US011880760B2

(12) United States Patent
Ovsiannikov et al.

(10) Patent No.: US 11,880,760 B2
(45) Date of Patent: **\*Jan. 23, 2024**

(54) MIXED-PRECISION NPU TILE WITH DEPTH-WISE CONVOLUTION

(71) Applicant: Samsung Electronics Co., Ltd., Suwon-si (KR)

(72) Inventors: Ilia Ovsiannikov, Porter Ranch, CA (US); Ali Shafiee Ardestani, San Jose, CA (US); Hamzah Ahmed Ali Abdelaziz, San Jose, CA (US); Joseph H. Hassoun, Los Gatos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 441 days.

This patent is subject to a terminal disclaimer.

(21) Appl. No.: 16/840,172

(22) Filed: Apr. 3, 2020

(65) Prior Publication Data

US 2020/0349420 A1 Nov. 5, 2020

Related U.S. Application Data

(60) Provisional application No. 62/841,590, filed on May 1, 2019.

(51) Int. Cl.
*G06F 9/30* (2018.01)
*G06N 3/063* (2023.01)
*G06F 13/16* (2006.01)

(52) U.S. Cl.
CPC ........... *G06N 3/063* (2013.01); *G06F 9/3001* (2013.01); *G06F 9/30032* (2013.01); *G06F 13/1668* (2013.01)

(58) Field of Classification Search
CPC .............. G06F 9/3001; G06F 9/30032; G06F 13/1668; G06F 13/00; G06F 12/00; G06N 3/063
See application file for complete search history.

(56) References Cited

U.S. PATENT DOCUMENTS 5,285,403 A   2/1994   Quisquater et al.
6,061,749 A   5/2000   Webb et al.
(Continued)

FOREIGN PATENT DOCUMENTS

CN   106650922 A   5/2017
CN   108615036 A   10/2018
(Continued)

OTHER PUBLICATIONS

Office Action for U.S. Appl. No. 16/847,504 dated May 10, 2022, 16 pages.
(Continued)

*Primary Examiner* — Tuan V Thai
(74) *Attorney, Agent, or Firm* — Lewis Roca Rothgerber Christie LLP

(57) ABSTRACT

A processor to perform inference on deep learning neural network models. In some embodiments, the process includes: a first tile, a second tile, a memory, and a bus, the bus being connected to: the memory, the first tile, and the second tile, the first tile including: a first weight register, a second weight register, an activations cache, a shuffler, an activations buffer, a first multiplier, and a second multiplier, the activations buffer being configured to include: a first queue connected to the first multiplier, and a second queue connected to the second multiplier, the activations cache including a plurality of independent lanes, each of the independent lanes being randomly accessible, the first tile being configured: to receive a tensor including a plurality of two-dimensional arrays, each representing one color component of the image; and to perform a convolution of a kernel with one of the two-dimensional arrays.

18 Claims, 136 Drawing Sheets

(56) References Cited

U.S. PATENT DOCUMENTS

| | | | |
|---|---|---|---|
| 9,418,458 | B2 | 8/2016 | Chertok et al. |
| 9,721,203 | B1 | 8/2017 | Young et al. |
| 9,836,691 | B1 | 12/2017 | Narayanaswami et al. |
| 9,904,874 | B2 | 2/2018 | Shoaib et al. |
| 10,438,117 | B1 | 10/2019 | Ross et al. |
| 10,521,488 | B1* | 12/2019 | Ross .................. G06N 3/063 |
| 10,664,751 | B2 | 5/2020 | Henry et al. |
| 10,706,147 | B1* | 7/2020 | Pohlack ............ H04L 63/1416 |
| 11,250,326 | B1 | 2/2022 | Ko et al. |
| 2016/0162782 | A1 | 6/2016 | Park |
| 2017/0011288 | A1 | 1/2017 | Brothers et al. |
| 2017/0103306 | A1 | 4/2017 | Henry et al. |
| 2017/0103314 | A1 | 4/2017 | Ross |
| 2017/0124452 | A1 | 5/2017 | Tucker et al. |
| 2017/0316312 | A1 | 11/2017 | Goyal et al. |
| 2017/0357891 | A1 | 12/2017 | Judd et al. |
| 2018/0032859 | A1 | 2/2018 | Park et al. |
| 2018/0046894 | A1 | 2/2018 | Yao |
| 2018/0046906 | A1 | 2/2018 | Dally et al. |
| 2018/0046913 | A1 | 2/2018 | Yu et al. |
| 2018/0096226 | A1 | 4/2018 | Aliabadi et al. |
| 2018/0101743 | A1 | 4/2018 | Yang et al. |
| 2018/0129935 | A1 | 5/2018 | Kim et al. |
| 2018/0181857 | A1 | 6/2018 | Mathew et al. |
| 2018/0181858 | A1 | 6/2018 | Son et al. |
| 2018/0189642 | A1 | 7/2018 | Boesch et al. |
| 2018/0217962 | A1 | 8/2018 | Takahashi |
| 2018/0218518 | A1 | 8/2018 | Yan et al. |
| 2018/0253636 | A1 | 9/2018 | Lee et al. |
| 2018/0259970 | A1 | 9/2018 | Wang et al. |
| 2018/0285254 | A1 | 10/2018 | Baum et al. |
| 2018/0307495 | A1 | 10/2018 | Ould-Ahmed-Vall et al. |
| 2018/0307950 | A1 | 10/2018 | Nealis et al. |
| 2019/0042923 | A1 | 2/2019 | Janedula et al. |
| 2019/0065896 | A1 | 2/2019 | Lee et al. |
| 2019/0066257 | A1 | 2/2019 | Daga et al. |
| 2019/0079764 | A1 | 3/2019 | Diamond et al. |
| 2019/0114511 | A1 | 4/2019 | Gao et al. |
| 2019/0130250 | A1 | 5/2019 | Park et al. |
| 2019/0138898 | A1 | 5/2019 | Song et al. |
| 2019/0147327 | A1 | 5/2019 | Martin |
| 2019/0156201 | A1 | 5/2019 | Bichler et al. |
| 2019/0205095 | A1 | 7/2019 | Gupta et al. |
| 2019/0236049 | A1 | 8/2019 | Vantrease et al. |
| 2019/0317732 | A1 | 10/2019 | Xu et al. |
| 2019/0392287 | A1 | 12/2019 | Ovsiannikov et al. |
| 2020/0210517 | A1 | 7/2020 | Baum et al. |
| 2021/0011732 | A1 | 1/2021 | Botimer et al. |

FOREIGN PATENT DOCUMENTS

| | | |
|---|---|---|
| CN | 110110707 A | 8/2019 |
| JP | 2018-92561 A | 6/2018 |
| TW | 201706871 A | 2/2017 |
| WO | 2016/186826 A1 | 11/2016 |
| WO | WO 2016/186801 A1 | 11/2016 |
| WO | WO 2017/142397 A1 | 8/2017 |
| WO | WO 2017/186830 A1 | 11/2017 |
| WO | 2019/213745 A1 | 11/2019 |

OTHER PUBLICATIONS

Jorge Albericio, Bit-Pragmatic Deep Neural Network Computing, Oct. 2017, MICRO-50, p. 385-387,390. (Year: 2017).

U.S. Office Action dated Jun. 2, 2022, issued in U.S. Appl. No. 16/552,619, 14 pages.

U.S. Office Action dated Jun. 6, 2022, issued in U.S. Appl. No. 16/446,610, 14 pages.

U.S. Notice of Allowance dated Jun. 8, 2022, issued in U.S. Appl. No. 16/552,945, 12 pages.

U.S. Office Action dated Jun. 14, 2022, issued in U.S. Appl. No. 16/552,850, 17 pages.

U.S. Office Action dated Jul. 7, 2022, issued in U.S. Appl. No. 16/900,819, 15 pages.

Mittal, Sparsh, "A survey of FPGA-based accelerators for convolutional neural networks," Neural Computing and Applications, 2020, pp. 1109-1139.

Sombatsiri, Salita, et al., "Parallelism-Flexible Convolution Core for Sparse Convolutional Neural Networks," SASIMI 2018 Proceedings, 2018, pp. 188-193.

Ahmad et al., "FPGA-based Accelerators of Deep Learning Networks for Learning and Classification: A Review," Jan. 1, 2019, Date of publication 2018 00, 0000, date of current version 2018 00, 0000. Digital Object Identifier 10.1109/ACCESS.2018.2890150. DOI, arXiv:1901.00121v1[cs.NE], pp. 1-41.

Aimar et al., "Nullhop: a Flexible Convolutional Neural Network Accerlerator Based on Sparse Representations of Feature Maps," Mar. 6, 2018, arXiv:1706.01406v2 [cs.CV], pp. 1-13.

Lascorz, A.D. et al., "Bit-Tactical: Exploiting Ineffectual Computations in Convolutional Neural Networks: Which, Why, and How", Cornell University, Computer Science, Neural and Evolutionary Computing, Mar. 9, 2018, pp. 1-14, arXiv:1803.03688v1.

Shaoli et al., "Cambricon: An Instruction Set Architecture for Neural Networks," 2016 ACM/IEEE 43rd Annual International Symposium on Computer Architecture, pp. 1-13.

Yu-Hsin et al., "Eyeriss v2: A Flexible Accelerator for Emerging Deep Neural Networks on Mobile Devices," May 20, 2019, arXiv:1807.07928v2 [cs.DC], pp. 1-21.

U.S. Notice of Allowance dated Feb. 1, 2023, issued in U.S. Appl. No. 16/552,945 (5 pages).

U.S. Notice of Allowance dated Feb. 13, 2023, issued in U.S. Appl. No. 16/446,610 (5 pages).

U.S. Notice of Allowance dated Feb. 23, 2023, issued in U.S. Appl. No. 16/552,619 (5 pages).

U.S. Office Action dated Feb. 28, 2023, issued in U.S. Appl. No. 16/900,819 (16 pages).

U.S. Notice of Allowance dated Mar. 2, 2023, issued in U.S. Appl. No. 16/552,850 (5 pages).

U.S. Advisory Action dated Jan. 3, 2023, issued in U.S. Appl. No. 16/900,819 (3 pages).

U.S. Notice of Allowance dated Sep. 21, 2022, issued in U.S. Appl. No. 16/552,945 (5 pages).

U.S. Final Office Action dated Oct. 12, 2022, issued in U.S. Appl. No. 16/900,819 (15 pages).

U.S. Notice of Allowance dated Oct. 13, 2022, issued in U.S. Appl. No. 16/552,619 (10 pages).

U.S. Notice of Allowance dated Oct. 14, 2022, issued in U.S. Appl. No. 16/552,850 (9 pages).

US Ex Parte Quayle Action dated Oct. 17, 2022, issued in U.S. Appl. No. 16/847,504 (11 pages).

U.S. Final Office Action dated Nov. 28, 2022, issued in U.S. Appl. No. 16/446,610 (9 pages).

U.S. Final Office Action dated May 30, 2023, issued in U.S. Appl. No. 16/900,819 (15 pages).

U.S. Office Action dated Sep. 18, 2023, issued in U.S. Appl. No. 16/900,819 (14 pages).

Japanese Notice of Allowance dated Jul. 25, 2023, issued in Japanese Patent Application No. 2020-571552 (3 pages).

Taiwanese Search Report dated Sep. 20, 2023, issued in Taiwanese Patent Application No. 109132495 (2 pages).

* cited by examiner

FIG. 2B-1

| | | | | | | | | | TO FIG. 2B-2 |
|---|---|---|---|---|---|---|---|---|---|
| IFM tensor start address in memory | AIFM | I00,0 | I00,1 | I00,2 | I00,3 | I00,4 | I00,5 | I00,6 | I00,7 | I00,8 |
| AIFM + (12*0+ 1)*16 bytes | I01,0 | I01,1 | I01,2 | I01,3 | I01,4 | I01,5 | I01,6 | I01,7 | I01,8 |
| AIFM + (12*0+ 2)*16 bytes | I02,0 | I02,1 | I02,2 | I02,3 | I02,4 | I02,5 | I02,6 | I02,7 | I02,8 |
| AIFM + (12*0+ 3)*16 bytes | I03,0 | I03,1 | I03,2 | I03,3 | I03,4 | I03,5 | I03,6 | I03,7 | I03,8 |
| AIFM + (12*0+ 4)*16 bytes | I04,0 | I04,1 | I04,2 | I04,3 | I04,4 | I04,5 | I04,6 | I04,7 | I04,8 |
| AIFM + (12*0+ 5)*16 bytes | I05,0 | I05,1 | I05,2 | I05,3 | I05,4 | I05,5 | I05,6 | I05,7 | I05,8 |
| ... | | | | | | | | | |
| AIFM + (12*0+11)*16 bytes | I0b,0 | I0b,1 | I0b,2 | I0b,3 | I0b,4 | I0b,5 | I0b,6 | I0b,7 | I0b,8 |
| AIFM + (12*1+ 0)*16 bytes | I10,0 | I10,1 | I10,2 | I10,3 | I10,4 | I10,5 | I10,6 | I10,7 | I10,8 |
| AIFM + (12*1+ 1)*16 bytes | I11,0 | I11,1 | I11,2 | I11,3 | I11,4 | I11,5 | I11,6 | I11,7 | I11,8 |
| AIFM + (12*1+ 2)*16 bytes | I12,0 | I12,1 | I12,2 | I12,3 | I12,4 | I12,5 | I12,6 | I12,7 | I12,8 |
| ... | | | | | | | | | |
| AIFM + (12*4+10)*16 bytes | I4a,0 | I4a,1 | I4a,2 | I4a,3 | I4a,4 | I4a,5 | I4a,6 | I4a,7 | I4a,8 |
| AIFM + (12*4+11)*16 bytes | I4b,0 | I4b,1 | I4b,2 | I4b,3 | I4b,4 | I4b,5 | I4b,6 | I4b,7 | I4b,8 |

|     |     |     |     |     |     |     |     |     |     |     |     |
|-----|-----|-----|-----|-----|-----|-----|-----|-----|-----|-----|-----|
| A00 | R00 | G00 | B00 | A01 | R01 | G01 | B01 | A02 | R02 | G02 | B02 | A03 | R03 | G03 | B03 |
| A04 | R04 | G04 | B04 | A05 | R05 | G05 | B05 | A06 | R06 | G06 | B06 | A07 | R07 | G07 | B07 |
| A08 | R08 | G08 | B08 | A09 | R09 | G09 | B09 | A0a | R0a | G0a | B0a | A0b | R0b | G0b | B0b |
| A10 | R10 | G10 | B10 | A11 | R11 | G11 | B11 | A12 | R12 | G12 | B12 | A13 | R13 | G13 | B13 |
| A14 | R14 | G14 | B14 | A15 | R15 | G15 | B15 | A16 | R16 | G16 | B16 | A17 | R17 | G17 | B17 |
| A18 | R18 | G18 | B18 | A19 | R19 | G19 | B19 | A1a | R1a | G1a | B1a | A1b | R1b | G1b | B1b |
| A20 | R20 | G20 | B20 | A21 | R21 | G21 | B21 | A22 | R22 | G22 | B22 | A23 | R23 | G23 | B23 |
| ... |
| A38 | R38 | G38 | B38 | A89 | R89 | G89 | B89 | A8a | R8a | G8a | B8a | A8b | R8b | G8b | B8b |
| A40 | R40 | G40 | B40 | A41 | R41 | G41 | B41 | A42 | R42 | G42 | B42 | A43 | R43 | G43 | B43 |
| A44 | R44 | G44 | B44 | A45 | R45 | G45 | B45 | A46 | R46 | G46 | B46 | A47 | R47 | G47 | B47 |
| A48 | R48 | G48 | B48 | A49 | R49 | G49 | B49 | A4a | R4a | G4a | B4a | A4b | R4b | G4b | B4b |

205 — 204

IFM tensor start address in memory

AARGB IFM
AARGB IFM + 1*16 bytes
AARGB IFM + 2*16 bytes
AARGB IFM + 3*16 bytes
AARGB IFM + 4*16 bytes
AARGB IFM + 5*16 bytes
AARGB IFM + 6*16 bytes
...

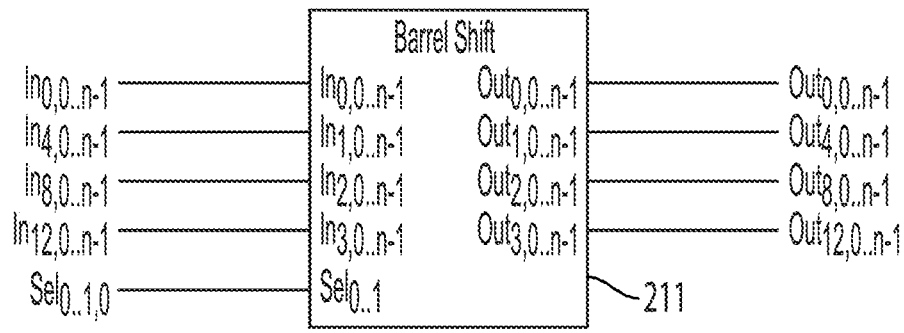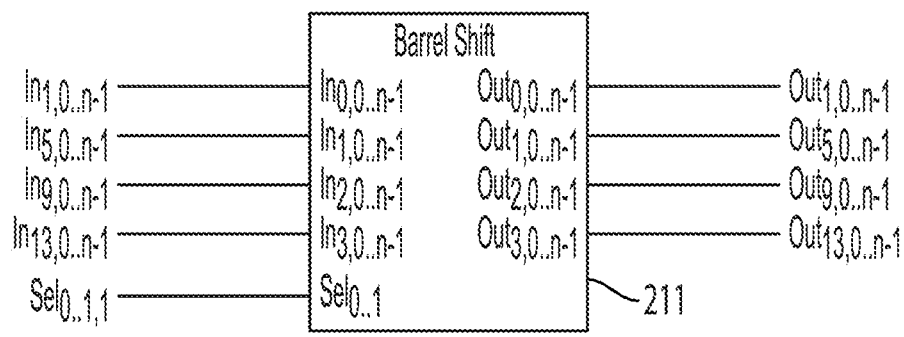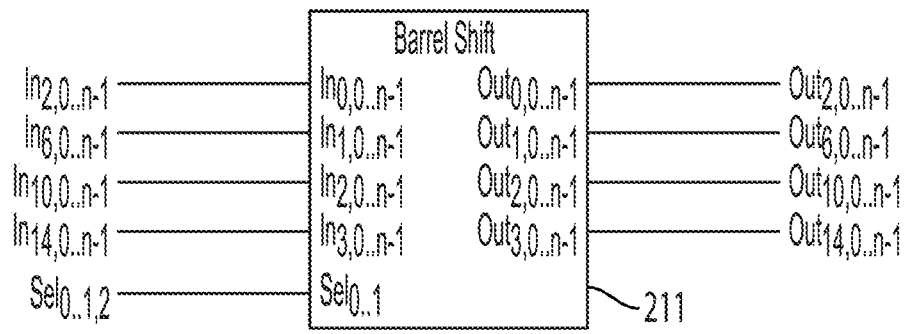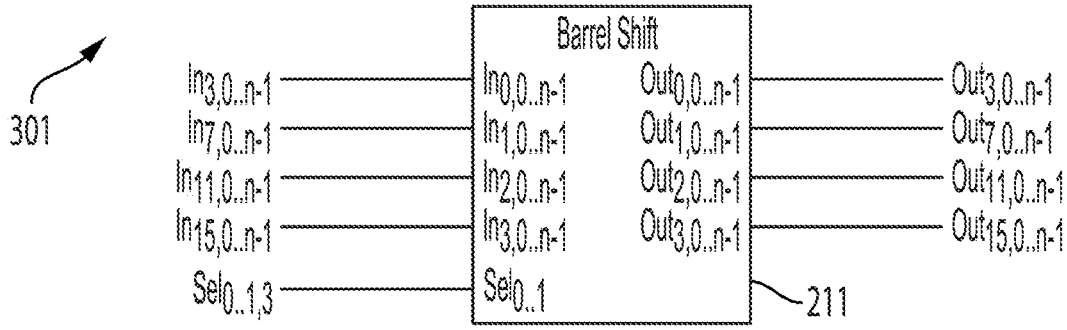
FIG. 3R

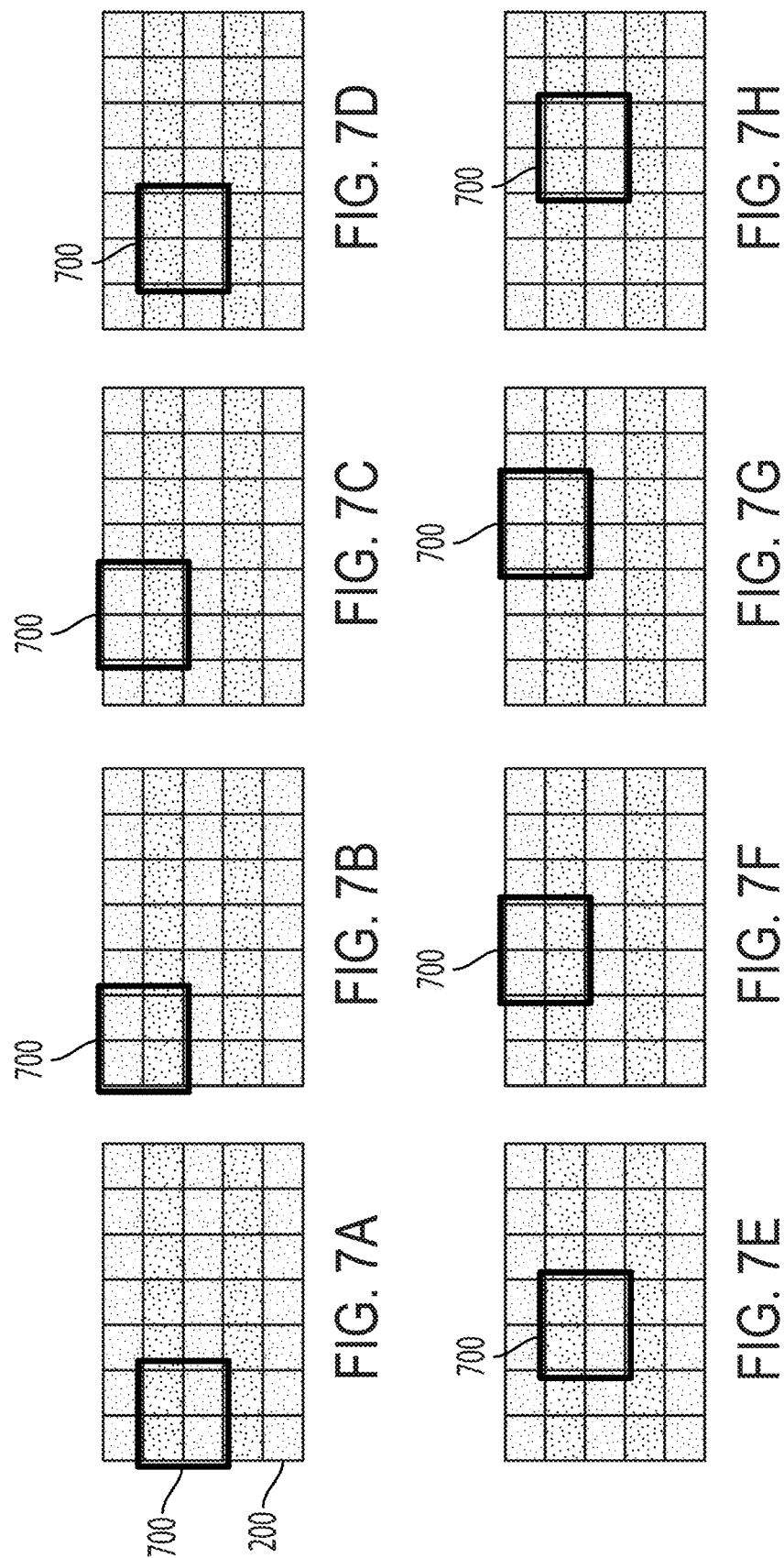

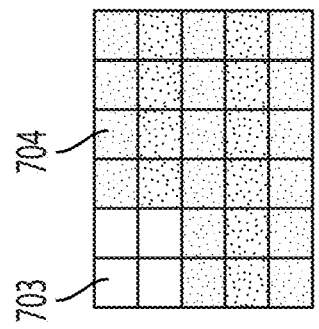
FIG. 8B
FIG. 8C
FIG. 8D
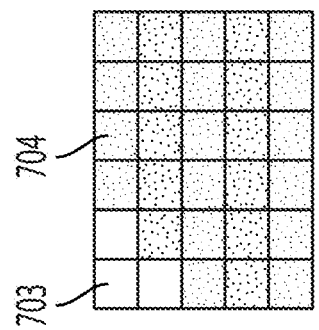
FIG. 8A
FIG. 8E
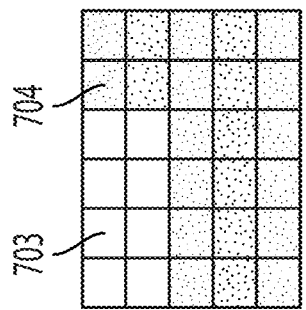
FIG. 8F
FIG. 8G
FIG. 8H

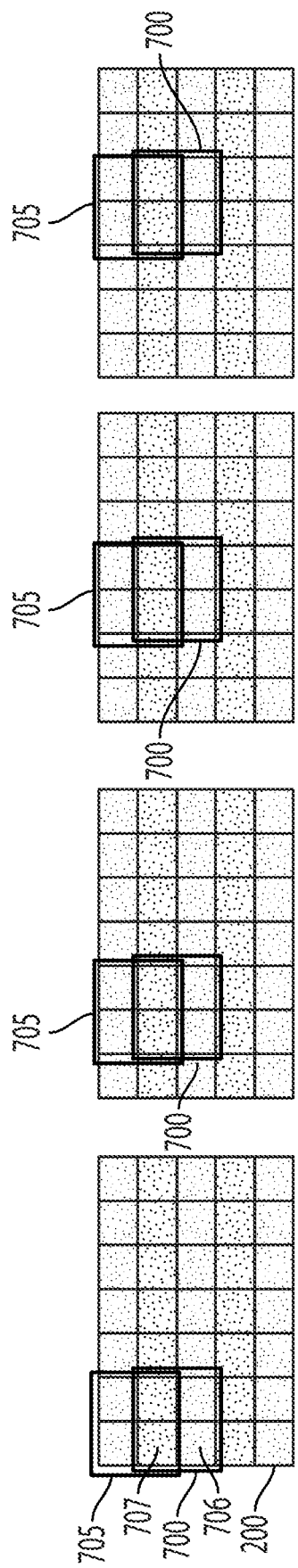

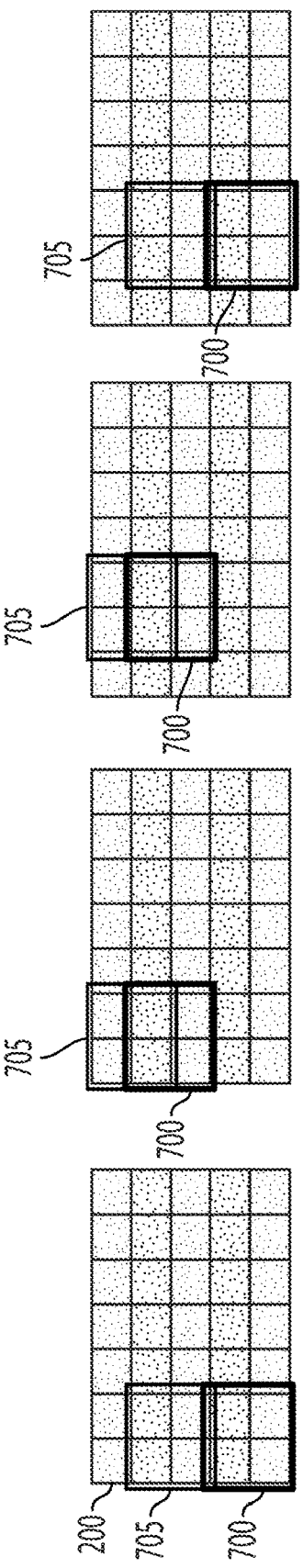

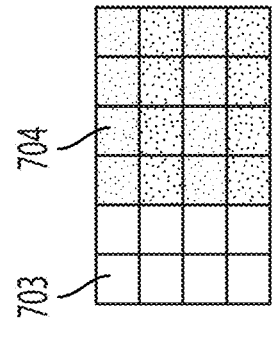
FIG. 12D
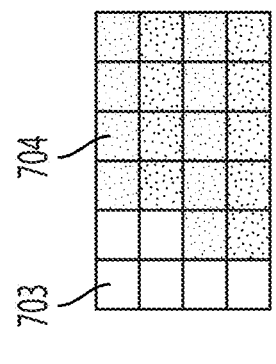
FIG. 12C
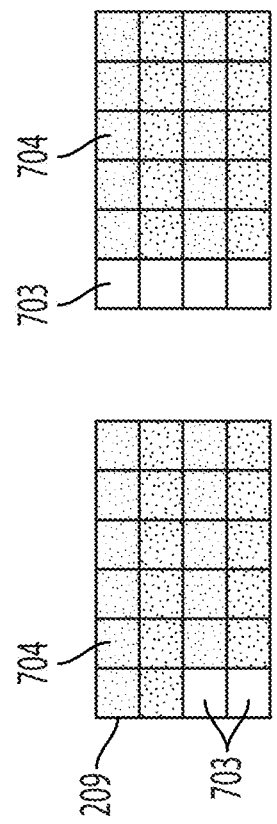
FIG. 12B
FIG. 12A
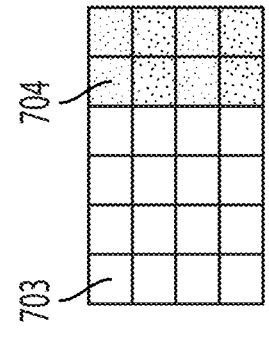
FIG. 12H
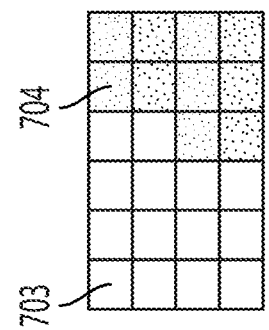
FIG. 12G
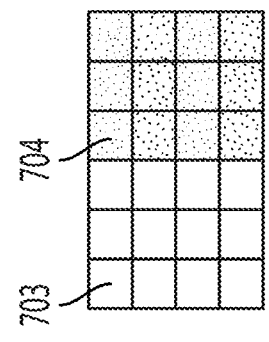
FIG. 12F
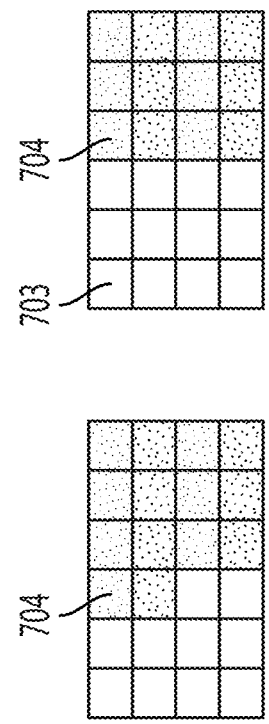
FIG. 12E

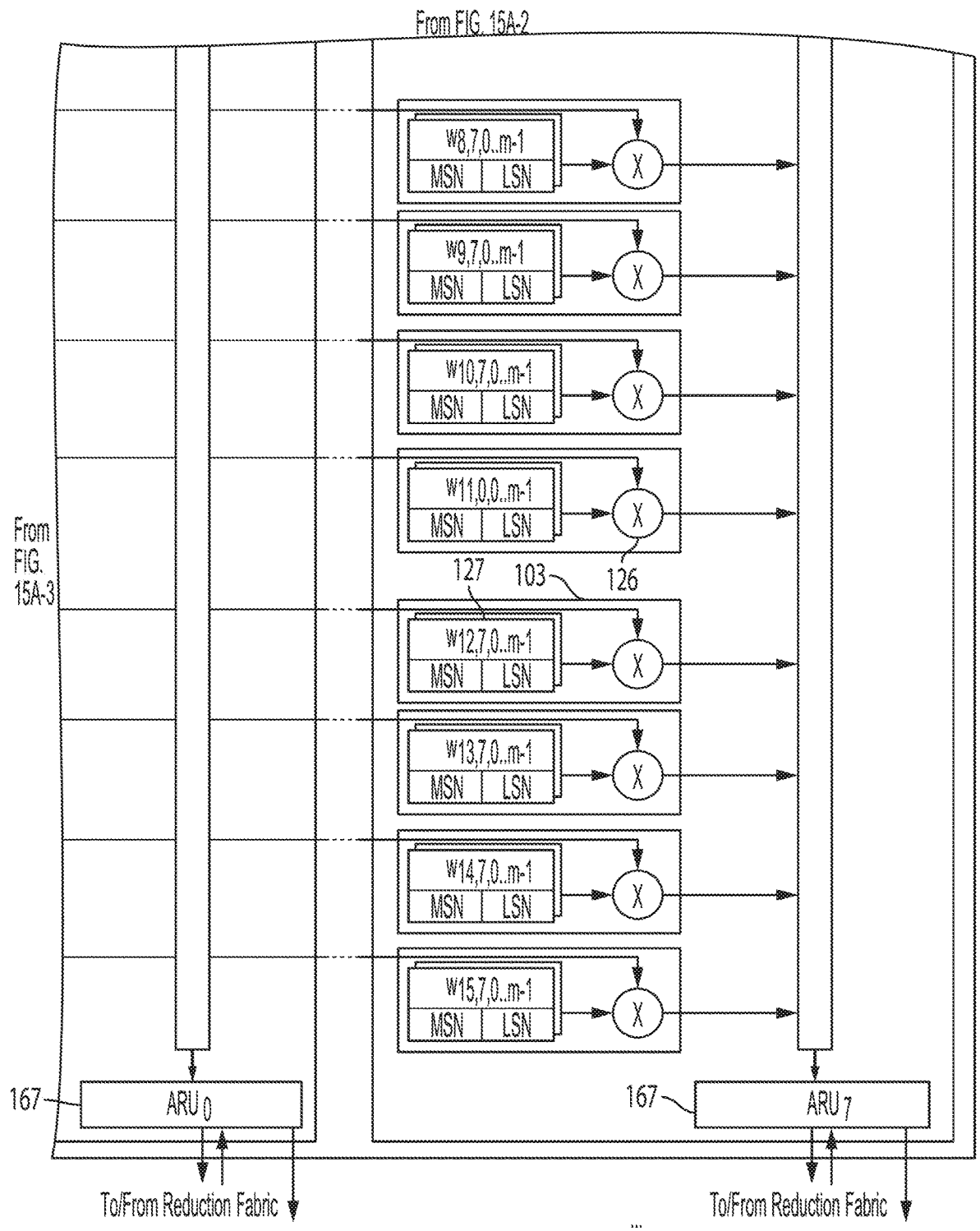
FIG. 15A-4   8 X 1 Byte, To OFM Fabric

US 11,880,760 B2

MIXED-PRECISION NPU TILE WITH DEPTH-WISE CONVOLUTION

CROSS-REFERENCE TO RELATED APPLICATION(S)

The present application claims priority to and the benefit of U.S. Provisional Application No. 62/841,590, filed May 1, 2019, entitled "MIXED-PRECISION NPU TILE WITH DEPTH-WISE CONVOLUTION", the entire content of which is incorporated herein by reference.

The present application is related to U.S. patent application Ser. No. 16/446,610, filed on Jun. 19, 2019 entitled "NEURAL PROCESSOR", ("the '610 application"), the entire content of which is incorporated herein by reference.

FIELD

One or more aspects of embodiments according to the present disclosure relate to neural processors, and more particularly to a mixed-precision neural processor with depth-wise convolution.

BACKGROUND

A common operation performed by a neural processing unit (NPU), or "neural processor", is a convolution of a tensor of activations (or input feature map (IFM)) with a convolution kernel. The neural processor described in U.S. patent application Ser. No. 16/446,610 can perform direct convolution on activation data tensors stored in depth-major order. However, deep neural network models may utilize a certain type of convolution called "depth-wise separable" convolution that the previously-described NPU does not support. Also, deep neural network models commonly perform direct convolution on image data, such as RGB image, where the image data is traditionally stored in planar-wise order that the previously-described NPU does not support. Furthermore, the power consumption and/or silicon area of the previously-described NPU can be reduced, while maintaining the computation precision and throughput, by optimizing NPU micro-architecture to take advantage of activations and/or weights frequently having zero or near-zero values. Thus, there is a need for a neural processor suitable for performing depth-wise convolutions, performing direct convolutions on image data stored in planar-wise order and efficiently performing convolutions when activations and/or weights frequently have zero or near-zero values.

SUMMARY

According to some embodiments of the present disclosure, there is provided a processor, including: a first tile, a second tile, a memory, and a bus, the bus being connected to: the memory, the first tile, and the second tile, the first tile including: a first weight register, a second weight register, an activations cache, a shuffler, an activations buffer, a first multiplier, and a second multiplier, the activations buffer being configured to include: a first queue connected to the first multiplier, and a second queue connected to the second multiplier, the activations cache including a plurality of independent lanes, each of the independent lanes being randomly accessible, the first tile being configured to: receive a tensor of activations representing an image including a plurality of pixels each having a plurality of color components, the tensor including a plurality of two-dimensional arrays, each representing one color component of the image; and to perform a convolution of a kernel with one of the two-dimensional arrays.

In some embodiments, the shuffler is connected to an output of the activations cache.

In some embodiments, the first tile includes a plurality of multipliers including the first multiplier and the second multiplier, arranged in a plurality of columns and a plurality of lanes, the lanes being arranged in groups of four, each group of lanes including an adder tree for summing outputs of the multipliers.

In some embodiments, the first tile further includes an accumulator for each group of lanes, for accumulating outputs of the adder tree.

In some embodiments, the first tile further includes, for a set of four groups of lanes: a plurality of bit shifters, for shifting products involving at least one most significant nibble to be offset from products involving two least significant nibbles, and a plurality of accumulators, for accumulating the outputs of the bit shifters.

In some embodiments, the shuffler has a granularity of four lanes.

In some embodiments, the shuffler has a granularity of one lane.

In some embodiments, the shuffler is connected to an input of the activations cache.

In some embodiments, the first tile includes a plurality of multipliers including the first multiplier and the second multiplier, arranged in a columns and a plurality of lanes, the lanes being arranged in groups of four, each group of lanes including an adder tree for summing outputs of the multipliers.

In some embodiments, the first tile further includes an accumulator for each group of lanes, for accumulating outputs of the adder tree.

In some embodiments, the first tile further includes, for a set of four groups of lanes: a plurality of bit shifters, for shifting products involving at least one most significant nibble to be offset from products involving two least significant nibbles, and a plurality of accumulators, for accumulating the outputs of the bit shifters.

In some embodiments, the shuffler has a granularity of four lanes.

In some embodiments, the shuffler has a granularity of one lane.

According to some embodiments of the present disclosure, there is provided a method for calculating with a processing circuit, the processing circuit including: a first tile, a second tile, a memory, and a bus, the bus being connected to: the memory, the first tile, and the second tile, the first tile including: a first weight register, a second weight register, an activations cache, a shuffler, an activations buffer, a first multiplier, and a second multiplier, the activations buffer being configured to include: a first queue connected to the first multiplier, and a second queue connected to the second multiplier, the activations cache including a plurality of independent lanes, each of the independent lanes being randomly accessible, the method including: receiving a tensor of activations representing an image including a plurality of pixels each having a plurality of color components, the tensor including a plurality of two-dimensional arrays, each representing one color component of the image; and performing a convolution of a kernel with one of the two-dimensional arrays.

In some embodiments, the shuffler is connected to an output of the activations cache.

In some embodiments, the first tile includes a plurality of multipliers including the first multiplier and the second multiplier, arranged in a plurality of columns and a plurality of lanes, the lanes being arranged in groups of four, each group of lanes including an adder tree for summing outputs of the multipliers.

In some embodiments, the first tile further includes an accumulator for each group of lanes, for accumulating outputs of the adder tree.

In some embodiments, the first tile further includes, for a set of four groups of lanes: a plurality of bit shifters, for shifting products involving at least one most significant nibble to be offset from products involving two least significant nibbles, and a plurality of accumulators, for accumulating the outputs of the bit shifters.

In some embodiments, the shuffler has a granularity of four lanes.

According to some embodiments of the present disclosure, there is provided a method for calculating with a means for processing, the means for processing including: a first tile, a second tile, a memory, and a bus, the bus being connected to: the memory, the first tile, and the second tile, the first tile including: a first weight register, a second weight register, an activations cache, a shuffler, an activations buffer, a first multiplier, and a second multiplier, the activations buffer being configured to include: a first queue connected to the first multiplier, and a second queue connected to the second multiplier, the activations cache including a plurality of independent lanes, each of the independent lanes being randomly accessible, the method including: receiving a tensor of activations representing an image including a plurality of pixels each having a plurality of color components, the tensor including a plurality of two-dimensional arrays, each representing one color component of the image; and performing a convolution of a kernel with one of the two-dimensional arrays.

BRIEF DESCRIPTION OF THE DRAWINGS

These and other features and advantages of the present disclosure will be appreciated and understood with reference to the specification, claims, and appended drawings wherein:

FIGS. 2B-1 and 2B-2 show a 3D IFM tensor with a planar size of 5 rows by 12 columns and a depth of 16 channels, stored in memory using the depth-major data order.

FIG. 2D-1 and FIG. 2D-2 show a 3D IFM tensor with a planar size of 5 rows by 12 columns and a depth of 32 channels, stored in memory using the depth-major data order.

FIGS. 2F-1, 2F-2, 2F-3, and 2F-4 show a block diagram of a multiply-reduce tile modified to compute depth-wise-separable convolution on 3D IFM sensors.

FIGS. 2G-1 and 2G-2 illustrate a step of an example of a 3×3×16 depth-wise-separable convolution operation.

FIGS. 2H-1 and 2H-2 illustrate a step of an example of a 3×3×16 depth-wise-separable convolution operation.

FIGS. 2I-1 and 2I-2 illustrate a step of an example of a 3×3×16 depth-wise-separable convolution operation.

FIGS. 2J-1 and 2J-2 illustrate a step of an example of a 3×3×16 depth-wise-separable convolution operation.

FIG. 3B illustrates the order in which ARGB IFM tensor values are stored in SRAM.

FIGS. 3C-1 and 3C-2 illustrate a multiply-reduce tile performing an ARGB convolution.

FIGS. 3D-1 and 3D-2 illustrate a multiply-reduce tile performing an ARGB convolution.

FIGS. 3E-1 and 3E-2 illustrate a multiply-reduce tile performing an ARGB convolution.

FIGS. 3F-1 and 3F-2 illustrate a multiply-reduce tile performing an ARGB convolution.

FIGS. 3G-1 and 3G-2 illustrate a multiply-reduce tile performing an ARGB convolution.

FIGS. 3H-1 and 3H-2 illustrate a multiply-reduce tile performing an ARGB convolution.

FIGS. 3I-1 and 3I-2 illustrate a multiply-reduce tile performing an ARGB convolution.

FIGS. 3J-1 and 3J-2 illustrate a multiply-reduce tile performing an ARGB convolution.

FIGS. 3L-1 and 3L-2 illustrate a step of an example of an alternative embodiment for ARGB convolution.

FIGS. 3M-1 and 3M-2 illustrate a step of an example of an alternative embodiment for ARGB convolution.

FIGS. 3N-1 and 3N-2 illustrate a step of an example of an alternative embodiment for ARGB convolution.

FIGS. 3O-1 and 3O-2 illustrate a step of an example of an alternative embodiment for ARGB convolution.

FIGS. 3P-1 and 3P-2 illustrate a step of an example of an alternative embodiment for ARGB convolution.

FIGS. 3Q-1 and 3Q-2 illustrate a step of an example of an alternative embodiment for ARGB convolution.

FIG. 3R illustrates a block diagram of an arrayed interleaved barrel shift unit utilized by an alternative embodiment of ARGB convolution.

FIGS. 3S-1 and 3S-2 illustrate an ARGB convolution embodiment where alpha values from IFM cache do not reach the multiply-reduce array.

FIGS. 3U-1 and 3U-2 illustrate the micro-architecture of the ARGB-to-RGB barrel shift unit utilized by an ARGB convolution where alpha values from IFM cache do not reach the multiply-reduce array.

FIGS. 3V-1, 3V-2, 3V-3, and 3V-4 illustrate the micro-architecture of the ARGB-to-RGB barrel shift unit utilized by an ARGB convolution where alpha values from IFM cache do not reach the multiply-reduce array.

FIG. 3X illustrates the order in which RGB IFM tensor values may be stored in SRAM.

FIGS. 3Y-1 and 3Y-2 illustrate an example of RGB convolution.

FIGS. 3Z-1 and 3Z-2 illustrate an example of RGB convolution.

FIGS. 3AA-1 and 3AA-2 illustrate an example of RGB convolution.

FIGS. 3AB-1 and 3AB-2 illustrate an example of RGB convolution.

FIG. 4A-1, FIG. 4A-2, FIG. 4A-3, and FIG. 4A-4 show an embodiment of multiply-reduce tile having the bit width of multiplier units 126 reduced from 8-bit-by-8-bit to 4-bits-by-4-bits or 4-bits-by-8-bits.

FIGS. 4B-1 and 4B-2 illustrate a baseline micro-architecture of multiplier unit having 8-by-8 bit width.

FIGS. 4D-1, 4D-2, and 4D-3 show an embodiment of multiplier unit having 8-bit weights and 4-bit activations.

FIGS. 4F-1 and 4F-2 illustrate an embodiment of multiplier unit operating on 4-bit activations and 4-bit weights.

FIGS. 5A-1, 5A-2, 5A-3, and 5A-4 show an embodiment of a multiply-reduce tile utilizing activation lane shuffling within each activation lane quad to increase computation throughput.

FIGS. 5F-1 and 5F-2 show a block diagram of a 16-channel butterfly shuffler.

FIGS. 6-1, 6-2, 6-3, 6-4 show a block diagram of a multiply-reduce tile embodiment where each weight register file is shared by two multipliers.

FIG. 7A illustrates a step of a convolution window of planar size 2×2 traversing an IFM tensor in a zig-zag fashion.

FIG. 7B illustrates a step of a convolution window of planar size 2×2 traversing an IFM tensor in a zig-zag fashion.

FIG. 7C illustrates a step of a convolution window of planar size 2×2 traversing an IFM tensor in a zig-zag fashion.

FIG. 7D illustrates a step of a convolution window of planar size 2×2 traversing an IFM tensor in a zig-zag fashion.

FIG. 7E illustrates a step of a convolution window of planar size 2×2 traversing an IFM tensor in a zig-zag fashion.

FIG. 7F illustrates a step of a convolution window of planar size 2×2 traversing an IFM tensor in a zig-zag fashion.

FIG. 7G illustrates a step of a convolution window of planar size 2×2 traversing an IFM tensor in a zig-zag fashion.

FIG. 7H illustrates a step of a convolution window of planar size 2×2 traversing an IFM tensor in a zig-zag fashion.

FIG. 8A shows computed convolution results.

FIG. 8B shows computed convolution results.

FIG. 8C shows computed convolution results.

FIG. 8D shows computed convolution results.

FIG. 8E shows computed convolution results.

FIG. 8F shows computed convolution results.

FIG. 8G shows computed convolution results.

FIG. 8H shows computed convolution results.

FIG. 9A illustrates planar locations of a convolution window pair that may be computed by multiply-reduce tiles utilizing the embodiment shown in FIG. 6.

FIG. 9B illustrates planar locations of a convolution window pair that may be computed by multiply-reduce tiles utilizing the embodiment shown in FIG. 6.

FIG. 9C illustrates planar locations of a convolution window pair that may be computed by multiply-reduce tiles utilizing the embodiment shown in FIG. 6.

FIG. 9D illustrates planar locations of a convolution window pair that may be computed by multiply-reduce tiles utilizing the embodiment shown in FIG. 6.

FIG. 11A illustrates a 2×1 convolution window pair.
FIG. 11B illustrates a 2×1 convolution window pair.
FIG. 11C illustrates a 2×1 convolution window pair.
FIG. 11D illustrates a 2×1 convolution window pair.
FIG. 11E illustrates a 2×1 convolution window pair.
FIG. 11F illustrates a 2×1 convolution window pair.
FIG. 11G illustrates a 2×1 convolution window pair.
FIG. 11H illustrates a 2×1 convolution window pair.
FIG. 12A shows computed convolution results.
FIG. 12B shows computed convolution results.
FIG. 12C shows computed convolution results.
FIG. 12D shows computed convolution results.
FIG. 12E shows computed convolution results.
FIG. 12F shows computed convolution results.
FIG. 12G shows computed convolution results.
FIG. 12H shows computed convolution results.

FIGS. 15A-1, 15A-2, 15A-3, and 15A-4 show a block diagram of a multiply-reduce tile having pairs of adder trees replaced with single adder trees and pairs of accumulate-and-return units replaced with single accumulate-and-return units.

FIGS. 15B-1, 15B-2, 15B-3, and 15B-4 show a block diagram of a multiply-reduce tile using an alternative, light-weight embodiment of zero activation skipping with activation lanes grouped in quads, each quad having a dedicated quad adder tree, each quad adder tree buffering its output in a quad FIFO and a column adder tree summing up outputs of all quad FIFOs in that column.

FIGS. 15C-1, 15C-2, 15C-3, and 15C-4 show a block diagram of a multiply-reduce tile combining planar for-loop unroll with the alternative zero activation skipping mechanism from FIG. 2F.

Figure 1A:
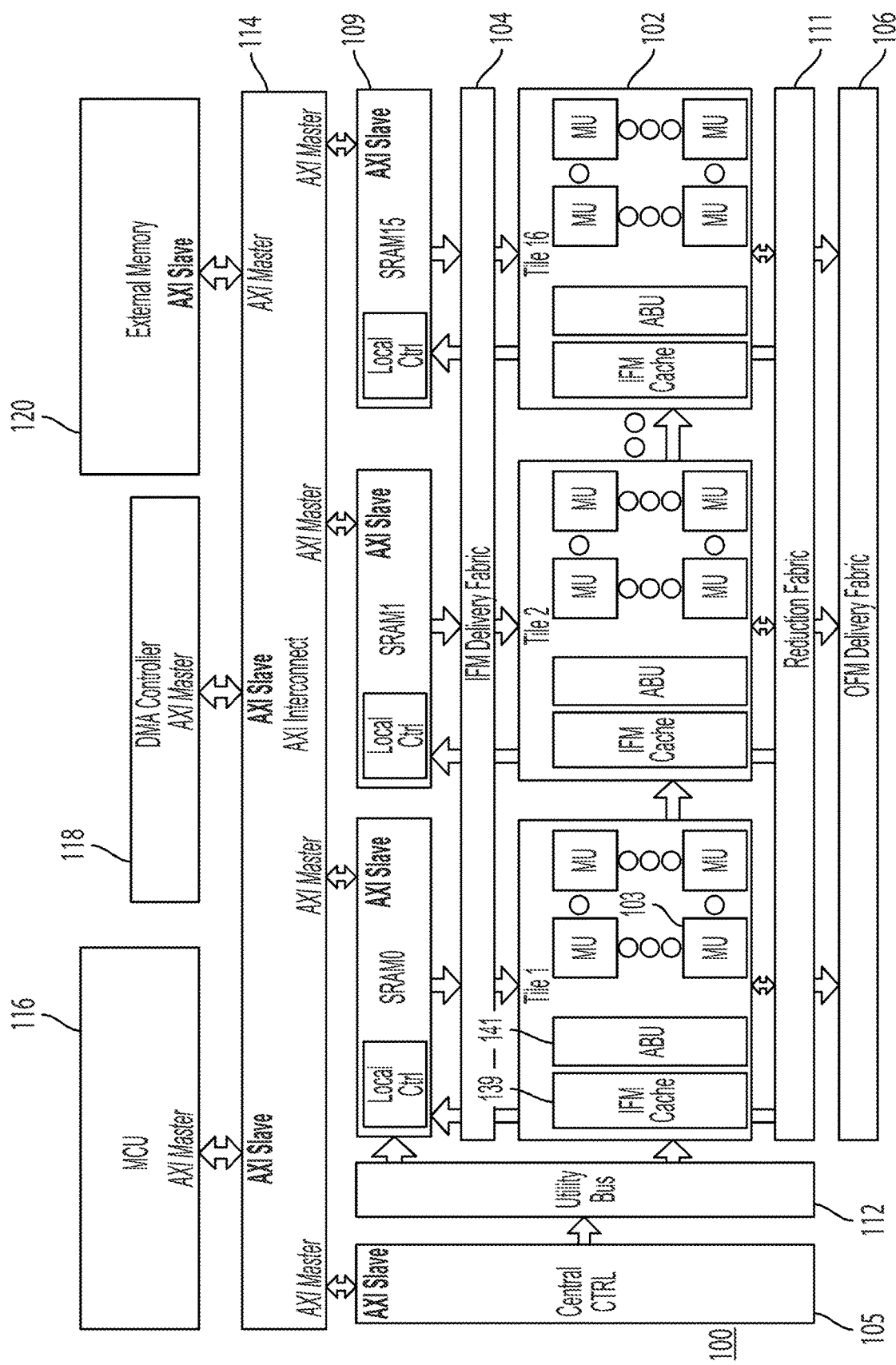
FIG. 1A is a neural processor unit block diagram, according to an embodiment of the present disclosure and the '610 application.

In the detailed description, drawings consisting of several parts may be referred to by an abbreviated drawing name omitting the portion identifying the part. For example, the drawing consisting of FIG. 2G-1 and FIG. 2G-2 may be referred to as simply as FIG. 2G.

DETAILED DESCRIPTION

The detailed description set forth below in connection with the appended drawings is intended as a description of exemplary embodiments of a mixed-precision NPU tile with depth-wise convolution provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

NPU Refresher—MU Array Calculates Vector-Matrix Dot Product

FIG. 1A shows a high-level block diagram of a neural processor 100, according to some embodiments. The neural processor 100 may be configured to efficiently calculate a convolution or a tensor product of an input feature map (IFM) (or a tensor of "activations") with a multi-dimensional array (or tensor) of weights, to form an output feature map (OFM). The neural processor may also be configured to compute feature map pooling and activation function.

As described in detail in the '610 application, a plurality of SRAM bank sets 109 (each including several, e.g., four SRAM banks) may be connected to Multiply-and-Reduce tiles 102 (or "MR tiles") through an input feature map (IFM) delivery fabric 104 that brings input activation maps stored in SRAM bank sets 109 to MR tiles 102 for subsequent computation. Each tile 102 may contain an array of multiplier units (MU) 103. Tiles 102 also connect to the SRAM bank sets 109 via an output feature map (OFM) delivery fabric 106 that transmits computed results from tiles 102 to SRAM bank sets 109 for storage.

The IFM delivery fabric 104 may be a segmented bus, and, as a result, each one of the SRAM bank sets 109 may be associated with one of the MR tiles 102. A central controller 105 may supply control words to control registers in the system via a utility bus 112. Data may be delivered to the neural processor's SRAM 109 via an AXI (Advanced Extensible Interconnect) interconnect 114 and the results of processing operations performed by the neural processor may similarly be retrieved from SRAM 109 via the AXI interconnect 114. An MCU (micro-controller) 116 can be used to orchestrate computation by properly configuring the central controller 105 in a timely fashion, as well as coordinating and executing data transfers using the DMA controller 118 between the neural processor 100 and an external memory 120. Please refer to the '610 application for details.

Figure 1B:
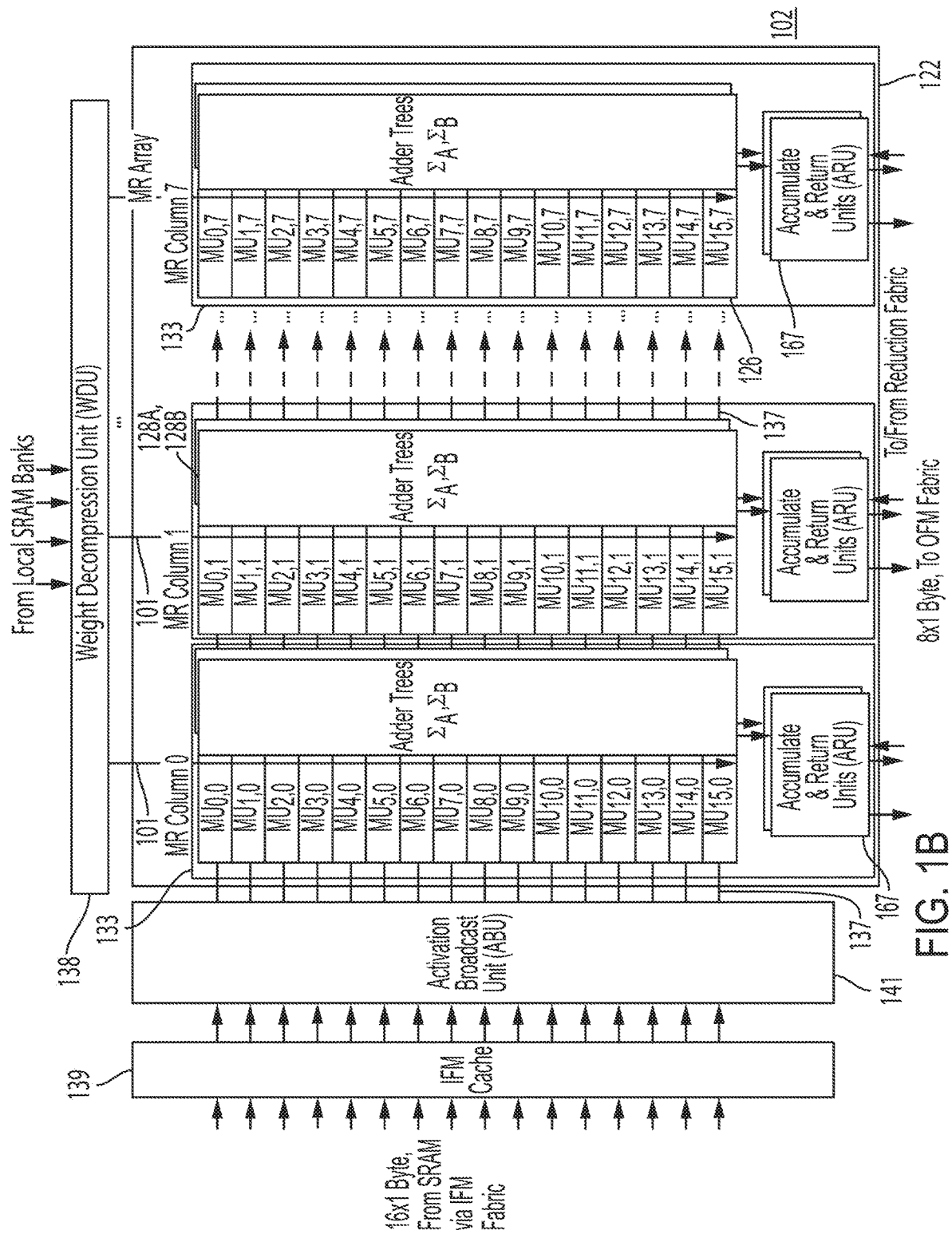
FIG. 1B is a multiply-reduce tile block diagram, according to an embodiment of the present disclosure and the '610 application.

FIG. 1B illustrates the multiply-and-reduce tile 102 as described in the '610 application. The present disclosure will focus on extending and optimizing MR tile 102. According to the '610 application, each MR tile 102 contains an 8×16 array of multiplier units 126. The array of multiply-reduce units is organized into 8 multiply-reduce columns 133. All 8 multiply-reduce columns receive same IFM data, which consists of 16 IFM channels. Using these received activations each multiply-reduce column calculates one OFM channel. Specifically, each multiply-reduce column calculates a dot product of 16 incoming activations with corresponding 16 weights, where each MU 126 performs a multiplication with a weight stored locally and pre-loaded before the layer computation begins. An adder tree 128A or 128B adds up the 16 products computed by MU 126 in MR column 133. Subsequently, the accumulate-and-return (ARU) unit 167 in MR column 133 may perform additional summation between tiles using the reduction fabric 111 and/or accumulation in order to support large weight kernel sizes. ARU 167 in each MR column 133 also typically applies an activation function to the sum and sends the resulting activation back to SRAM 109 via OFM delivery fabric 106. Please refer to the '610 application for details.

Inside each MR tile 102, a compact activations cache, or "IFM cache" 139 stores activations delivered from SRAM

109 over IFM delivery fabric 104. As the weight kernel in direct convolution "slides" over the IFM layer data, an element in the IFM tensor may be needed several times to calculate convolution at adjacent locations within the OFM tensor. Therefore, caching activations locally in each MR tile may allow computation to proceed without the need to fetch same IFM element from SRAM repetitively. This helps reduce the number of SRAM 109 reads, IFM delivery fabric bandwidth and the associated power and silicon area without reducing NPU computation throughput.

Activations from IFM cache 139 pass through the activation broadcast unit (ABU) 141, which converts signed activations into sign-and-magnitude numeric format. Subsequently, activations in sign-and-magnitude numeric format are broadcast over 16 activation lanes 137 to all eight MR columns 133 simultaneously. The use the sign-and-magnitude numeric format allows computing the product of activations and weights in cases when activations and/or weights in SRAM are stored in signed, unsigned, 8-bit, 16-bit or 8×N-bit formats, where N is a natural number. Specifically, if activations are encoded in signed format, e.g. int8, ABU converts signed activations into sign-and-and-magnitude format, where the sign is a one-bit signal and the magnitude is uint8. ABU bypasses the numeric format conversion when activations are encoded in unsigned format, e.g. uint8. If activations are 16-bit unsigned, i.e. uint16, ABU splits uint16 activations into uint8 MSB and uint8 LSB bytes and broadcasts these two bytes one after another to the MR array. Similarly, when processing 16-bit signed activations, i.e. int16, ABU converts int16 into uint16, splits the resulting uint16 into uint8 MSB and uint8 LSB and broadcasts these two bytes one after another to the MR array, accompanied by the sign that was associated with the input int16. Activations having longer bit width, such as 24 or 32, are processed in a similar way, by converting signed numbers to unsigned and subdividing the unsigned result into a sequence of bytes.

Figure 1C:
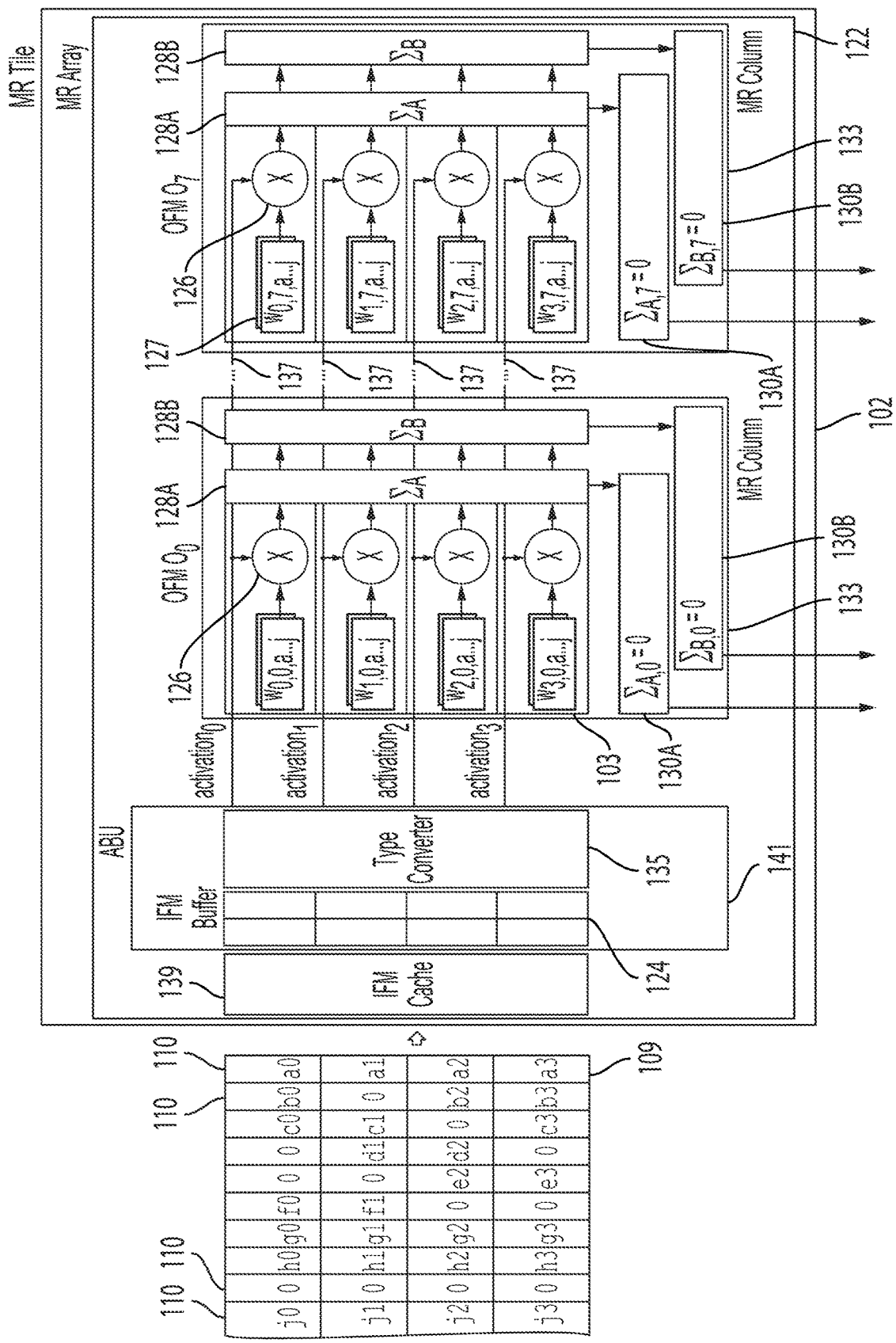
FIG. 1C illustrates a step of an example of zero activation skipping, as described in the '610 application.

Multiplier units 126 store kernel weights locally in weight register file 127, see FIG. 1C. Similar to activations, the weights are also stored in the sign-and-magnitude format to support calculation using signed, unsigned, 8-bit, 16-bit and 8×N-bit weights. Similar to ABU's numeric format conversion, weight decompression unit (WDU) converts signed and multi-byte weights into one or more sign-and-magnitude values as it loads weights from SRAM to weight register files 127. As used herein, a "weight register file" is an array of weight registers, each weight register being an register configured to store a weight.

It is common for IFM data to contain many zeros, for example 50% or more. As described in the '610 application, MR tile 102 can take advantage of IFM data having zero values and increase computation throughput up to 2× by skipping (not spending time to perform) multiplications of an activation by a weight where the activation is zero. Activation broadcast unit 141 facilitates such zero-activation skipping as illustrated in FIGS. 1C to 1F. In particular, FIG. 1C illustrates SRAM data 109 just before the computation begins. More specifically, SRAM data 109 is about to arrive to IFM cache 139, pass through ABU 141 and get broadcast over activation lanes 137 to eight MR columns 133. Note that ABU 141 contains an IFM buffer 124 and type converter 135. While the type converter 135 performs numeric format conversions as mentioned above, the IFM buffer 124 buffers two or more activations (per lane) fetched from IFM cache 139. Note that for clarity, FIGS. 1C to 1F show only 4 activations lanes out of 16.

Figure 1D:
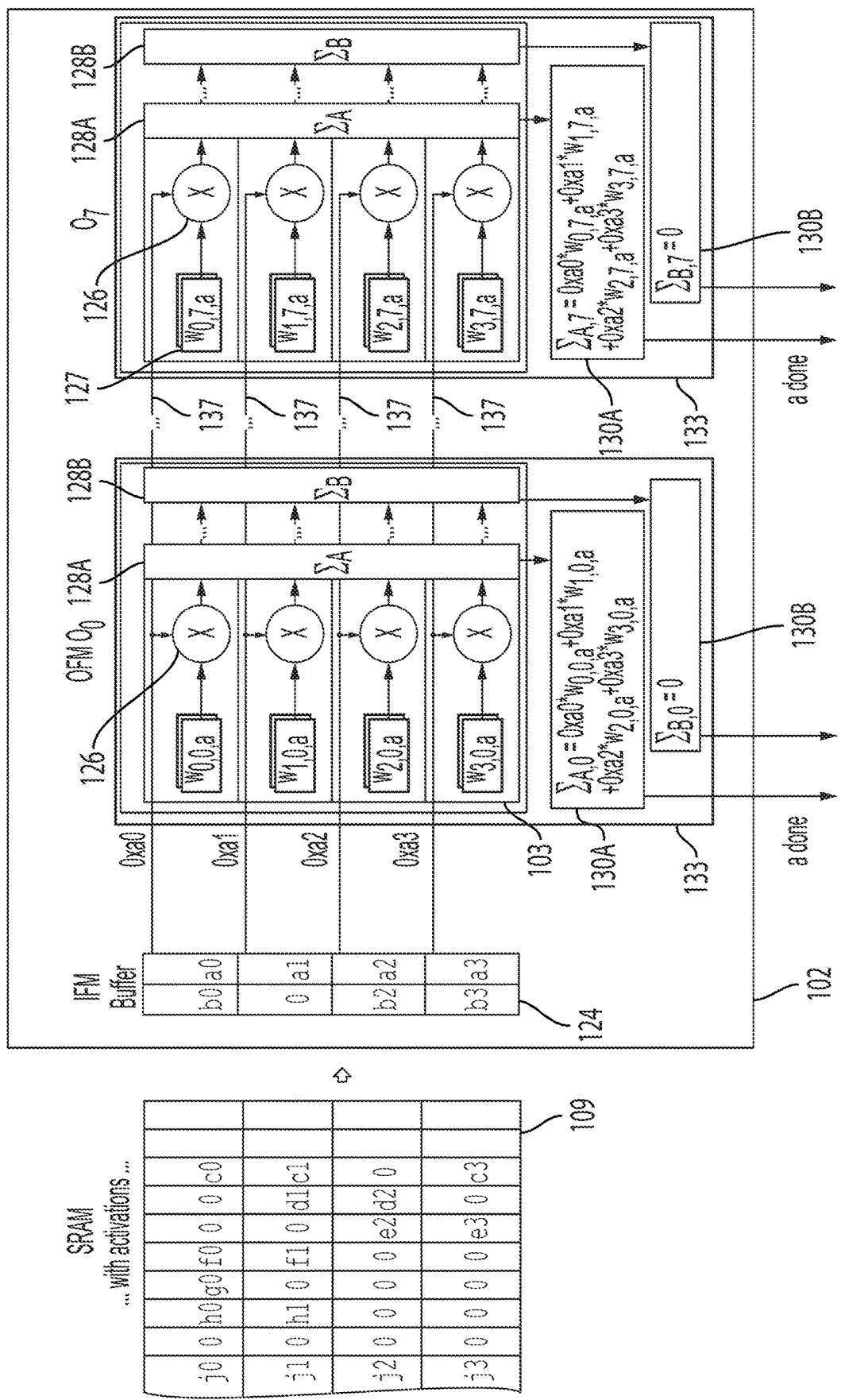
FIG. 1D illustrates a step of an example of zero activation skipping, as described in the '610 application.

FIG. 1D shows the first two IFM vectors 110 (IFM slices) arrive to IFM buffer 124, with IFM cache 139 and type converter 135 omitted for clarity. In this clock cycle, activations in lanes 0, 1, 2 and 3 have values 0xa0, 0xa1, 0xa2 and 0xa3 respectively. In this example, since none of the activation values at the front of the IFM buffer are zero, all four non-zero activations 0xa0, 0xa1, 0xa2 and 0xa3 get broadcast to MR columns $O_0$ through $O_7$ via activation lanes 137. With activation values 0xa0 through 0xa3 being broadcast, each multiplier unit 103 selects a weight $w_{row,col,seq}$ associated with the activation the particular multiplier unit is receiving. Assuming, for simplicity, that IFM has 4 channels, OFM has 8 channels and NPU has only one MR tile, multiplier unit located at row "row", column "col" within MR tile 102 receives activation broadcast lane "row" and computes partial product for MR column "col" that, respectively, contributes to OFM channel $O_{col}$. Weight register index "seq" corresponds to the weight's sequence order in the weight kernel. For example, a 3×3 weight kernel has 9 weights, each weight associated with its respective activation, that can be labeled seq∈{a, b . . . h} in the order of the activations' arrival to the multiplication unit 103.

With 0xa0 . . . 0xa3 activations being broadcast and $w_{row,col,a}$ weights selected by MR units, multiplier 126 in each MR unit 103 proceeds to compute the product of activation $act_{ow,a}$ with $W_{row,col,a}$: $p_{row,col} = w_{row,col,a} * act_{row,a}$. Subsequently, adder trees 128A and/or 128B proceed to sum up values $p_{row,col,a}$ for col=[0 . . . 3]: $S_{col} = \Sigma p_{row,col}$. as accumulators 130A and/or 130B in each ARU 167 work to accumulate $S_{col}$ over time, when necessary. Lastly, although not essential for the present disclosure, reduction fabric 111 further may add up accumulator 130A (B) or adder trees to compute the dot product over weight kernels that are too large to fit into a single MR tile and thus end up being distributed over multiple NPU MR tiles, as described in detail in the '610 application.

Following the example in FIG. 1D, in each column 133 "col", adder tree 128A computes the desired dot product, stores it in the accumulator 130A $\Sigma_{A,col} = 0xa0 * w_{0,col,a} + 0xa1 * w_{1,col,a} + 0xa2 * w_{2,col,a} + 0xa3 * w_{3,col,a}$ for col=[0 . . . 3]. The computation involving IFM slice "a" has now been completed and the calculated dot product, in each column, is passed on to the activation function module 151 (omitted in FIGS. 1C to 1F for clarity).

Figure 1E:
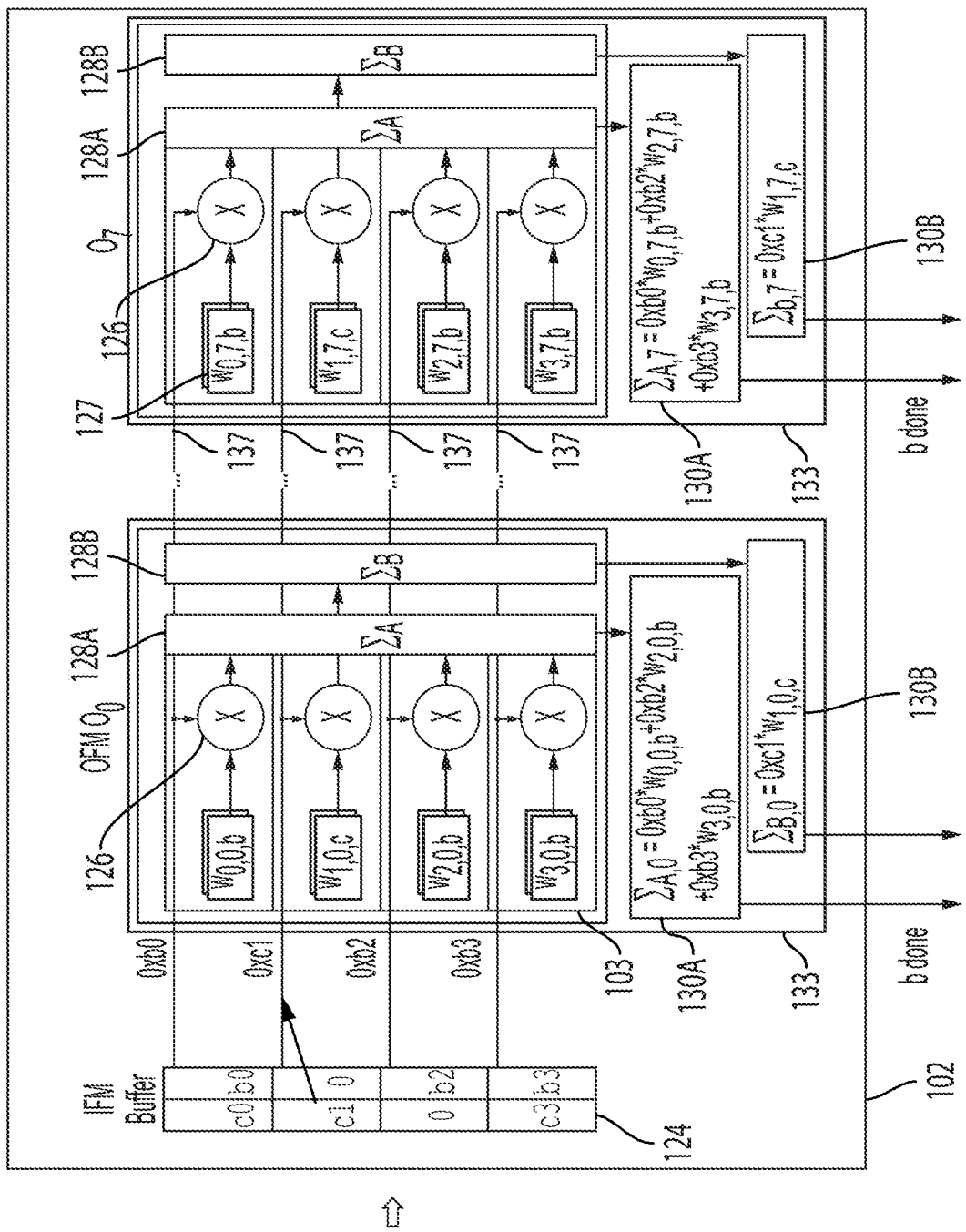
FIG. 1E illustrates a step of an example of zero activation skipping, as described in the '610 application.

FIG. 1E illustrates the next clock of the computation with the next IFM slice {0xb0, 0, 0xb2, 0xb3} arriving to the front of the IFM buffer 124, the three non-zero activations 0xb0, 0xb2 and 0xb3 getting broadcast over lanes 137 number 0, 2 and 3 respectively while the following IFM slice {0xc0, 0xc1, 0, 0xc3} is fetched to the IFM buffer 124. Since element 1 in the IFM slice {0xb0, 0, 0xb2, 0xb3} is zero, activation lane 1 is used to broadcast element 0xc1 from the IFM slice {0xc0, 0xc1, 0, 0xc3} in an out-of-order fashion. Here, in each column 133, adder tree 128A computes the desired dot product for IFM slice "b" and stores it in the accumulator 130A: $\Sigma_{A,col} = 0xb0 * w_{0,col,b} + 0xb2 * w_{2,col,b} + 0xb3 * w_{3,col,b}$ for col=[0 . . . 3]. The computation involving IFM slice "b" has now been completed and the calculated dot product, in each column, is passed on to the activation function module 151.

At the same time, in each column 133, the second adder tree 128B computes a portion of the desired dot product for IFM slice "c" and stores it in the accumulator 130B: $\Sigma_{B,col} = 0xc1 * w_{1,col,c}$ for col=[0 . . . 3]. The computation involving IFM slice "c" has not been completed and the calculated partial dot product stays in accumulator 130B.

Figure 1F:
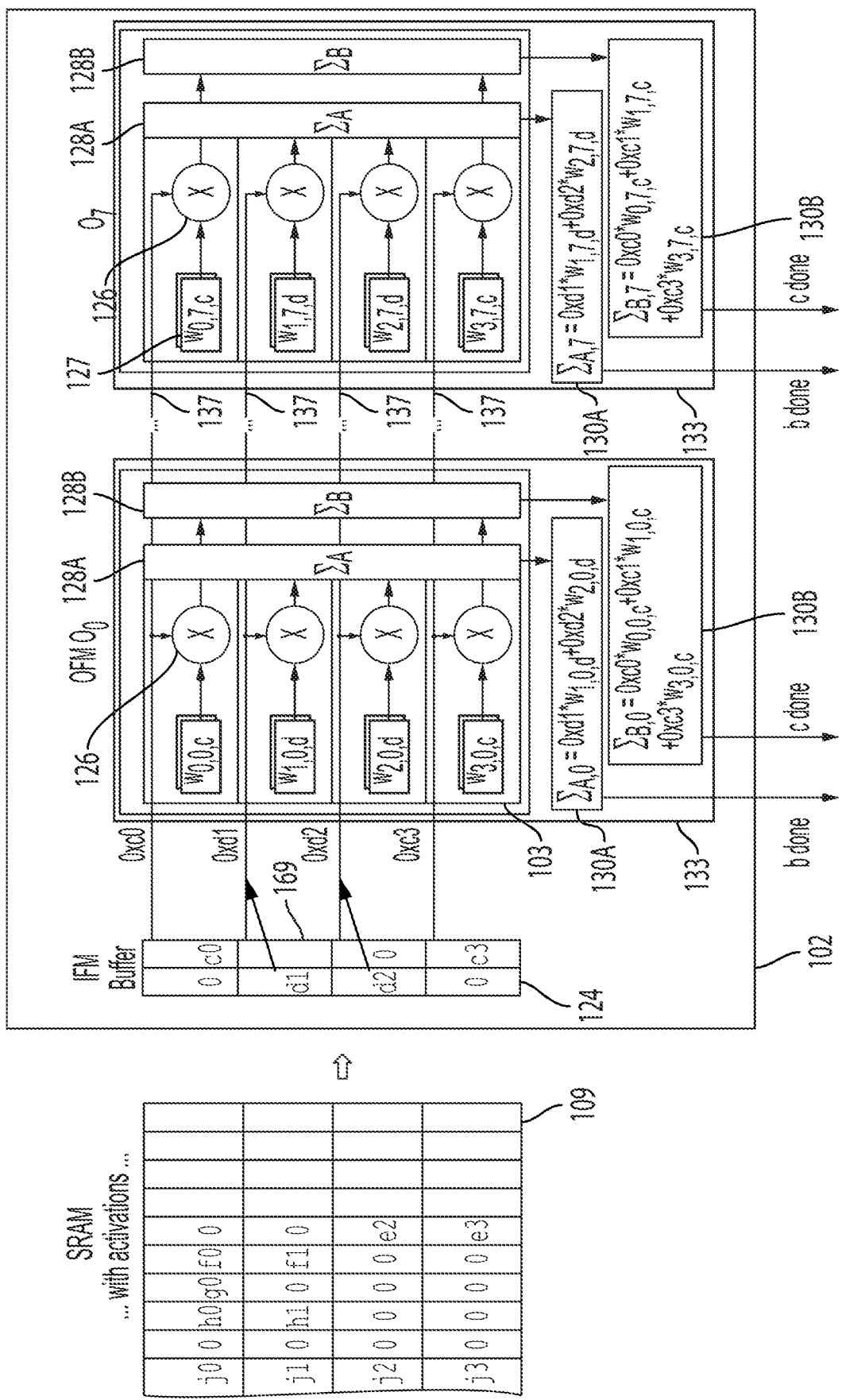
FIG. 1F illustrates a step of an example of zero activation skipping, as described in the '610 application.

FIG. 1F illustrates the next clock cycle of the computation, where the calculation of IFM slice "c" completes, IFM slice "d" arrives to IFM buffer 124 and the calculation of IFM slice "d" takes place and also completes, thus computing two dot products per single clock cycle thanks to activations being sparse. More specifically, since activation 0xc1 was already processed using lane 1, adder tree 128B and accumulator 130B, in each column, to generate an unfinished dot product, activation 0xd1 from IFM slice "d" can take the now-available slot 169 at the front of IFM buffer, left by the just-processed activation 0xc1. Also, since the $2^{nd}$ element of IFM slice "c" {0xc0, 0xc1, 0, 0xc3} is zero, IFM slice "d" {0, 0xd1, 0xd2, 0} element 0xd2 can get broadcast to lane 2, in an out-of-order fashion.

With activations 0xc0, 0xd1, 0xd2 and 0xc3 broadcast to activation lanes 0, 1, 2 and 3 respectively, in each column 133, adder tree 128B calculates the remaining portion of dot product for IFM slice "c" (0xc0*$w_{0,col,c}$+0xc3*$w_{3,col,c}$) and passes it on to accumulator 130B to finish the dot computation: $\Sigma_{B,col}$=(0xc0*$w_{0,col,c}$+0xc3*$w_{3,col,c}$). The computation involving IFM slice "c" has completed and the calculated dot product, in each column, is passed on to the activation function module 151.

At the same time, in each column 133, adder tree 128A calculates the dot product for IFM slice "d" and passes it on to accumulator 130A: $\Sigma_{A,col}$=0xd1*$w_{1,col,d}$+0xd2*$w_{2,col,d}$. The computation involving IFM slice "d" has completed and the calculated dot product, in each column, is passed on to the activation function module 151.

FIGS. 1C to 1F have illustrated the basic principles of dot product computation capable of skipping zero-valued activations to achieve up to 2× computation throughput as described in disclosure '601. A larger throughput acceleration can be obtained in cases when the probability of an activation having a zero value is higher than shown in FIGS. 1C to 1F. For example, if the probability of an activation having a zero value is 1/N where N=4, columns 133 may have 4 adder trees and respectively 4 accumulators to compute up to 4 sparse dot products per clock and achieve an up-to-4 times (and in general up-to-N times) throughput. Please note FIGS. 1C to 1F ignore pipelining and timing for extra clarity. Please refer to the '610 application for in-depth details of NPU operation that serves as a baseline for modifications described in the present disclosure.

Figure 1G:
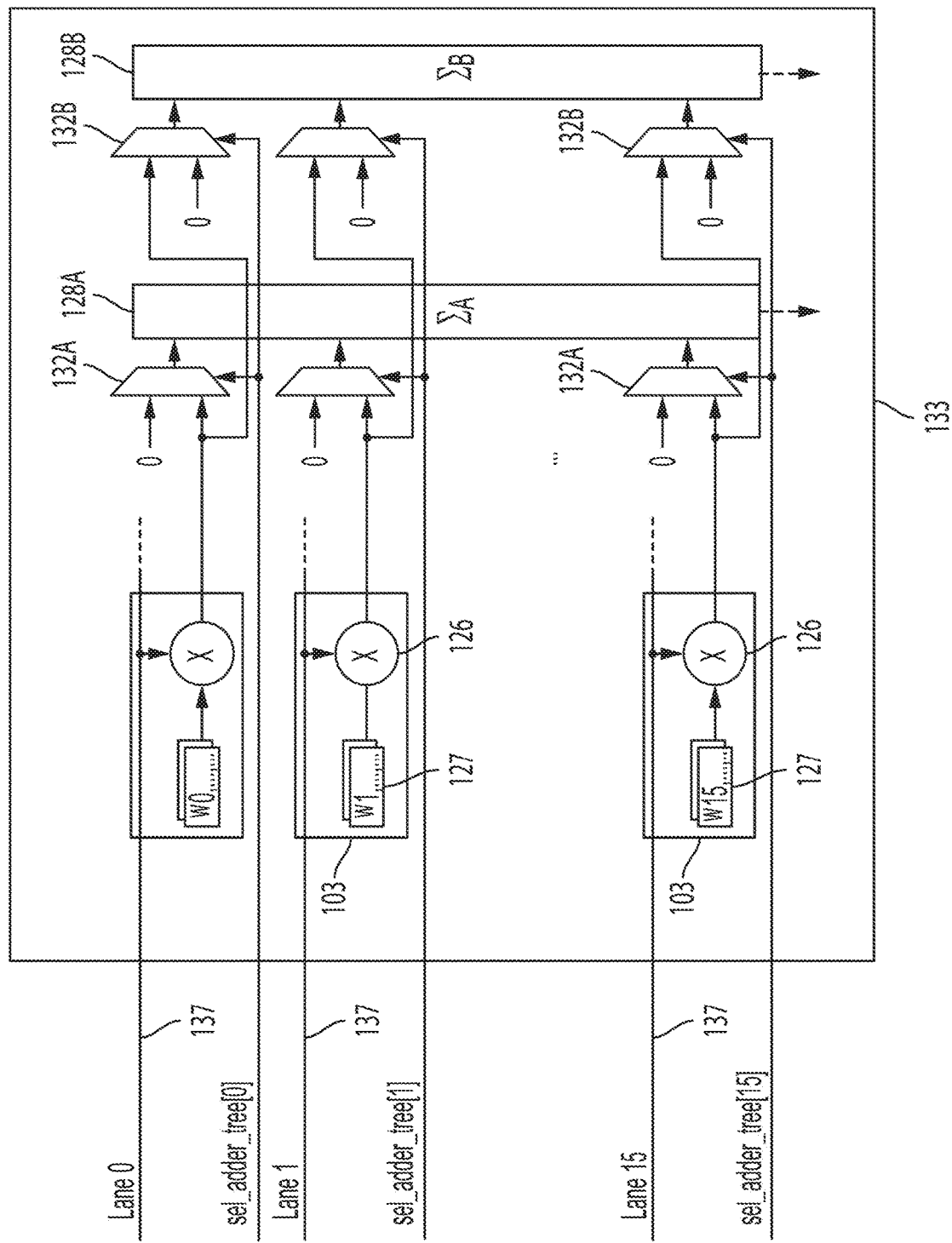
FIG. 1G is an illustration of adder tree pairs facilitating zero activation skipping as described in the '610 application.

FIG. 1G illustrates MR column 133 where ABU 141 controls the destination of each partial product as computed by multiplier units 103. More specifically, along with activation lanes, ABU 141 broadcasts sel_adder_tree[row] signal, per each activation lane, that directs products, in the corresponding row, to adder tree 128A or adder tree 128B using multiplexers 132A and 132B correspondingly. When adder tree 128A receives products, the corresponding input in the adder tree 132B receives a zero to ensure the correct dot product computation in adder tree 132B—and vice versa.

Figure 1I:
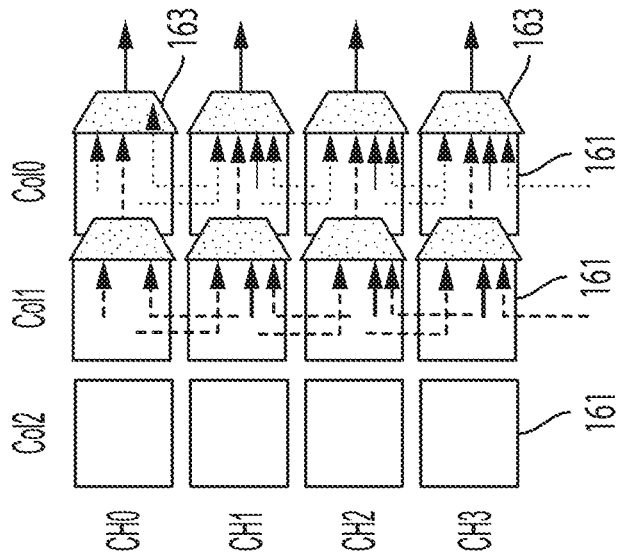
FIG. 1I is a block diagram of look-ahead and look-aside logic comprising IFM buffer to facilitate zero activation skipping as described in the '610 application.
Figure 1H:
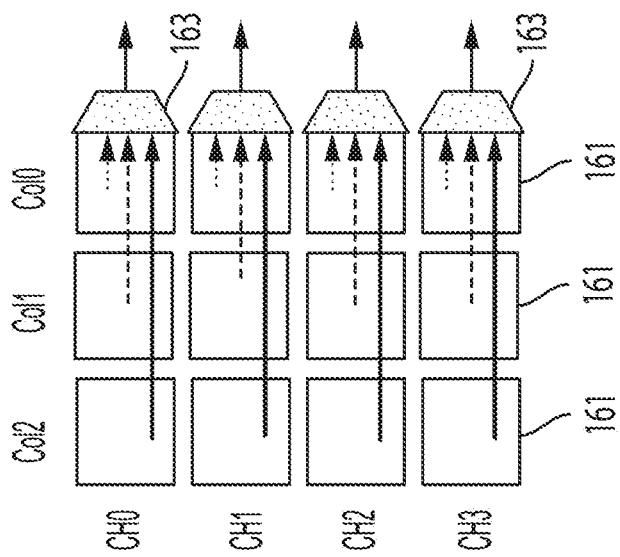
FIG. 1H is a block diagram of look-ahead logic comprising IFM buffer to facilitate zero activation skipping as described in the '610 application.

FIGS. 1H and 1I illustrate IFM buffer 124, within ABU 141 as described in disclosure '601, where values from IFM cache 139 arrive from the left and gradually propagate to the right (Col0) for broadcast to MR array 122, while being reordered to eliminate zero-valued elements. For clarity, only 4 channels (lanes) are shown instead of 16. FIG. 1H illustrates an embodiment where a zero—or "empty" slot 169 which held a non-zero value that has already been consumed—in a Col0 slot, i.e. at the front of IFM buffer 124, can be replaced by a (non-zero) value from Col1 or Col2 slots in the same channel using multiplexers 163. Forwarding non-zero values in an out-of-order fashion from columns Col1, Col2, etc. is referred to as look-ahead. FIG. 1H illustrated a look-ahead distance of 3, i.e. a value can be retrieved from any of the 3 columns Col0, Col1 or Col2.

FIG. 1I illustrates an embodiment where a zero or "empty" slot 169 in a Col0 slot, i.e. at the front of IFM buffer 124, can be replaced by a (non-zero) value from Col1 or Col2 slots in same as well as adjacent channels, e.g. CH[i] being able to receive values from channel CH[i−1] and/or channel CH[i+1] using multiplexers 163. Forwarding non-zero values in an out-of-order fashion from adjacent rows is referred to as look-aside. E.g. being able to send a value from one channel to another, up to "m" channels away, is a look-aside of distance m. Look-aside and look-ahead distances can be combined and selected to trade off circuit complexity versus performance. For example, the example in FIG. 1I has a look-ahead distance of 2 and a look-aside distance of 1. Note that FIGS. 1C through 1F only use look-ahead, but not look-aside operation. When look-aside distance is used, i.e. when the look-aside distance is one or more, multiplier units 103 may not have the weight necessary to perform the multiplication in its weight register file. This can happen when an activation is broadcast on a lane that is different from the activation's original lane, due to look-aside forwarding in IFM buffer 1F. In this case multiplier unit 103 has to get the correct weight from the weight register file 127 of the multiplier unit 103 in the activation's original lane, of same column. For look-aside distance of one this may be equivalent to multiplier units getting a weight from another vertically-adjacent multiplier unit and weight register files being able to fetch three weights at the same time, one for its own multiplier unit, one for the multiplier unit one lane above and one for the multiplier unit one lane below.

Figure 1J:
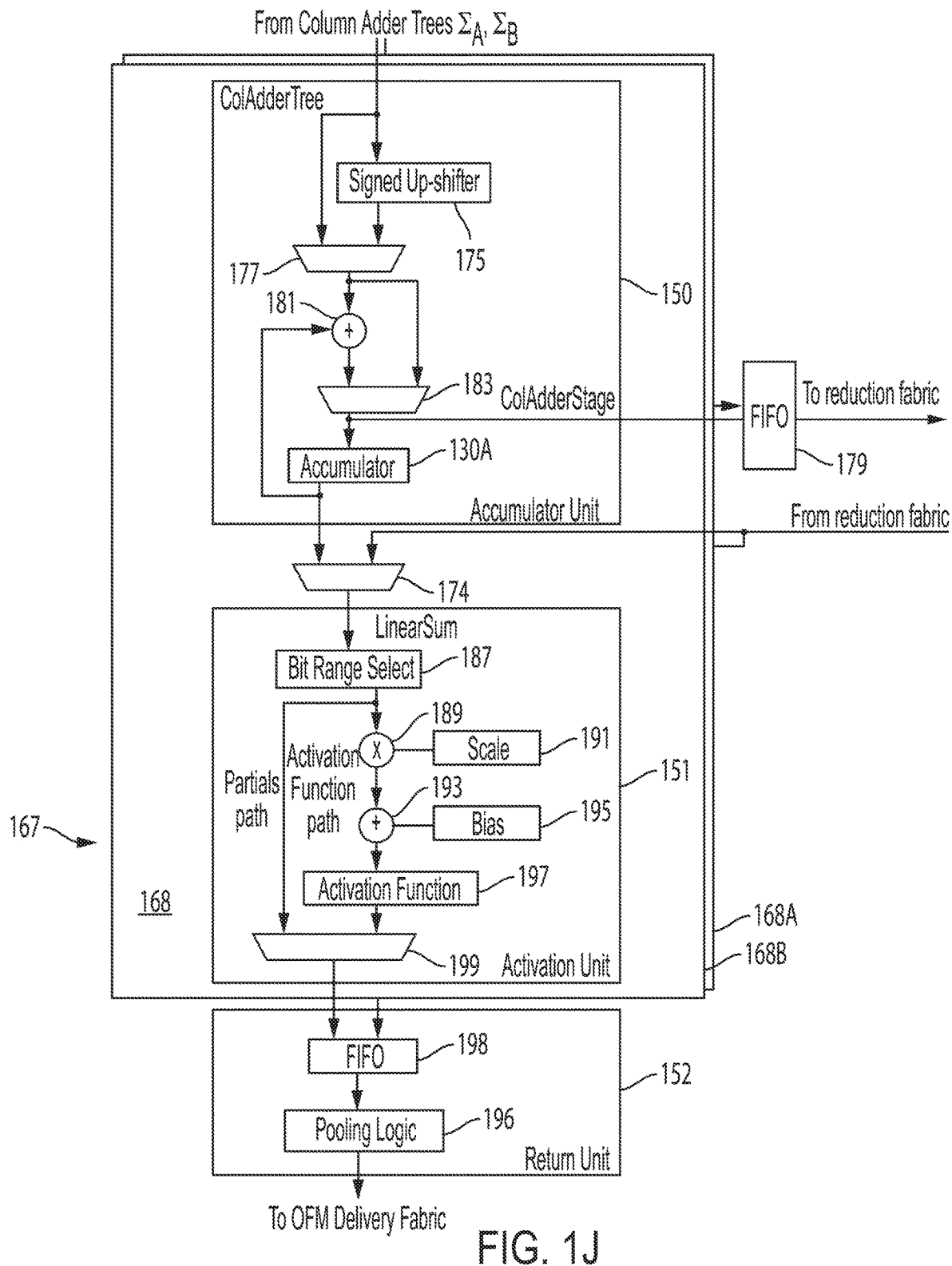
FIG. 1J is a block diagram of accumulate-and-return unit logic comprising IFM as described in the '610 application.

FIG. 1J illustrates the accumulate-and-return unit (ARU) 167 as described in the '610 application. ARU 167 contains two accumulation-and-activation (AA) channels 168, one per adder tree 128A and 128B, and a return module 152. As the adder tree 128A output arrives to accumulation module 150 in AA 168, the adder tree's output is, optionally, scaled by a signed up-shifter 175 and, optionally, added to the accumulator 130A contents using adder 181. As described in the '610 application in detail, accumulation of adder tree output over several clock cycles may be necessary to convolve an entire weight kernel. For example, if the weight kernel size is 3×3×16×8, where 3×3 is the planar width and height and 16 is the number of channels, a single MR tile can perform the associated convolution by storing 3×3=9 weights in each of 16×8 multiplier units in the tile. Subsequently, 9 IFM slices corresponding to one 3×3×16 activations tensor may be supplied to the MR tile, e.g. over 9 clocks, to compute 9 dot products. Completing the convolution requires adding these 9 dot products in accumulator 130A (and/or 130B), which is done simultaneously with the 9 IFM slices being supplied to the MR tile.

Multiplexer 183 allows initializing the accumulator with the adder tree 128A (or 128B) output, as opposed to accumulation, which is necessary when the first of the 9 dot products has been calculated. The signed up-shifter 175 is bypassed using multiplexer 177 when both activations and weights are 8-bit, i.e. any combination of int8 and uint8. Activations and weights with bit width of 16 or more are split by ABU 141 into a series of bytes for subsequent multiplication. For example most-significant (MSB) and least-significant (LSB) bytes for 16-bit values. Computing a product of 16-bit activation with 16-bit weight requires 4 clock cycles, where the activation LSB may be broadcast during the clock cycles 1 and 2, while the activation MSB may be broadcast during clock cycles 3 and 4. Weight LSBs may be selected for multiplication during clock cycles 1 and 3, while the weight MSB may be selected during clock cycles 2 and 4. Thus, the multiplication sequence would start by having activation LSB multiplied by weight LSB during clock cycle 1, added by adder tree 128A/B, in each MR column 133, and placed into the corresponding accumulator 130A/B. Next, activation LSB will be multiplied by weight MSB during clock cycle 2, added by adder tree 128A/B, shifted up by 8 bit using the signed up-shifter 175 and added to accumulator 130A/B using adder 181. During clock cycle 3, activation MSB will be multiplied by weight LSB, added by adder tree 128A/B, shifted up by 8 bit using the signed up-shifter 175 and again added to accumulator 130A/B using adder 181. Finally, the dot product computation completes in cycle 4 by multiplying activation MSB by weight MSB, adder tree 128A/B adding the products, the signed up-shifter 175 shifting the sum up by 16 bits and adder 181 adding the result to accumulator 130A/B. Please see the '610 application for details.

The value of accumulator 130A/B at this point may be the final result when weight kernel is small enough to fit into a single MR tile. In this case, the final result passes to the activation module 151 via multiplexer 174. However, weights from large weight kernels have to be distributed over multiple MR tiles, as described in the '610 application. In other words, the dot product calculation now takes place over several MR tiles, as opposed to just one MR tile. In this case each MR tile calculates a portion of the final dot product and these partial dot product results must be further reduced (added up) using reduction fabric 111 that spans all MR tiles. As the zero activation skipping method operates, partial dot product results get computed in accumulators 130A and 130B the computation throughput fluctuates depending on the quantity and locations of zeros in IFM slices. More specifically, each clock cycle both accumulators 130A and 130B may finish its calculations to produce two results per clock—or only one of accumulators 130A or 130B may finish its calculation to produce one result per clock. FIFO 179 in ARU 167 collects partial dot products computed by accumulators 130A and 130B, arranges them to match the original order of IFM slices and forwards the stream of partial results to the reduction fabric 111. Since the computation throughput and delay may vary slightly between MR tiles 102 due to fluctuations in IFM sparsity as different MR tiles simultaneously receive and process different portions of the IFM tensor, FIFO 179 works to re-align partial dot products generated by different MR tiles, such that these dot products can be correctly summed up by the reduction fabric 111.

When weight kernel size is too large to fit into a single MR tile, reduction fabric 111 effectively acts as extra upper levels for adder trees 128A/B to add partial dot products generated by different MR tiles and forwards the finished sum back to ARU 167 via multiplexer 174 to apply the activation function.

Fully-reduced, i.e. summed up using adder trees 128A/B, accumulated using accumulator(s) 130A/B and further summed up using reduction fabric 111, dot products reach the activation module 151 via multiplexer 174. The activation module 151 in ARU 167 applies an activation function. More specifically, the linear data from multiplexer 174 gets scaled up or down by a coarse, power-of-2 factor using the bit shifter module 187 scales followed by the multiplication 189 by a fine scaling factor 191 ranging from 1× to 2×, the addition 193 of a bias term 195 and the application of an activation function 197. The activation function can be, for example, of ReLU or sigmoidal types. In cases when the weight kernel is too large to fit into all MR tiles 102 available in NPU 100, the dot product computation has to be done by processing the IFM tensor two or more times while saving partial results in SRAM, as explained in disclosure '601. In such cases, multiplexer 199 allows bypassing the fine scaling 189, bias 193 and activation function 197 to allow streaming partial linear results to SRAM for temporary storage.

Lastly, the final results with activation function applied or the partial linear results stream into the return unit 152. FIFO 198 in the return unit 152 collects results computed by ARU channels 168A and 168B, arranges them to match the order of convolutions performed, applies optional in-place pooling 196 and forwards the stream of final or partial linear results to OFM delivery fabric 106. The eight MR columns 133 operate in parallel, producing a stream of OFM vectors (slices), where each OFM slice has, correspondingly, eight elements. Since sparse activation processing may result in each MR tile 102 computing results with slightly different throughput and delays, FIFOs 198 are responsible for re-aligning OFM outputs between MR tiles for streaming OFM slices over OFM delivery fabric 106 from various MR tiles 102 to SRAMs 109. Please see the '610 application for details.

Figure 2A:
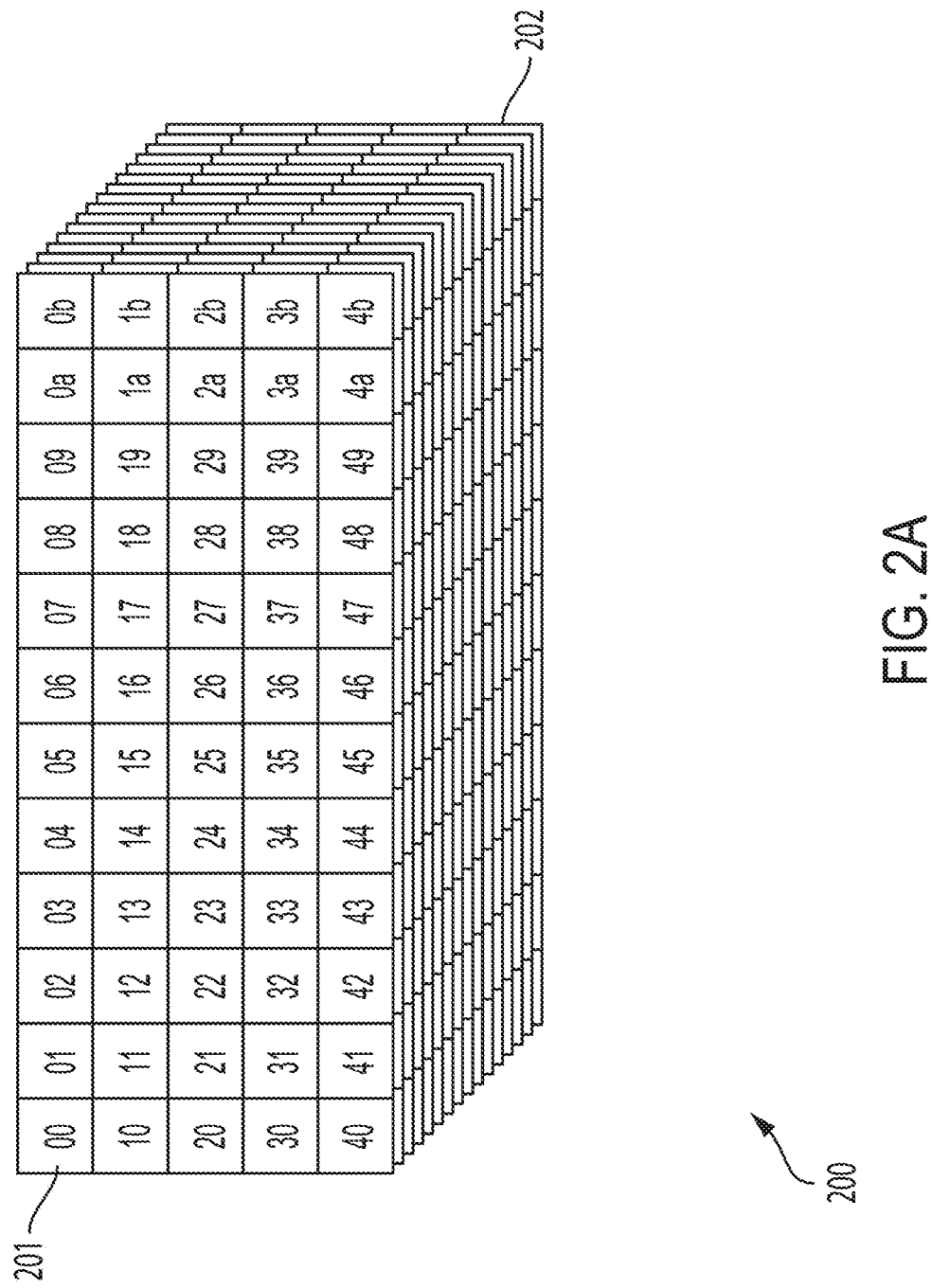
FIG. 2A is a 3D IFM tensor with a planar size of 5 rows by 12 columns and a depth of 16 channels.

The present disclosure focuses on extensions and efficiency improvements of a single MR tile 102, while keeping the rest of the NPU 100 architecture unchanged, as described in disclosure '601, unless specified otherwise. NPU 100 as detailed in disclosure '601 operates on data stored in SRAMs 109 in depth-major order. FIG. 2A illustrates a 3D tensor 200, corresponding e.g. to an IFM tensor with a batch size of one, having the planar size of 5 rows by 12 columns and containing 16 depth channels 202. The 3D tensor 200 consists of individual elements 201. Using a rows-by-columns-by-(depth)-channel notation let us denote the size of this tensor as 5×12×16.

Figure 2B-2:
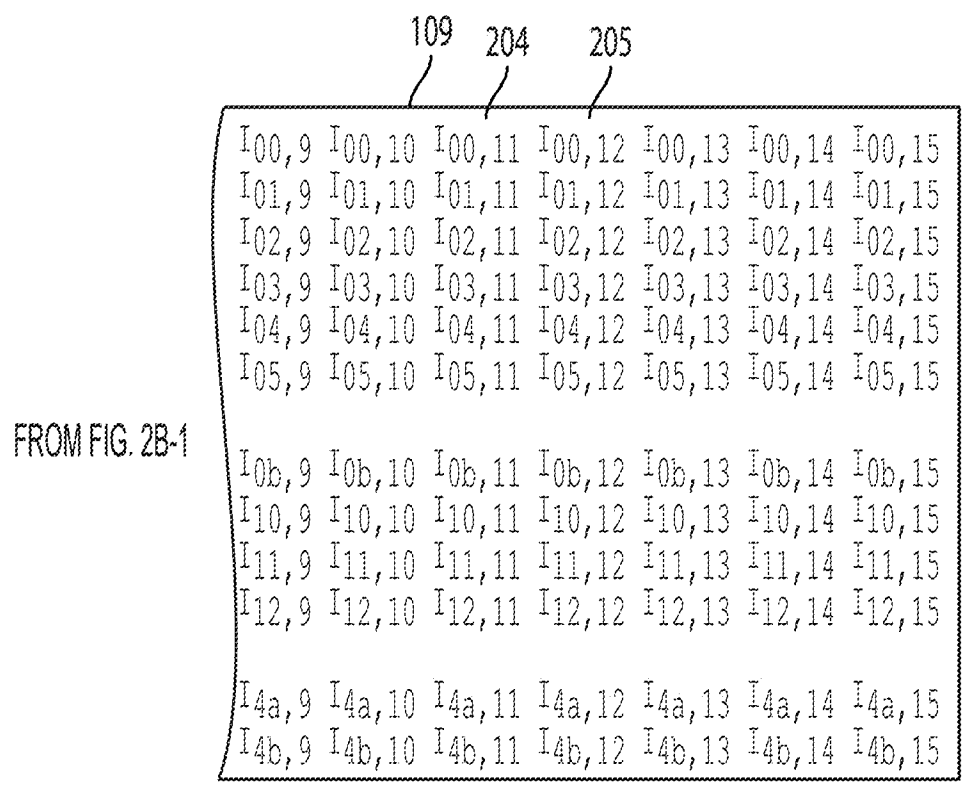

As illustrated in FIG. 2B, the "depth-major" order means that elements 201 (col, row, ch) and (col, row, ch+1) of tensor 200 are stored at SRAM address z 204 and z+1 205 respectively. In other words, elements 201 along the depth dimension 202 are stored contiguously, next to each other in SRAM 109. More specifically, if $A_{IFM}$ is the start address of the 3D 5×12×16 IFM tensor 200 stored in SRAM 109 and $I_{col,row,ch}$ corresponds to element 201 at coordinate (col, row, ch) in FIG. 2A, the 16 elements 200 at same planar (col, row) position, e.g. $I_{0,0,0} \ldots I_{0,0,15}$, are stored at contiguous SRAM addresses from $A_{IFM}$ to $A_{IFM}+15$ respectively.

Figure 2C:
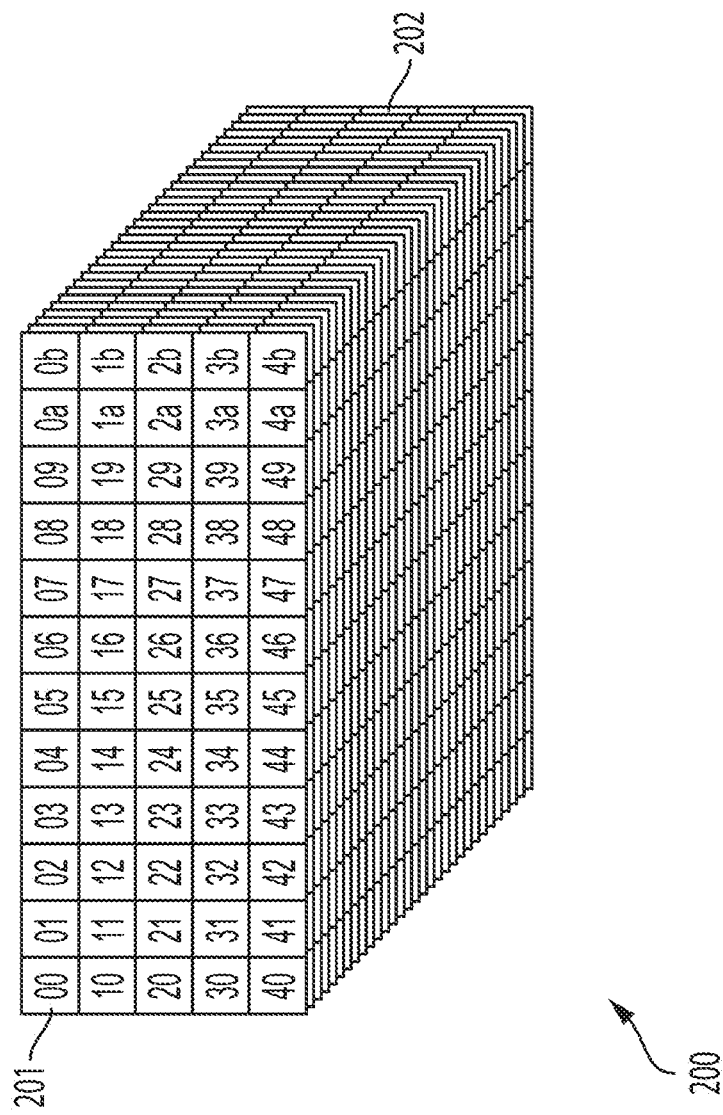
FIG. 2C is a 3D IFM tensor with a planar size of 5 rows by 12 columns and a depth of 32 channels.
Figures 1, 2D:
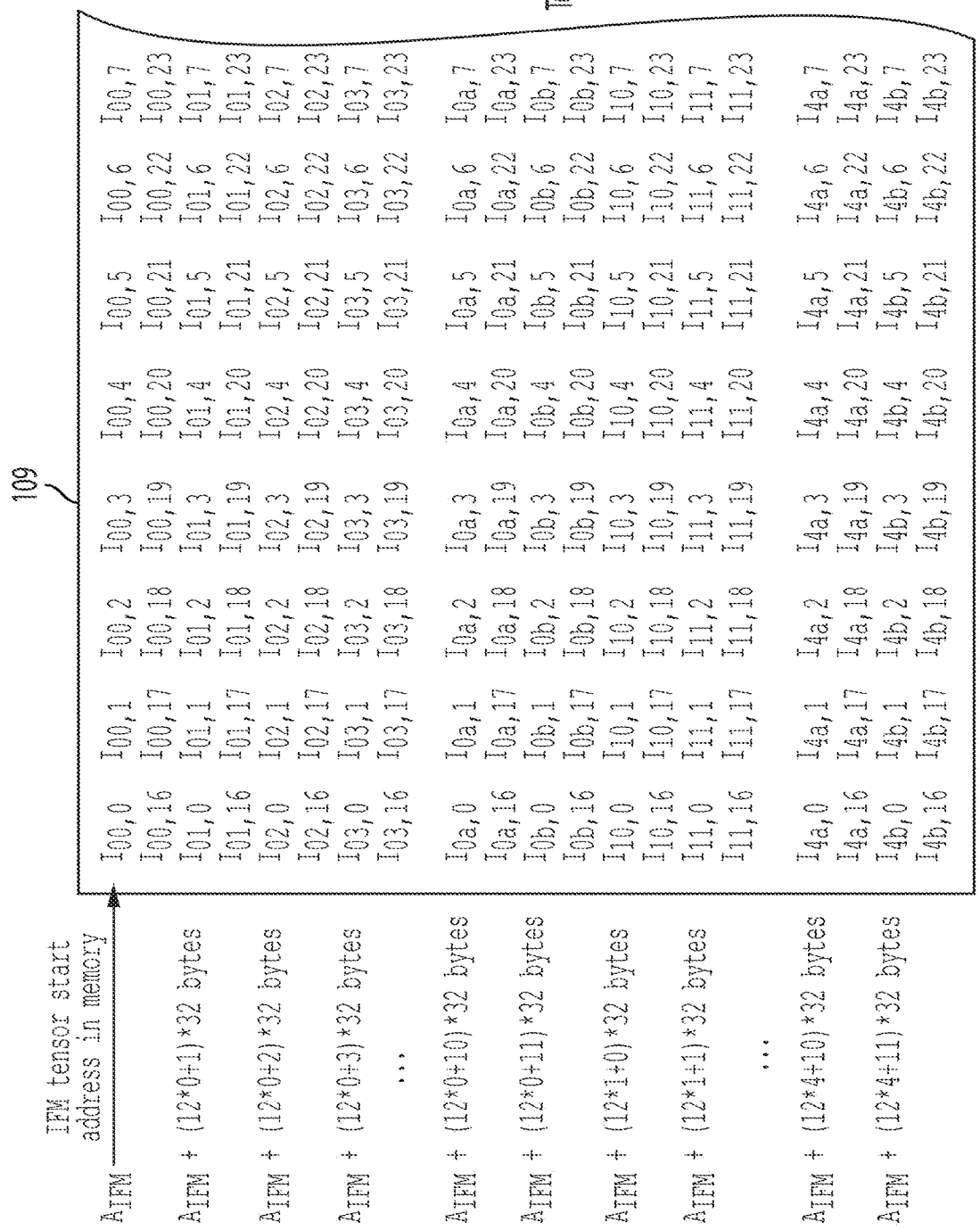

FIG. 2C illustrates a 3D tensor 200 with dimensions of 5×12×32. Similar to FIG. 2C, SRAM 109 stores values in the 32 depth channels 202 in a contiguous fashion. More specifically, as illustrated in FIG. 2D, if $A_{IFM}$ is the start address of the 3D 5×12×32 IFM tensor 200 stored in SRAM 109 and $I_{col,row,ch}$ corresponds to element 201 at coordinate (col, row, ch) in FIG. 2C, the 32 elements 200 at same planar (col, row) position, e.g. $I_{00,0} \ldots I_{00,31}$, are stored at contiguous SRAM addresses from $A_{IFM}$ to $A_{IFM}+31$ respectively, followed by $I_{0,1,0 \ldots 31}, I_{0,2,0 \ldots 31}, \ldots I_{0,0xb,0 \ldots 31}$, $I_{1,0,0 \ldots 31}$ and so on.

Figure 2E:
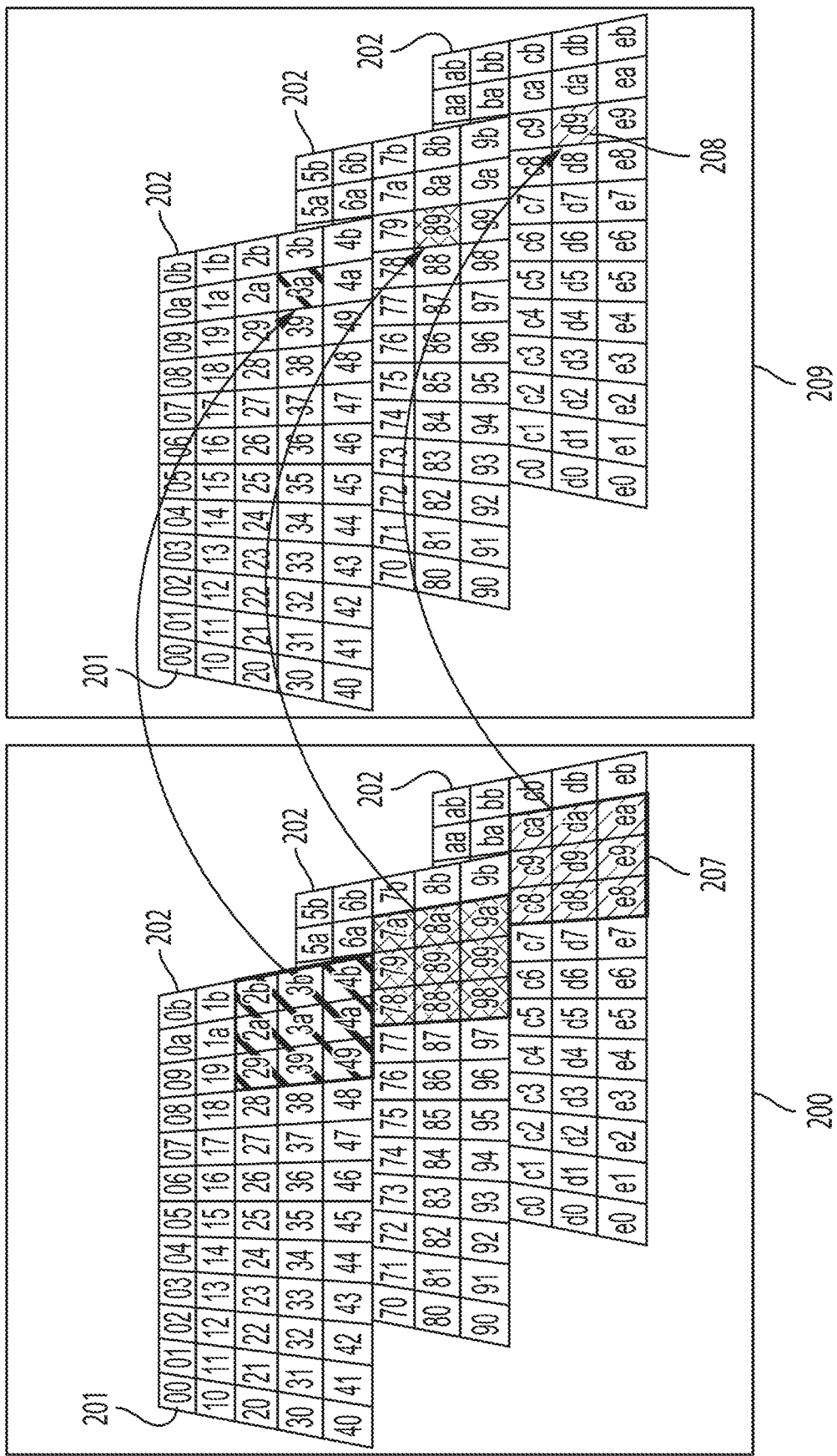
FIG. 2E is an illustration of depth-wise-separable convolution applied to 3D IFM tensor with a planar size of 5 rows by 12 columns 3 depth channels.

The present disclosure focuses on a number of upgrades and extensions to MR tile 102 compared to its baseline architecture described in disclosure '601. One of the extensions, described in detail below, focuses on depth-wise-separable 2D convolution. Depth-wise-separable convolution, also known as depth-wise convolution, is a special case of general direct convolution where output values in depth channel C are computed using same input depth channel C, see FIG. 2E. In other words, information stays within same channel, does not cross channels and, in case of convolving a 3D IFM tensor, the computation becomes equivalent to running a 2D convolution separately on each depth channel of that 3D tensor. More specifically, as illustrated in FIG. 2E, each depth channel 202—independently from all other depth channels—is 2D-convolved with a planar 3×3 patch of weights 207 (associated with that channel) to generate output elements 208 that make up the output (OFM) tensor 209.

The baseline architecture of MR tile 102, as described in disclosure '601, takes IFM slice(s) as input. As mentioned previously, an IFM slice is an activations vector containing values for 16 depth channels all of which belong to the same planar coordinate (row, col), e.g. $I_{row,col,0 \ldots 15}$, where $0 \ldots 15$ corresponds to depth channels. MR tile 102 then proceeds to reduce along the depth dimension, "collapsing" the 16 elements of $I_{row,col,0 \ldots 15}$ to a single value $S_{row,col}$ as a result of the dot product calculation. However, depth-wise-separable convolution does not reduce the depth dimension, i.e. does not add partial products across the depth dimension. Therefore, column-wise adder trees 128A/B that perform reduction (summation) along the depth dimension, as presented in the baseline architecture described in disclosure '601, are unable to support depth-wise convolution.

Figures 1, 2F:
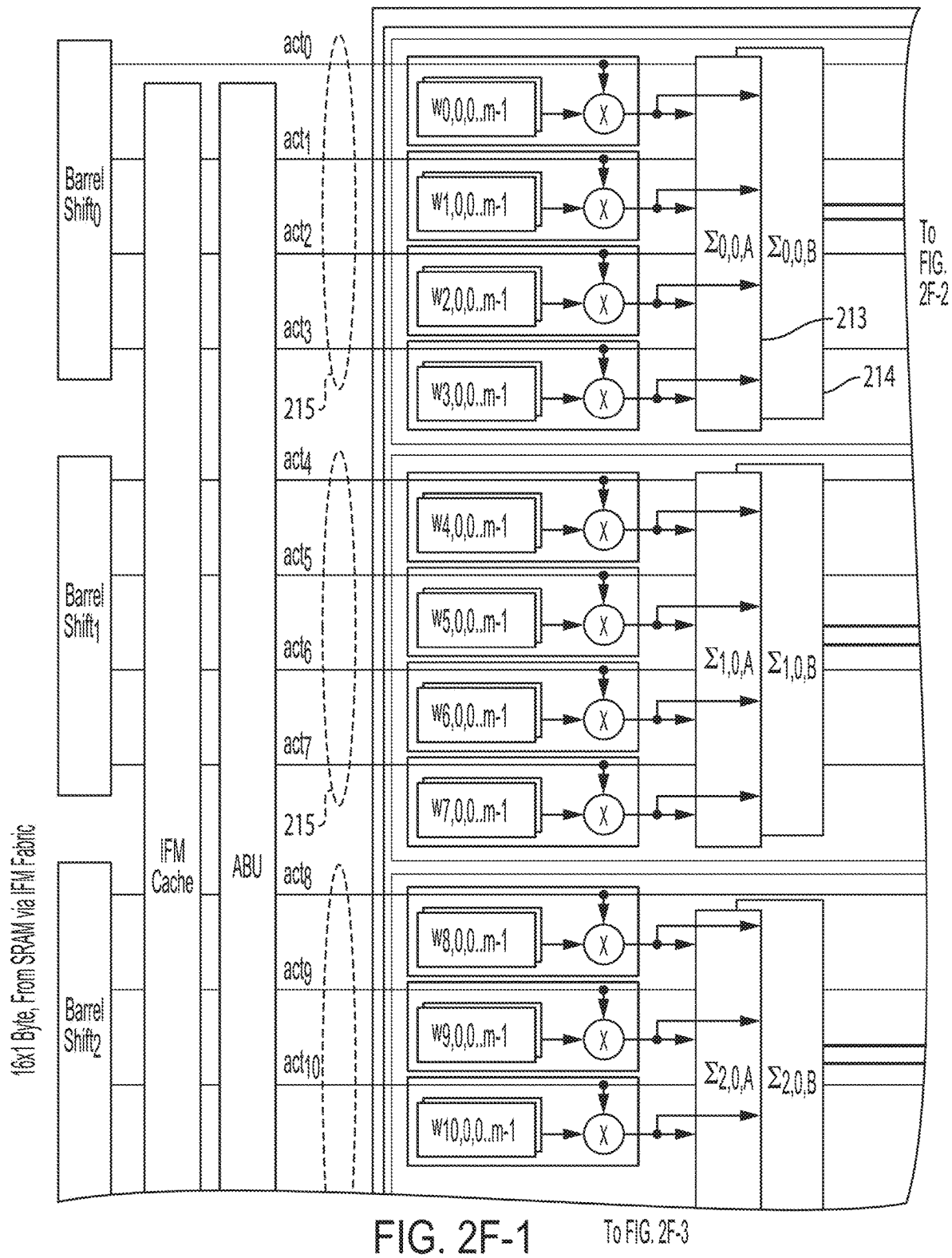
Figures 2, 2F:
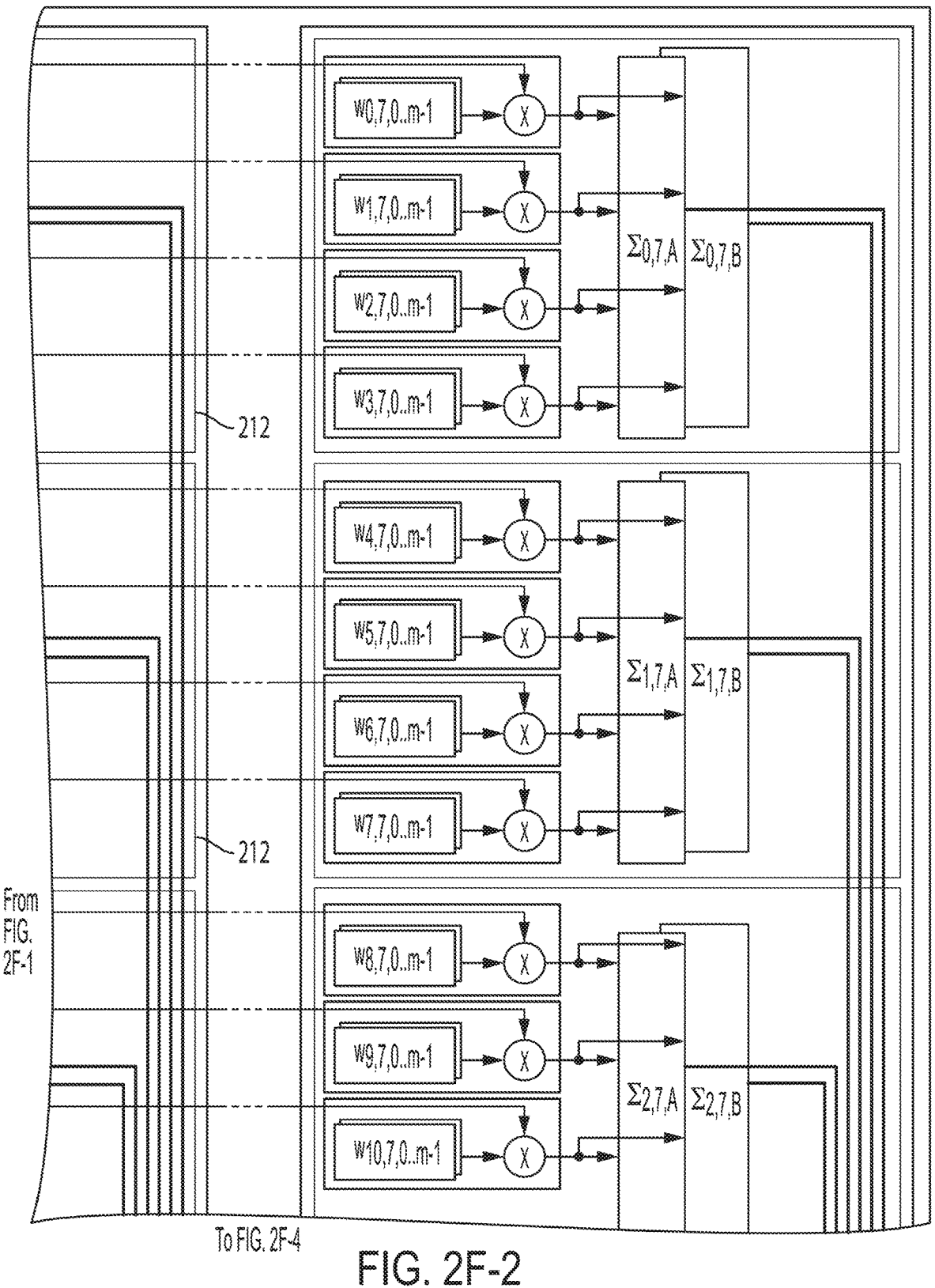

FIG. 2F illustrates MR tile 102 modified to compute 2D depth-wise-separable convolution on 3D IFM sensors. Note that, compared to the baseline MR tile 102 architecture, the 16 activation lanes become grouped into 4 quads 215, i.e. groups each containing 4 channels. Importantly, the IFM input data order changes from depth-major to planar-major, as shown later in detail in FIGS. 2G through 2J. Therefore, the dot-product and the associated reduction (summation of partial products) is now computed along the planar dimensions, i.e. along rows and/or columns of the IFM tensor. Each quad processes values from one and only one depth channel at a time, while iterating over 4 depth channels over time. Note that large adder trees 128A/B become split into sub-trees 213, 214 and send their outputs into ARUs 210 that now each have 4 pairs of accumulators in ARU, as opposed to one pair in the baseline architecture of disclosure '601. Also, note barrel shift units 211 are added before IFM cache 139, one barrel shift unit per quad. IFM cache 139 has also been modified as explained below in detail. Lastly, note that a column shuffler unit 218 added between ARU outputs and OFM delivery fabric 106. The column shuffler 218 unit's task is to reorder outputs of MR columns into proper OFM slices because each MR column may be calculating the depth-wise convolution at a different planar location.

Keep in mind that the architecture, as shown, is intended to be almost identical to disclosure '601, such that baseline MR tile 102 can be easily reconfigured from computing a general direct convolution to computing a depth-wise-separable convolution and back.

Figures 2, 2F, 3:
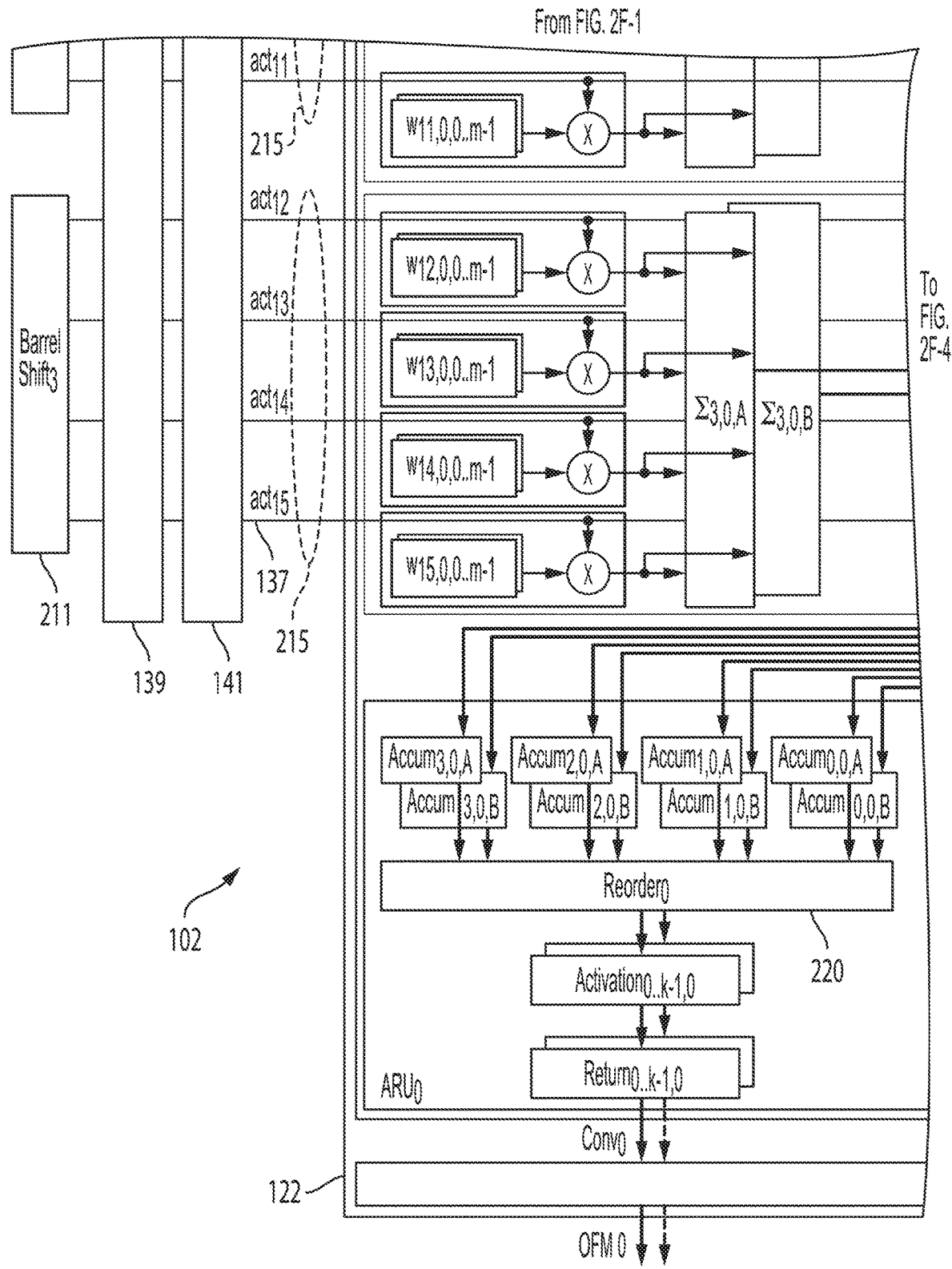
Figures 2, 2F, 3, 4:
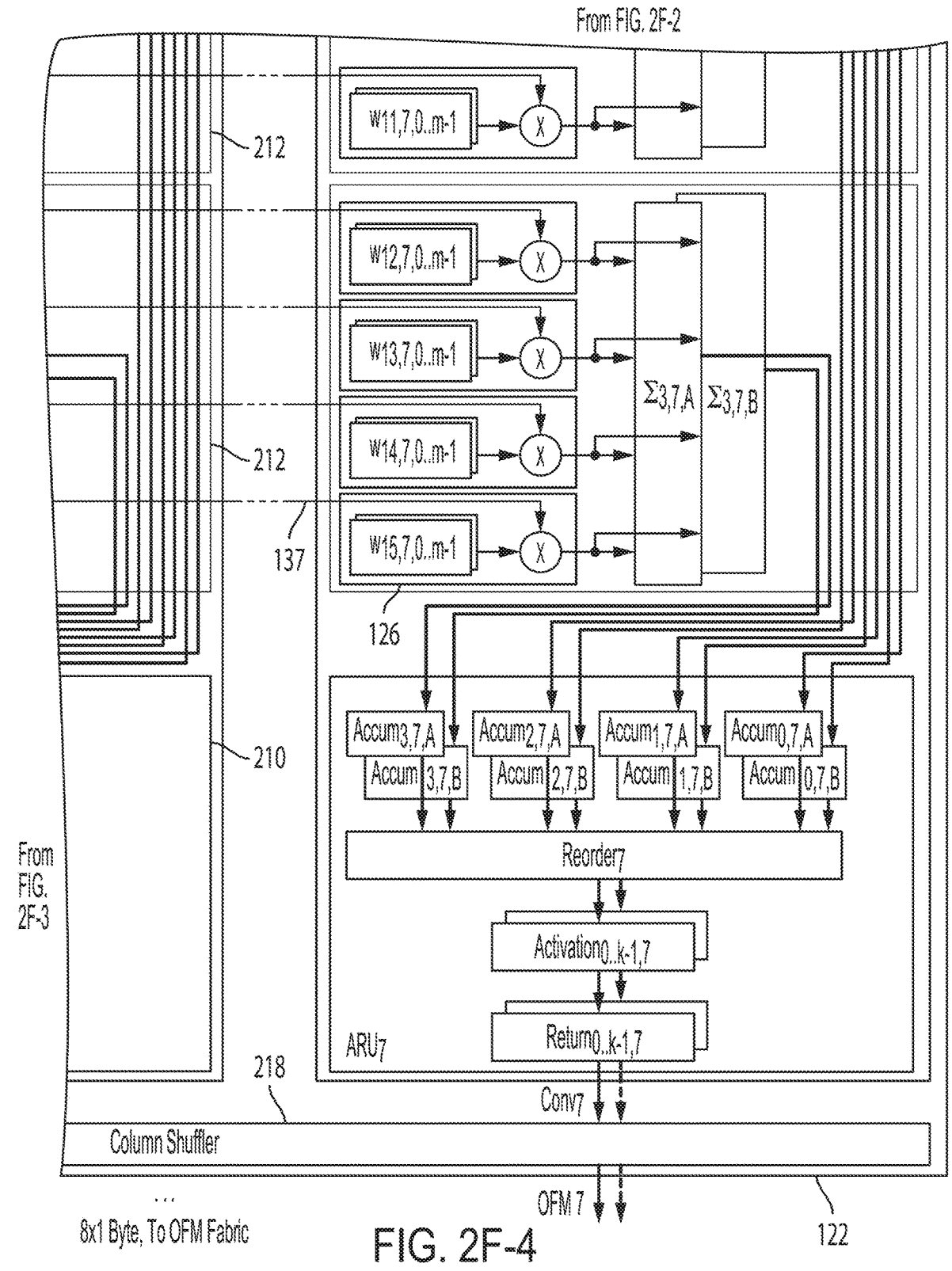
Figures 1, 2G:
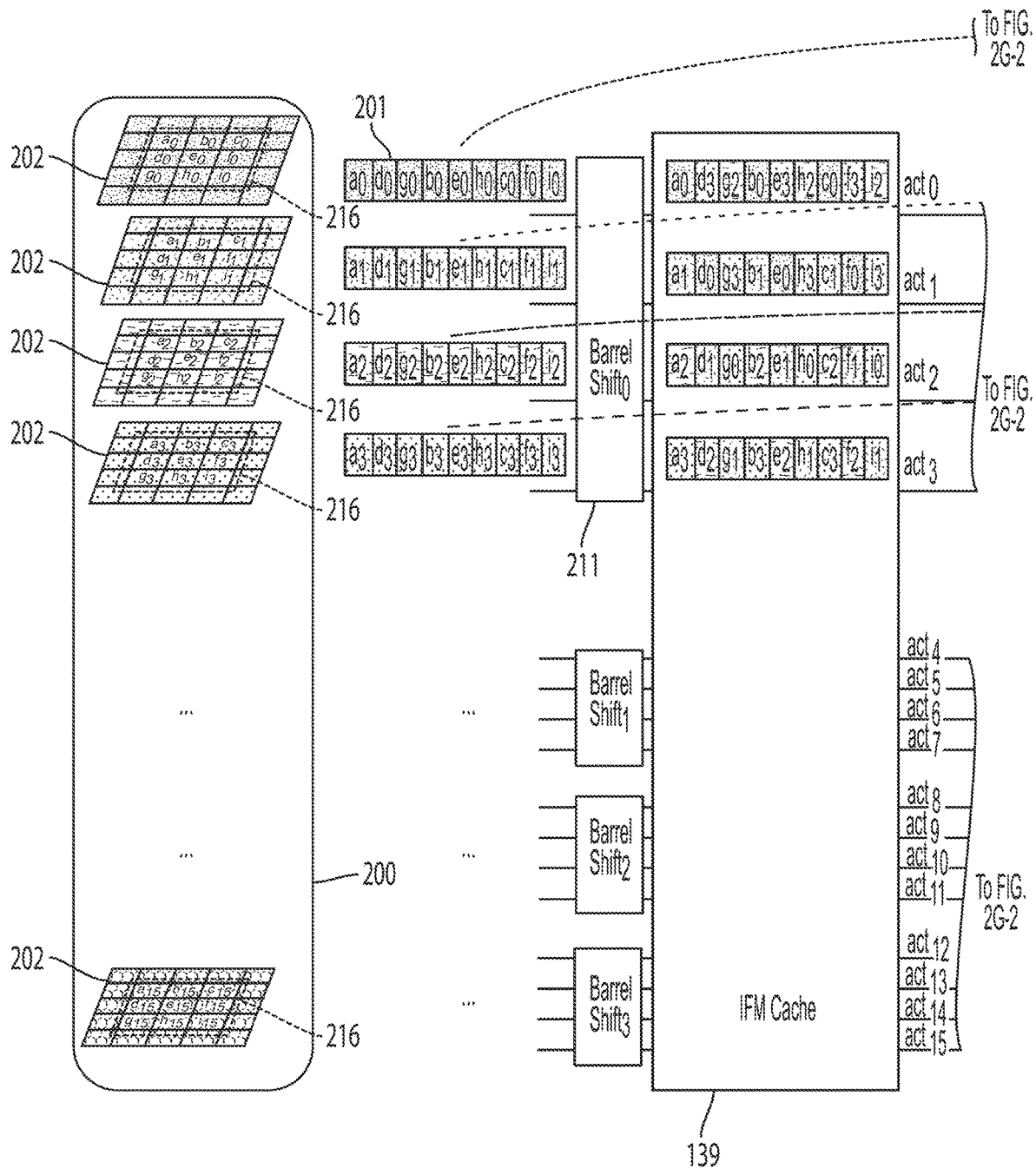
Figures 2, 2G:
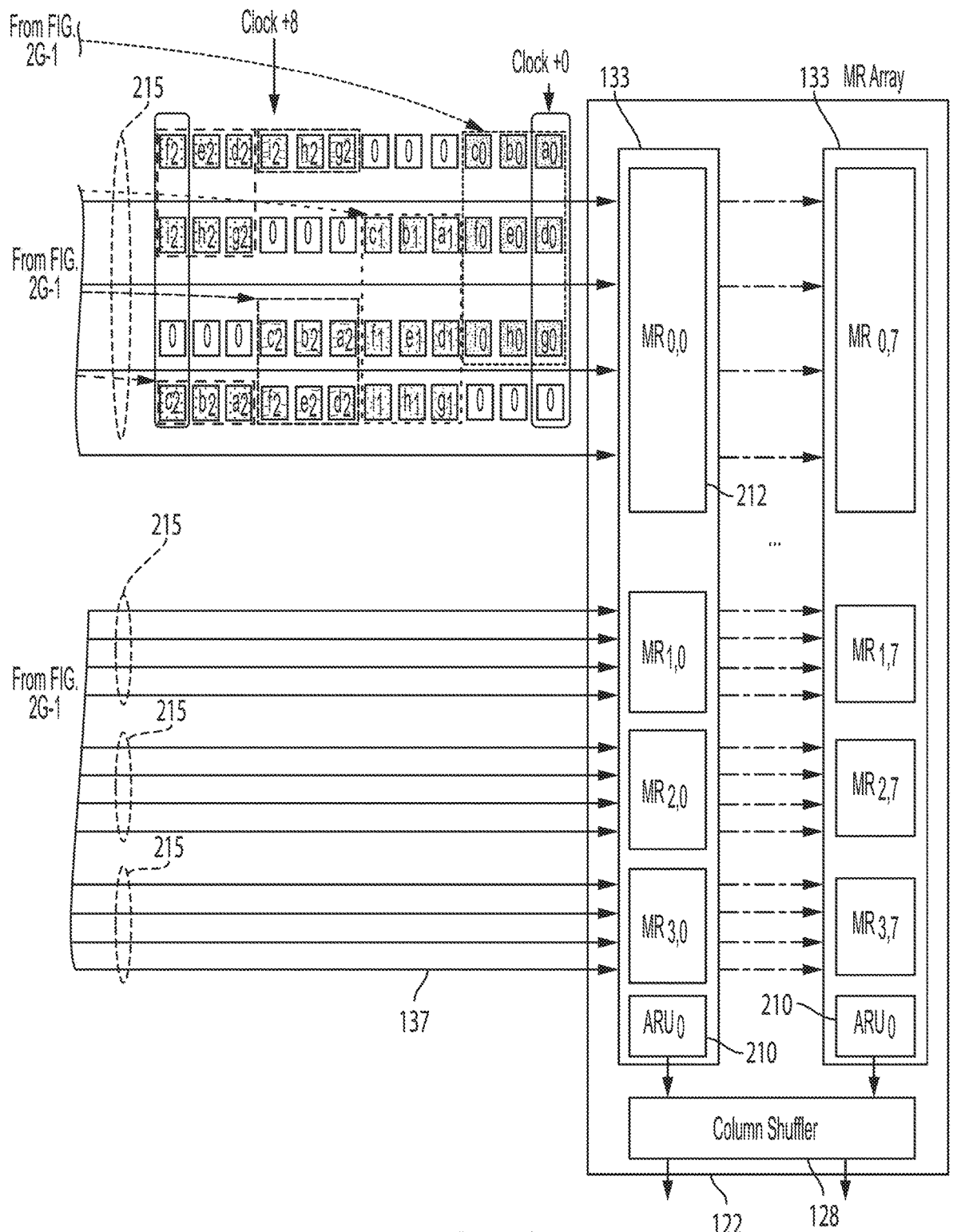

FIGS. 2G through 2J illustrate a step-by-step example of a 3×3×16 depth-wise-separable convolution operation. FIG. 2G shows slices $I_{a,0 \ldots 15}, I_{b,0 \ldots 15}, \ldots I_{i,0 \ldots 15}$ of IFM tensor 200 arriving from SRAM 109 over IFM delivery fabric 104. While the planar 3×3 2D convolution patches 216 are shown to be located over pixels a, b, . . . i, once the convolution calculation at this location completes, patches 216 will slide over to a next planar location, e.g. in a zig-zag fashion as detailed in the '610 application.

Note that the 16 depth channels have been sub-divided into four sets, each set corresponding to a quad 215. More specifically, depth channels 0, 1, 2 and 3 correspond to the first quad 215 comprised of activation lanes $act_0$, $act_1$, $act_2$ and $act_3$. Depth channels 4, 5, 6 and 7 correspond to the second quad 215 comprised of activation lanes $act_4$, $act_5$, $act_6$ and $act_7$. Depth channels 8, 9, 10 and 11 correspond to the third quad 215 comprised of activation lanes $act_8$, $act_9$, $act_{10}$ and $act_{11}$. Depth channels 12, 13, 14 and 15 correspond to the last (fourth) quad 215 comprised of activation lanes $act_{12}$, $act_{13}$, $act_{14}$ and $act_{15}$.

As IFM slices $I_{a,0 \ldots 15}, I_{b,0 \ldots 15}, \ldots I_{i,0 \ldots 15}$—comprising the planar patches 216 at the current convolution location—arrive in the depth-major order, identical to the '610 application, barrel shift units 211 work in coordination with IFM cache 139 to reorder IFM values 201 from depth-major order to planar-major order, necessary to perform depth-wise-separable 2D convolution using MR tile 102 from the '610 application reconfigured to match the micro-architecture corresponding to FIG. 2F.

For purposes of clarity, FIG. 2G illustrates operation details of the first quad 215 and omits the second, third and fourth quads since all quads operate in a substantially similar fashion. As illustrated, the IFM slice quad $I_{a,0 \ldots 3}$ corresponding to planar location "a" arrives to MR tile 102, passes through the barrel shift 211 unit 0 with no change to the channel order and gets saved in IFM cache 139 lane quad as vector $\{I_{a,0}, I_{a,1}, I_{a,2}, I_{a,3}\}$. However, the next IFM slice quad $I_{d,0 \ldots 3}$, corresponding to planar location "b", undergoes a rotation as it passes through barrel shift 211 unit 0 and gets saved in IFM in the order of $\{I_{d,3}, I_{d,0}, I_{d,1}, I_{d,2}\}$. The following IFM slice quads $I_{g,0 \ldots 3}, I_{b,0 \ldots 3}, I_{h,0 \ldots 3}, I_{h,0 \ldots 3}, I_{c,0 \ldots 3}, I_{f,0 \ldots 3}$, and $I_{i,0 \ldots 3}$ undergo changes in channel order, when appropriate, and get saved in IFM cache 139 correspondingly as $\{I_{g,2}, I_{g,3}, I_{g,0}, I_{g,1}\}$, $\{I_{b,0}, I_{b,1}, I_{b,2}, I_{b,3}\}$, $\{I_{e,3}, I_{e,0}, I_{e,1}, I_{e,2}\}$, $\{I_{h,2}, I_{h,3}, I_{h,0}, I_{h,1}\}$, $\{I_{c,0}, I_{c,1}, I_{c,2}, I_{c,3}\}$, $\{I_{f,3}, I_{f,0}, I_{f,1}, I_{f,2}\}$ and $\{I_{i,2}, I_{i,2}, I_{i,0}, I_{i,1}\}$. Note that the barrel shift distance starts with zero for the first IFM slice in planar patch 216 and increments by one for each following IFM slice from until all IFM slices in patch 216—at its current planar location—have been loaded from SRAM 109.

With IFM slice depth channels reordered, one more reordering step takes place as IFM values 201 get broadcast to MR array 122 for quad-wise dot product computation. More specifically, IFM cache 139 may first fetch a column vector $\{I_{a,0}, I_{d,0}, I_{g,0}, 0\}$ corresponding to activation lanes $act_0$, $act_1$, $act_2$ and $act_3$, followed a second column vector $\{I_{b,0}, I_{e,0}, I_{h,0}, 0\}$ and a third column vector $\{I_{c,0}, I_{f,0}, I_{i,0}, 0\}$. Note that thanks to the barrel shift unit 0, values $I_{a,0}, I_{d0}$, and $I_{g,0}$ that originally belonged to the same lane 0 have been respectively spread out over lanes 0, 1 and 2. Once spread out over separate lanes in IFM cache 139, IFM cache 139 can fetch all these tree values simultaneously, i.e. in same clock cycle, and subsequently broadcast (via ABU, not shown) to MR array 122 for computation.

With the second and third column vectors $\{b_0, e_0, h_0, 0\}$ and $\{c_0, f_0, i_0, 0\}$ having undergone substantially similar transforms as the first column vector $\{a_0, d_0, g_0, 0\}$, the nine previously-planar patch of values $\{I_{a,0}, I_{b,0}, \ldots I_{i,0}\}$ now arrives to the $MR_{0,0 \ldots 7}$ quad in a planar-major order, suitable for dot product computation. The dot product computation as shown may take up to three clock cycles or less due to support for sparse computation. More specifically, activation sparsity in depth-wise convolution computation may operate similar to how it operates in the baseline case of general convolution, illustrated in FIG. 1B and FIGS. 1C through 1F, with the exception that the four quads operate independently from each other. Referring to FIG. 2F, each quad has its own pair of adder trees 213 and 214 with corresponding accumulator pairs in ARU. In this way, ABU can perform activation look-ahead and/or look-aside on the four lanes associated with its quad. With the four quads operating independently from each other, each at its own throughput, reorder unit 220 in ARU acts to reorder dot product results computed by the different quads to the desired output order, i.e. corresponding to the order in which dot products would be calculated if activation sparsity support were disabled.

Referring further to FIG. 2G, with the planar patch $\{I_{a,0}, I_{b,0}, \ldots I_{i,0}\}$ order transposed, the barrel shifter 211 unit 0 and IFM cache 139 continue on to transpose planar patches $\{I_{a,1}, I_{b,1}, \ldots I_{i,1}\}$, $\{I_{a,1}, I_{b,1}, \ldots I_{i,1}\}$ and $\{I_{a,1}, I_{b,1}, \ldots I_{i,1}\}$. Correspondingly, the $MR_{0,0 \ldots 7}$ quad finishes dot product computation for patch $\{I_{a,0}, I_{b,0}, \ldots I_{i,0}\}$ and continues on to compute dot products for patches $\{I_{a,1}, I_{b,1}, \ldots I_{i,1}\}$, $\{I_{a,1}, I_{b,1}, \ldots I_{i,1}\}$ and $\{I_{a,1}, I_{b,1}, \ldots I_{i,1}\}$ to complete the depth-wise convolution's computation at the current planar location. After that patches 216 can slide to a next planar location. Layer computation finishes once depth-wise convolution has been computed at all desired planar locations.

Note that activation lane quads $act_4 \ldots act_7$, $act_8 \ldots act_{11}$ and $act_{12} \ldots act_{15}$ process IFM slice channels 4 ... 7, 8 ... 11 and 12 ... 15 correspondingly and otherwise operate substantially identical to the activation lane quad $act_0 \ldots act_3$. FIGS. 2G through 2J omit illustrations for activation lanes $act_4$ through $act_{15}$.

Also, note that it may be beneficial to place barrel shift units 211 right after IFM cache 139 instead of before IFM cache 139, since this allows storing IFM slices in IFM cache 139 without change in depth channel order, such that zig-zag traversal described in the '610 application can operate without change to reduce access to SRAM 109. Barrel shift units 211 placed after IFM cache 139 can therefore apply the necessary changes in depth channel ordering as IFM values 201 exit IFM cache 139. However, in this case IFM cache 139 may need to be modified such that it can fetch several values (e.g. four) from same lane in same clock.

Figures 1, 2H:
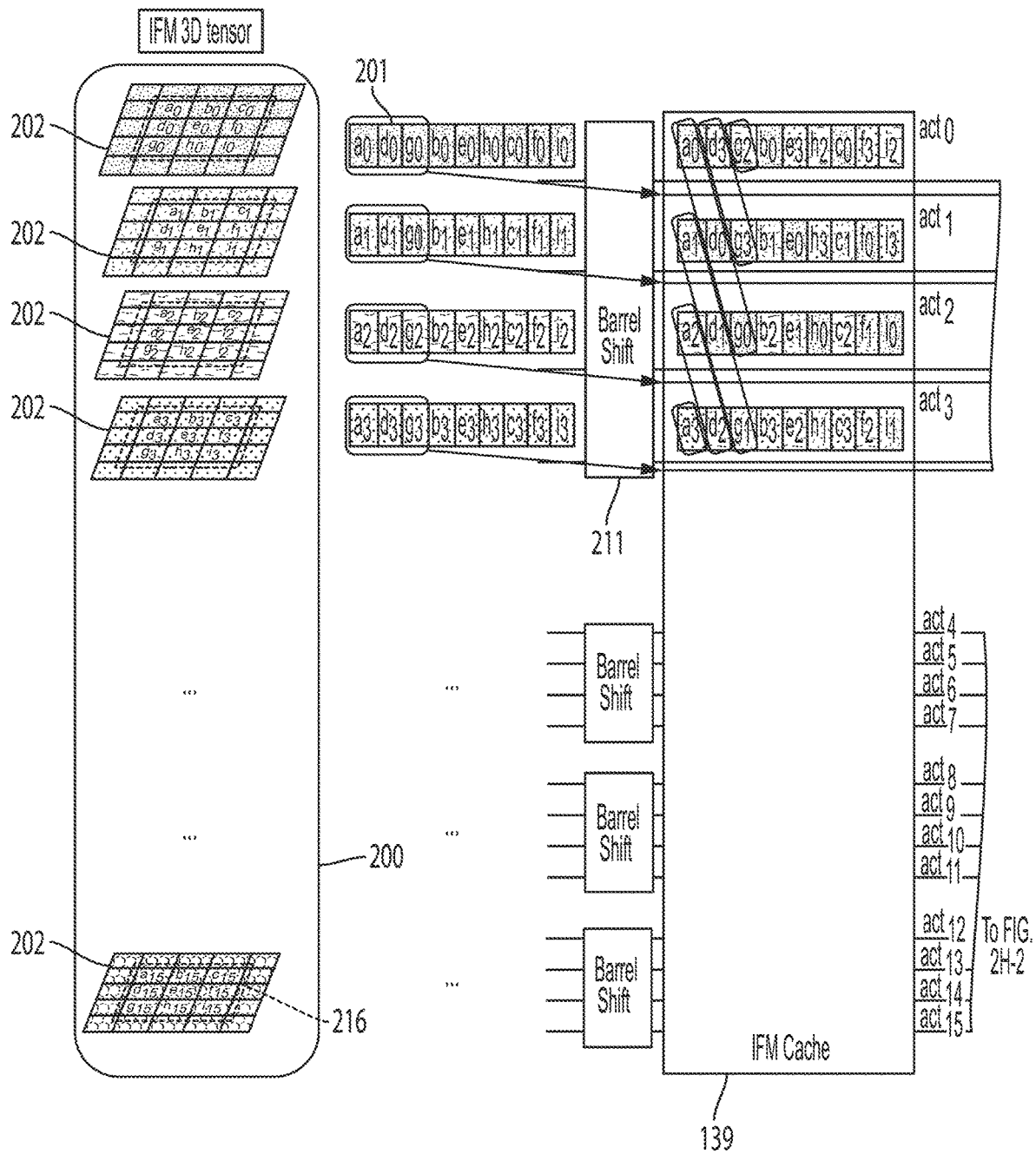
Figures 2, 2H:
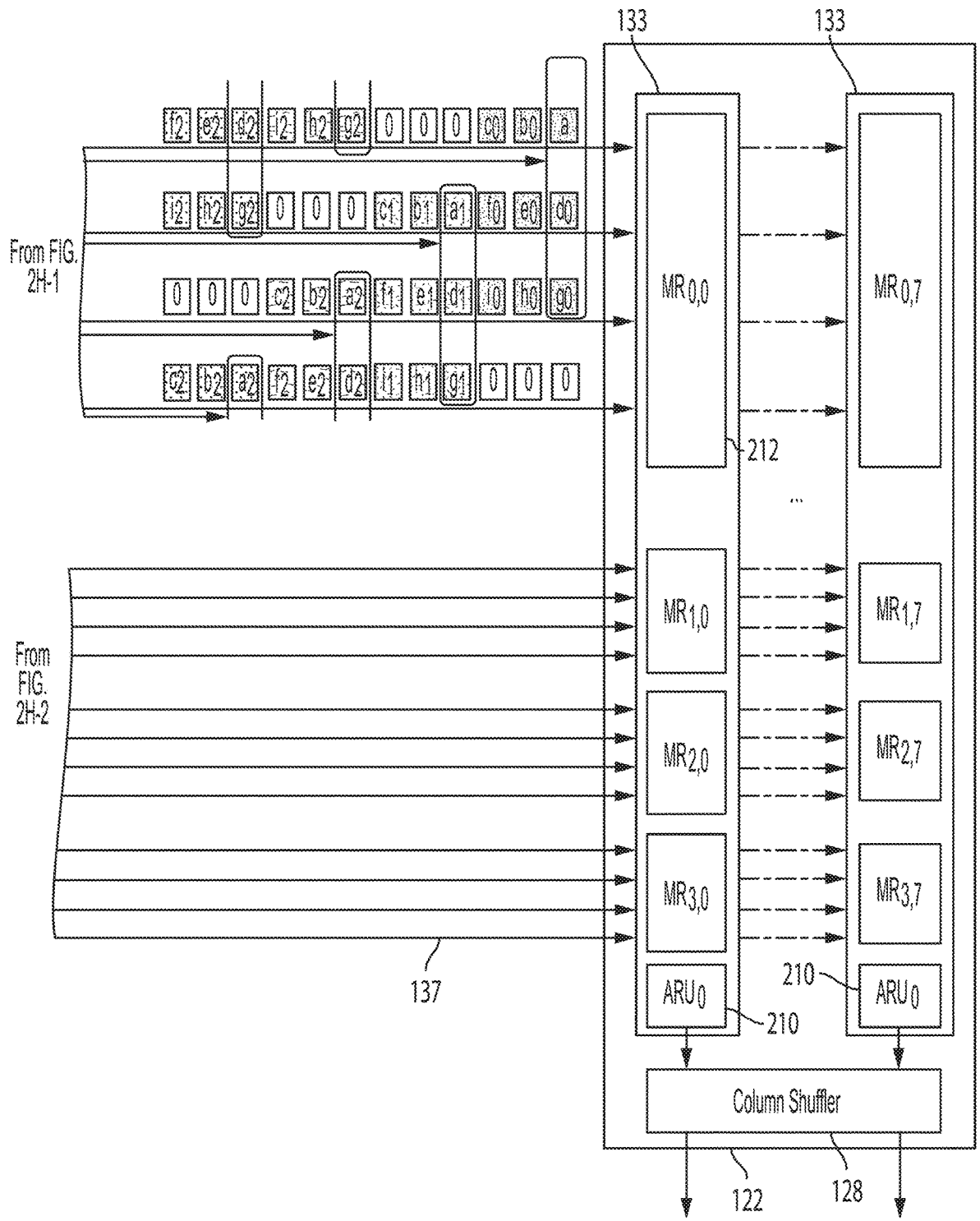
Figures 1, 2I:
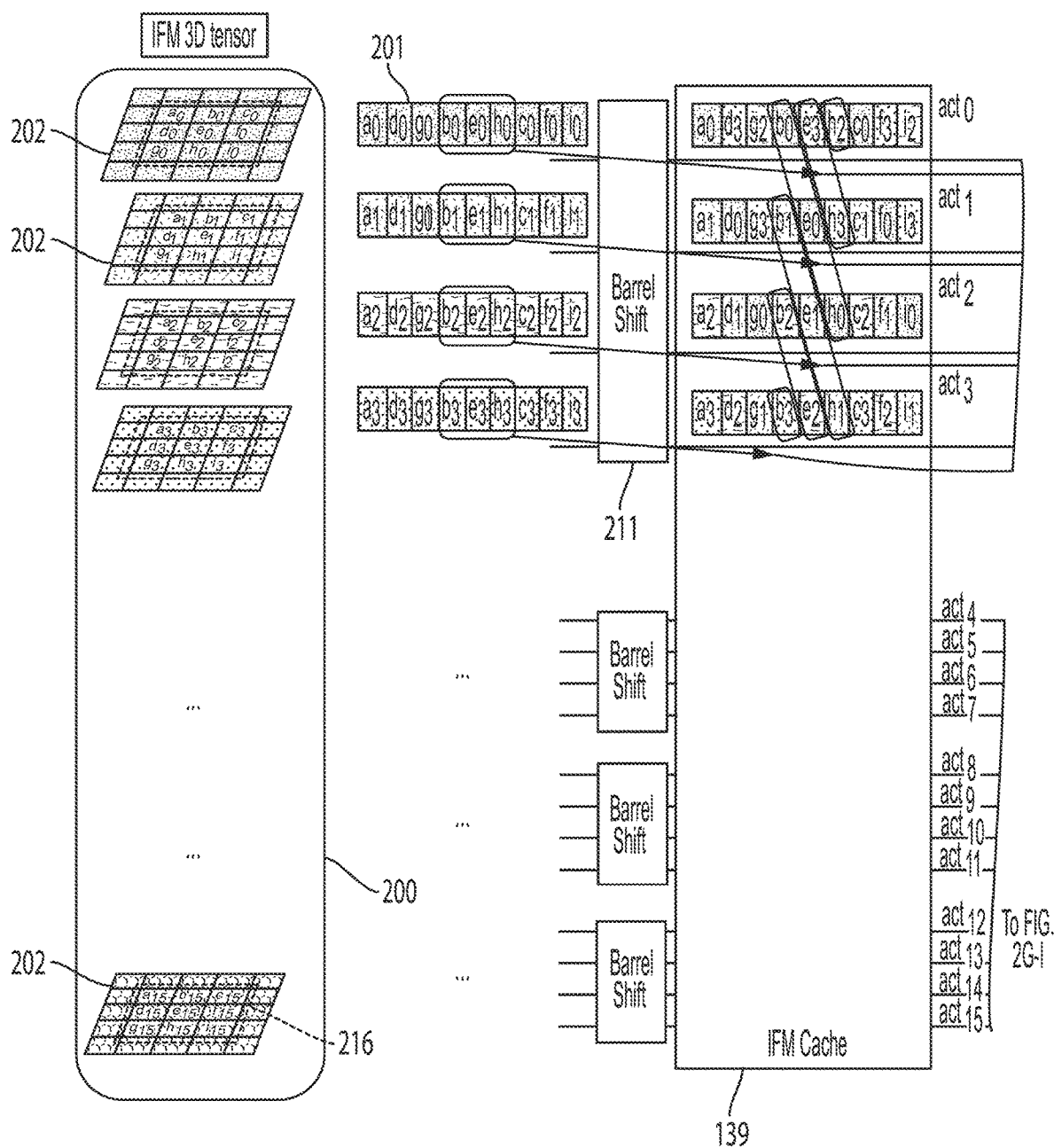
Figures 2, 2I:
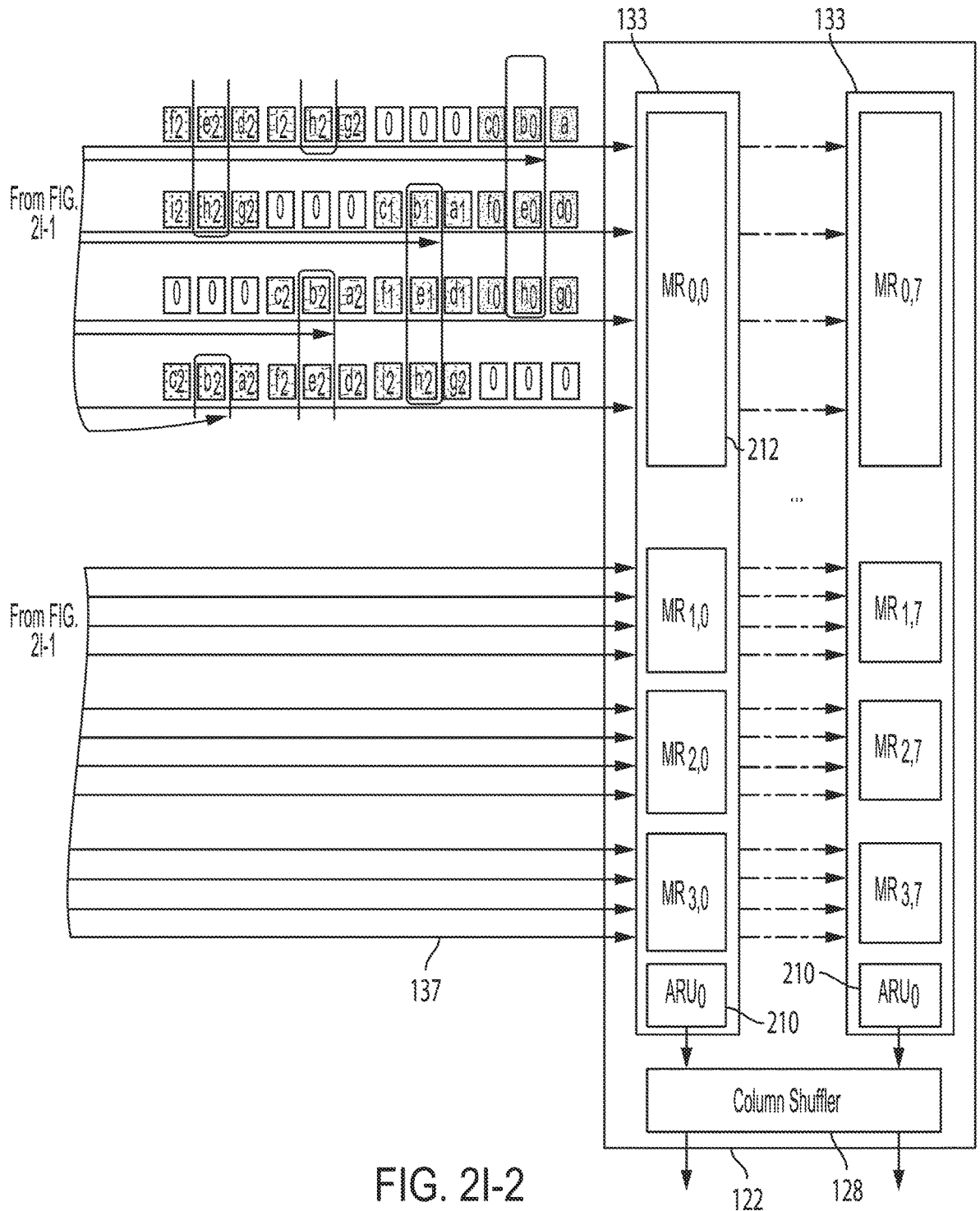
Figures 1, 2J:
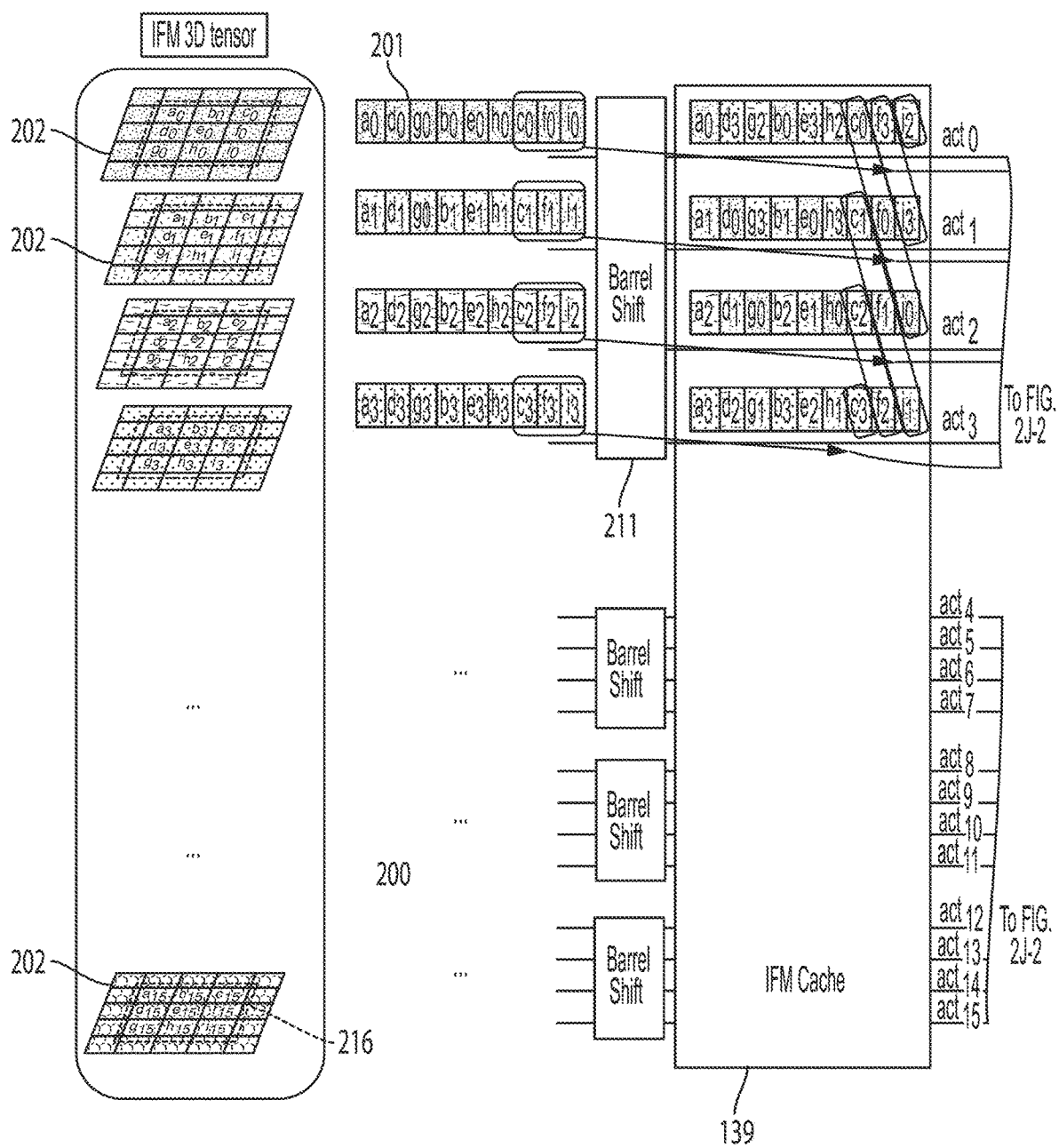
Figures 2, 2J:
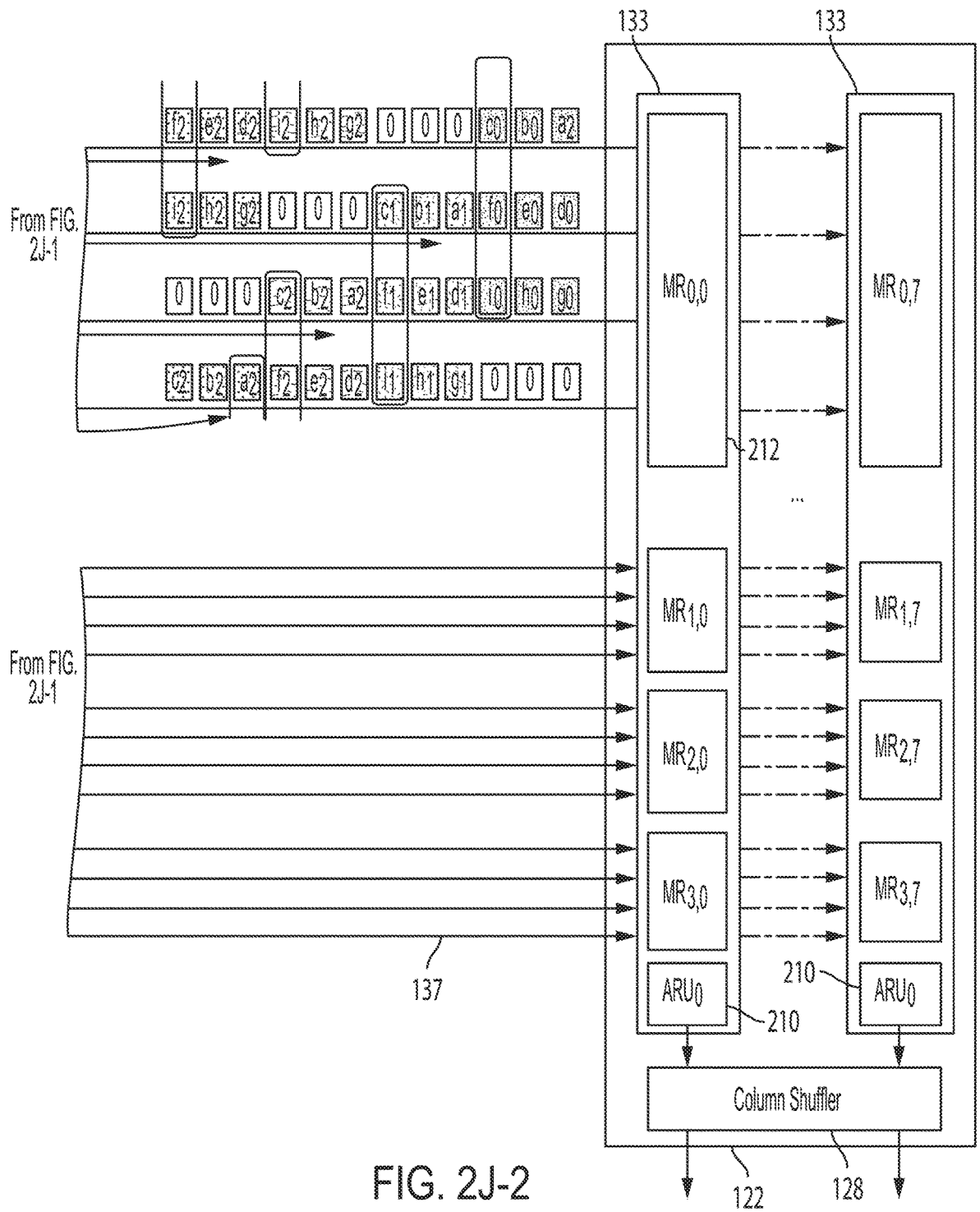

FIGS. 2H, 2I and 2J correspondingly illustrate step-by-step how row-vectors $\{I_{a,0 \ldots 3}, I_{d,0 \ldots 3}, I_{g,0 \ldots 3}\}$, $\{I_{b,0 \ldots 3}, I_{e,0 \ldots 3}, I_{h,0 \ldots 3}\}$ and $\{I_{c,0 \ldots 3}, I_{f,0 \ldots 3}, I_{i,0 \ldots 3}\}$ each undergo the transpose from depth-major order—i.e. IFM slice being a column vector indexed by depth channel—to planar-major order, i.e. the column vector arriving to each quad 215 being indexed by planar location.

Figure 2K:
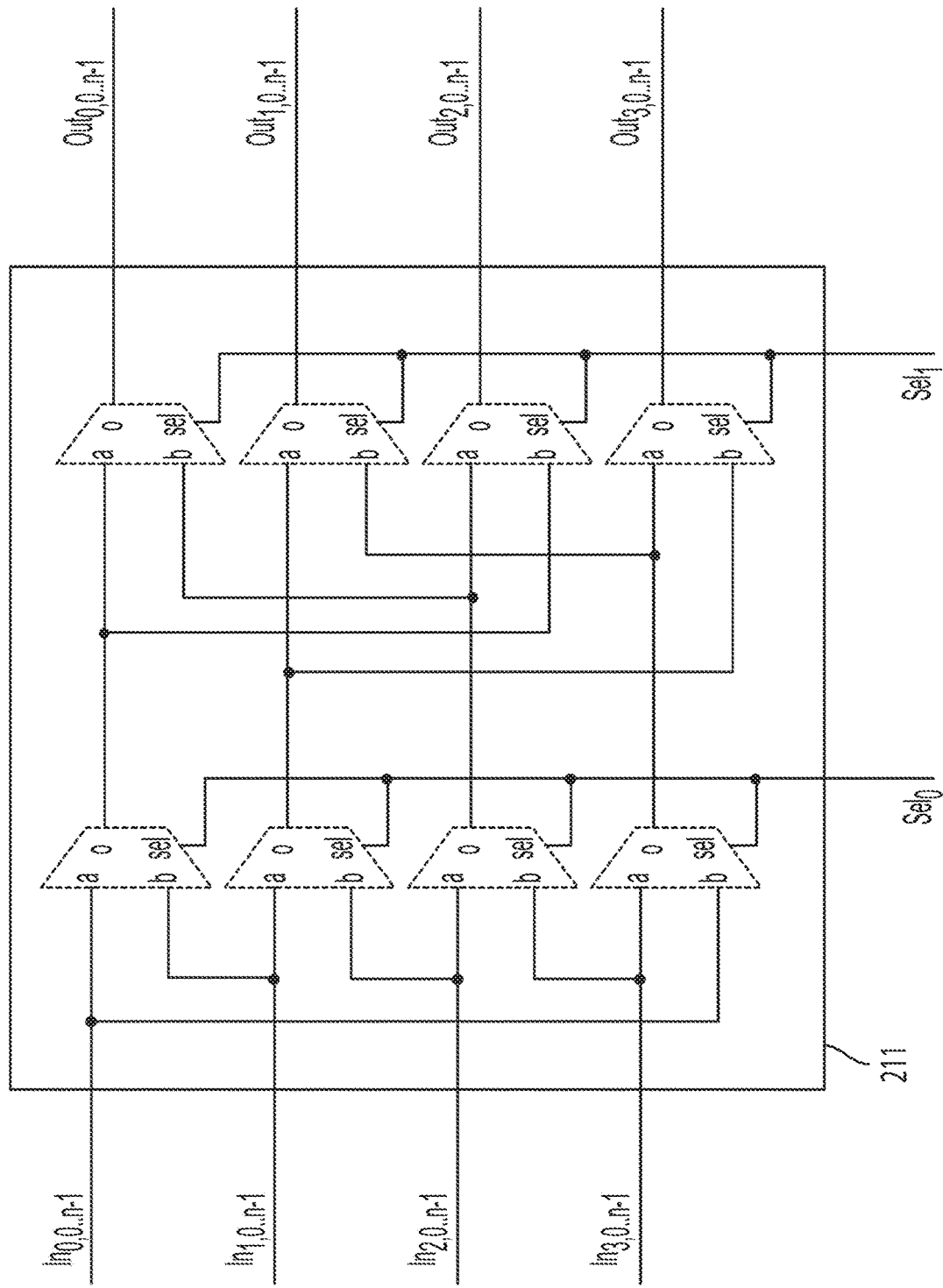
FIG. 2K illustrates micro-architecture of barrel shift units utilized by depth-wise-separable convolution operations.

FIG. 2K illustrates micro-architecture of barrel shift units 211, where control inputs Sel[1:0] specify the shift amount (number of bits). For example, Sel[1:0] set to {0,0} will cause Out[3:0] to be identical to In[3:0], Sel[1:0] set to {0,1} will cause Out[3:0] to be {In$_2$, In$_1$, In$_0$, In$_3$}, Sel[1:0] set to {1,0} will cause Out[3:0] to be {In$_1$, In$_0$, In$_3$, In$_2$} and Sel[1:0] set to {1,1} will cause Out[3:0] to be {In$_0$, In$_3$, In$_2$, In$_1$}.

Figure 2L:
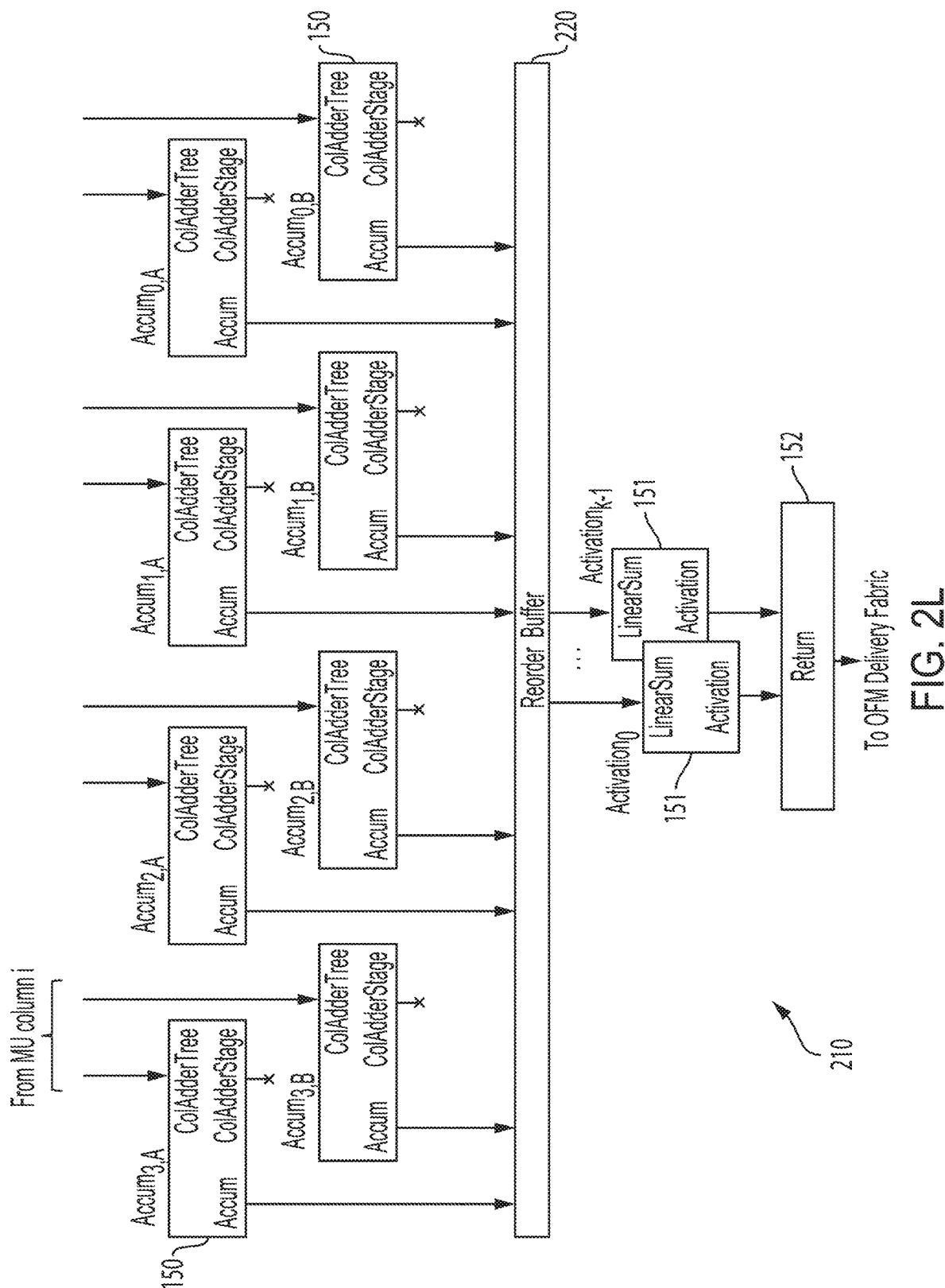
FIG. 2L illustrates micro-architecture of the accumulate-and-return unit modified to be used by depth-wise-separable convolution.

FIG. 2L illustrates the modified ARU 210, as compared to the baseline ARU 167 shown in FIG. 1J. As mentioned previously, note that each quad 215 of activation lanes now has its own accumulator pair. More specifically, within each MR column "c" and quad "q", Accum$_{c,q,A}$ and Accum$_{c,q,B}$ 150 respectively receive outputs of adder trees $\Sigma_{c,q,A}$ and $\Sigma_{c,q,B}$ in quad multiply-reduce (MR) unit 212 MR$_{q,c}$ for activation lane quads 0 through 3. Each quad MR unit having its own pair of accumulators allows each quad 215 operate substantially independently from each other, i.e. skip zero activations as necessary, with ARU reorder buffer 220 re-assembling dot products—computed by the four quad MR units 212 in each column—back to the original order, e.g. the order that would take place if sparsity support was disabled.

Note that since there are four quad MR units per column—and correspondingly four accumulator pairs per column—each MR column's maximum throughput has quadrupled. However, as illustrated in FIG. 2G, it takes (3 clock cycles per depth channel)*(repeated once per 4 depth channels in the quad)=12 clock cycles to compute 3×3 depth-wise convolution on 16 depth channels. Therefore, in this particular example of FIG. 2G, the actual throughput of each MR column equals to (16 depth channels in IFM slice)/(12 clock cycles per 3×3 convolution)=4/3, i.e. 4 final results computed every 3 clock cycles. Note that the throughput depends on the depth-wise convolution kernel size. For example, a 2×2 depth-wise convolution could be computed as fast as in (2 clock cycles per depth channel)*(repeated once per 4 depth channels in the quad)=8 clock cycles, with throughput reaching (16 depth channels in IFM slice)/(8 clock cycles per 2×2 convolution)=2 output values per clock cycle, on average. Furthermore, a 2×1 depth-wise convolution may reach a throughput of 4 final results per clock cycle, on average. On top of that, support for sparse computation can further increase throughput of MR columns up to another 2×.

In order to apply activation function several times per clock cycle, on average, ARU 210 has multiple activation units 151. Once can choose the number of activation units 151 per each ARU 210 to be, for example, four—to support 2×2 depth-wise convolution without delay, while 2×1 depth-wise convolution may need to be throttled down unless eight activation units 151 are available. Note that in order to avoid bottlenecks in communication and computation, while using the silicon area economically, MR column throughput should correspondingly match the throughput of the OFM delivery fabric 106, SRAM 109 as well as the IFM delivery fabric 104—considered together with IFM cache 139.

The return unit 152 collects final outputs from one or more activation units 151 and passes the resulting OFM slices (vectors) on to OFM delivery fabric 104 for storage in SRAM 109. Note that ColAdderStage outputs of accumulator units 150 are shown to be disconnected when computing depth-wise convolution since there is no need to use the reduction fabric 111. More specifically, the reduction (addition using adder trees as well as accumulation) during depth-wise convolution is accomplished within each MR tile, as opposed to the baseline case of general direct convolution often requiring adding results from multiple MR tiles in order to add up partial products in a dot product having more than 16 terms.

As illustrated in FIGS. 2F through 2L, the hardware configuration for depth-wise convolution can support arbitrary planar kernel sizes, subject to the size of IFM cache 139 that acts to reduce SRAM reads and subject to the size of MU weight register file 127. For example, a 10×8 depth-wise convolution can be computed by the 10*8=80 IFM slices, logically sub-dividing the 80 IFM slices in sets of 4 and applying transpose to each of these sets, as shown in FIGS. 2G through 2J. Note that unlike in the case of convolution illustrated in FIGS. 2G through 2J, in this case there is no need to insert zero values in the course of transpose as the transpose operation would effectively operate on a (4 depth channels per quad) by (4 IFM slices read in per each transpose)=4-by-4 matrix.

Following the baseline implementation in the '610 application, MR tiles generate OFM slices (vectors) of length 8, while deep learning network models may apply less than 8 filters per IFM depth channel, in particular including only one filter per IFM depth channel. In such cases MR column 133 can compute value of same—and often the only one—

Figure 2M:
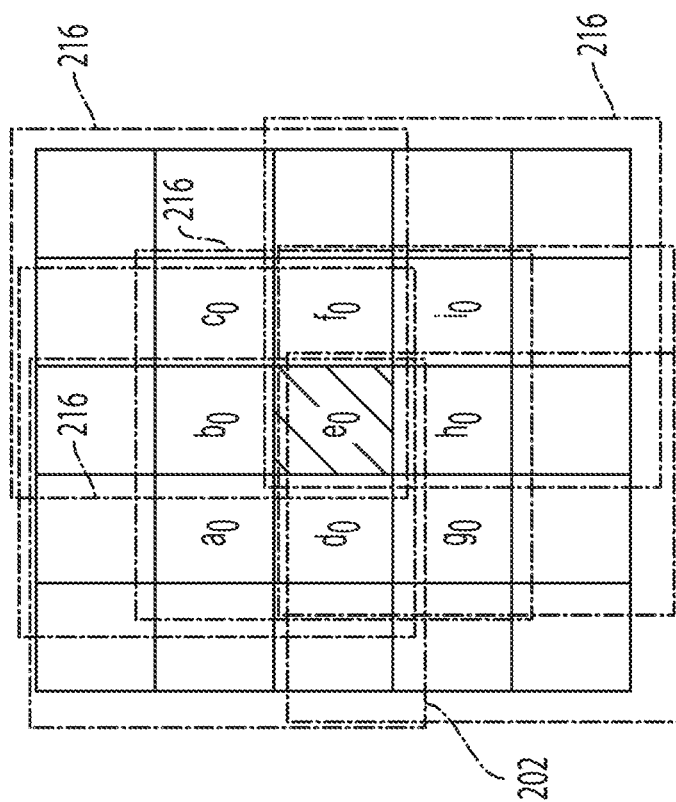
FIG. 2M illustrates an example of an activation value being used to compute depth-wise-separable convolution at several planar locations, where the convolution window at each of such planar location overlaps the activation value.
Figure 2N:
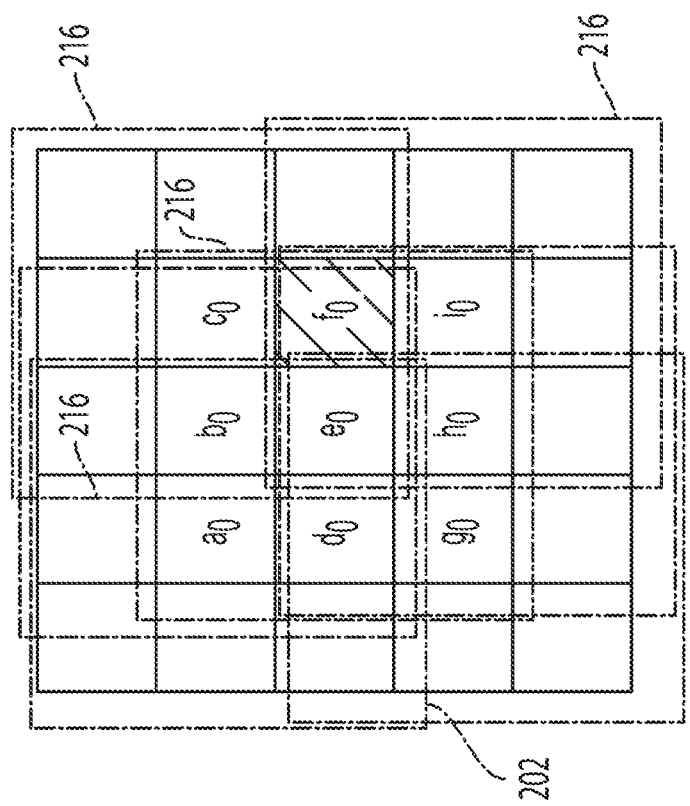
FIG. 2N illustrates an example of an activation value being used to compute depth-wise-separable convolution at several planar locations, where the convolution window at each of such planar location overlaps the activation value.

OFM channel at different planar locations, in parallel. FIG. 2M illustrates an example, where planar element $e_0$ from depth channel 202—as part of a transposed vector—is broadcast to MR columns, where each of the 8 MR columns has its own planar convolution patch 216 at a location that overlaps—and thus receives—the element $e_0$ being broadcast and to compute depth-wise convolution at that location. For example, an element from within a 3×3 planar patch can simultaneously belong to 3×3=9 convolution patches, thus allowing up of depth-wise convolution to proceed at up to 9 locations simultaneously. However, as illustrated in FIG. 2N, when activation $f_0$ gets broadcast to MR columns configured to have same convolution patch locations as in FIG. 2M, only 6 of the MR column patches 216 end up overlapping the location of element $f_0$, thus causing MR column that don't overlap element $f_0$ to idle.

In general, the input feature map can be traversed in an optimal sequence—not described in this disclosure—to broadcast transposed IFM quad slices in an optimal order that keeps MR columns active, i.e. avoids MR columns idling due to a lack of overlap between the MR column's patch with activation elements being broadcast. Note also MR columns computing dot products at different planar locations in parallel may also require the column shuffler unit 218, in each MR tile, to reorder MR column outputs back to the depth-major order used by OFM slices, before sending these OFM slices for storage to SRAM 109 via OFM delivery fabric 106. For example, OFM slice from a depth-wise convolution computed at location row "r and column "c" should be a vector of the shape $\{O_{r,c,d}, O_{r,c,d+1}, O_{r,c,d+2}, O_{r,c,d+3}, O_{r,c,d+4}, O_{r,c,d+5}, O_{r,c,d+6}, O_{r,c,d+7}\}$, where index d corresponds to the depth-wise convolution's depth channel. More specifically, since depth-wise convolution operates on each depth channel independently, the depth-wise convolution's output depth channel is same as the depth-wise convolution's input channel, here referred to as just "depth-wise convolution's channel". Referring to the baseline architecture description in the '610 application, index d may be a multiple of 8, i.e. 0, 8, 16, etc. Lastly, column shuffler unit 218 logically functions as an all-to-all switch and can be economically implemented, for example as a bus connecting 8 input sources to 8 output destinations.

As we have discussed in some detail, the baseline NPU architecture described in the '610 application cannot compute depth-wise-separable convolution in an efficient way. Another type of convolution that the baseline NPU architecture runs inefficiently is ARGB convolution, where the input data is a color image, such as one captured by a camera or one loaded from a color bitmap or compressed JPEG file. A color image typically has three color channels—e.g. RGB or YUV—and sometimes an additional "alpha" channel. The alpha channel is commonly used in computer graphics, but when used with a color image captured by a camera or loaded from a JPEG-compressed file the alpha channel may be either absent or unused. For reasons explained below in detail, NPU architecture becomes simpler when the input color image has ARGB encoding, with the alpha channel unused, e.g. set to zero, as opposed to RGB encoding. A computer system, including personal computer and mobile application processor, can easily convert the encoding of a color image from RGB to ARGB on-the-fly while transferring the color image from camera or memory or file to NPU by inserting a zero value into every 4th byte. Therefore, it may be beneficial to have NPU being able to process ARGB data, while keeping changes to the baseline NPU architecture, as described in the '610 application, to a minimum.

Figure 3A:
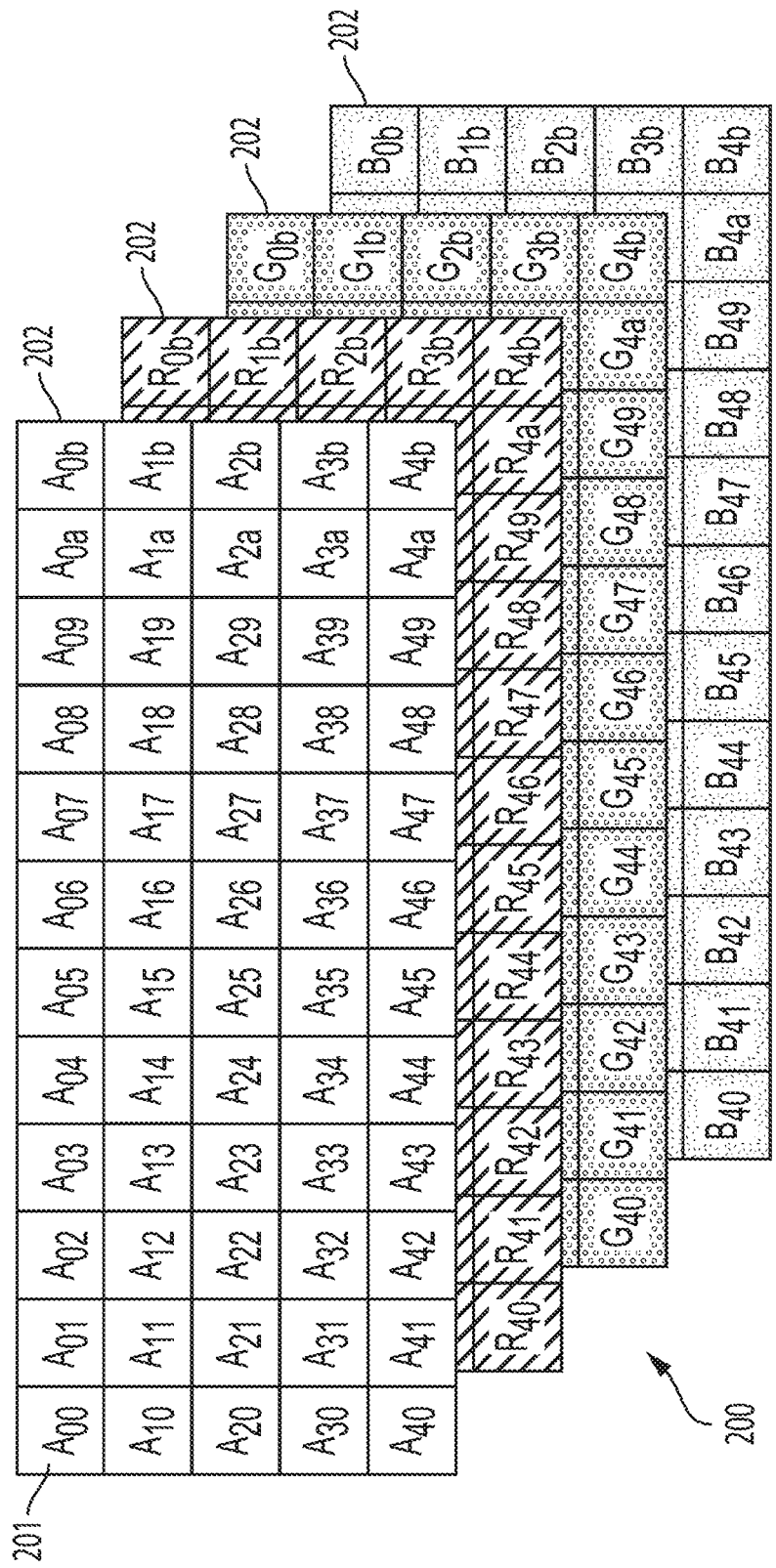
FIG. 3A illustrates the composition of an ARGB IFM tensor with the batch size of one.

FIG. 3A illustrates the composition of an ARGB IFM tensor 200 as may be commonly used for inference on deep-learning neural network models in real time, with the batch size of one. The IFM tensor 200 has three dimensions, with the fourth dimension, i.e. batch size, equal to one and thus subsequently ignored. More specifically, while training a deep-learning neural network model typically uses batch sizes larger than one, e.g. 128, to accelerate training and improve model training convergence, real-time inference on deep-learning neural network models typically uses the batch size of one, corresponding to the image just-captured by the user camera, a self-driving car, a robot, an internet-of-things appliance or other devices that perform model inference as their main function as opposed to model training.

As shown in FIG. 3A, the 3D IFM tensor 200 has planar dimensions of 5 rows and 12 columns and contains four depth channels, corresponding to the alpha and three color channels comprising the color image. Each planar location at image row "r" and column "c" contains a four-element vector $\{A_{r,c}, R_{r,c}, G_{r,c}, B_{r,c}\}$. FIG. 3B correspondingly illustrates the order of storing ARGB IFM tensor 200 values 202 in SRAM 109. Note that the four-element vectors $\{A_{r,c}, R_{r,c}, G_{r,c}, B_{r,c}\}$ are stored one after the other, i.e. at the next SRAM address, as the planar indices, e.g. the column index followed by the row index, increment. More specifically, with SRAM 109 input-out data bit width set to match IFM slice length of 16 bytes, each entry in such 16-byte-wide SRAM 109 thus holds four ARGB pixels that are consecutive with respect to their planar location, e.g. planar locations (0, 0), (0,1), (0, 2) and (0, 2). It is this kind of storage order in SRAM 109 that the NPU has to process efficiently when calculating a general direct convolution.

FIGS. 3C through 3J illustrate MR tile 122 performing an ARGB convolution, step-by-step. Note that FIG. 3C hardware block-diagram is similar to that of depth-wise convolution in FIG. 2G, with barrel shifters 211 moved from the IFM cache 139 input to IFM cache 139 output and combined into an arrayed interleaved barrel shift unit 300. The column shuffler becomes bypassed and omitted for clarity. Otherwise, ARGB convolution operates in a similar fashion to depth-wise convolution by utilizing quads of activation lanes 215, quad MR units MR0,0 . . . MR4,7, and one pair of quad-size adder trees per MR unit and with the associated pair of accumulators in ARU 210.

Figures 1, 3C:
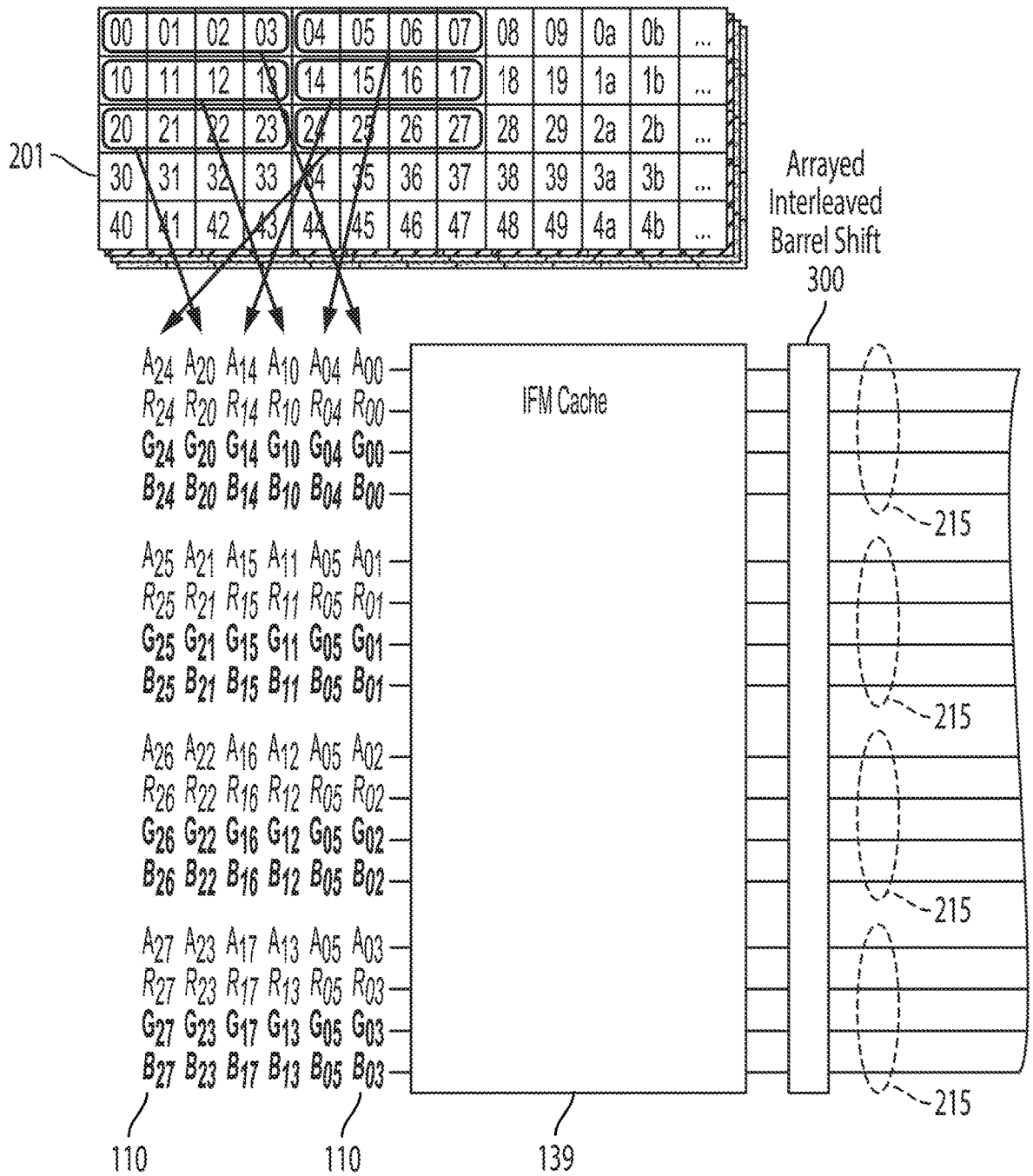
Figures 2, 3C:
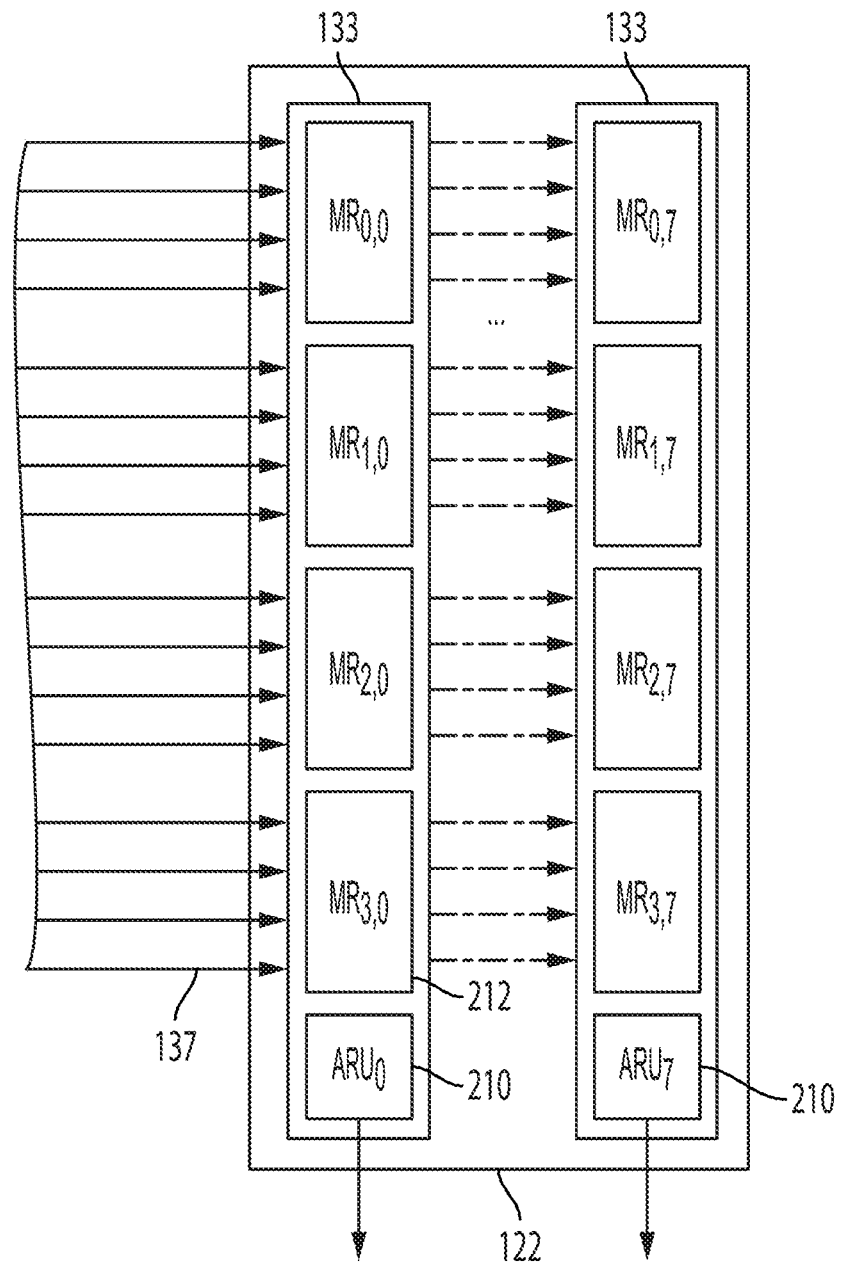

More specifically, referring to FIG. 3C, IFM slices 110 comprising the ARGB 3D IFM tensor 201 arrive from SRAM 109 over IFM delivery fabric 104 to IFM cache 139. Each IFM slice 201 carries four ARGB pixels. The example in FIGS. 3C through 3J illustrates a 3×3 convolution window scanning the input image, i.e. IFM tensor 201, in a planar fashion, sliding horizontally left-to-right as the inner index loop and vertically top to bottom as the outer index loop. As the scan starts, the convolution windows will be positioned in the upper left corner of IFM tensor 201, therefore the NPU 100 starts IFM tensor convolution by fetching IFM slices 110 from the upper left corner of IFM tensor 201. In particular, the very first IFM slice 110 that arrives to IFM cache 139 contains ARGB pixels at planar locations (0, 0), (0, 1), (0, 2) and (0, 3), where we use the (row, column) notation to indicate planar coordinates. Each of these four pixels respectively come to IFM cache 139 lanes 0 . . . 3, 4 . . . 7, 8 . . . 11 and 12 . . . 15, in turn corresponding to quads 0, 1, 2 and 3. The second IFM slice 110 brings ARGB pixels at planar locations (0, 4), (0, 5), (0, 6) and (0, 7). The third IFM slice 201 brings ARGB pixels at planar locations (1, 0), (1, 1), (1, 2) and (1, 3). This process continues until a 3-by-8 patch of ARGB pixels has been fetched, as illustrated in FIG. 3C.

Figures 1, 3D:
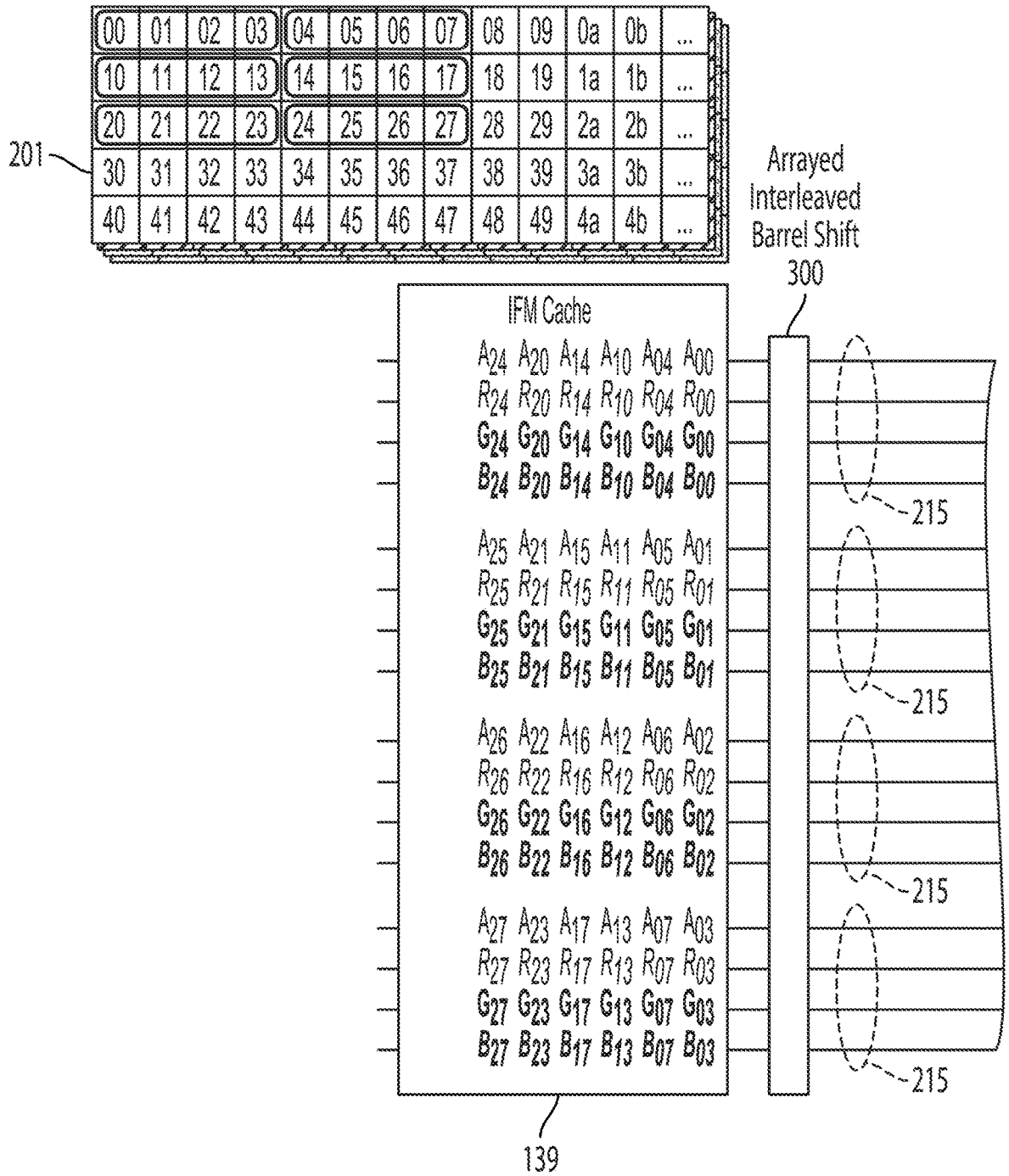
Figures 2, 3D:
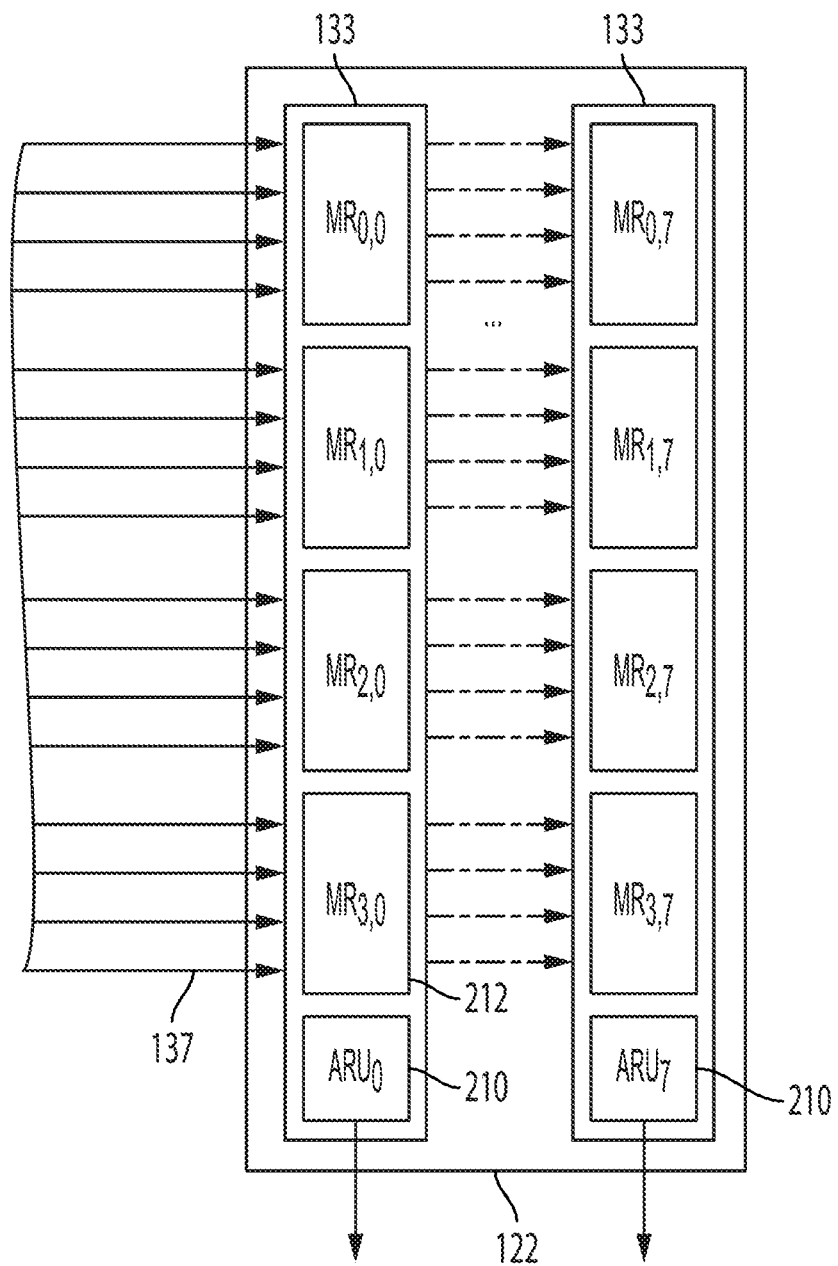
Figures 1, 3E:
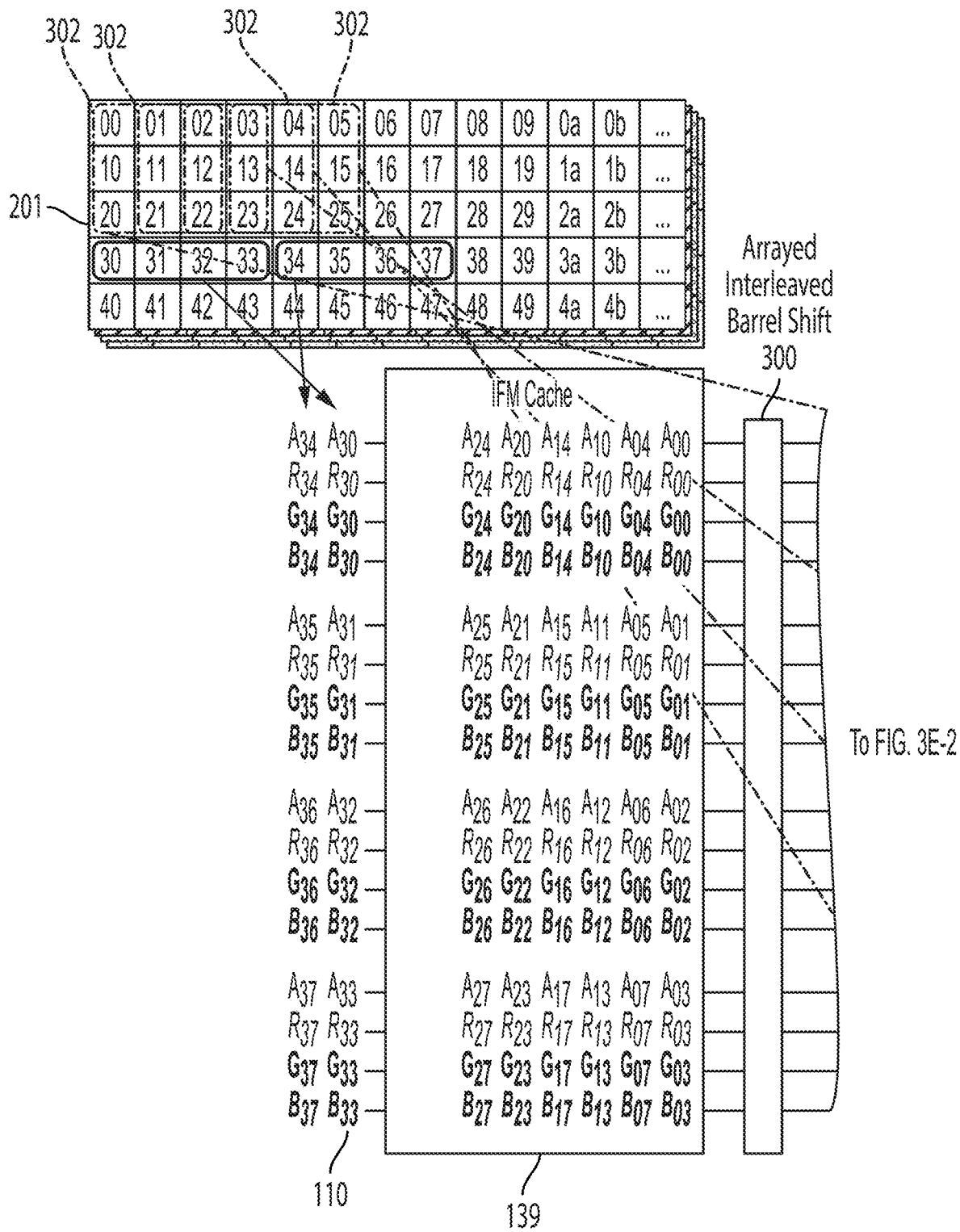
Figures 2, 3E:
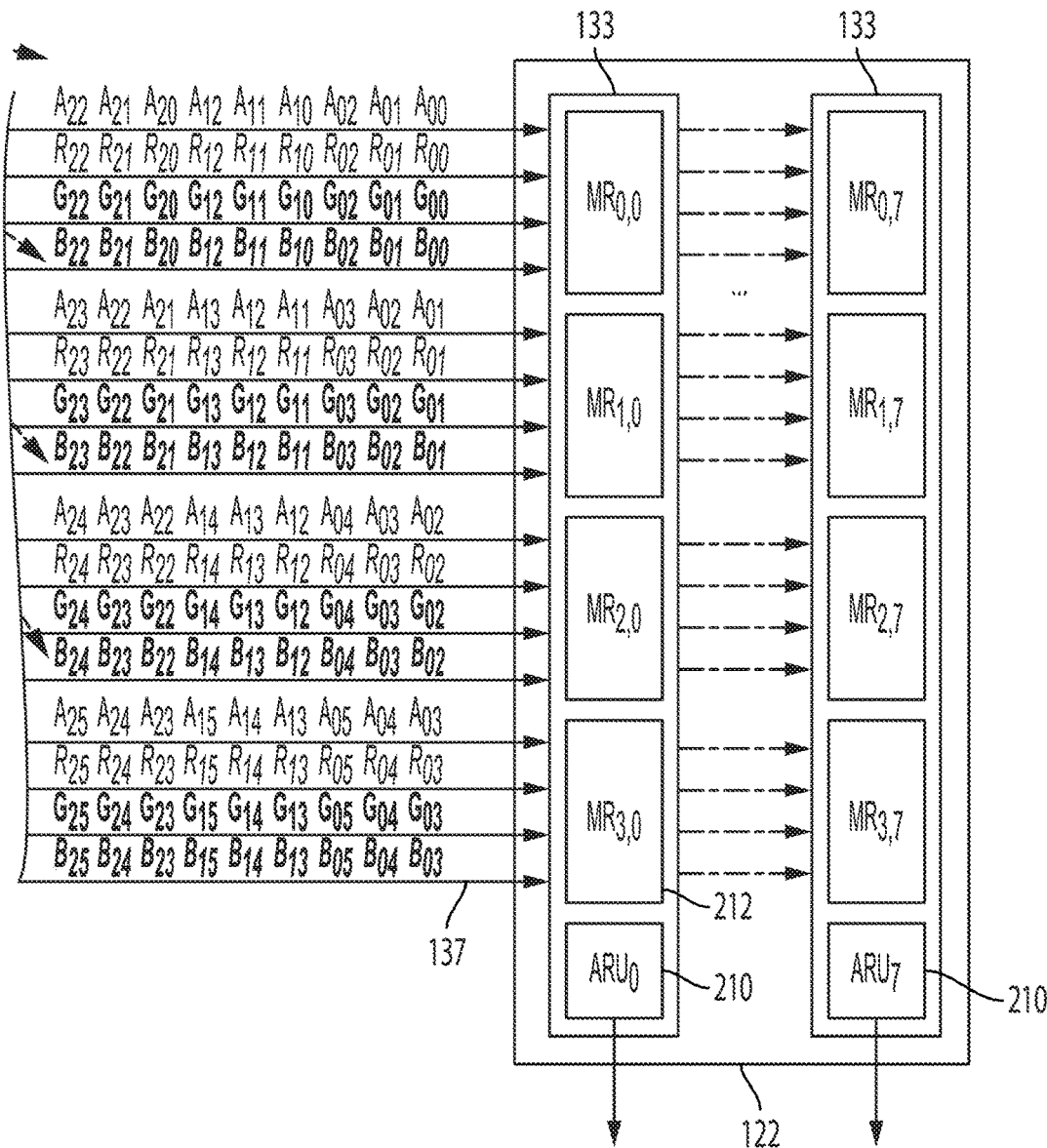

FIG. 3D illustrates the 3-by-8 patch of ARGB pixels stored in IFM cache 139, ready for the ARGB layer convolution operation to begin. Referring to FIG. 3E, note the four convolution patches 302 placed at consecutive planar locations. Each convolution patch 302 has a size of 3×3×4 using the rows-by-columns-by-depth-channels notations. Each of the four convolution patches 302 is assigned its activation lane quad. For example, IFM cache 139 and the arrayed interleaved barrel shift unit 300 work together to direct ARGB pixels convolved with left-most convolution patch 302 to activation lanes quad 0, i.e. activation lanes 0, 1, 2 and 3. More specifically, the alpha channel A becomes assigned to activation lane 0, and R, G and B channels become assigned to activation lanes 1, 2 and 3 respectively in this example. Similarly, ARGB pixels convolved with the second from the left convolution patch 302 stream over activation lanes quad 1, i.e. activation lanes 4, 5, 6 and 7. Accordingly, ARGB pixels convolved with the third and fourth from the left convolution patches 302 stream over activation lane quads 2 and 3, i.e. lanes 8 through 11 and 12 through 15 respectively.

Referring to FIG. 3E, the nine ARGB pixels at locations (0, 0) through (2, 2) inclusive sequentially arrive over activation lanes 0 through 3 for convolution by multiply-reduce 212 units $MR_{0, 0 \ldots 7}$, the nine ARGB pixels at locations (0, 1) through (2, 3) inclusive sequentially arrive over activation lanes 4 through 7 for convolution by multiply-reduce 212 units $MR_{1, 0 \ldots 7}$, the nine ARGB pixels at locations (0, 2) through (2, 4) inclusive sequentially arrive, over activation lanes 8 through 11 for convolution by multiply-reduce 212 units $MR_{2, 0 \ldots 7}$ and the nine ARGB pixels at locations (0, 3) through (2, 5) inclusive sequentially arrive over activation lanes 12 through 15 for convolution by multiply-reduce 212 units $MR_{3, 0 \ldots 7}$. Note that, as described in the '610 application, convolution weight kernels must be pre-loaded into weight register files of multiply-reduce units before layer convolution can commence. In the case of ARGB convolution kernels loaded into $MR_{0 \ldots 3, c}$, where column c=0 ... 7, may have identical values since $MR_{0 \ldots 3, c}$ perform same convolution, i.e. with same weight kernel, at different planar locations.

As the four convolutions proceed in parallel, MR units and associated ARU modules produce at least four OFM slices per 9 clock cycles. The four OFM slices correspond to convolutions applied at the four locations 302. Note that RGB values in ARGB convolution typically have few zero values, unlike activations in layers that follow ARGB in deep learning models. All values in the alpha channel, however, can and should be set to zero. Therefore, the NPU's support for activation sparsity can accelerate ARGB convolution by a factor of 4/3, approximately. Note that, as mentioned in the '610 application, other related disclosures and later in this disclosure, activation lanes carrying ARGB values should be pseudo-randomly shuffled to spread out zero-valued activations, in this case the zero-valued alpha channel, among all activation lanes in order to skip zero-valued activations most efficiently and thus accelerate the computation. Note that the convolution kernel weights pre-loaded into MR units also have to be shuffled to match the order in which the corresponding activations have been shuffled, such that each activation gets multiplied by the correct weight even though the activations are being shuffled as they continue arriving to MR array 122.

Figures 1, 3F:
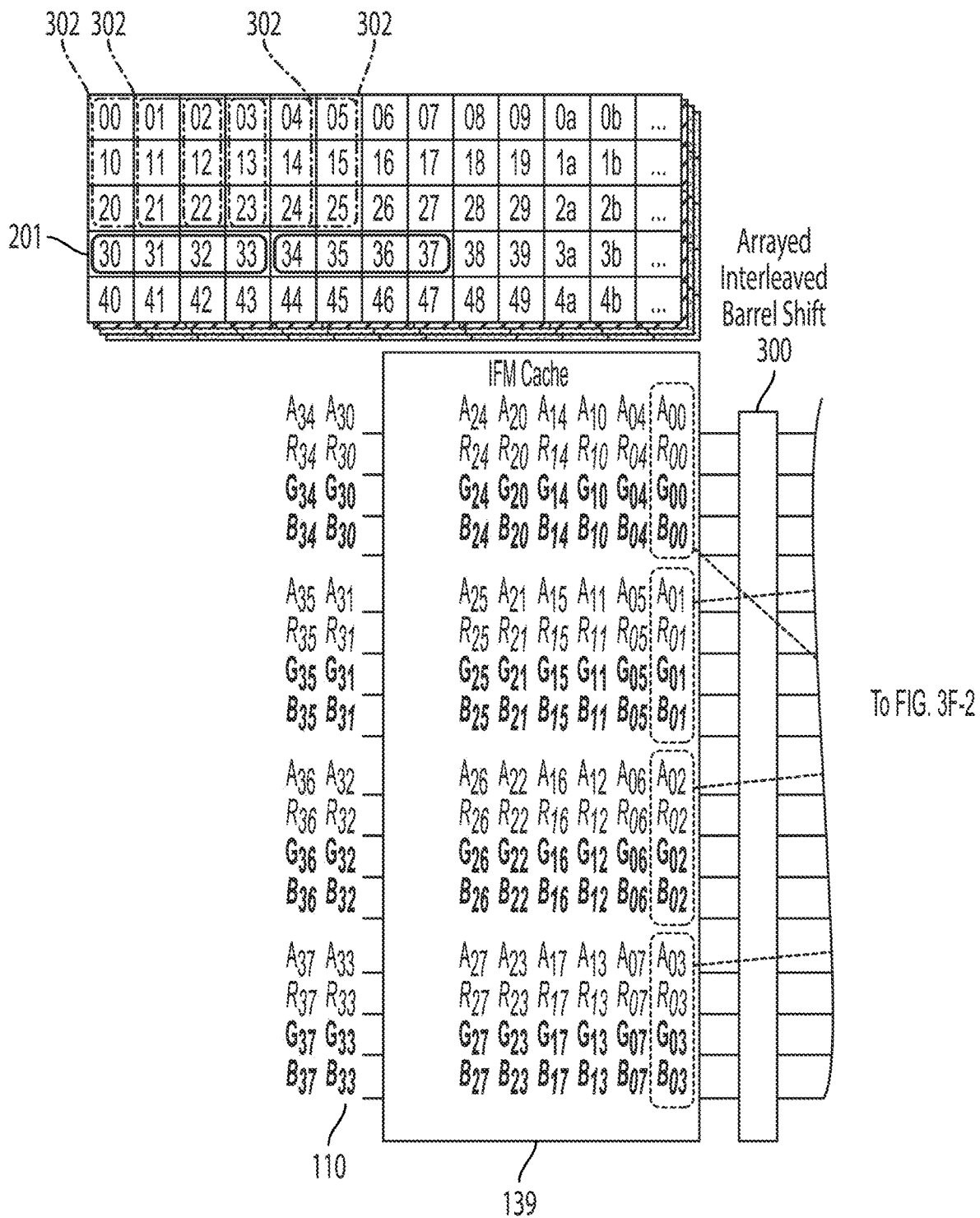
Figures 2, 3F:
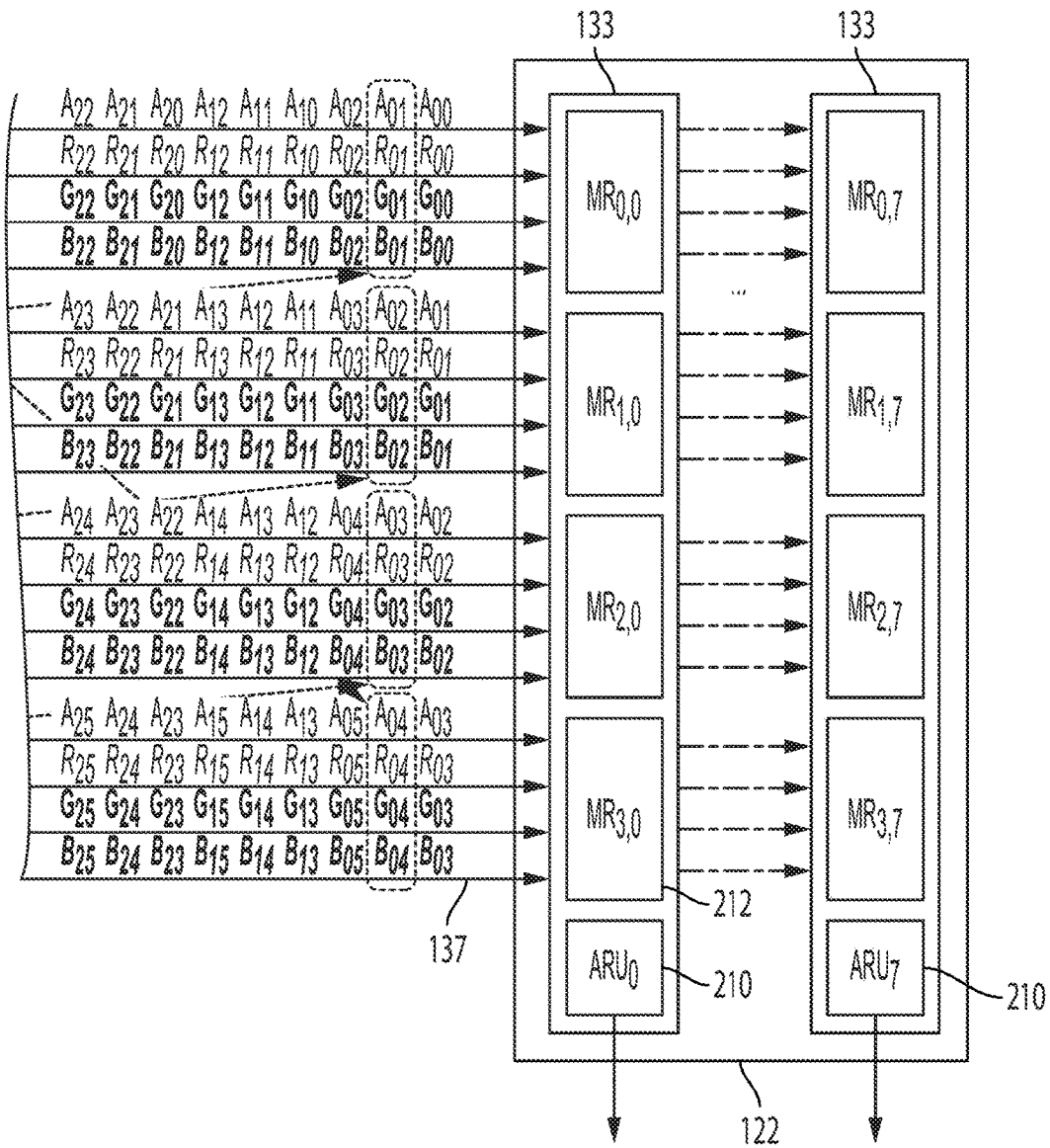

FIG. 3F illustrates operation of the arrayed interleaved barrel shift unit 300. Referring to FIG. 3E, note that the very first IFM slice 110 containing ARGB pixels at locations (0, 0) through (0, 3) arrived to IFM cache 139 lanes in a way that does not require a barrel shift applied. In other words, ARGB pixel from location (0, 0) arrived to activation lanes 0 through 3, ready for consumption by multiply-reduce units $MR_{0, 0 \ldots 7}$ connected to broadcast lanes 0 through 3. However, the ARGB pixel that follows the ARGB pixel from location (0, 0) arriving for computation in $MR_{0, 0 \ldots 7}$ comes from location (0, 1). IFM cache 139 stores the four values of this ARGB pixel—from location (0, 1)—in cache lanes 4 through 7. The arrayed interleaved barrel shift unit 300 moves these four values from lanes 4 through 7 to lanes 0 through 3, such that multiply-reduce units $MR_{0, 0 \ldots 7}$ now can receive and process the ARGB pixel from location (0, 1) after they have received the ARGB pixel from location (0, 0). Similarly, the arrayed barrel shift unit 300 moves pixel as necessary between activation lane quads, making sure ARGB pixels reach the activation quad where those pixels will be consumed during convolution. More specifically, in FIG. 3F, the barrel shift unit 300 simultaneously moves the ARGB pixel (0, 0) from IFM cache 139 lanes 0 ... 3 to activation broadcast 137 lanes 12 ... 15, moves the ARGB pixel (0, 1) from IFM cache lanes 4 ... 7 to activation broadcast lanes 0 ... 3 moves the ARGB pixel (0, 2) from IFM cache lanes 8 ... 11 to activation broadcast lanes 4 ... 7 and moves the ARGB pixel (0, 3) from IFM cache lanes 12 ... 15 to activation broadcast lanes 8 ... 11. This process repeats as necessary the IFM cache 139 continues sending copies of as ARGB pixels via the barrel shift unit 300 to activation broadcast lanes and on to MR quads for computation.

As the four convolutions at locations shown in FIG. 3E proceed in parallel, the IFM delivery fabric 104 brings IFM slices 110 containing ARGB pixels that will be necessary for convolution when the four current convolutions complete and the four convolution patches 302 slide over to the next location. More specifically, in FIG. 3G patches 302 have moved one row down from locations (0, 0) ... (2, 2), (0, 1) ... (2, 2), (0, 2) ... (2, 4) and (0, 3) ... (2, 5) correspondingly to locations (1, 0) ... (3, 2), (1, 1) ... (3, 2), (1, 2) ... (3, 4) and (1, 3) ... (3, 5). Note that ARGB pixels at locations (3, 0) through (3, 5) are now required to compute convolutions at the new locations. Therefore, IFM delivery fabric 104 brings these pixels from SRAM 109 into IFM cache 139. Since the IFM delivery fabric 104, SRAM 109 and cache 139 operate with the granularity of one IFM slice, the NPU fetches two whole IFM slices 110 containing ARGB pixels at locations (3, 0) through (3, 7) as illustrated in FIG. 3F.

Figures 1, 3G:
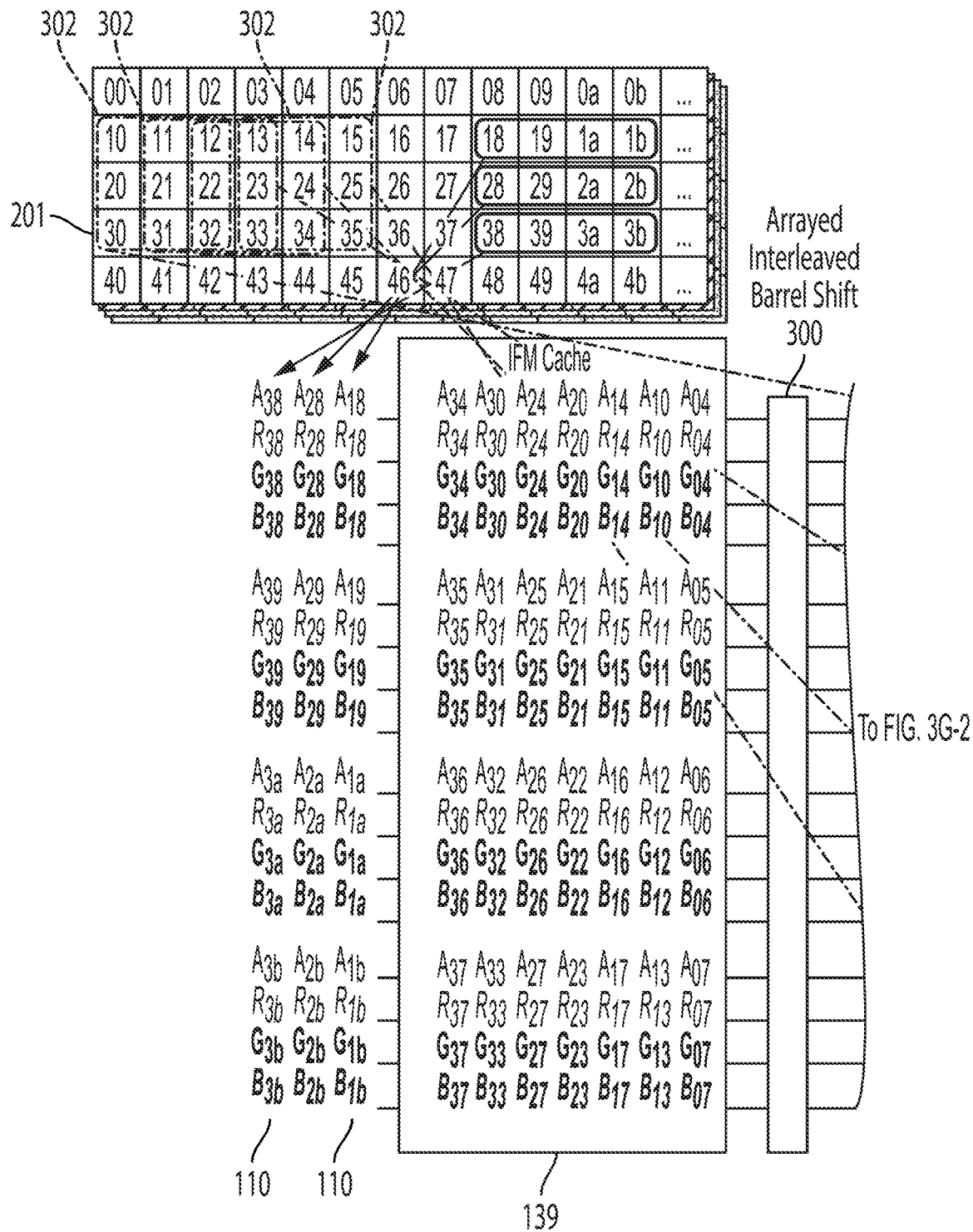
Figures 2, 3G:
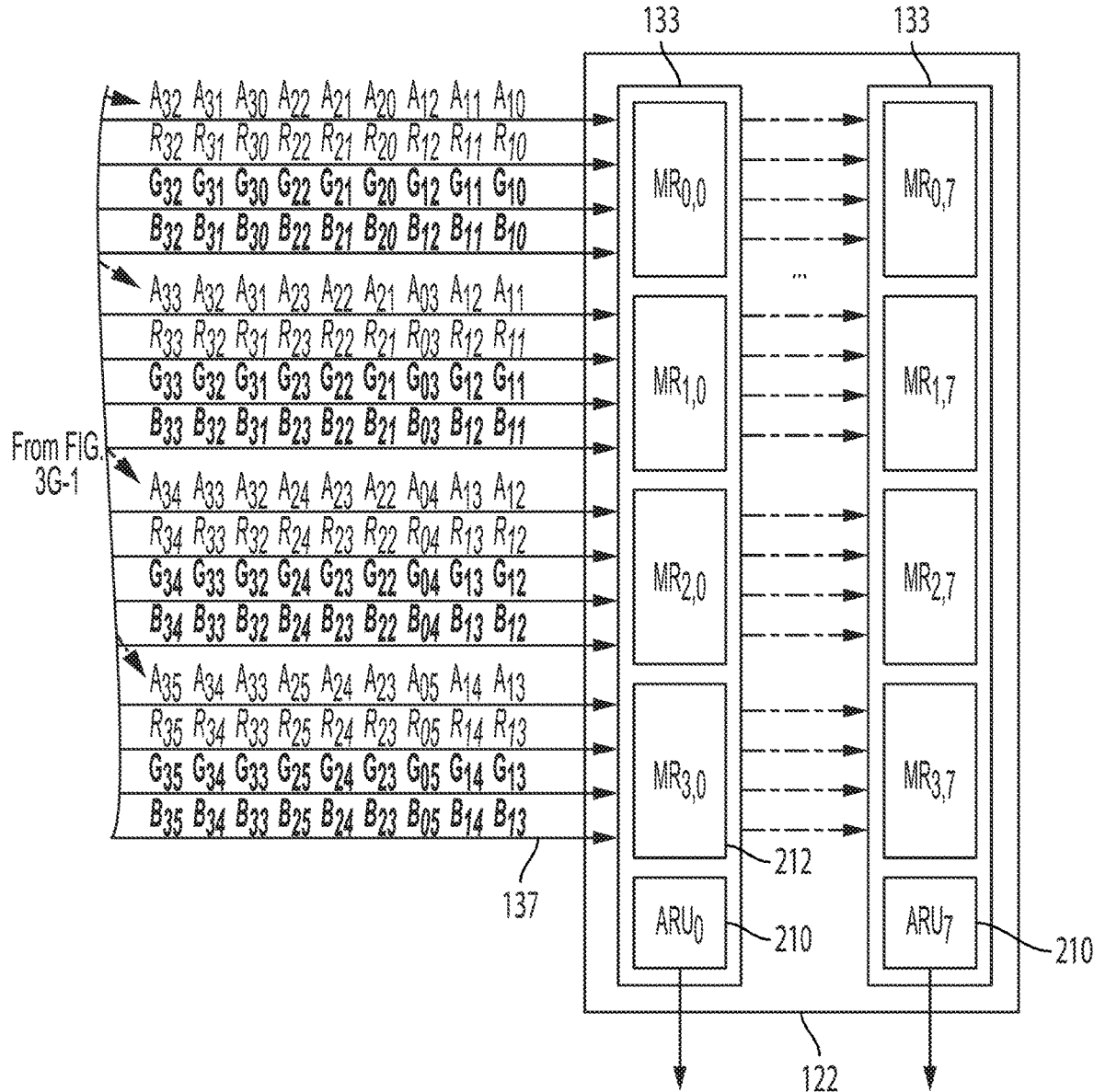

With ARGB pixels from locations (3, 0) through (3, 7) now stored in IFM cache 139 and with convolutions at the previous four locations 302 shown in FIG. 3F finished, MR tile 102 now can start computing convolution at the four locations 302 shown in FIG. 3G. Similar to FIGS. 3E and 3F, IFM cache 139 sends copies of ARGB pixels, via the arrayed barrel shifter 300, to MR quad units such that each MR quad receives ARGB pixels from the convolution patch 302 associated with that MR quad. Also, in anticipation of the convolution patches 302 sliding over to yet another next location, IFM delivery fabric 104 now brings IFM slices 110 containing the missing ARGB pixel values, i.e. those not yet stored in IFM cache 139, necessary to compute the four convolutions at the next location.

Figures 1, 3H:
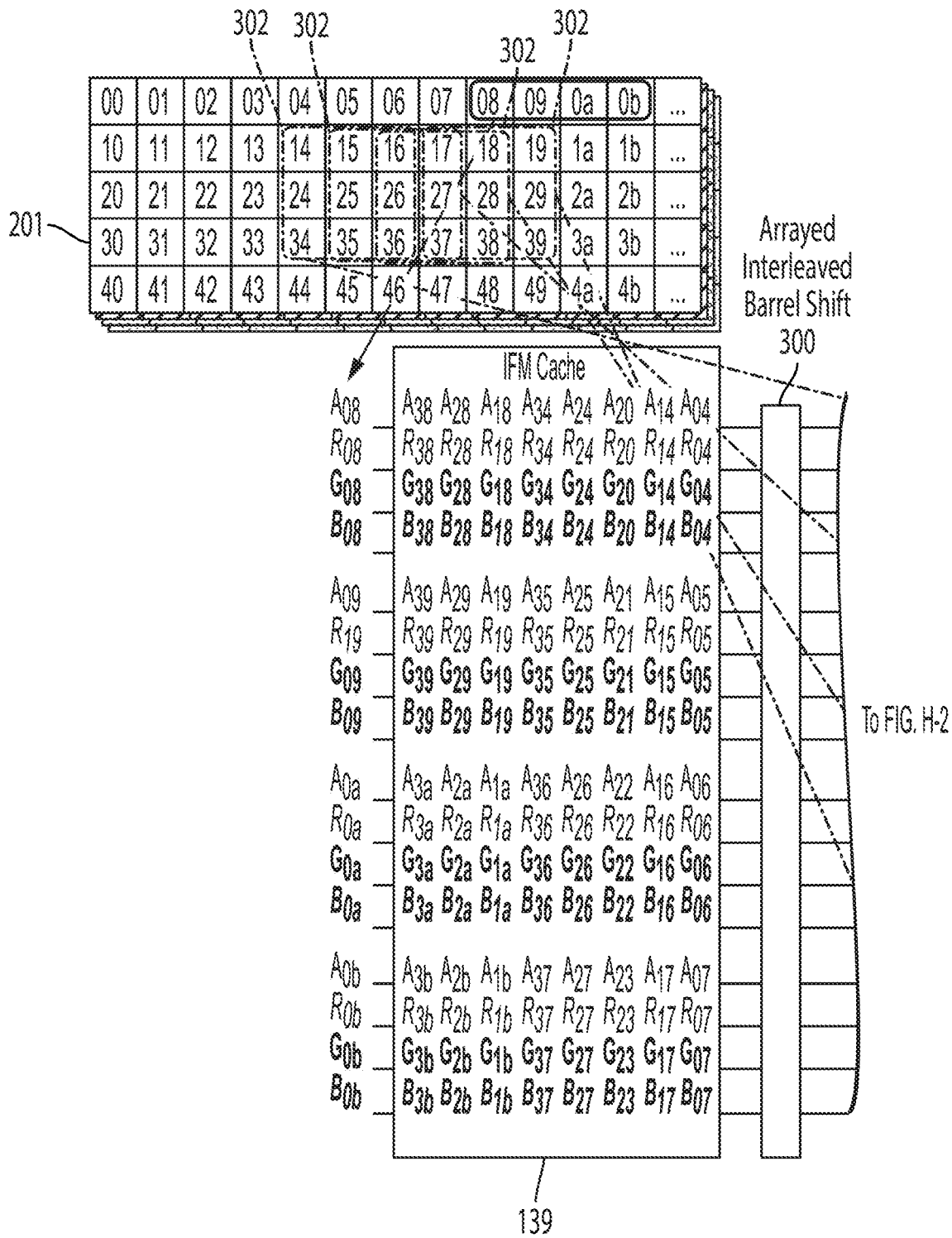
Figures 2, 3H:
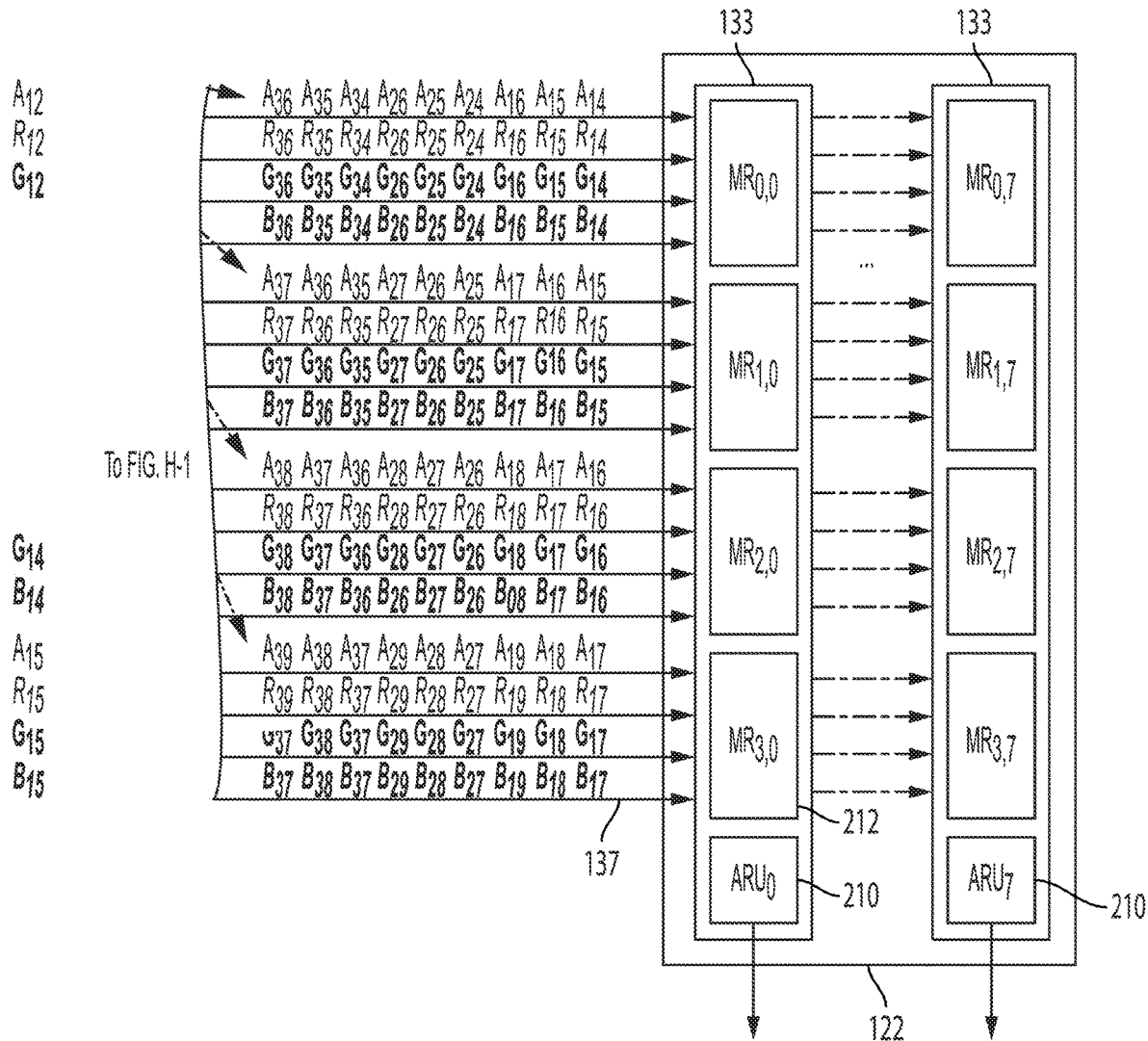
Figures 1, 3I:
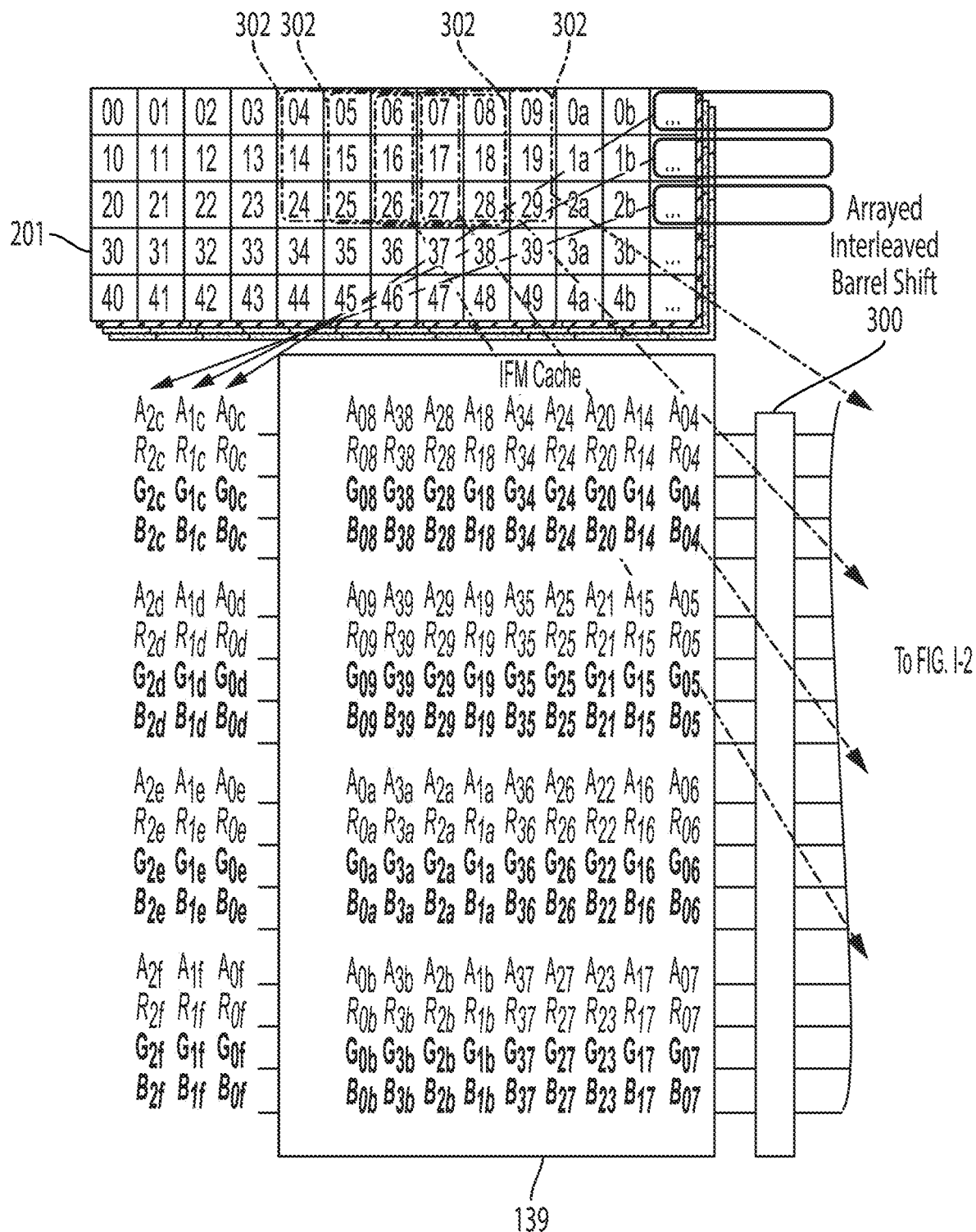
Figures 2, 3I:
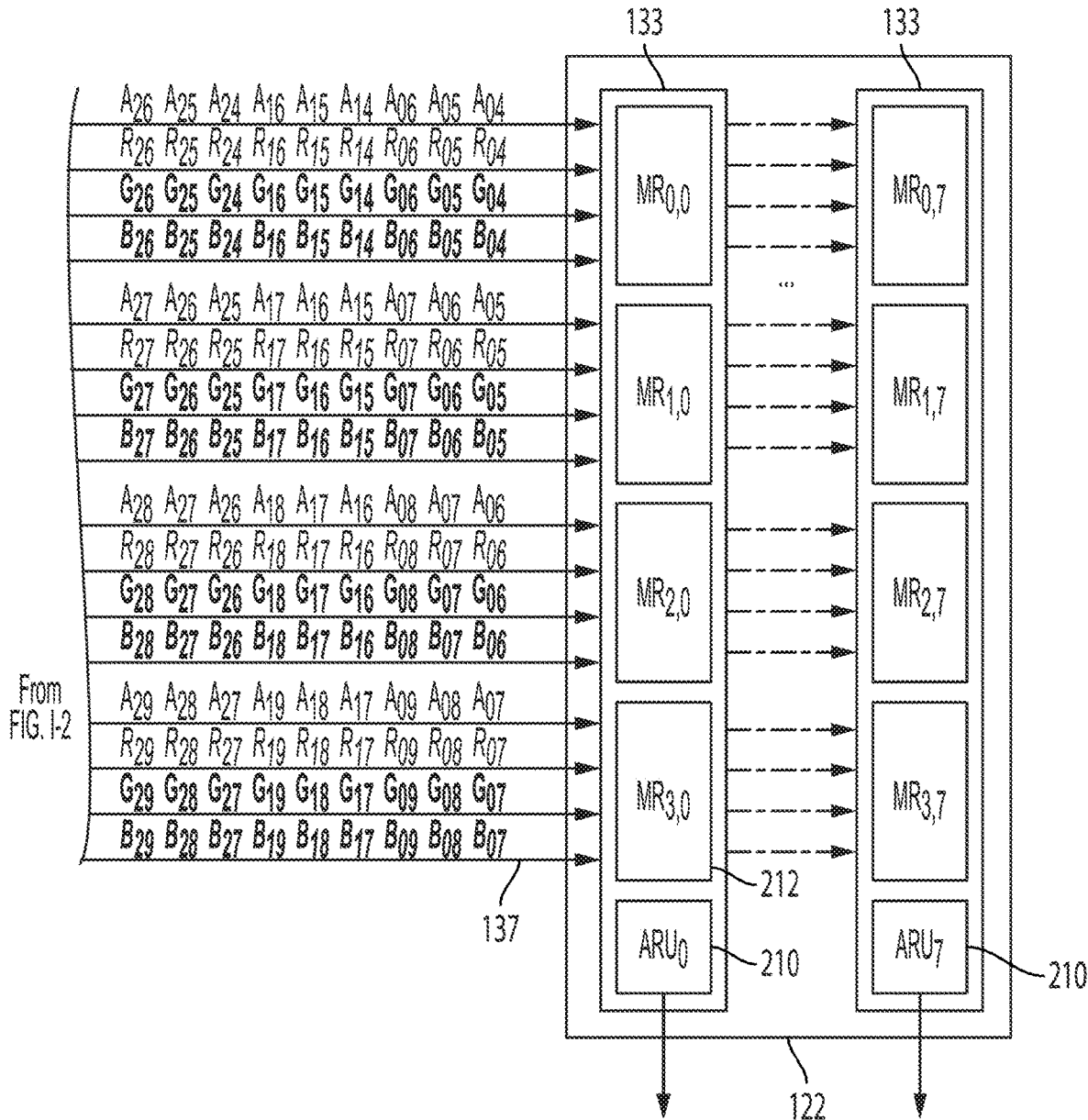
Figures 1, 3J:
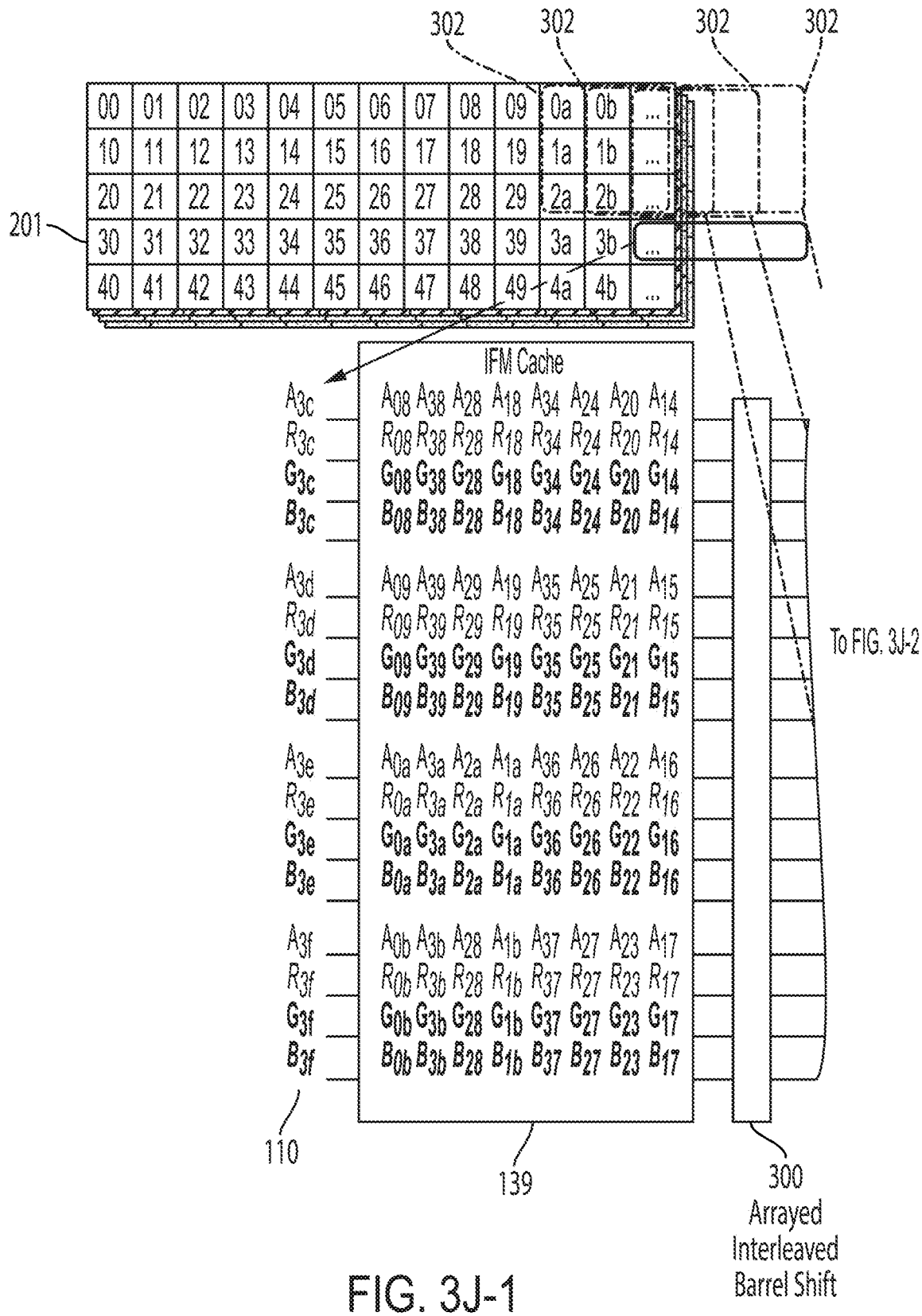
Figures 2, 3J:
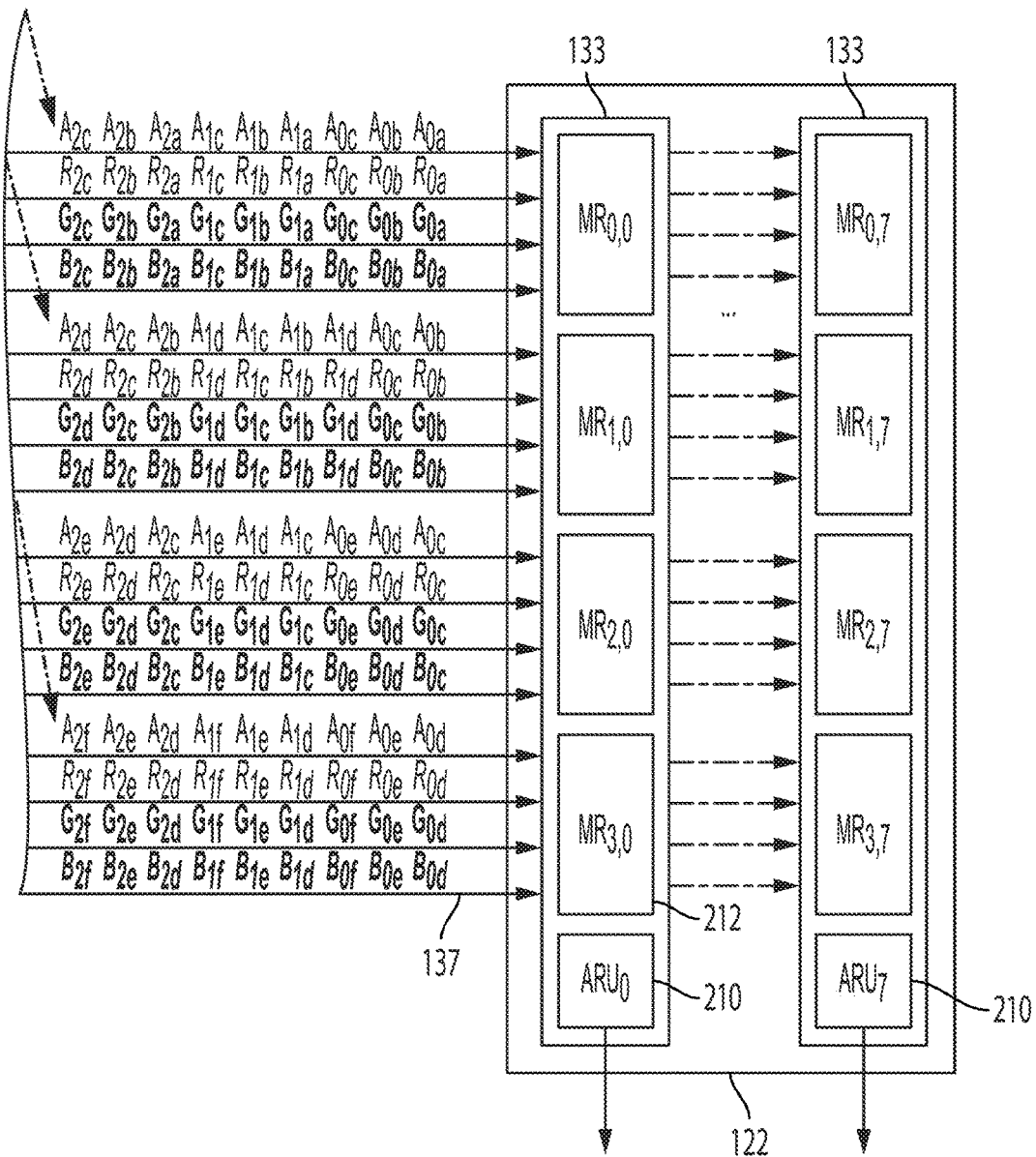

FIGS. 3H through 3J illustrate the process further as the set of four convolution patches continue sliding over the ARGB image, i.e. IFM tensor 201, in a zig-zag fashion, performing a 3×3×4×8 convolution on ARGB data at each planar location as IFM slices carrying ARGB pixels continue arriving to IFM cache in anticipation of the four convolution windows sliding to their next location. As the ARGB convolution proceeds, following principles described in the '610 application, OFM delivery fabric moves computed results, i.e. OFM slices, to SRAM 109 for storage.

The ARGB convolution examples in FIGS. 3C through 3J use the convolution weight kernel with a planar size of 3 by 3. Larger planar size kernels can be used using a number of methods including multi-cycling, as described in the '610 application, splitting weight kernels across multiple MR tiles followed by combining, i.e. adding, dot products from those MR tiles using reduction fabric 111 and/or splitting a large weight kernel into smaller kernels—of size that fits into MU weight register files—and computing the ARGB convolution using partial results.

Figure 3K:
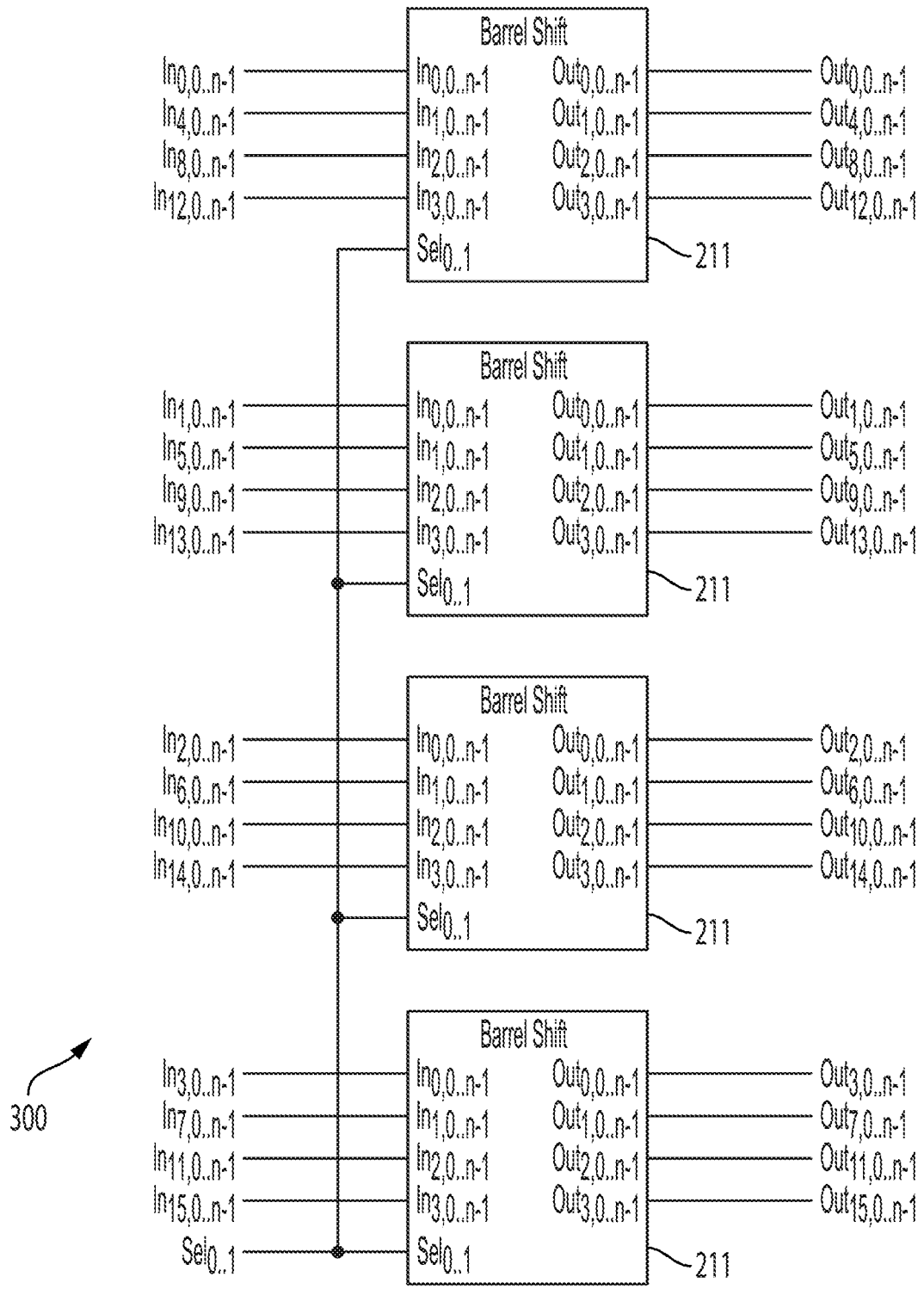
FIG. 3K illustrates a block-diagram of an arrayed interleaved barrel shift unit utilized for ARGB convolution.

FIG. 3K shows a block-diagram of the arrayed interleaved barrel shift unit 300. Unit 300 consists of an array of barrel shift units 211, with the array size of four corresponding to the MR array 122 also having four quads. Unit 300 inputs Sel[1:0] indicate the shift amount, e.g. 1 to barrel-shift each input quad by one quad, 2 to shift by two quads, 3 to shift by 3 quads and 0 to pass input quads to output as is, with no shift.

Figures 1, 3L:
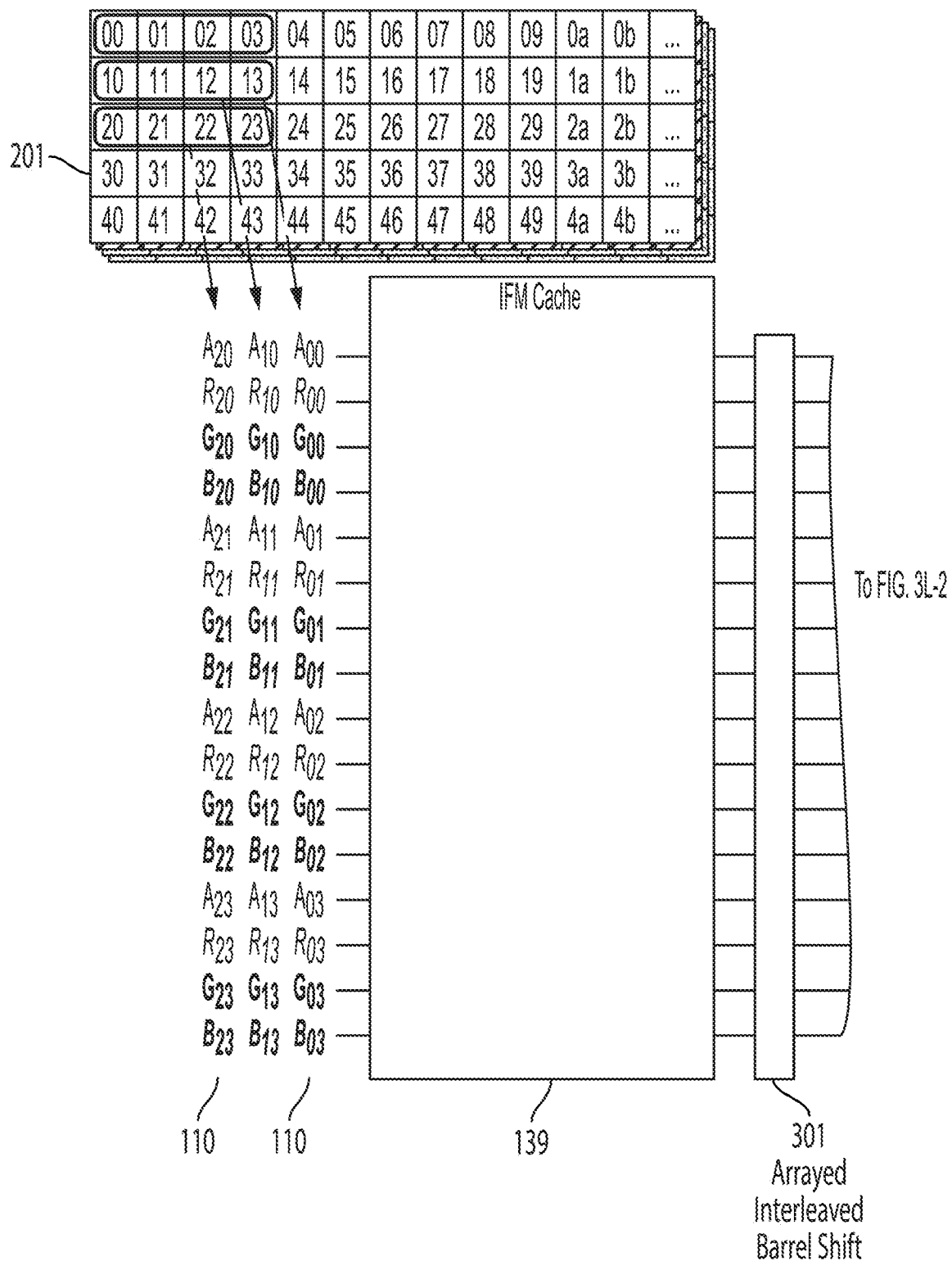
Figures 2, 3L:
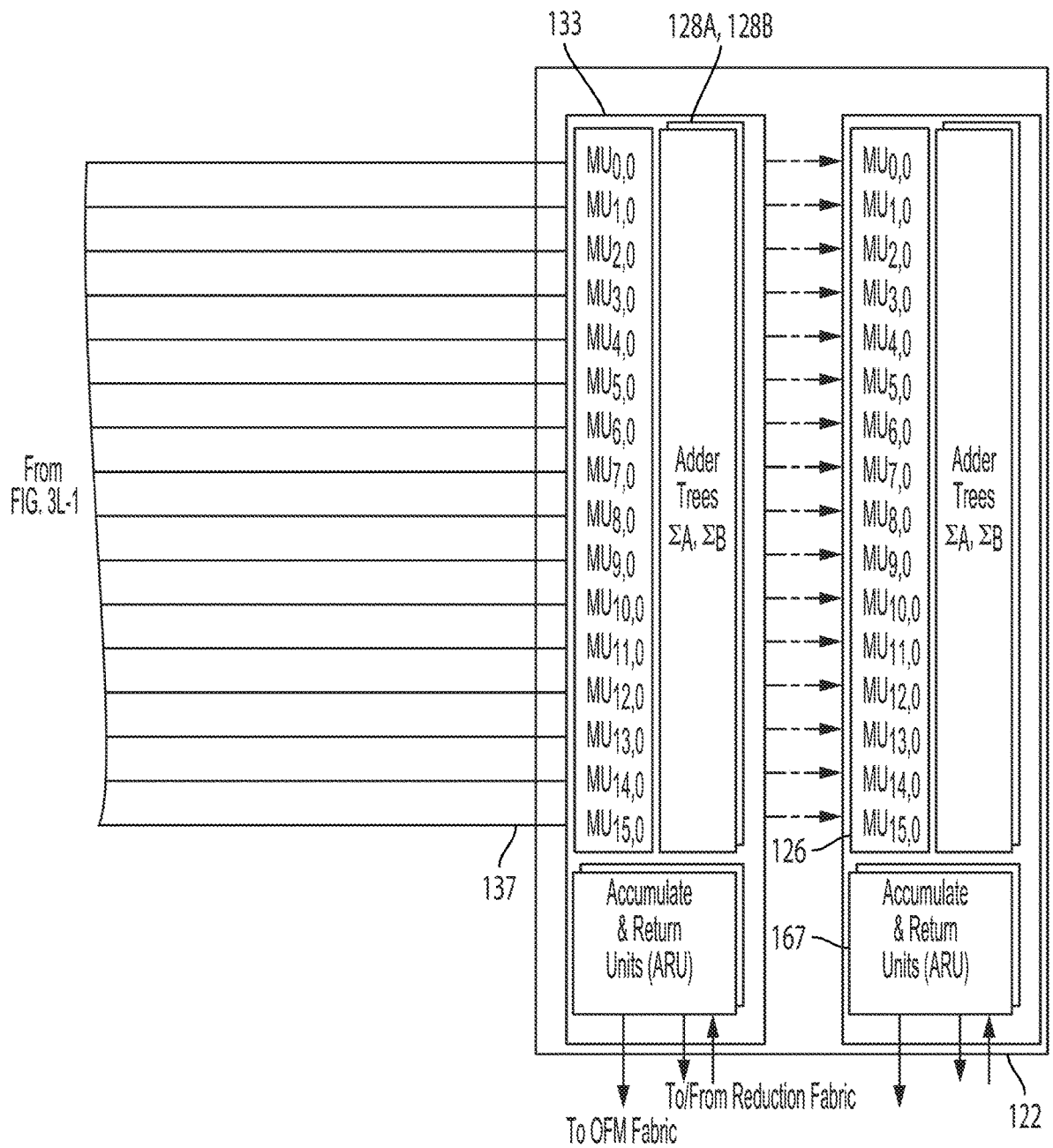
Figures 1, 3M:
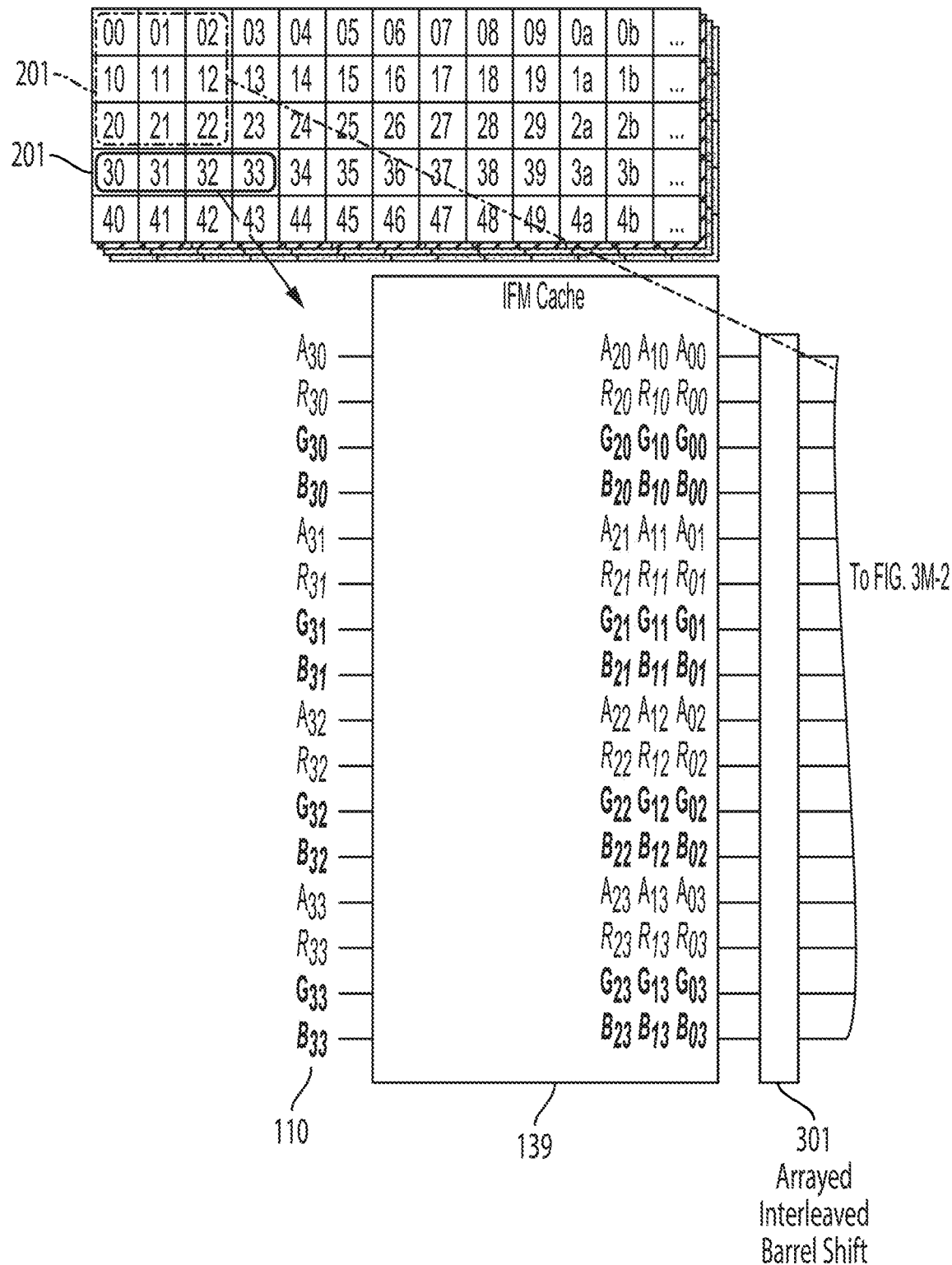
Figures 2, 3M:
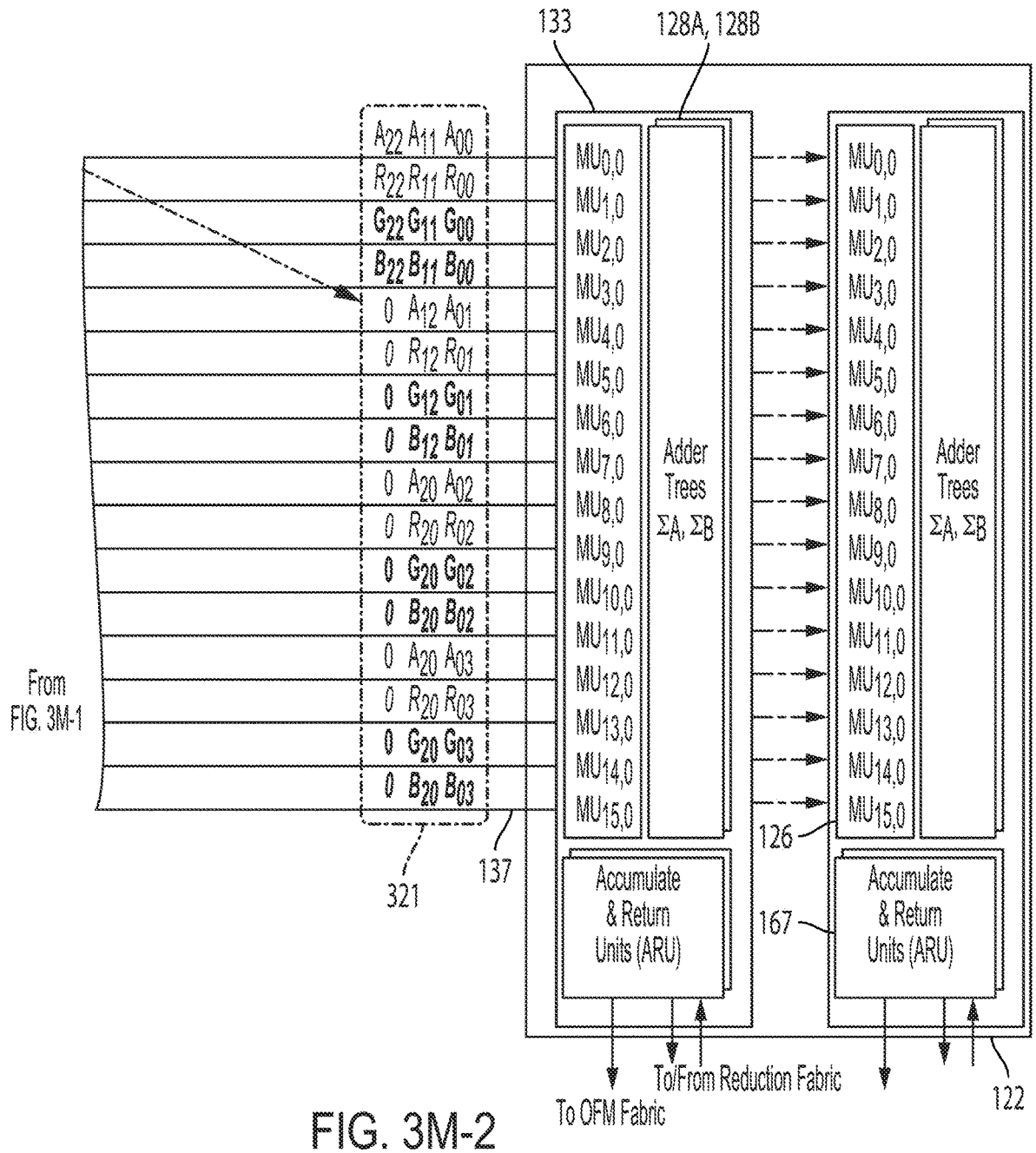
Figures 1, 3N:
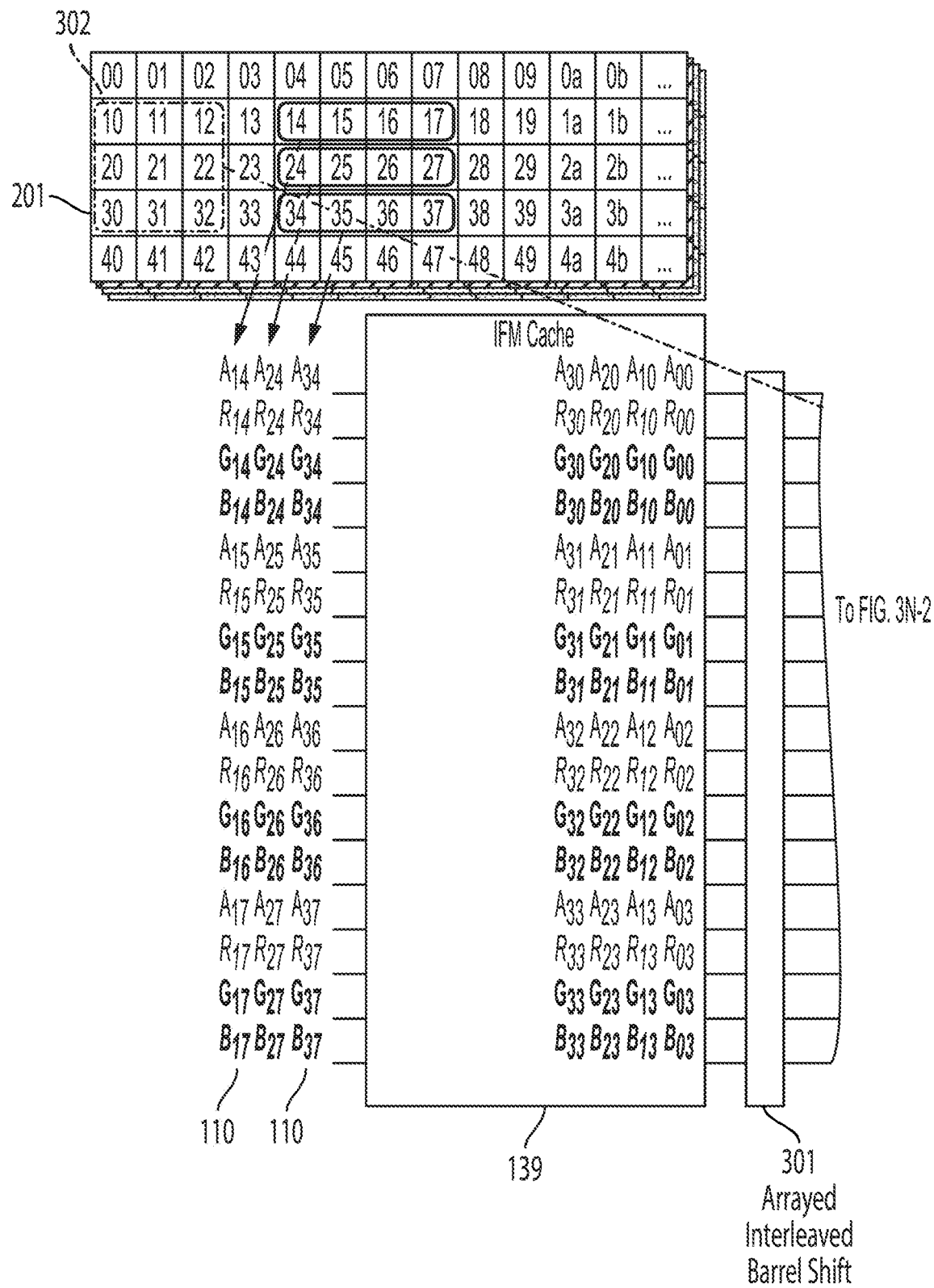
Figures 2, 3N:
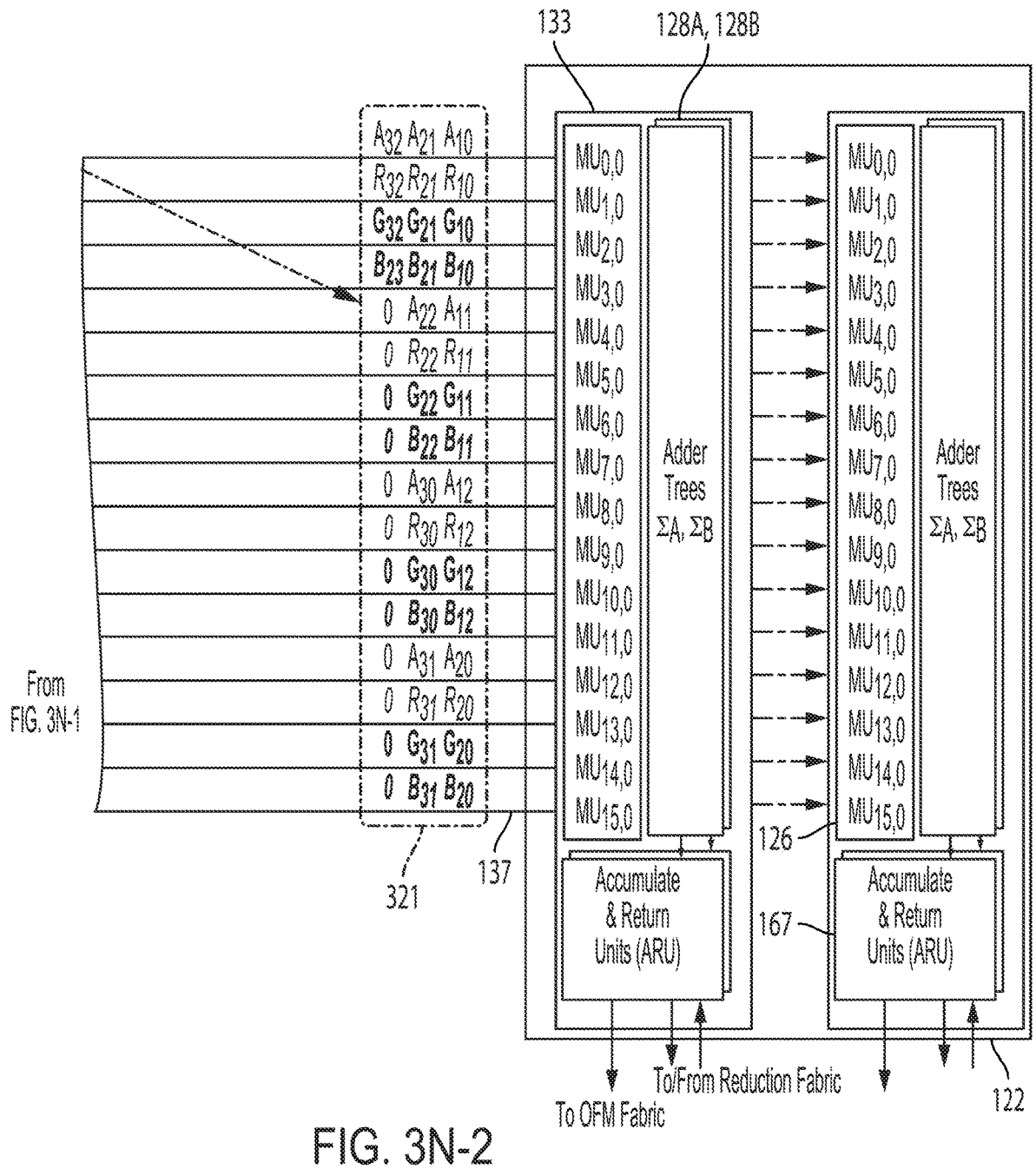

FIGS. 3L through 3Q illustrate an alternative embodiment for ARGB convolution. Unlike the embodiment shown in FIGS. 3C through 3J, the alternative embodiment in FIGS. 3L through 3Q reuses the single pair of adder trees 128A and 128B, per MR column 133, from the '610 application, and does not use quad activation lanes or quad adder trees 213 and 214. Referring to FIG. 3L, an ARGB convolution with the planar patch size of 3×3 starts by fetching ARGB pixels as three IFM slices. The first three IFM slices 110 contain 12 ARGB pixels at planar locations (0, 0) through (0, 3), (1, 0) through (1, 3) and (2, 0) through (2, 3) respectively. Referring to FIG. 3M, with these first three IFM slices 110 stored in IFM cache 139, a copy 321 of 9 of those 12 ARGB pixels—those corresponding to the planar location of the 3×3 convolution patch—pass from the IFM cache 139 via the arrayed interleaved barrel shift unit 301 to the 16 activation lanes 137 in the order shown. Since each ARGB pixel contains 4 values, there are (9 ARGB pixels)*(4 values per ARGB pixel)=36 activation values to be processed per single planar location of the convolution patch. Feeding 36 activation values 321 over 16 activation lanes into MR array 122 takes ceil(36/16)=3 clock cycles, with (3 clock cycles) *(16 activation lanes)−(36 activation values)=12 unused activation slots filled with zeros. The convolution operation—at the current planar location of the convolution patch—concludes by MR array 122 calculating three dot products, with one dot product per each 16 activation values, accumulating results of these three dot products in ARU 167 accumulators 130A/130B, ARU 167 applying the activation function and sending the resulting OFM slice back to SRAM 109 over OFM delivery fabric 106. Each OFM slice contains 8 values. Following the principles described in the '610 application, NPU can be configured to increase the number of OFM channels, e.g. beyond the 8 values contained in a single OFM slice, by feeding same ARGB data into multiple MR tiles, in parallel, to apply a different convolution weight kernel. Please refer to the '610 application for details.

Referring again to FIG. 3M, another IFM slice 110 carrying 4 more ARGB pixels, at planar locations (3, 0) through (3, 3), arrives to the IFM cache 139 while the MR array 122 computes convolution at the planar location corresponding to patch 302. Continuing to FIG. 3N, the convolution patch 302 has slid over to its next planar location, one row down. Similar to FIG. 3M, the 9 ARGB pixels 321 corresponding to the new planar location of the convolution patch 302 arrive over 3 clock cycles from IFM cache 139 via the barrel shift unit 301, over activation broadcast lanes 137 to MR array 122, which proceeds to compute the 3×3×4×8 convolution, i.e. 3×3 planar size by 4 values per ARGB pixel with one OFM slice containing 8 values generated. Simultaneously, next three IFM slices 110 arrive from SRAM carrying 12 more ARGB pixels from locations where the convolution patch 302 will soon move.

Figures 1, 3O:
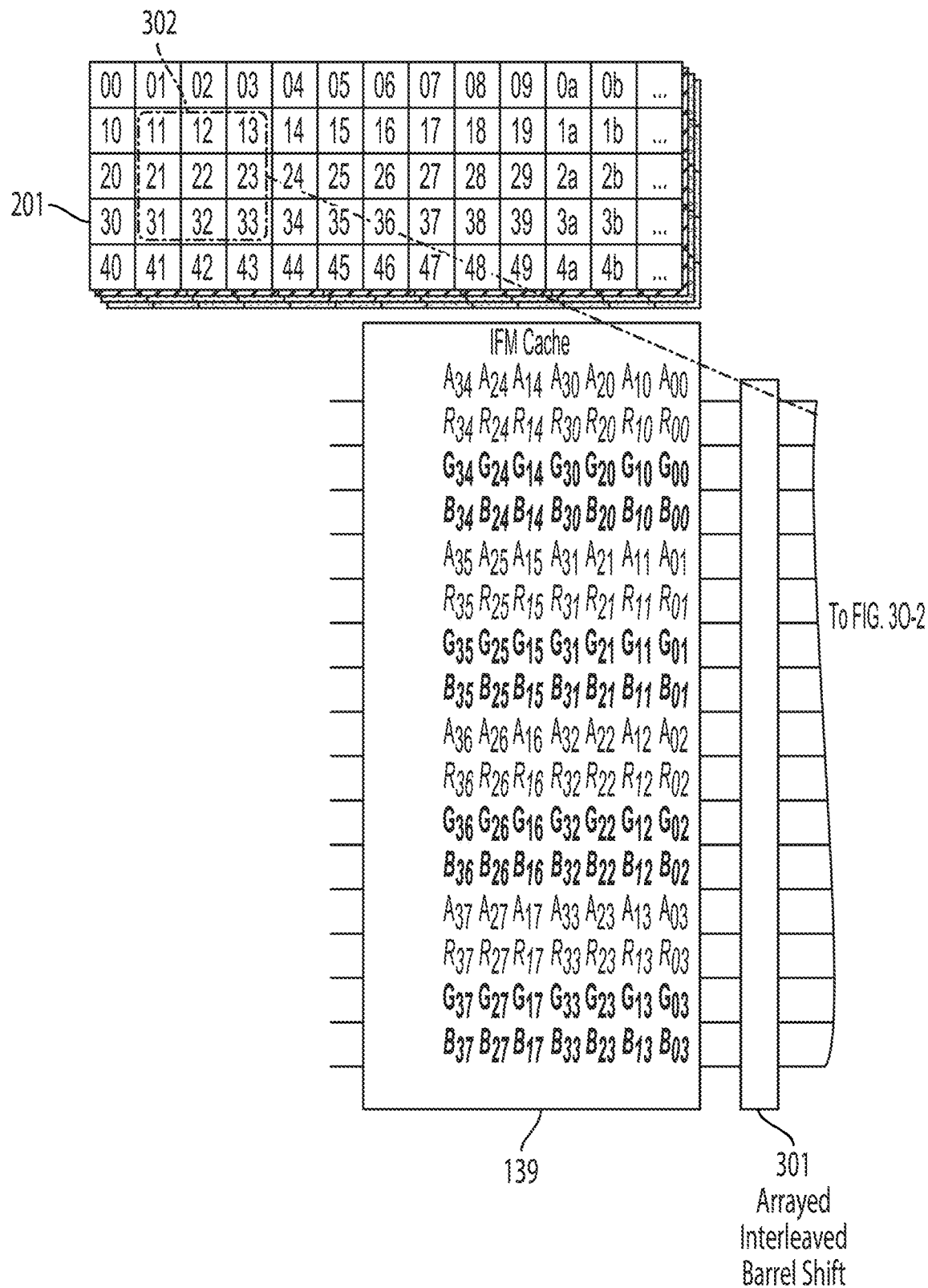
Figures 2, 3O:
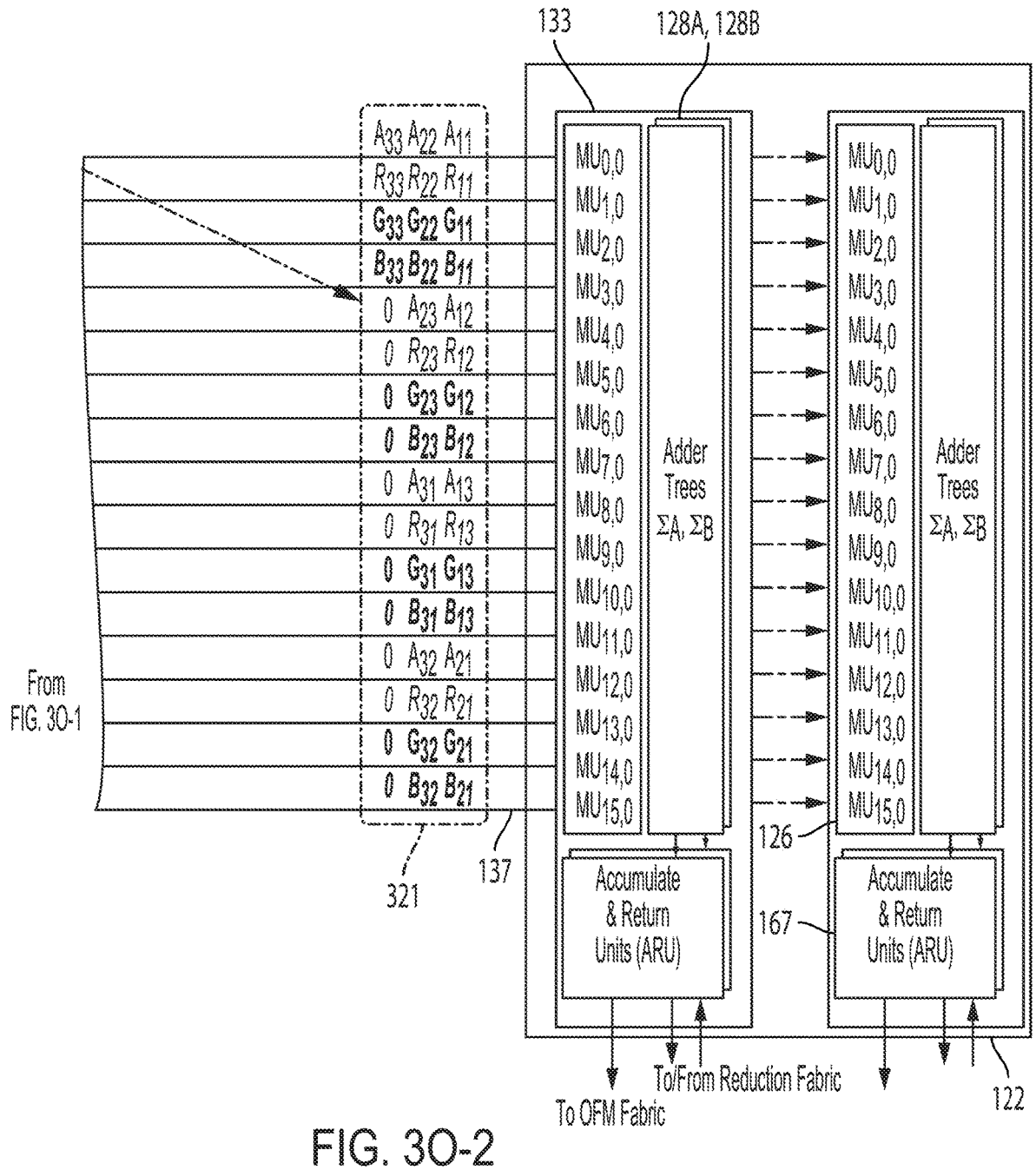
Figures 1, 3P:
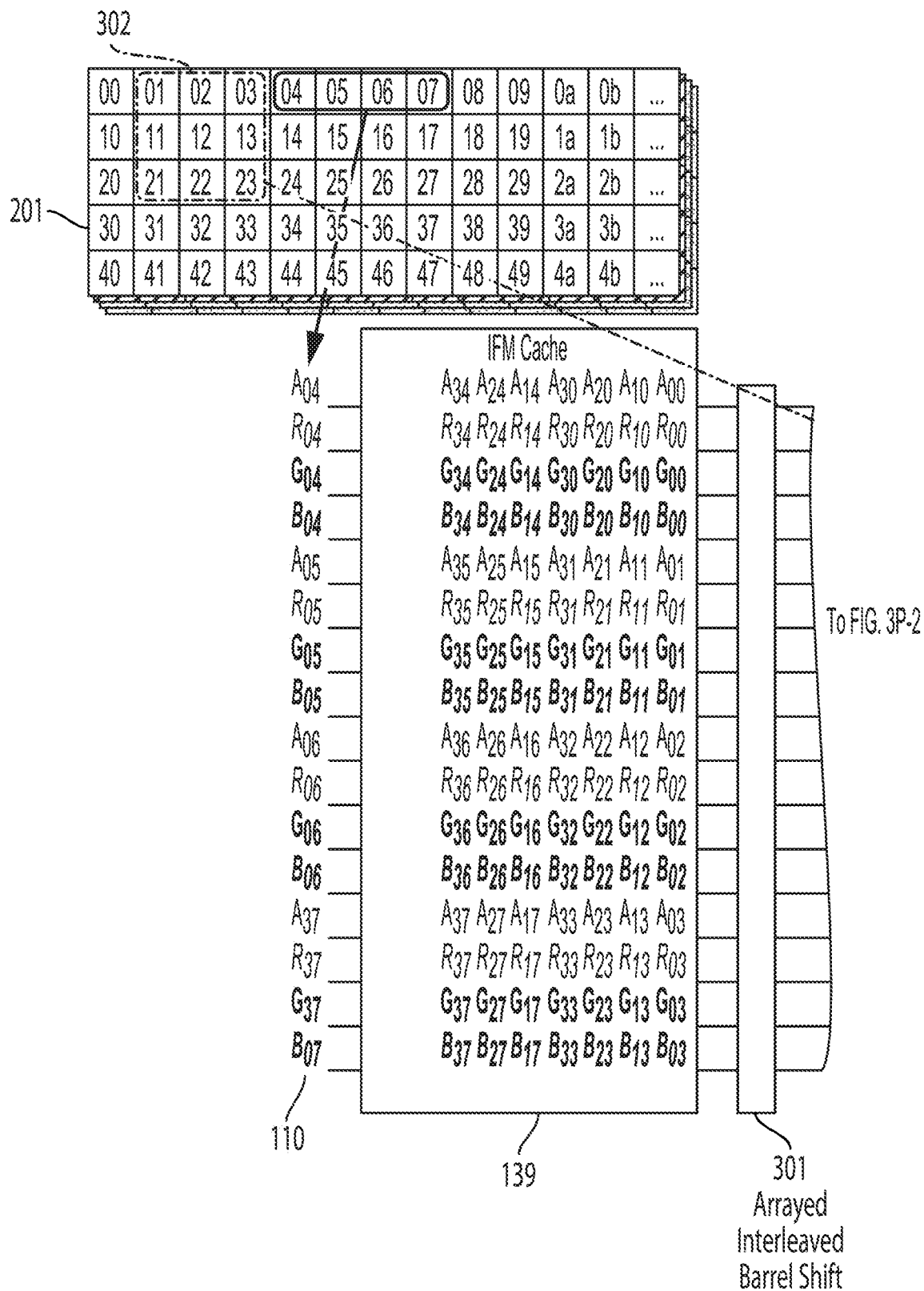
Figures 2, 3P:
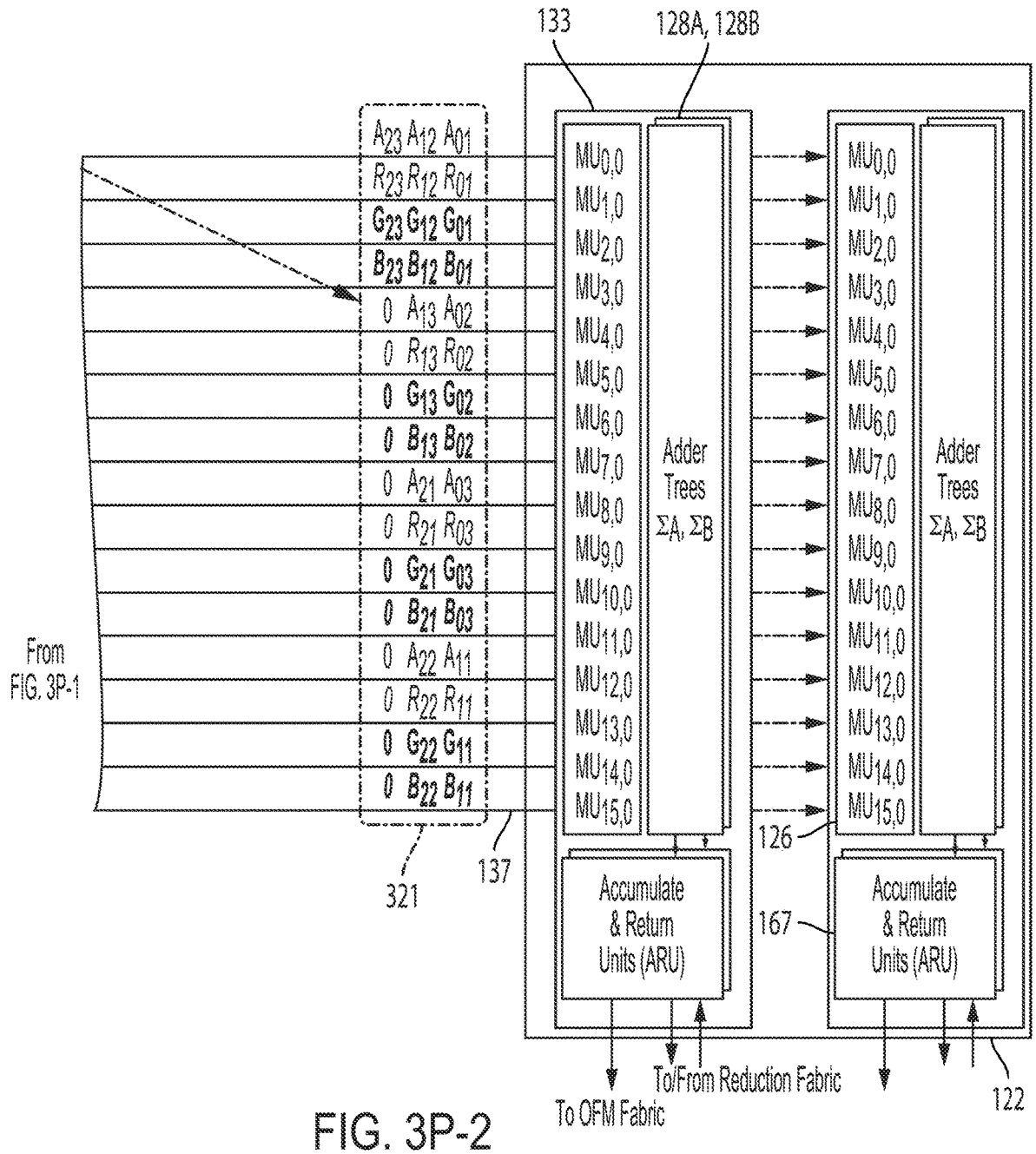
Figures 1, 3Q:
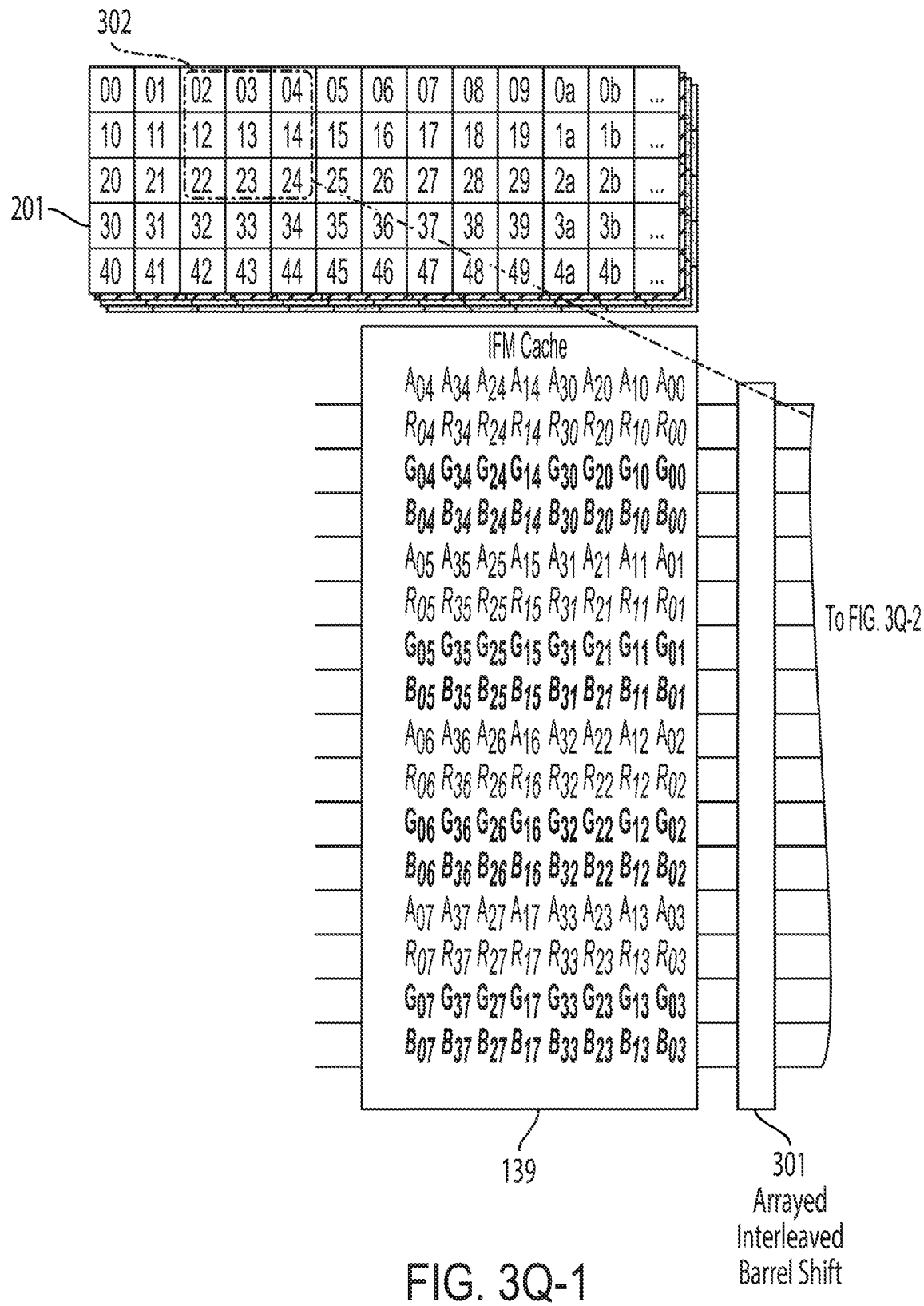
Figures 2, 3Q:
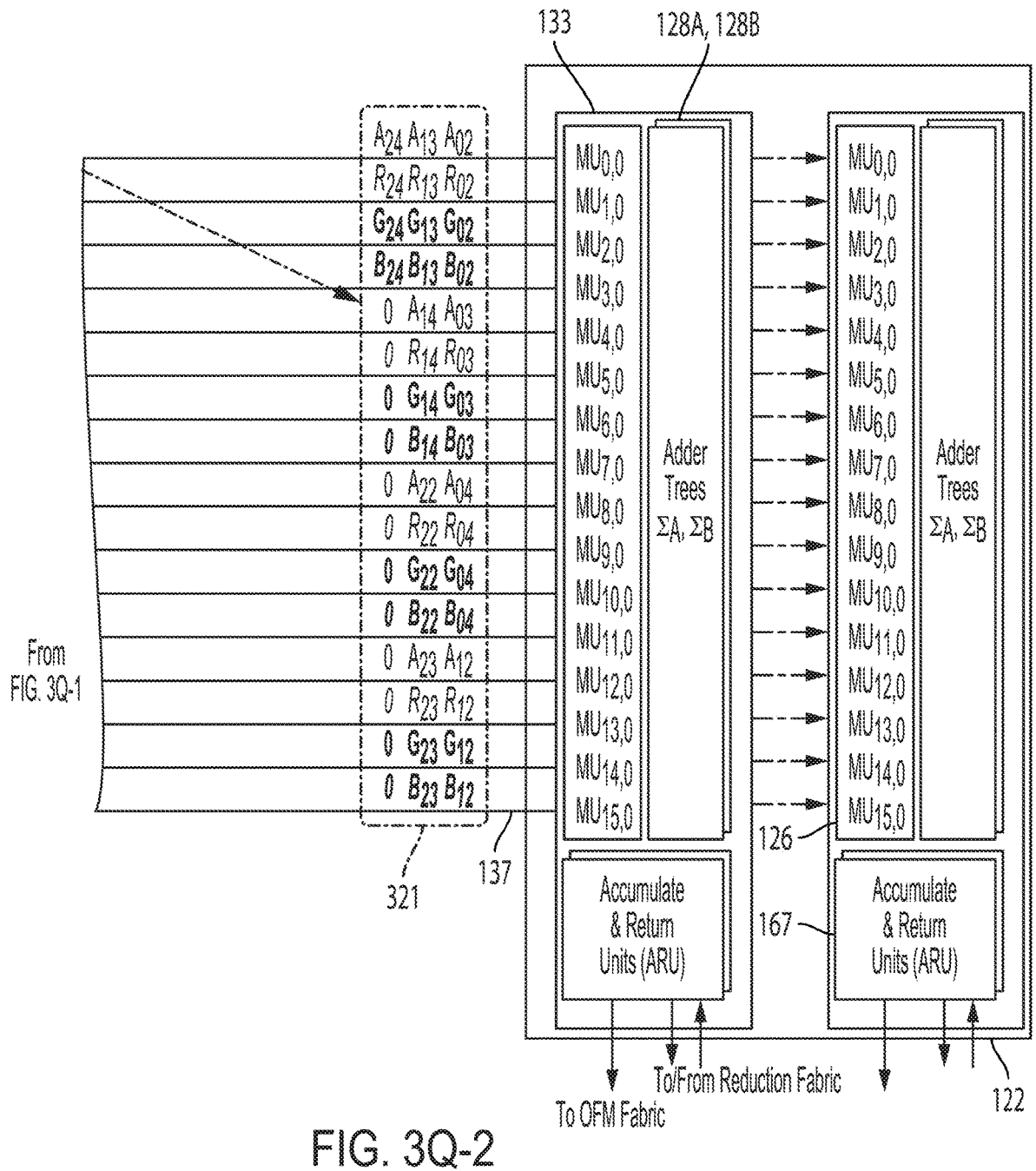

Continuing to FIG. 3O, the planar patch has slid over to its next position, one column right. Correspondingly, IFM cache 139 and barrel shift unit 301 provide ARGB pixel values corresponding to the new location of the planar patch to MR array 122 for computation. Lastly, FIGS. 3P and 3Q illustrate ARGB convolution at next two planar locations as the planar patch keeps traversing the ARGB image, i.e. IFM tensor 201, in a zig-zag fashion.

Note that the arrayed interleaved barrel shift unit 301 in FIGS. 3L through 3Q is different from the arrayed interleaved barrel shift unit 300 in FIGS. 3C through 3J. Referring to FIG. 3R, unit 301 contains an array of barrel shift units 211, each operating on ARGB pixel corresponding to a quad (four values) of activations, similar to FIG. 3K. However, control select signals Sel[1:0,3:0] driving barrel shift units 211 are now separated to make possible moving an ARGB pixel from any IFM cache 139 lane quad to any other activation lane quad, e.g. as illustrated in FIG. 3M.

Figures 1, 3S:
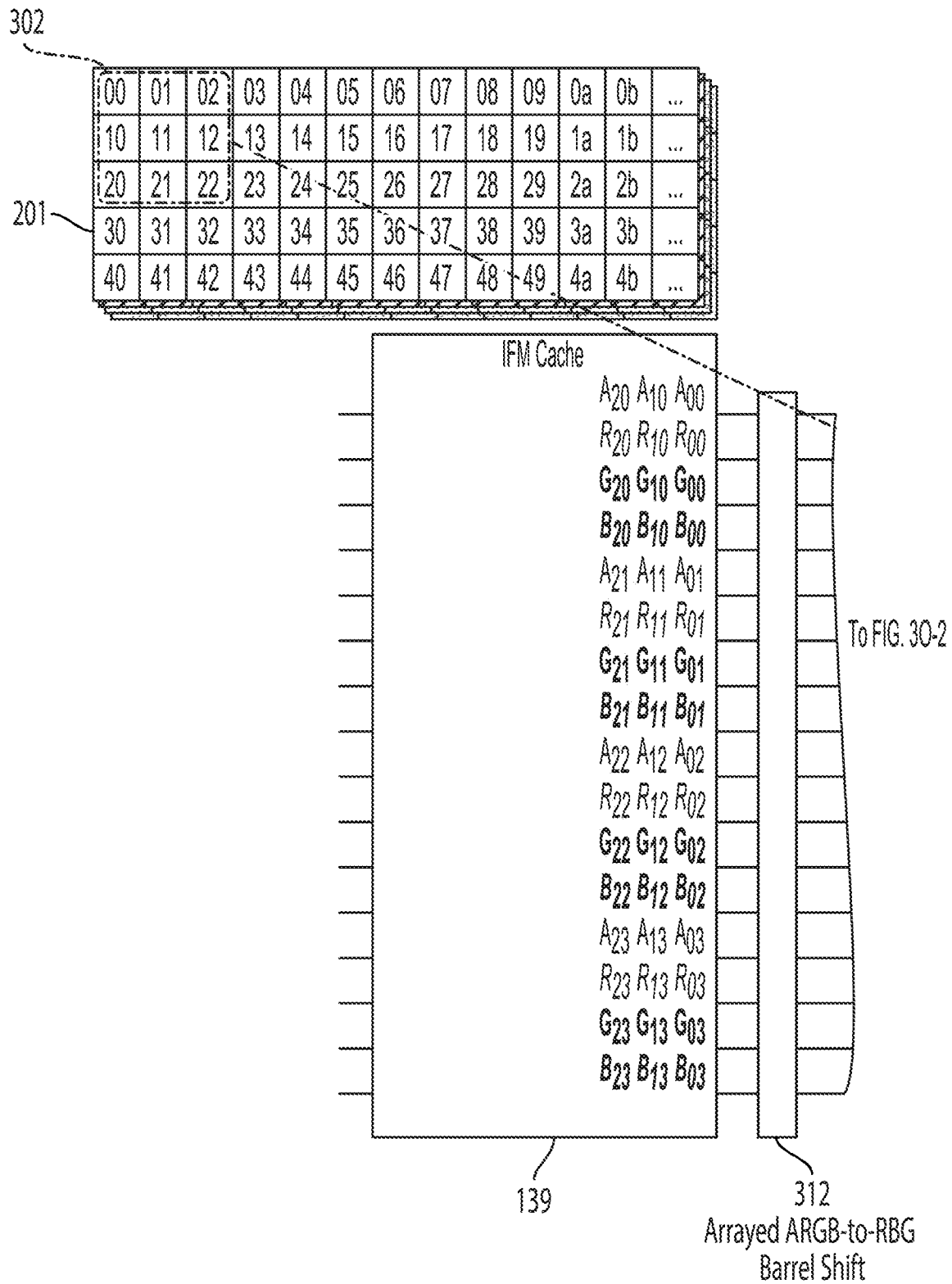
Figures 2, 3S:
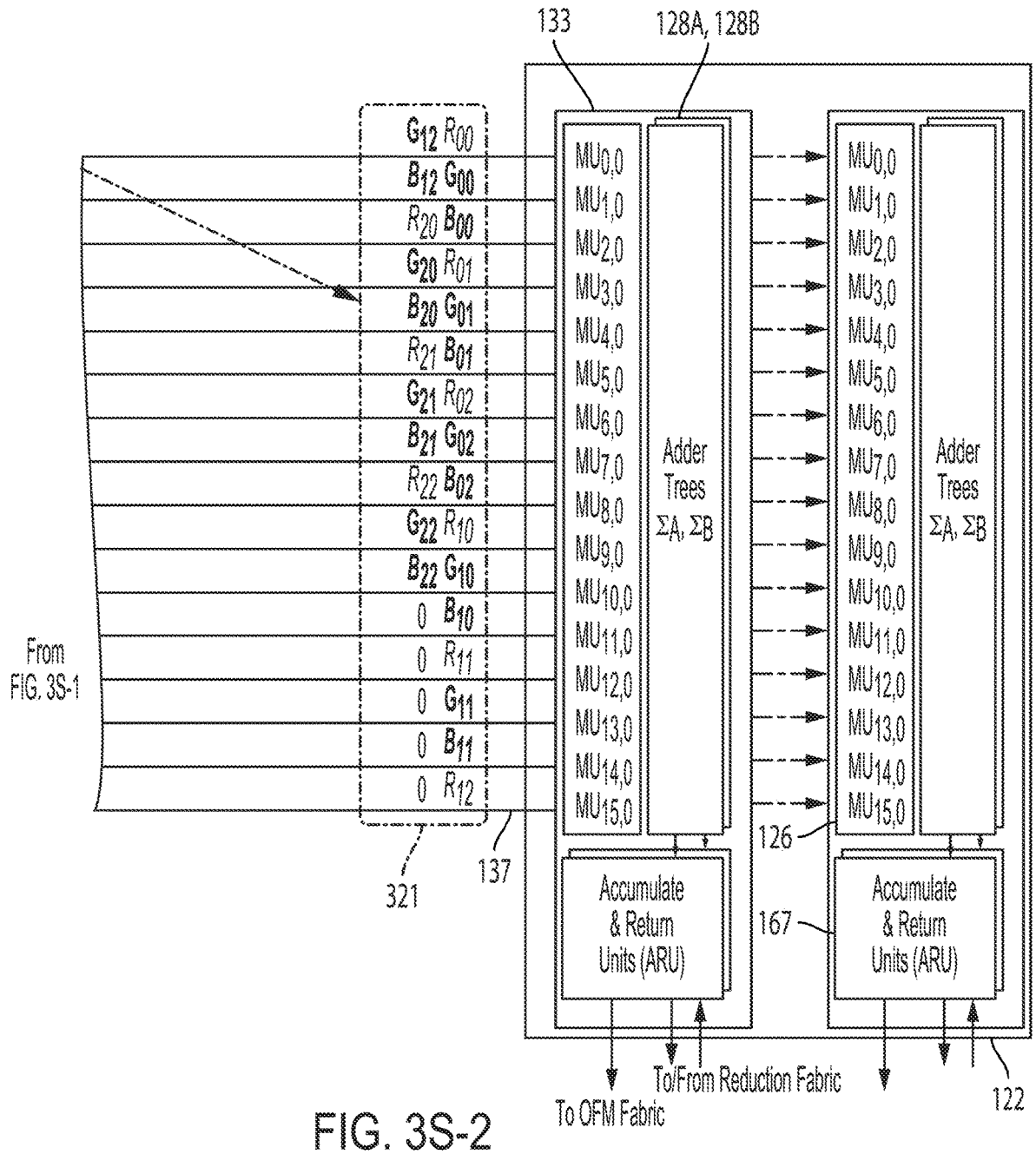

ARGB pixel values 321, padded with zeros and with alpha values set to zero, as illustrated in FIGS. 3L through 3Q, contain many zero values. Activation sparsity support, as described in the '610 application, can skip zero-value activations to accelerate the computation throughput. In a case when activation sparsity support is not available, e.g. to reduce NPU silicon area, it may be beneficial to fetch only RGB values from IFM cache 139. FIG. 3S illustrates an ARGB convolution embodiment where alpha values from IFM cache 139 do not reach MR array 122. More specifically, the arrayed ARGB-to-RGB barrel shift unit 312 reads IFM slices from IFM cache 139 at several addresses, rearranges the retrieved ARGB data to drop the alpha channel, concatenate the RGB values corresponding to the planar location of the convolution patch 302, groups the (9 convolution pixels)*(3 values per RGB pixel)=27 activation values into two 16-long IFM slices 321 and pads the five unused values in one of the two IFM slices 321 with zeros. Otherwise, the convolution process continues similar to the example shown in FIGS. 3L through 3Q as the convolution patch 302 keeps traversing the ARGB image in a zig-zag order while IFM slices 110 arrive from SRAM 109 to IFM cache 139, which supplies ARGB pixels in correct order via the barrel shift unit 301 to MR array 122.

Figure 3T:
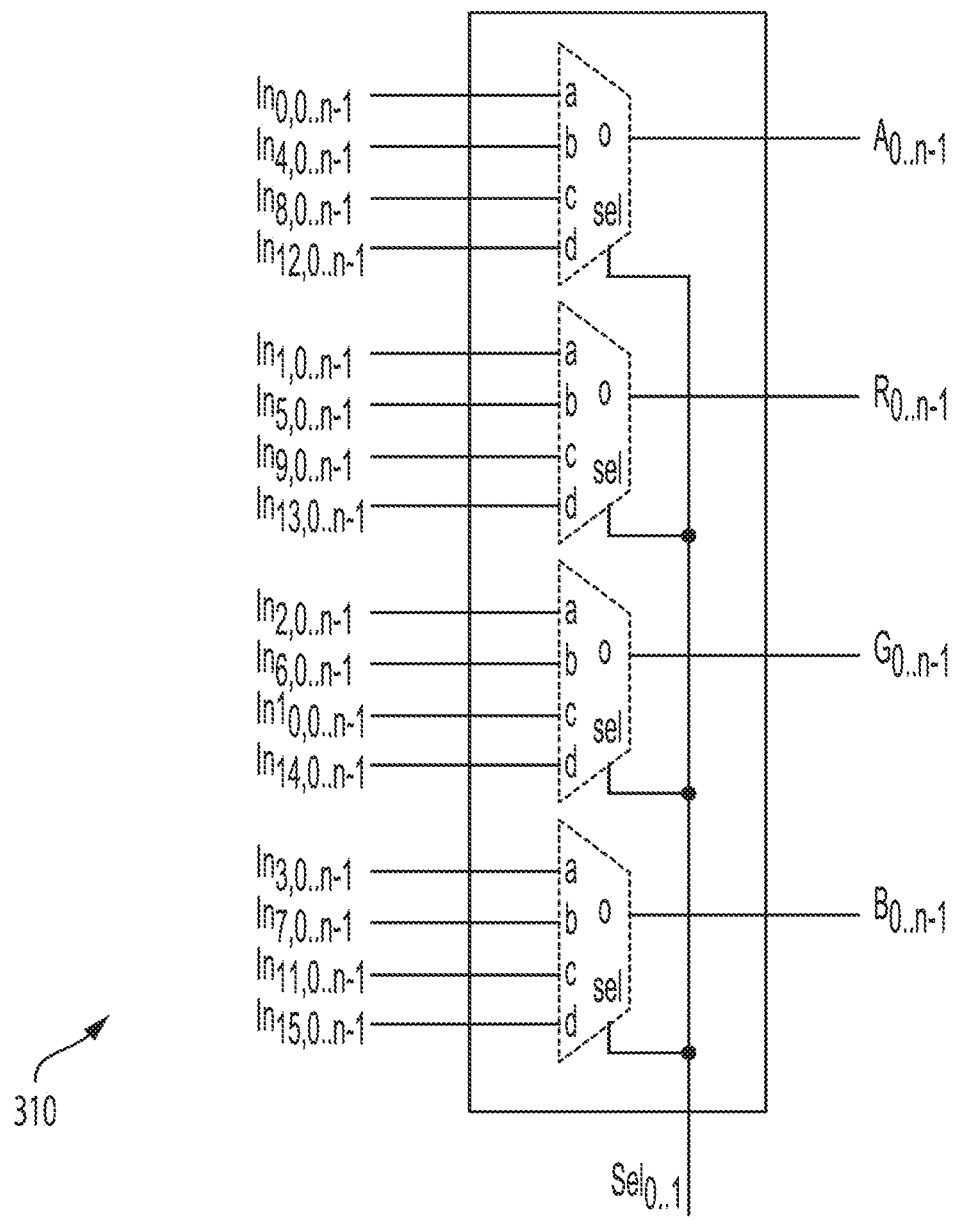
FIG. 3T illustrates the micro-architecture of the ARGB-to-RGB barrel shift unit utilized by an ARGB convolution where alpha values from IFM cache do not reach the multiply-reduce array.
Figures 1, 3U:
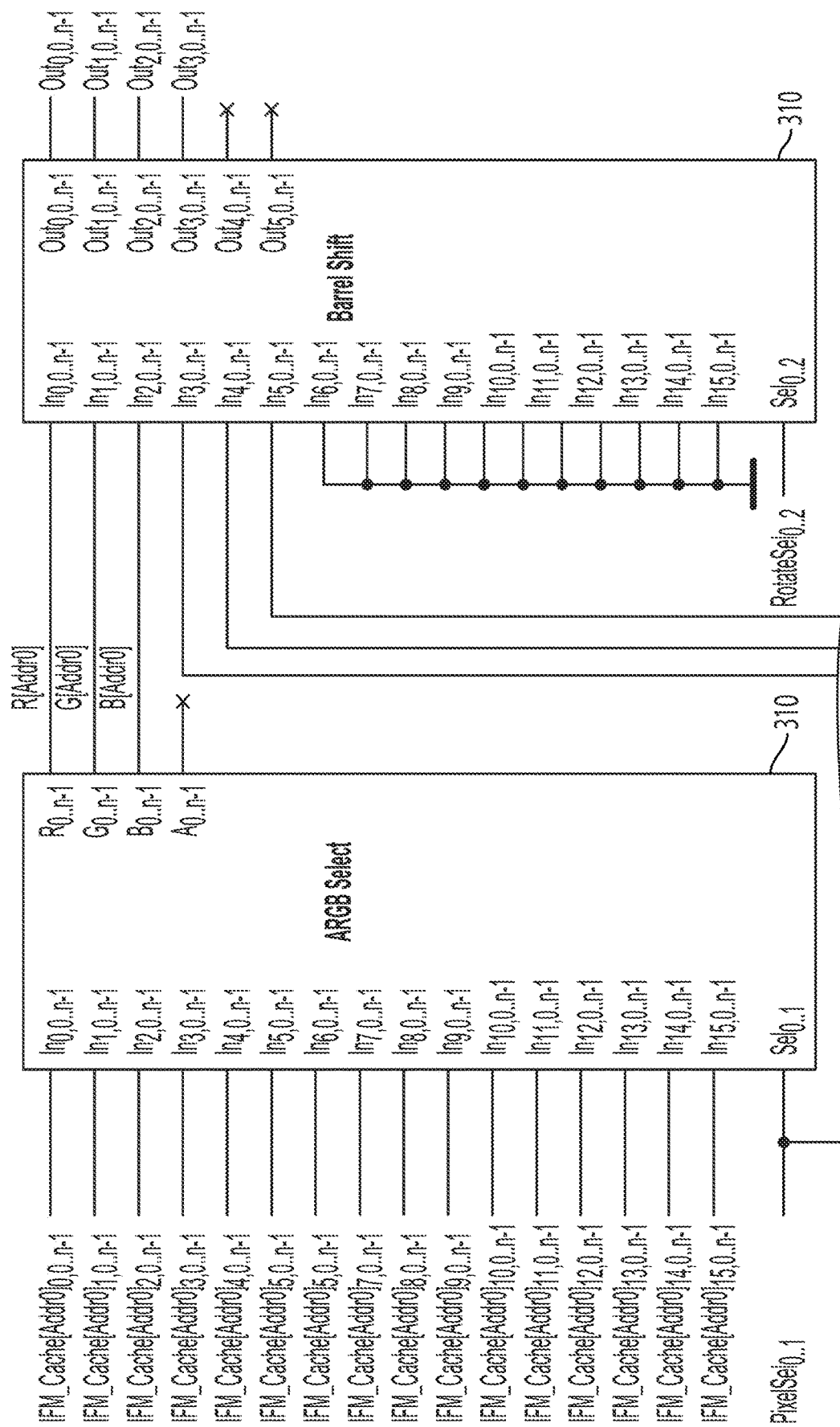
Figures 2, 3U:
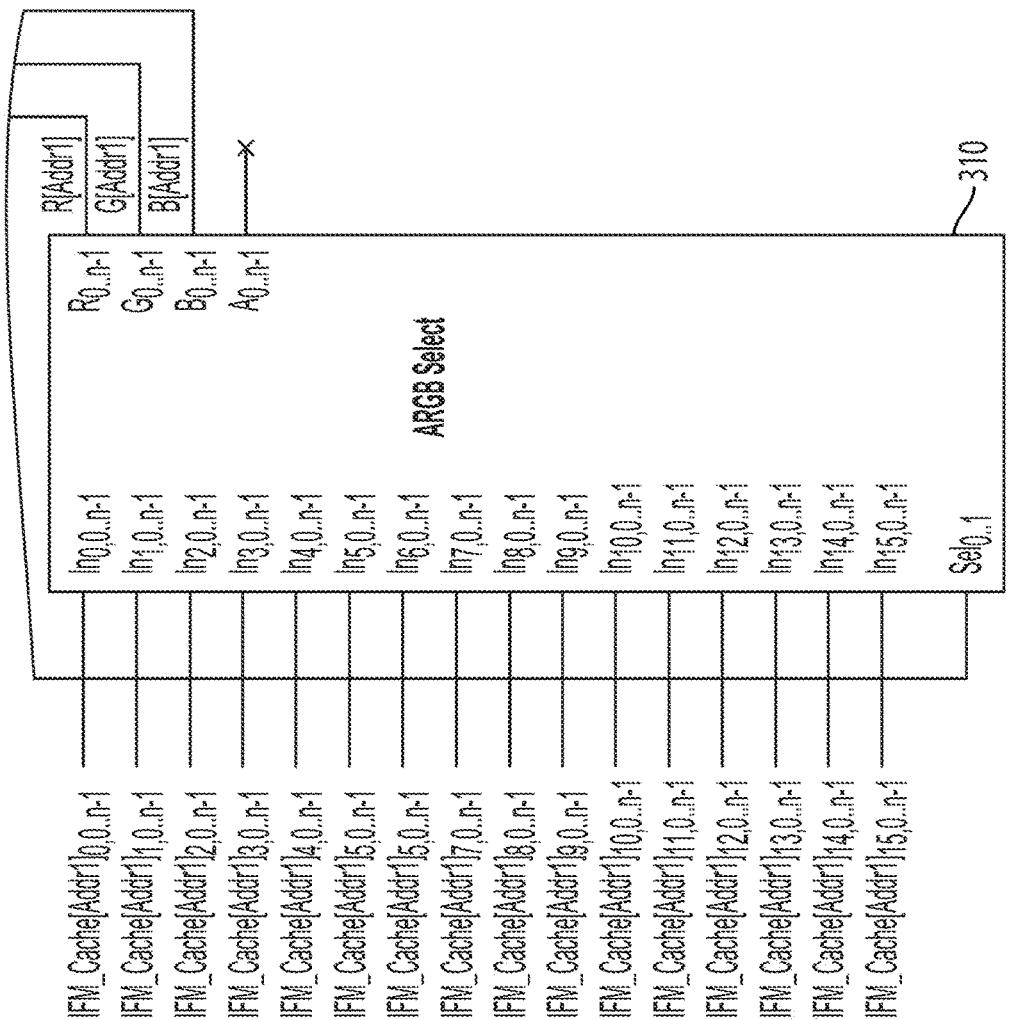
Figures 1, 3V:
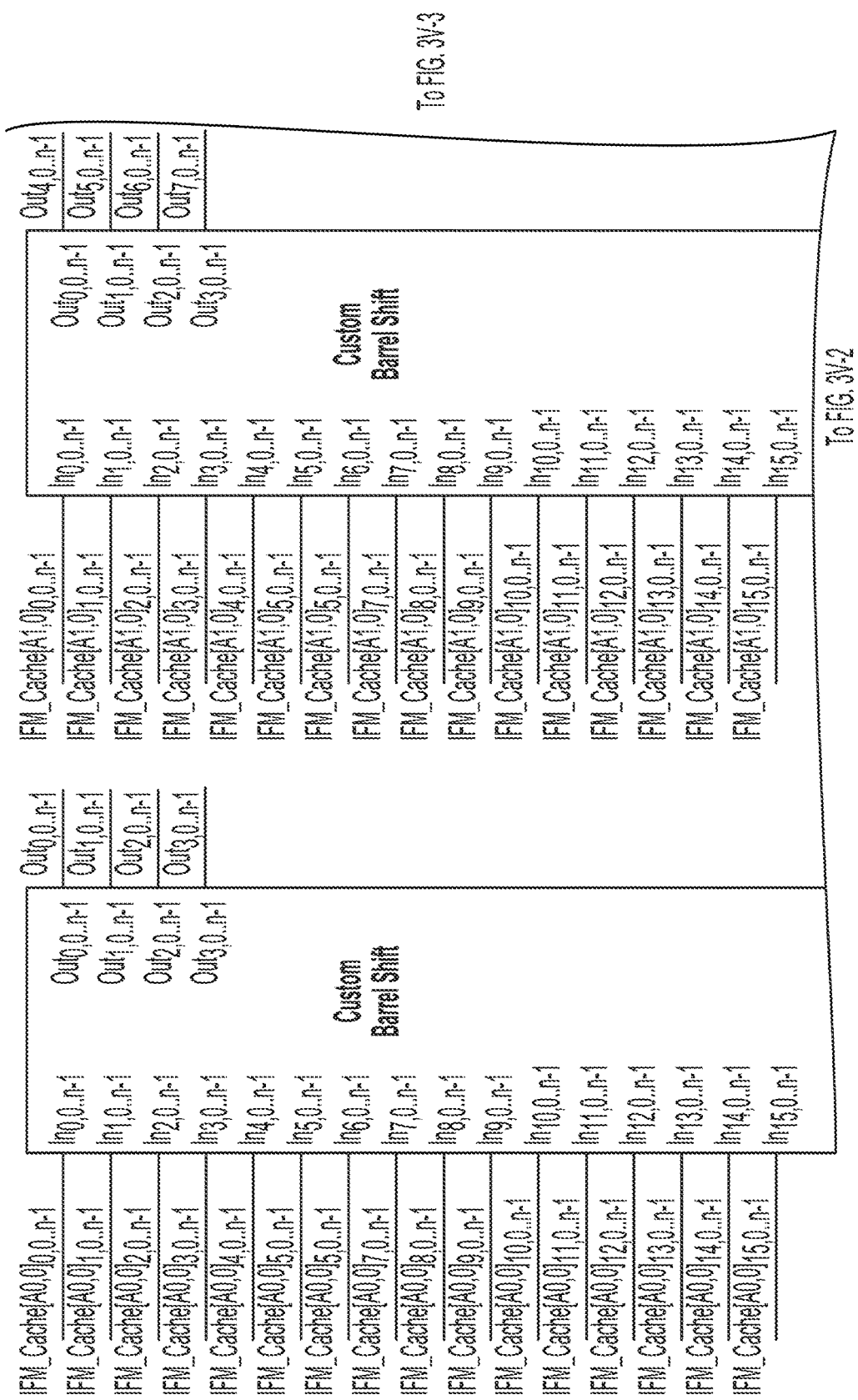
Figures 3, 3V:
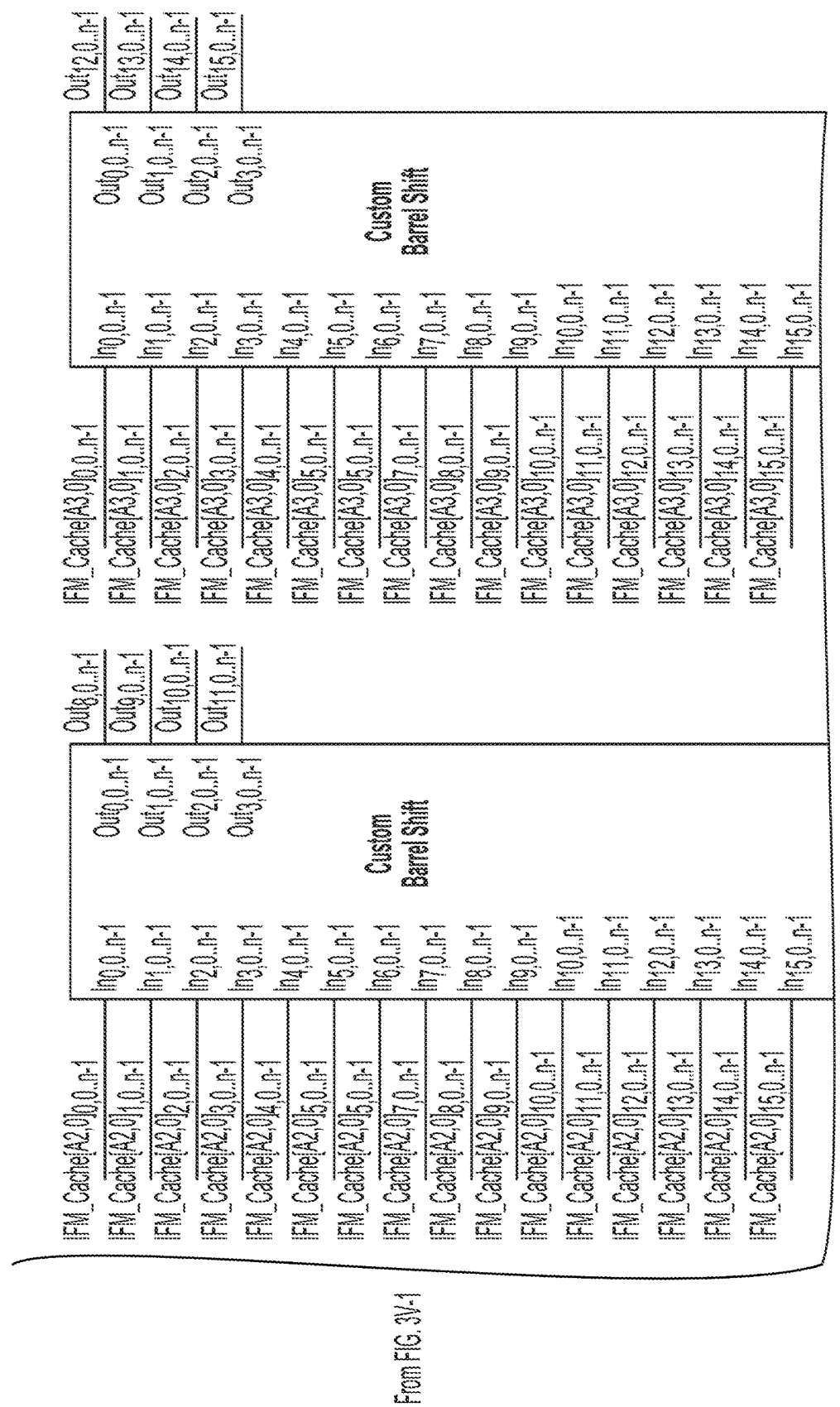

FIGS. 3T through 3V illustrate the micro-architecture of the ARGB-to-RGB barrel shift unit 312 used in FIG. 3S. Unit 310 in FIG. 3T selects ARGB pixel out of the IFM slice retrieved from IFM cache 139. Unit 311 receives two IFM slices from IFM cache 139, drops the alpha channel's value, concatenates the two remaining RGB values together into a 6-element-long vector, passes the 6-element vector via a barrel shifter and crops the barrel shifter output to output only the first 4 values. For example, unit 311 can transform pixels $A_A R_A G_A B_A$ and $A_B R_B G_B B_B$ to $R_A G_A B_A R_B$ to $R_A G_A B_A R_B$ or $G_A B_A R_B G_B$ to or $B_A R_B G_B B_B$. Lastly, unit 312 shown in FIG. 3V receives IFM slices from several address pairs in IFM cache 139, converts ARGB data to RGBR or GBRG or BRGB data order quads and concatenates four of such value quads into a 16-element IFM slice suitable for processing by MR array 122.

ARGB convolution embodiments described above take advantage of IFM slice, having the size of 16 bytes, conveniently fitting four ARGB pixel, each pixel consisting of 4 bytes. This allows reusing 16-byte-wise IFM delivery bus, IFM cache 139 and MR arrays 122 from the '610 application largely unchanged to fetch ARGB pixels from ARGB image at necessary planar locations. However, this convenience of reusing the existing hardware architecture comes with a tradeoff of storing an unused alpha value along with each RGB pixel. Let us explore an NPU embodiment that can convolve RGB image, as opposed to ARGB image, in case SRAM size is costly and SRAM usage must be reduced.

Figure 3W:
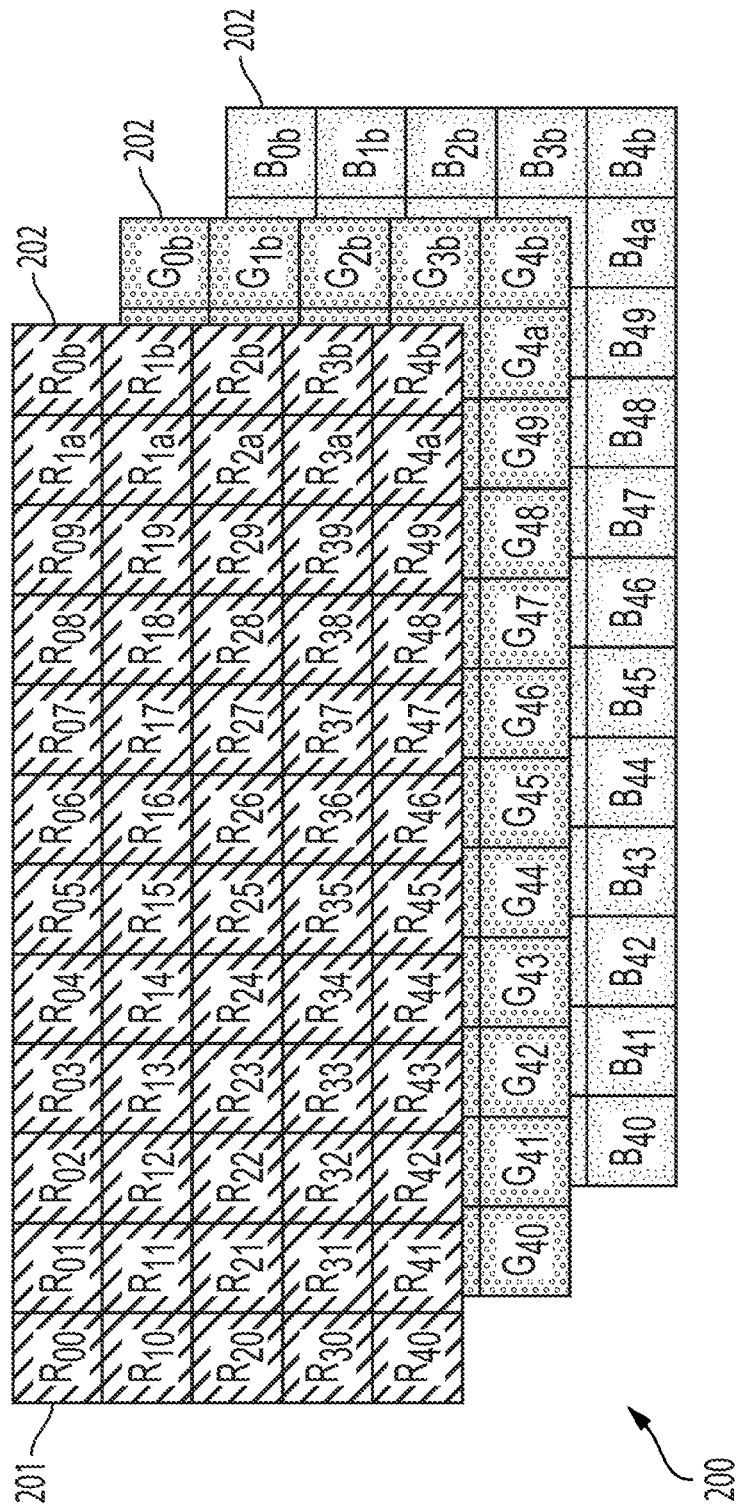
FIG. 3W illustrates an RGB image in the shape of 3D IFM tensor.
Figure 3X:
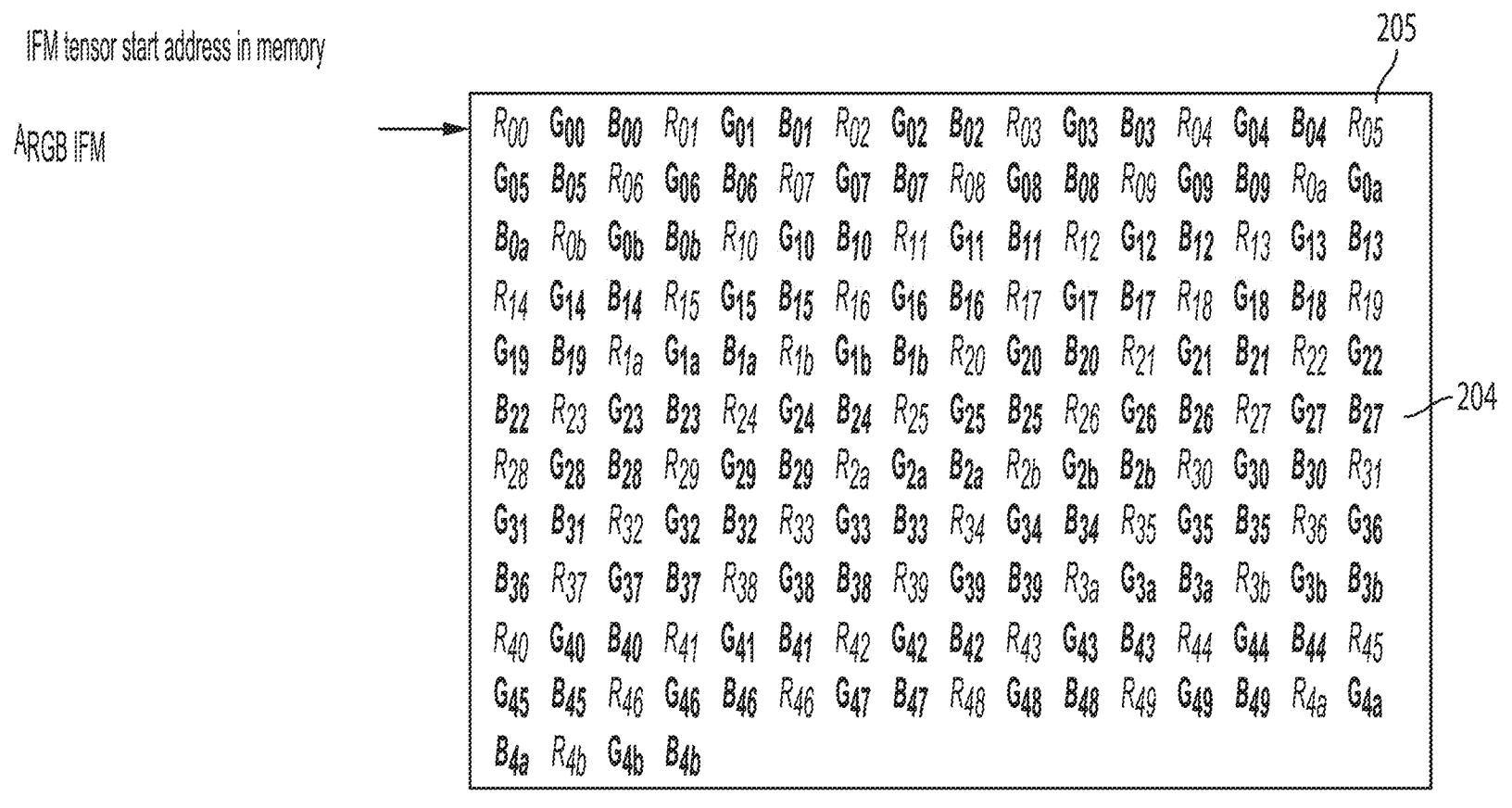

FIG. 3W illustrates an RGB image in the shape of 3D IFM tensor 200, comprised of three color, i.e. depth, channels 202, each consisting of activation values 201. Referring to FIG. 3X, SRAM 109 may store RGB image 200 in the depth-major order, i.e. by storing RGB values from the same pixel at consecutive SRAM addresses. SRAM 109 is 16 bytes wide, same as in the '610 application, in order to continue being able to carry out computations described in the '610 application. Since SRAM byte width of 16 does not divide evenly by RGB pixel byte width of 3, each IFM slice fetched from SRAM contains a number of whole RGB pixels accompanied by one or two RGB pixels in part. For example, the top-most IFM slice, i.e. row, from RGB image 204 in FIG. 3X contains 5 whole RGB pixels, at planar locations (0, 0) through (0, 4) and R channel that belongs to the RGB pixel at location (0, 5).

Figures 1, 3Y:
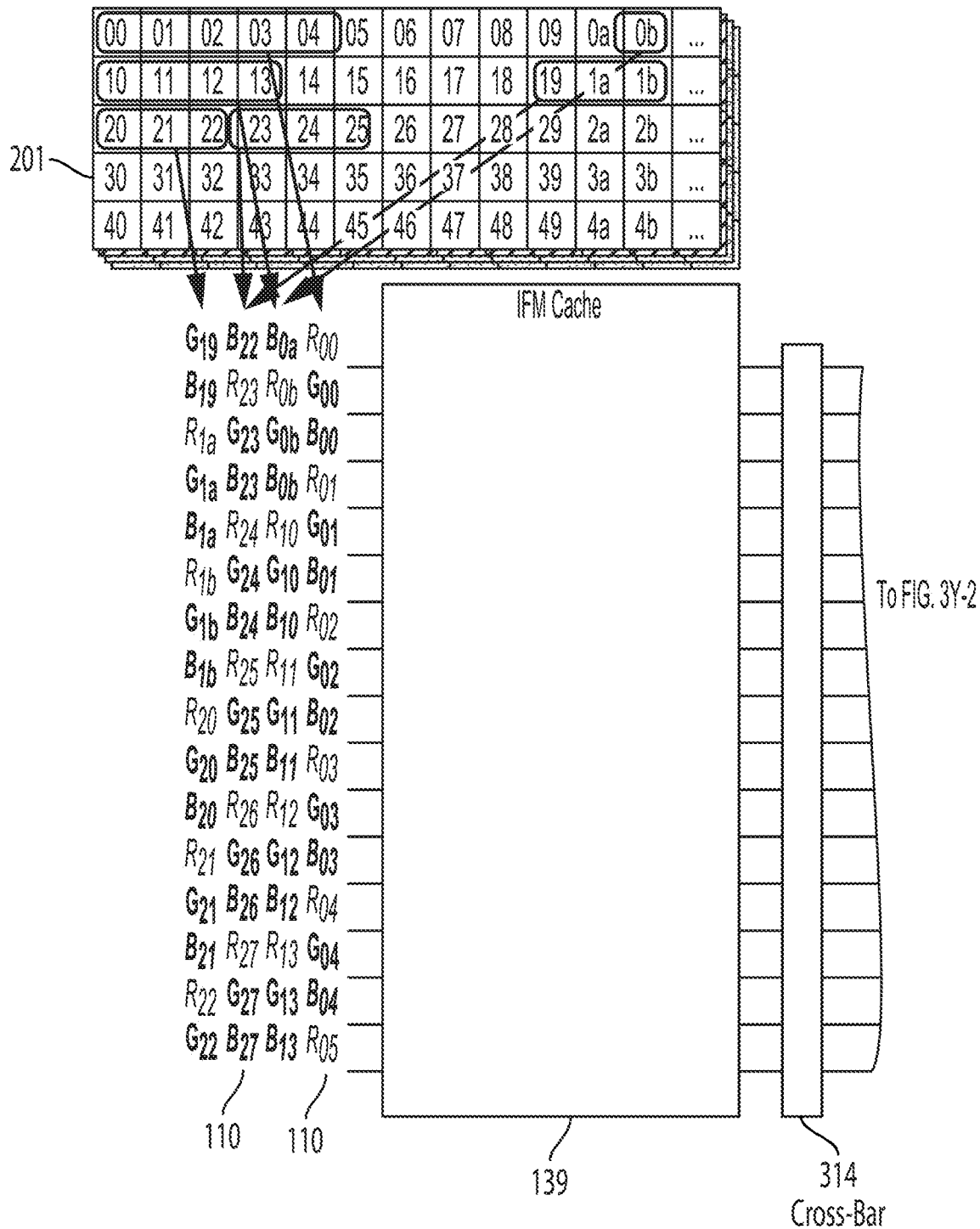
Figures 2, 3Y:
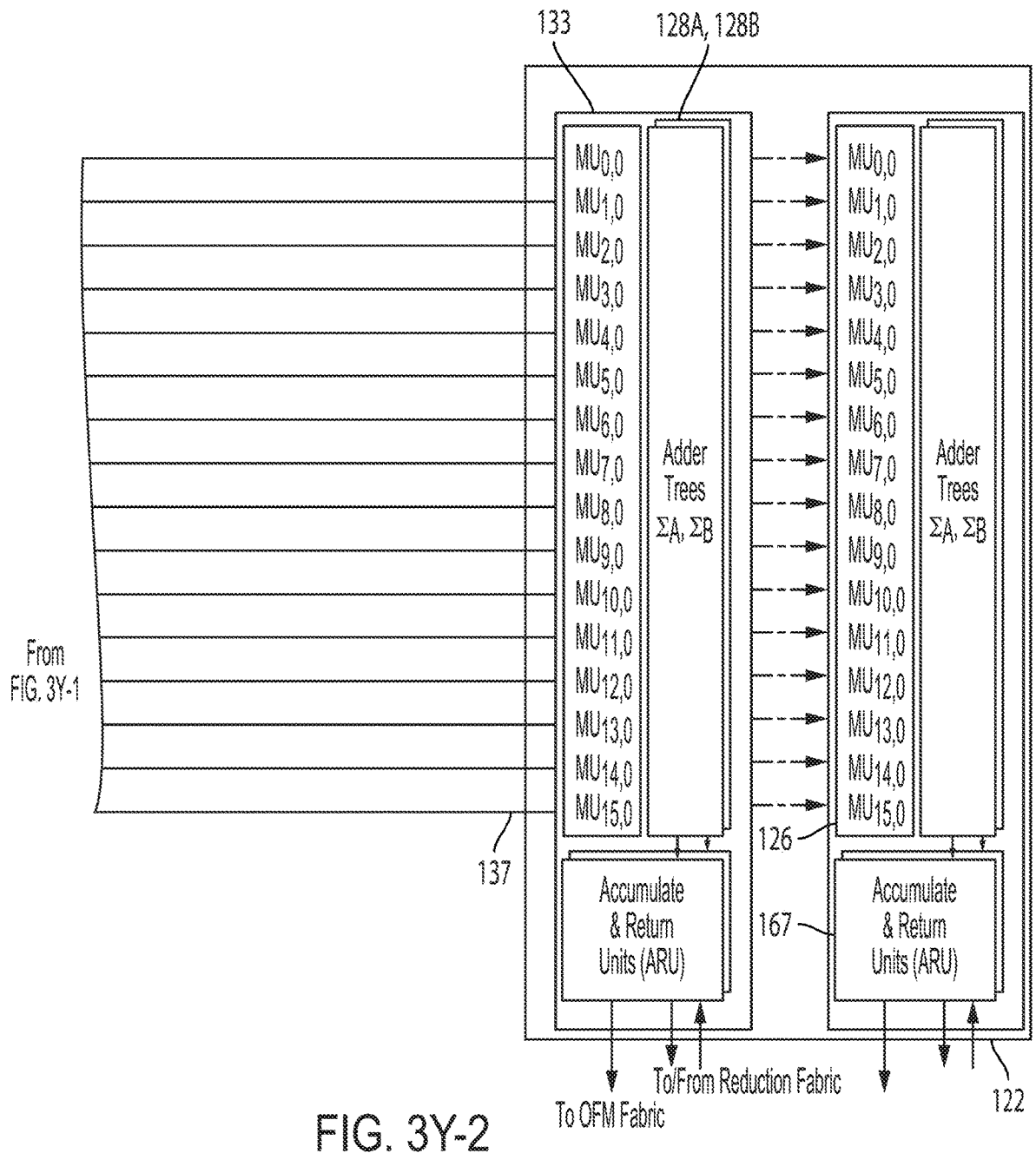
Figures 1, 3Z:
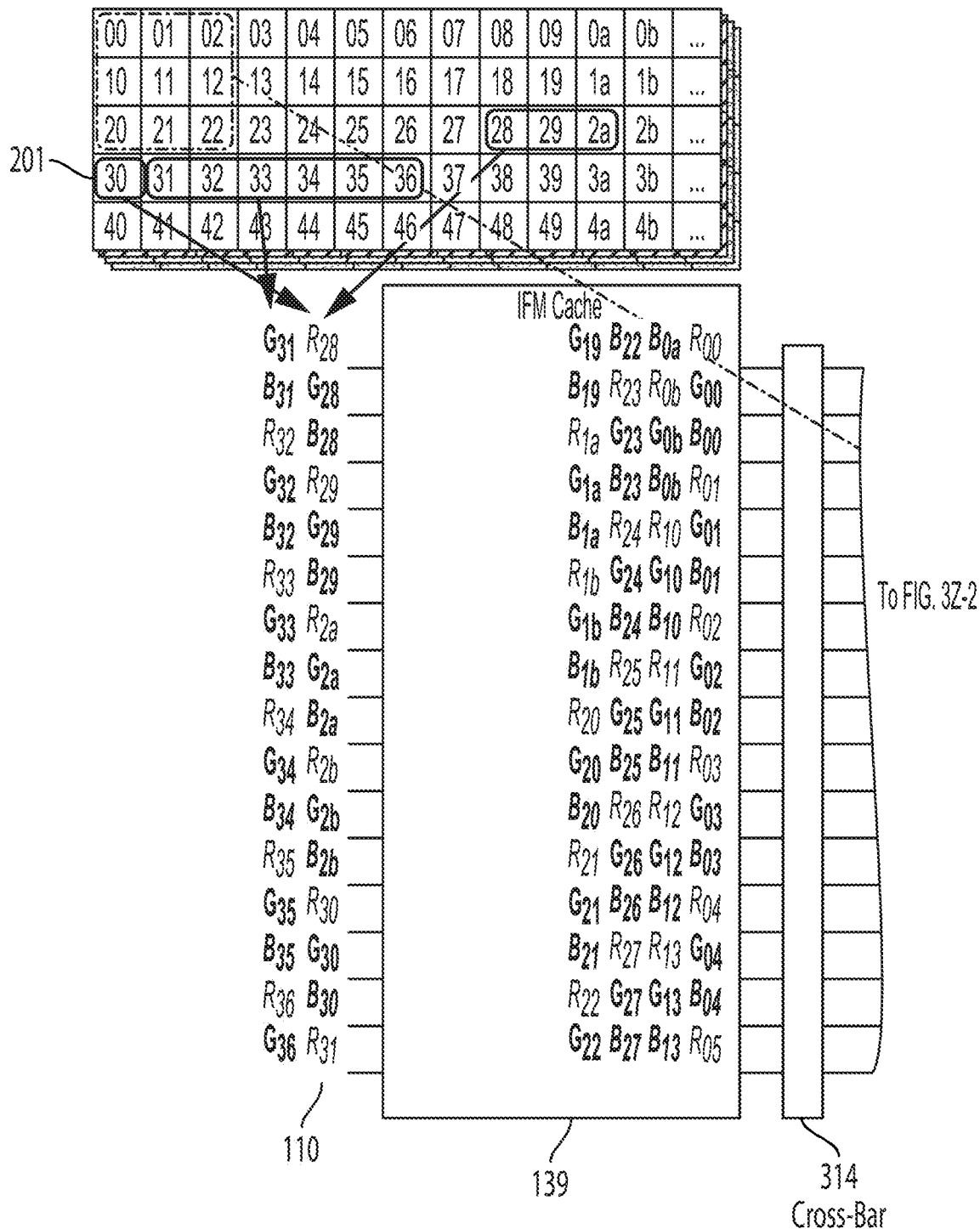
Figures 2, 3Z:
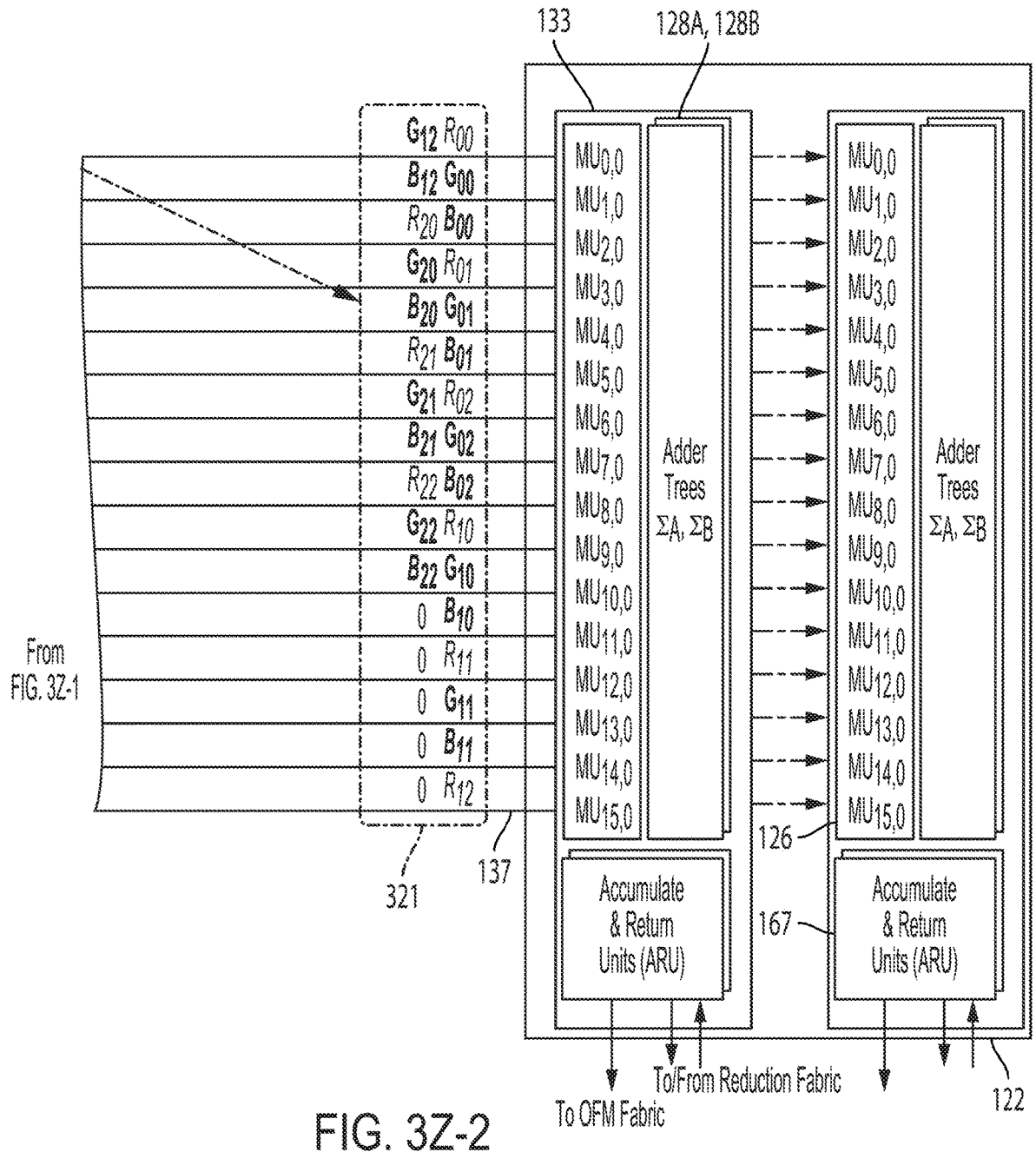
Figure 3A:
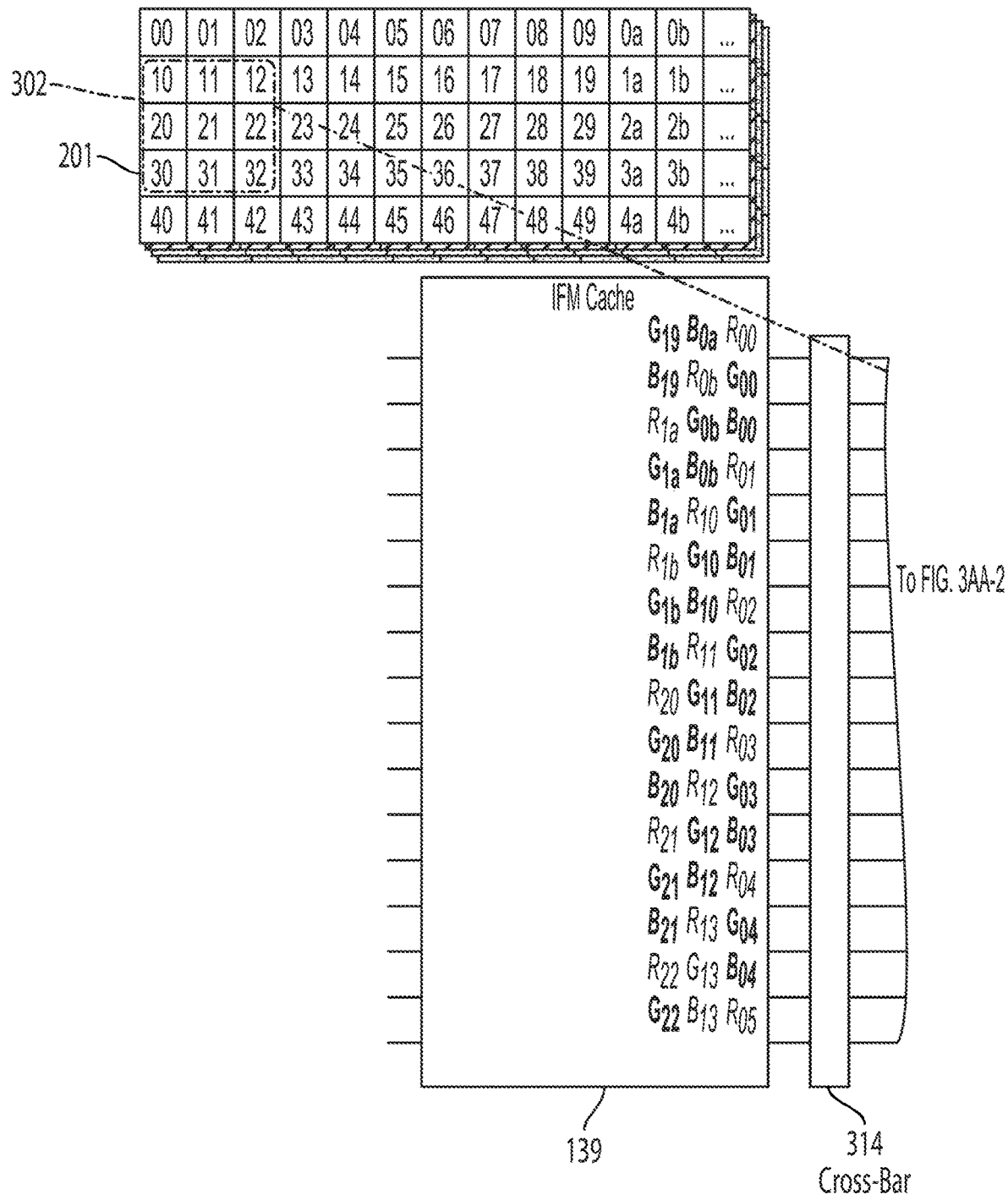
Figure 3A:
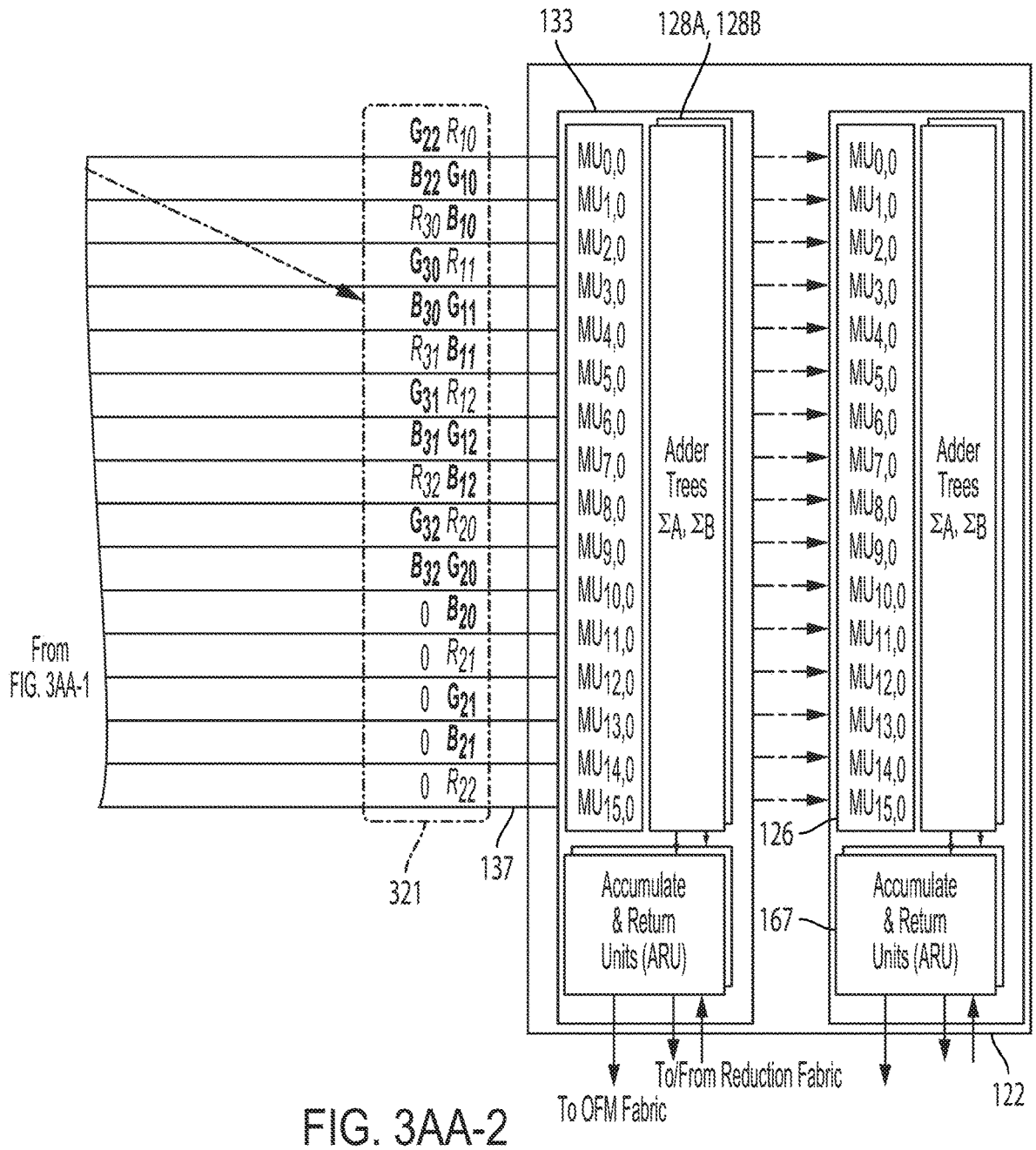
Figure 3A:
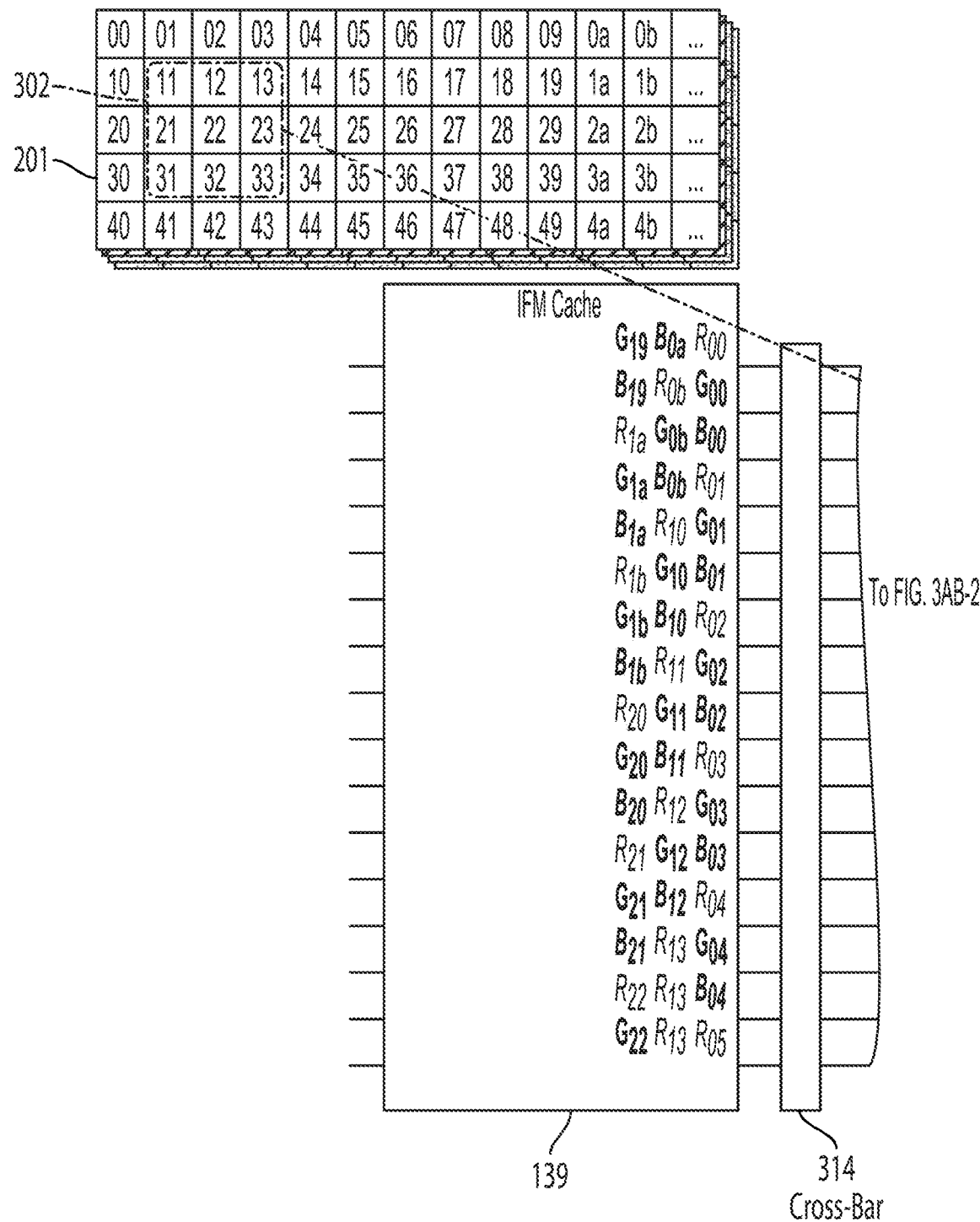
Figure 3A:
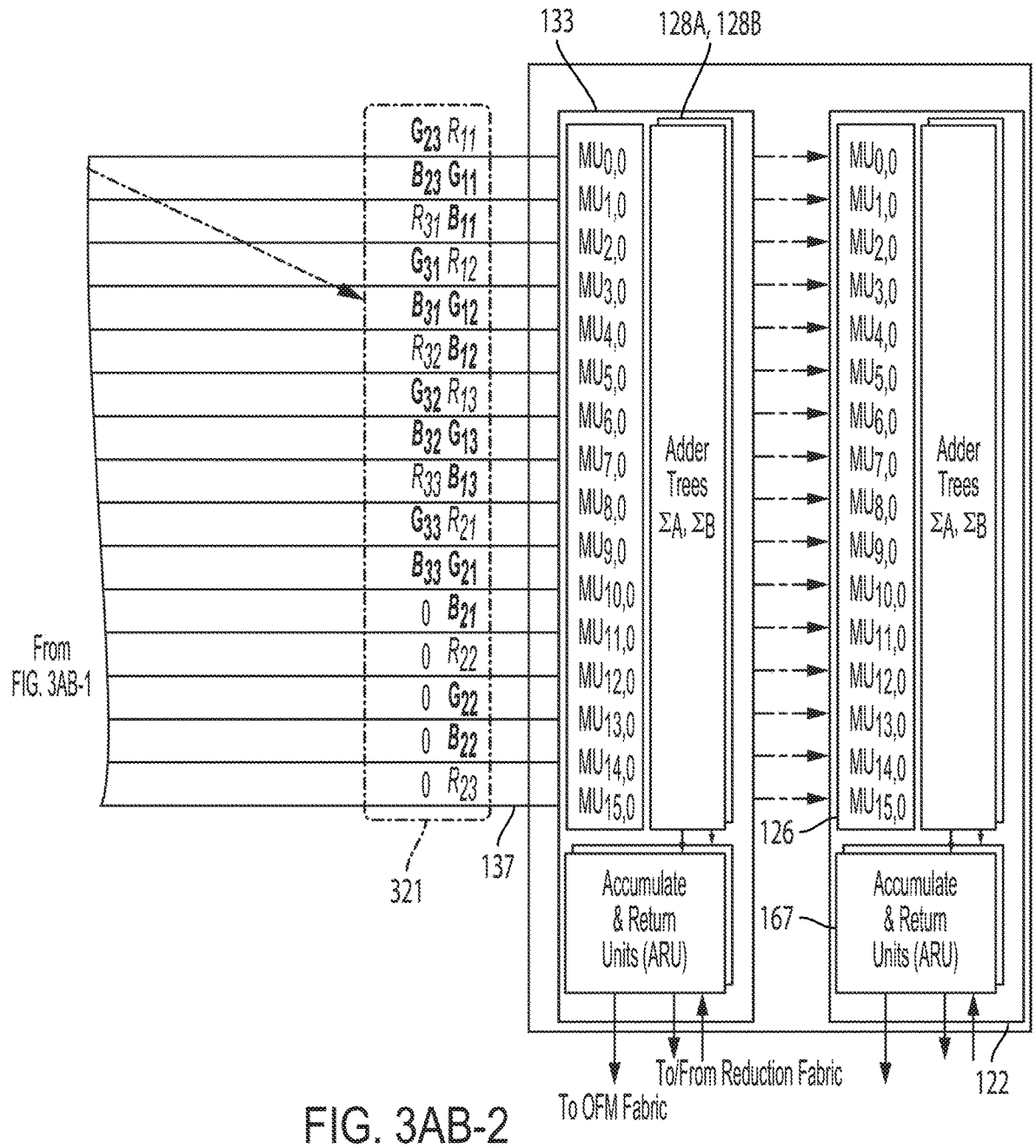

Referring to FIG. 3Y, IFM slices 110 arrive from RGB image 201—stored in SRAM 109—into IFM cache 139 corresponding to convolution patch 302 placed at an initial planar location as shown in FIG. 3Z. Convolution starts by IFM cache 139 sending copies of IFM slices, reordered by cross-bar 314, as two IFM slices 321—containing the 9 RGB pixels necessary to compute convolution at the current planar location of convolution patch 302—to MR array 122 for computation. Referring to FIGS. 3AA and 3AB, convolution continues as the convolution patch 302 keeps traversing the IFM tensor 201, i.e. the RGB image, IFM slices 110 arriving to IFM cache 139 in anticipation of the convolution patch 302 sliding to its next location, IFM cache 139 continuing to send RGB pixels—reordered by cross-bar 314 as necessary—to MR array 122.

Note that due to the IFM slice byte width of 16 not being evenly divisible by the RGB byte width of 3, the cross-bar 314 is required to reorder activation lane values in nearly arbitrary fashion to support various planar sizes of the convolution patch 302. Adding an 8-bit 16-inputs-by-16-outputs all-to-all cross bar to each MR tile 102 may be prohibitively expensive. Therefore, NPU embodiments utilizing ARGB convolution may be have certain advantages over an embodiment that uses RGB convolution.

Figures 1, 4A:
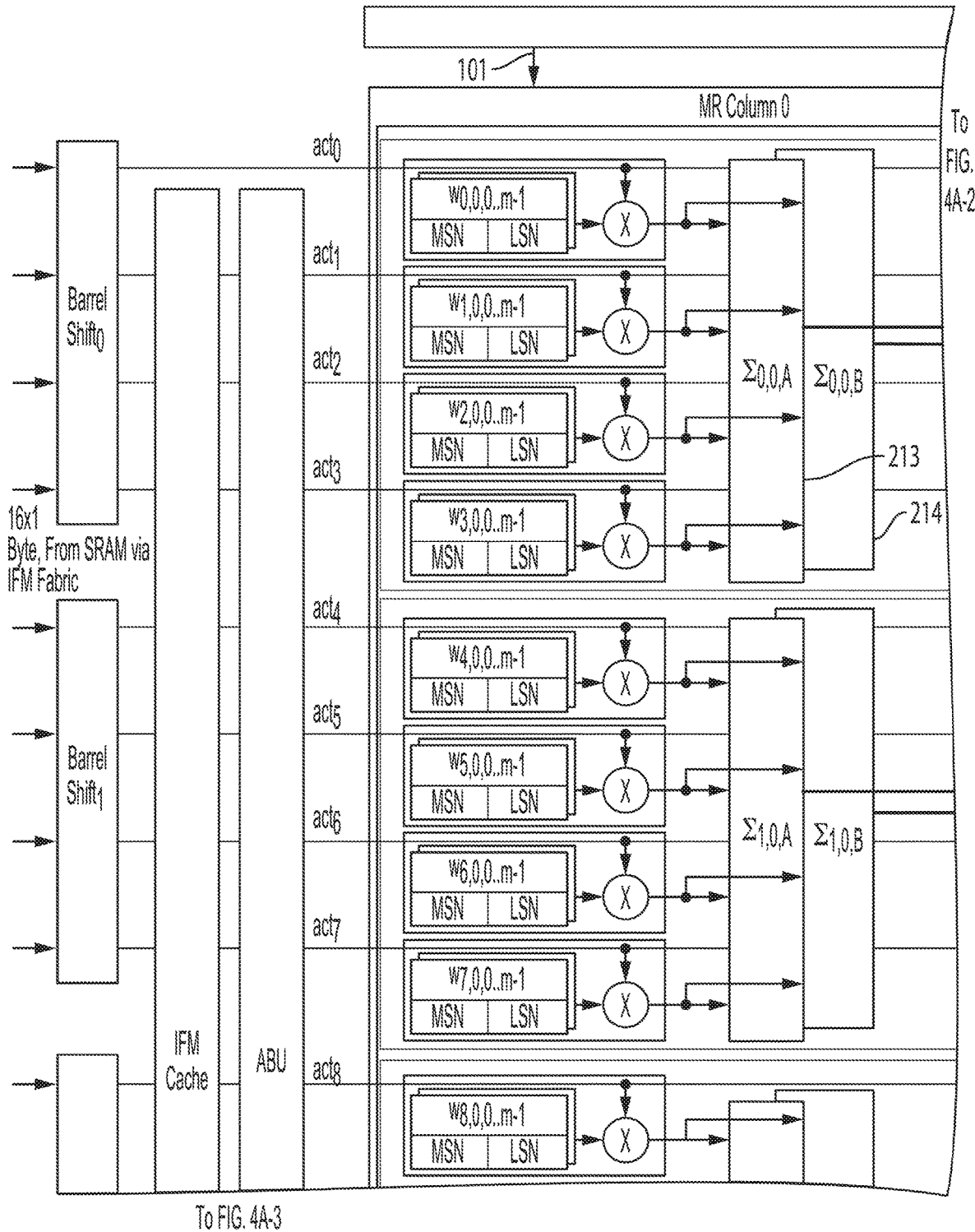
Figures 2, 4A:
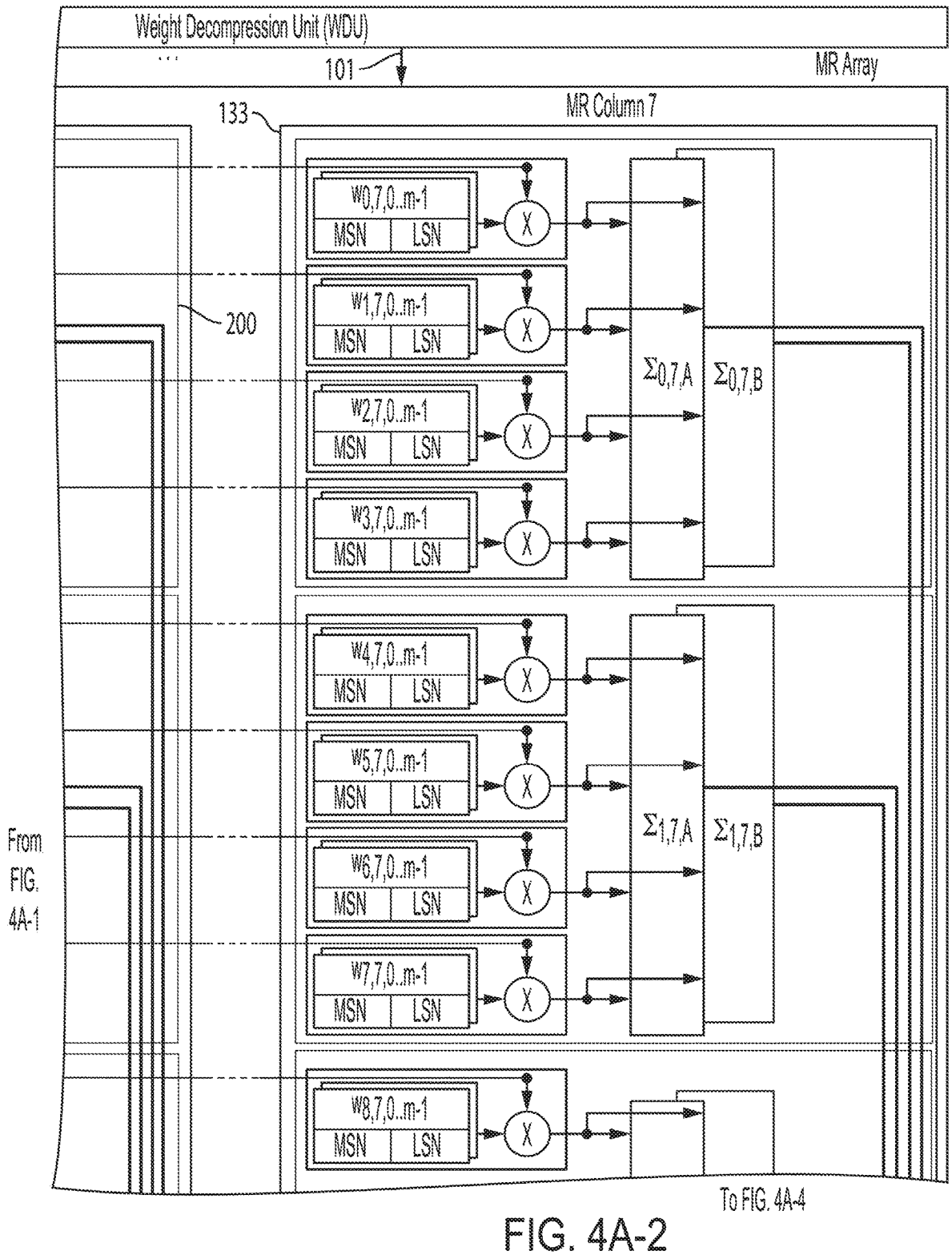
Figures 3, 4A:
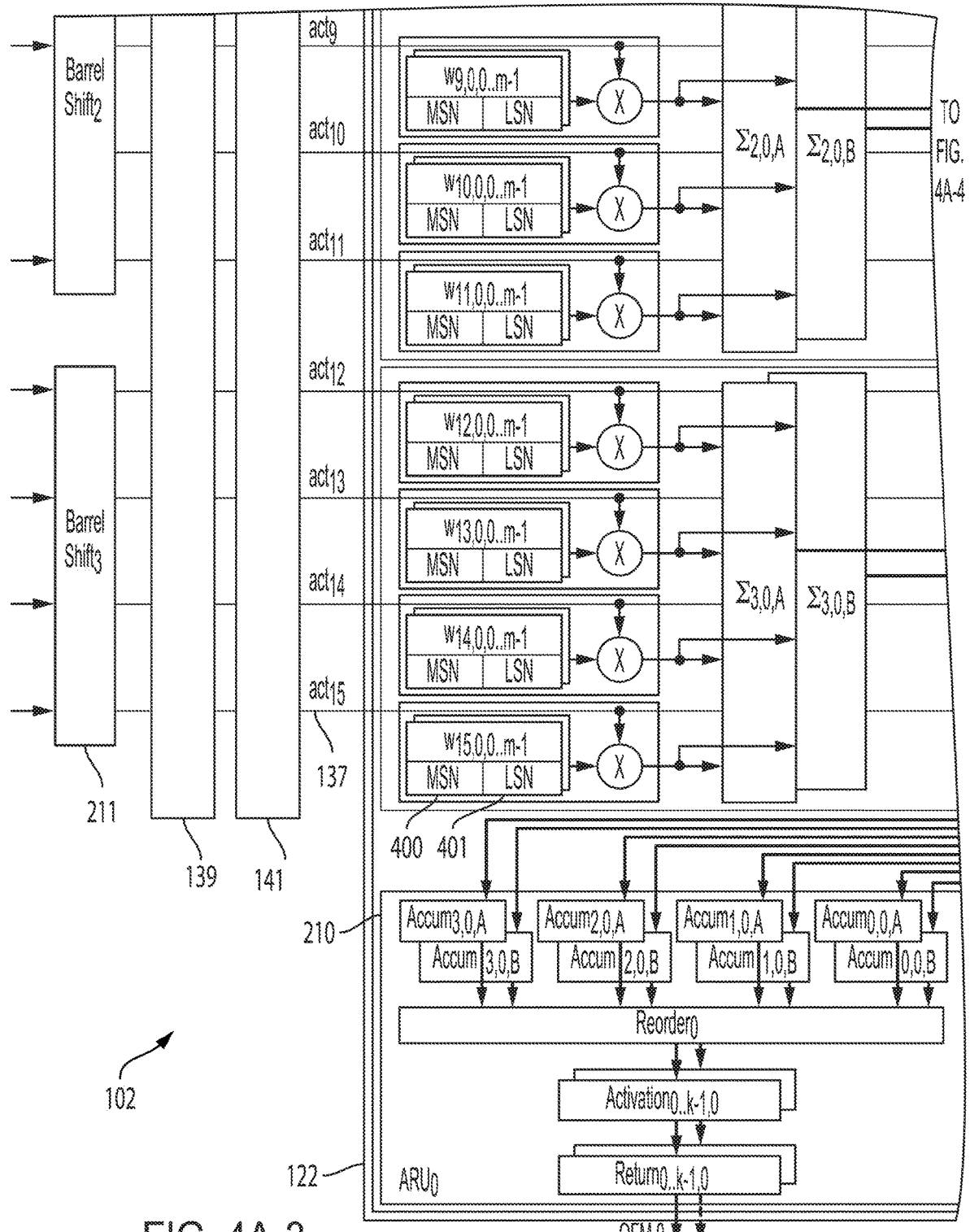
Figures 4, 4A:
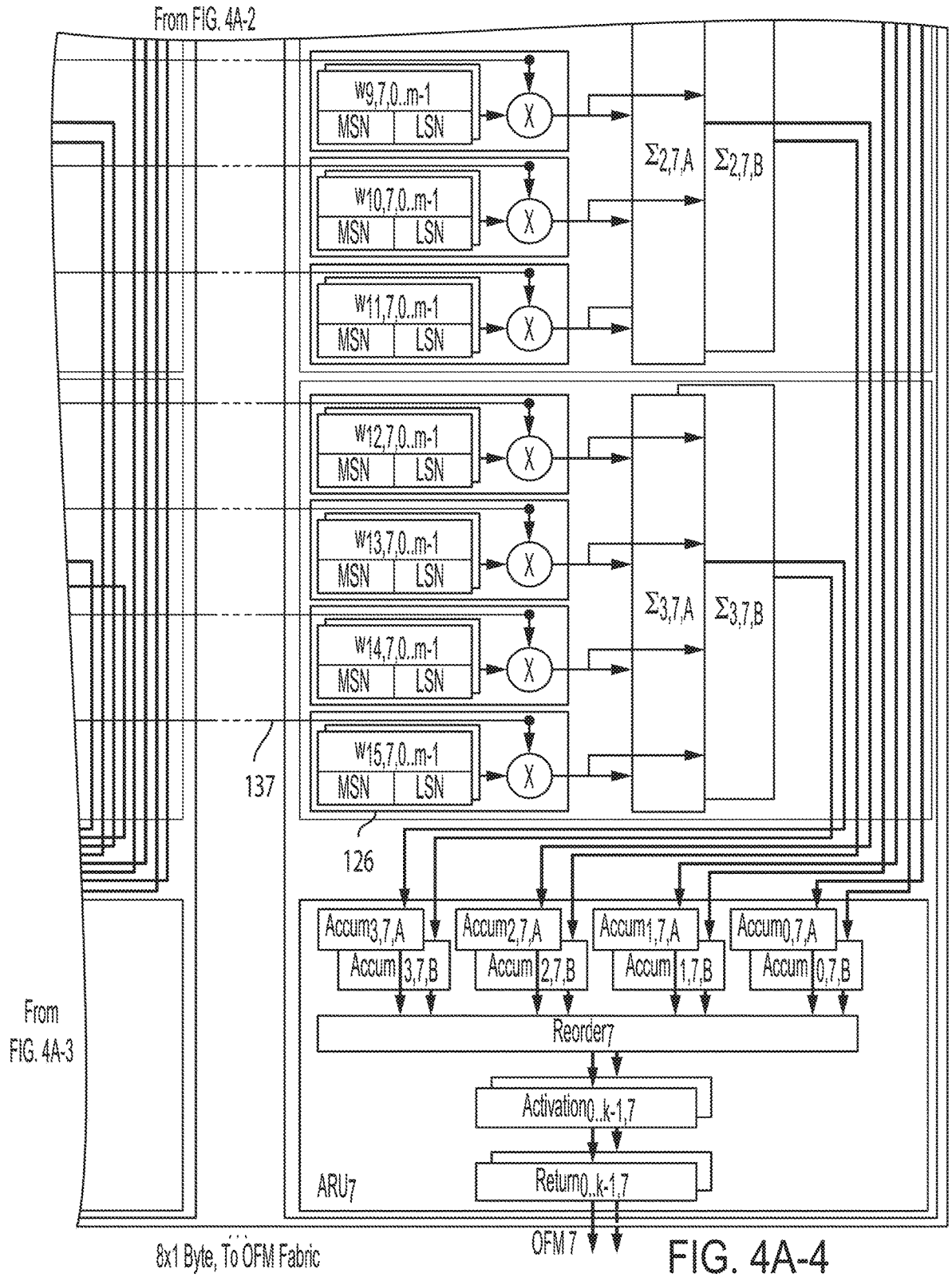

Having covered depth-wise and ARGB convolution embodiments as extensions to the baseline NPU '610, let us consider another set of extensions focusing on reducing the NPU 100 silicon area, while maintaining computation throughput. More specifically, FIG. 4A shows an embodiment of MR tile from FIG. 2F having the bit width of multiplier units 126 reduced from 8-bit-by-8-bit to 4-bits-by-4-bits or 4-bits-by-8-bits, thereby allowing MR tile 102 operate on 4-bit weights and/or activations such as int4 and uint4, as opposed to 8-bit, 16-bit or longer bit width. Importantly, the modified tile 102 can also accelerate its throughput by taking advantage of weight sparsity as well as "magnitude" sparsity, in addition to sparsity of activation values. Let us refer to weight sparsity as kernel weights having zero values. Let us refer to magnitude sparsity as kernel weights and/or activation values often having small magnitudes, i.e. absolute values. In particular, we are interested in weights and/or activations having magnitudes less than 16, i.e. those that fit into 4-bit unsigned integer and thus can be processed by a 4-bit multiplier. It is well known that activations and weights of trained deep learning models often have small magnitudes, thus making it possible to use 4-bit multipliers—which have smaller area and power—to process 8-bit values with little or no decrease in computation throughput. Let us refer to computation of 8-bit values using 4-bit multipliers as "mixed precision" computation. Another embodiment related to the '610 application describes mixed-precision computation in detail in the case of general direct convolution. The present disclosure applies mixed-precision concepts to depth-wise and ARGB convolutions.

Referring to FIG. 4A, note that byte-wide weight register files 127 have been split into most-significant nibble (MSN) 400 and least-significant nibble (LSN) 401. More specifically, weight register 127 in the baseline disclosure '601 holds weights in the magnitude-and-sign format, where magnitude is 8-bit wide, i.e. uint8, and the sign takes one additional bit. Correspondingly, capacity and bit width of weight register files in FIG. 4A remain unchanged, except each uint8 weight magnitude becomes logically split into two uint4 values.

Figures 1, 4B:
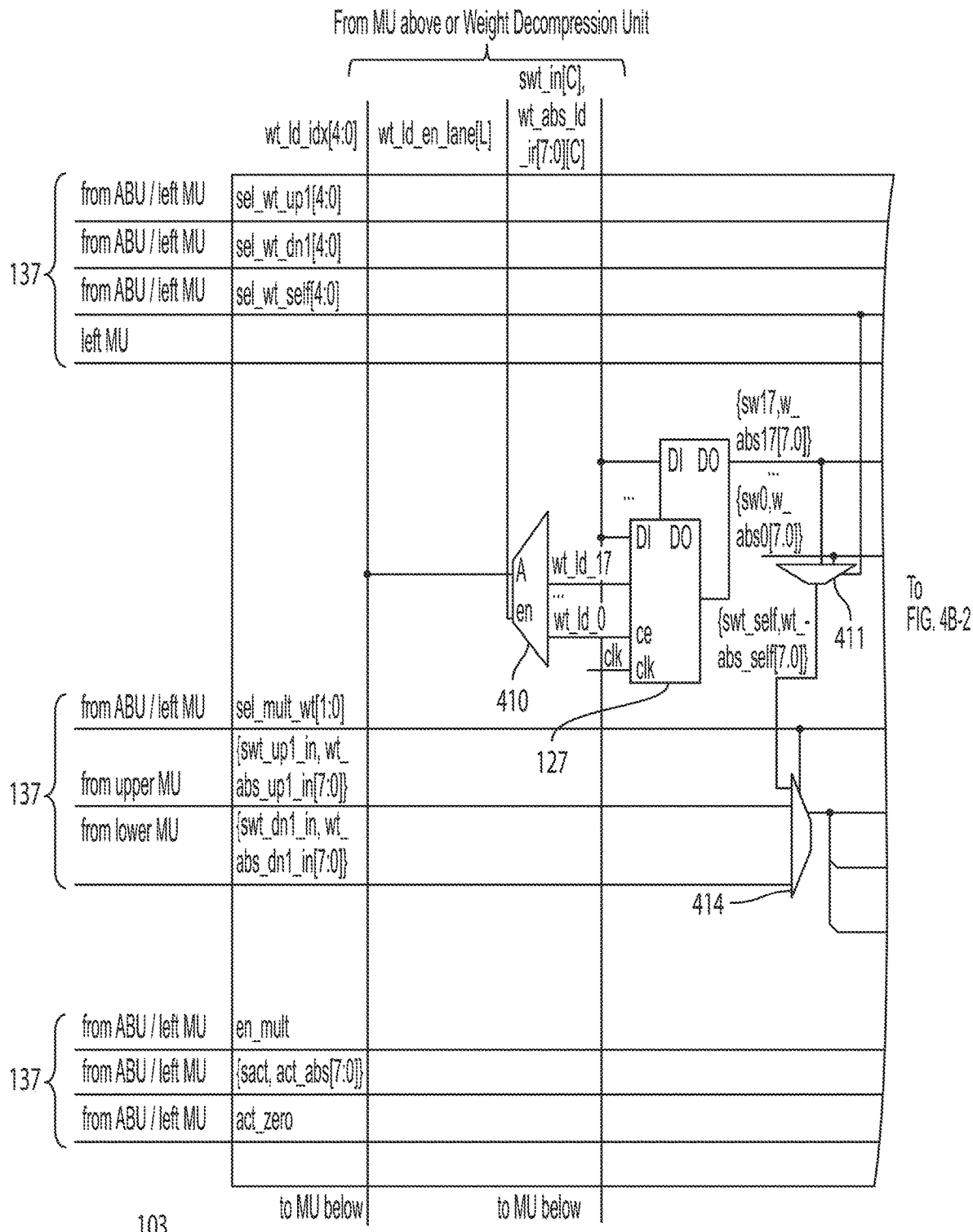
Figures 2, 4B:
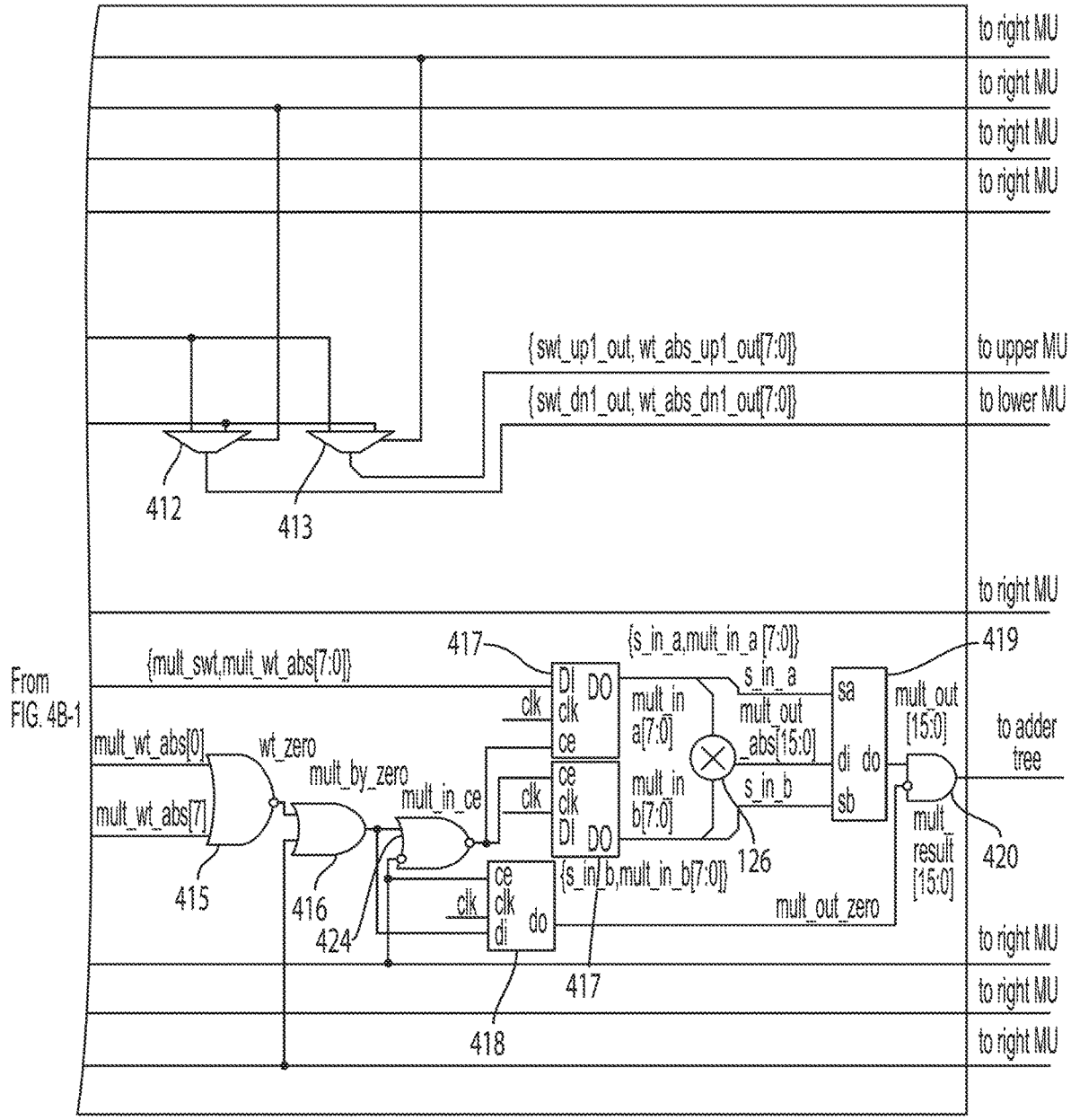

FIG. 4B illustrates a baseline micro-architecture of multiplier unit 103 as described in the '610 application with multiplier 126 having 8-by-8 bit width, i.e. multiplying a uint8 weight magnitude mult_in_a[7:0] by a uint8 activation magnitude to obtain an uint16 result multi_out_abs[15:0] as the product's magnitude. Both weight and activation arrive to multiplier 126 in the sign-and-magnitude format. More specifically, the weight register file 127 stores 18 weights {sw0,w_abs0[7:0]} through {sw17,w_abs17[7:0]}. To support look-aside operation with the distance of one, multiplier 126 can receive its weight—via multiplexer 414—from three sources: the weight register file 127 co-located with the 126 multiplier in the same multiplier unit 103 via bus {swt_self, wt_abs_self[7:0]}, the weight register file 127 located in the multiplier unit 103 one lane above via bus {swt_up1_in, wt_abs_up1_in[7:0]} and the weight register file 127 located in the multiplier unit 103 one lane below via bus {swt_dn1_in, wt_abs_dn1_in[7:0]}.

Figure 4C:
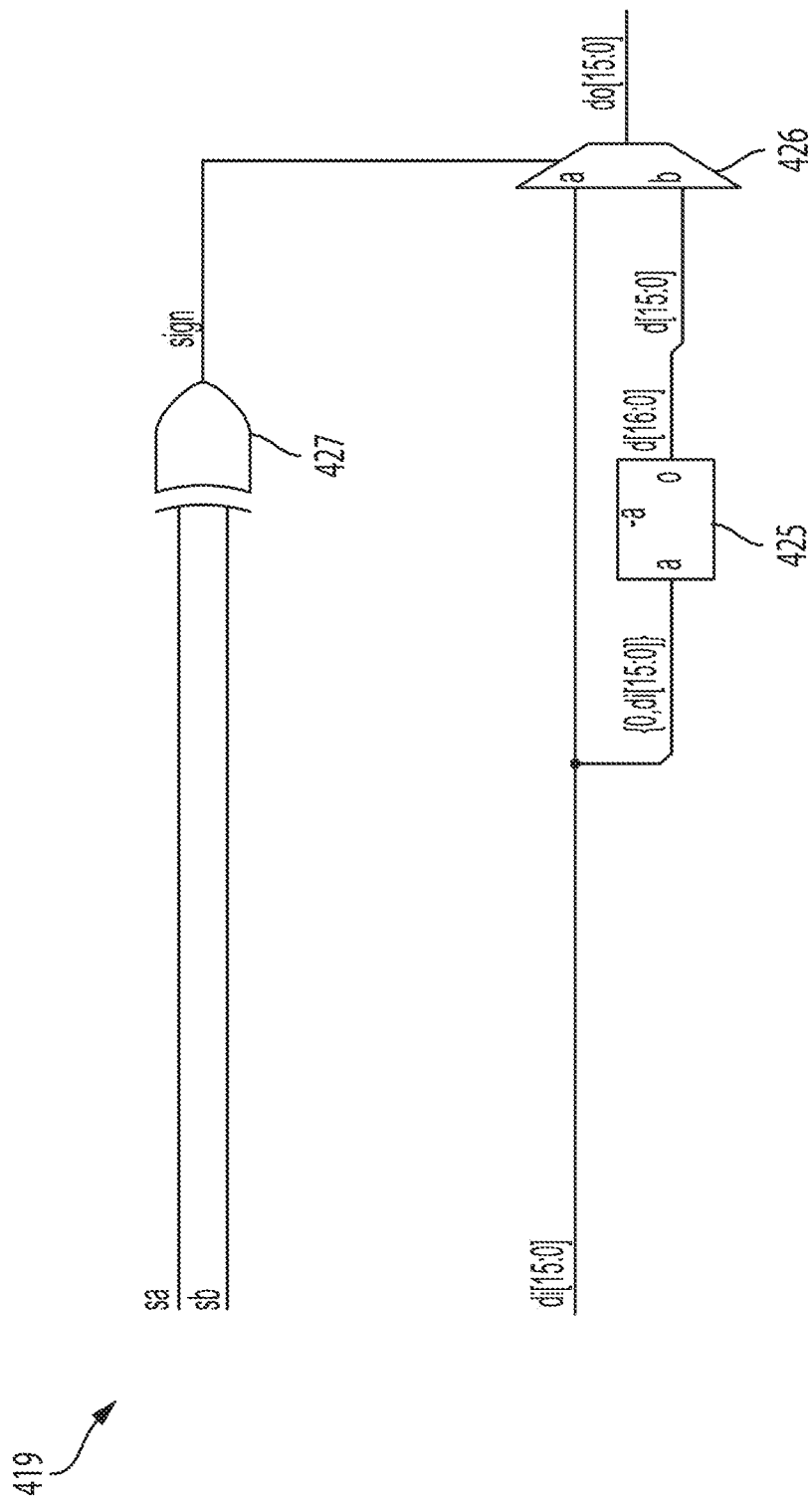
FIG. 4C illustrated micro-architecture of a multiplier unit module to compute the sign of the output result and convert the unsigned product into the signed two's complement format, where the multiplier has the bit width of 8-by-8.

With multiplier 126 computing a product of weight and activation magnitude pairs, unit 419 calculates the product's sign by taking exclusive-or 427 of the weight's sign s_in_a with the activation's sign s_in_b and converts uint16 result magnitude to a signed two's complement int16 number mult_out[15:0], see units 425 and 426 in FIG. 4C. Registers 417 latch inputs to multiplier 126. Logic cells 415 and 416 check if the weight's magnitude equals to zero to generate signal wt_zero. In each activation lane ABU 141 broadcasts activation {sact, act_abs[7:0]}, a signal act_zero indicating that the activation's magnitude is zero and a signal en_mult that gates clock via unit 424 to registers 417 thereby pausing multiplication when multiplier 126 is supposed to idle. Logic unit 416 checks if the weight or the activation equals to zero and generates signal mult_by_zero to indicate that the upcoming multiplication is a multiplication by zero. In case of multiplication by zero, logic unit 424 gates the clock to registers 417 using signal mult_in_ce to freeze inputs to multiplier 126, such that, input registers 417 and unsigned-to-signed result conversion unit 422 will not be spending dynamic power. At the same time, register 418 latches mult_by_zero by one clock cycle that causes logic unit 420 to zero out the signed result to multiplier unit's output mult_result[15:0], which in turn connects to adder tree 128A, 128B—or 213, 214 when MR tile 102 is grouped into activation lane quads.

Multiplexers 411, 412 and 413 comprise the weight register file's 127 three read ports. Each read port, i.e. multiplexer 411, 412 and 413, receive its 5-bit read address sel_wt_self[4:0], sel_wt_dn1[4:0] and sel_wt_up1[4:0] respectively from ABU unit 141. More specifically, multiplexer 411 fetches a weight from the weight file register 127 when the look-ahead did not take place for the current weight cycle. In other words, when the weight associated with the incoming activation {sact, act_abs[7:0]} is located in the same lane with that activation—not in the MU 103 one lane above or in the MU 103 one lane below—it is multiplexer 411 that fetches the weight from the local weight register file 127 to the multiplier unit 126. When activation {sact, act_abs[7:0]} was shifted by one lane up, e.g. using a multiplexer 163 in FIG. 1I, the weight associated with that activation has been stored in the weight register file 127 located in MU 130 one lane below. Therefore, multiplexer 413 in the MU 130 one lane below will fetch the weight associated with the activation arriving to MU 130 where the multiplication will take place and send that weight over bus {swt_up1_out, wt_abs_up1_out[7:0]} up to the MU 130 where the multiplication will take place. Similarly, when ABU 141 shifted an activation {sact, act_abs[7:0]} one lane down, the weight associated with that activation has been stored in the weight register file 127 located in MU 130 one lane above. Therefore, multiplexer 412 in the MU 130 one lane above will fetch the weight associated with the activation arriving to MU 130 where the multiplication will take place and send that weight over bus {swt_dn1_out, wt_abs_dn1_out[7:0]} down to the MU 130 where the multiplication will take place.

Before computation starts, weight decompression unit (WDM) 138 loads weights into weight registers 127 over a vertical bus {swt_in[C], wt_abs_Id_in[7:0][C]}, where C is the MR column index 0 . . . 7. To load one weight into each of the eight multiplier units in lane with index L 0 . . . 15, WDM asserts wt_Id_en_lane[L] causing de-multiplexer 410 to un-gate the clock input of weight register at index wt_Id_idx[4:0], where wt_Id_idx ranges from 0 to 17.

Figures 1, 4D:
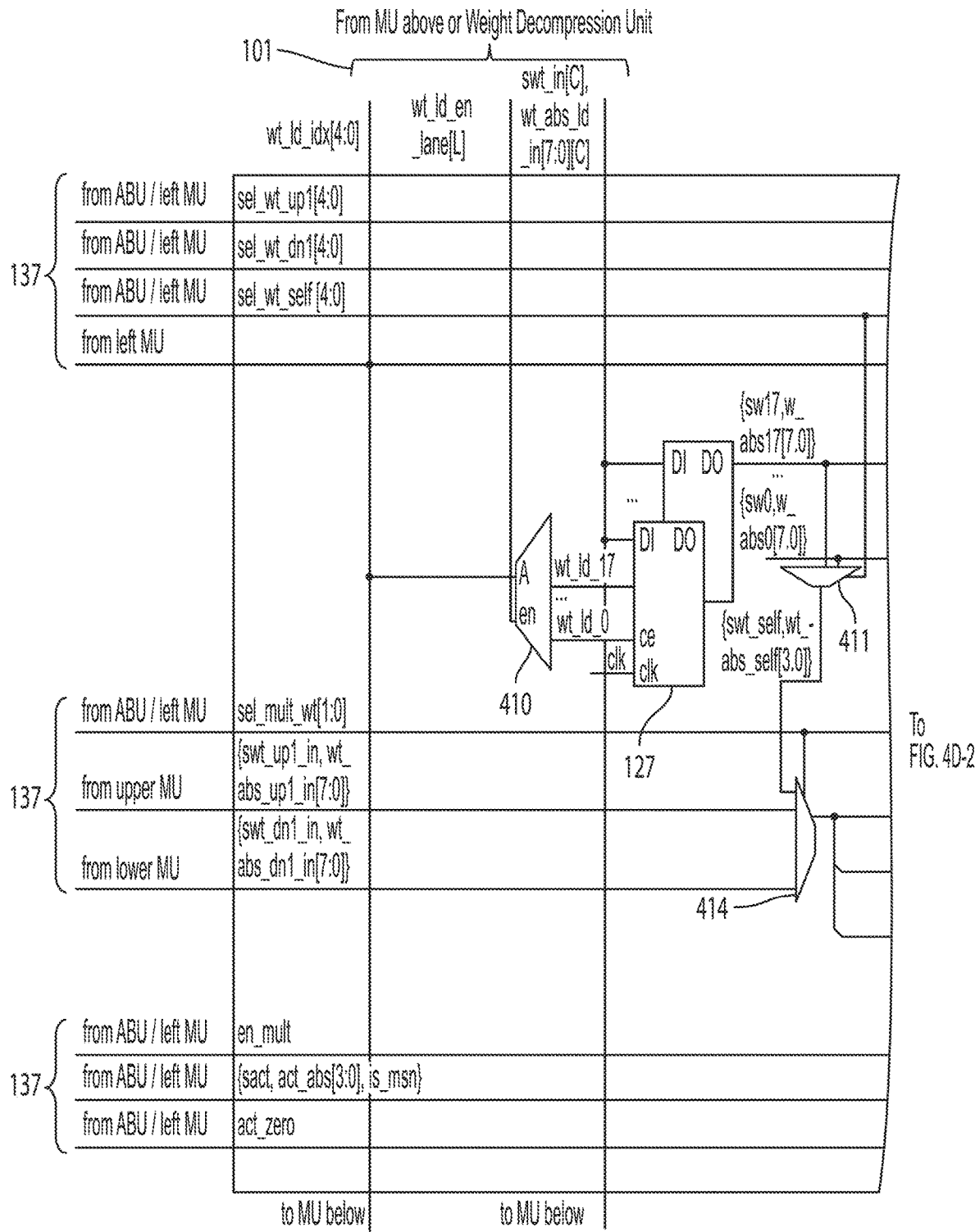
Figures 2, 4D:
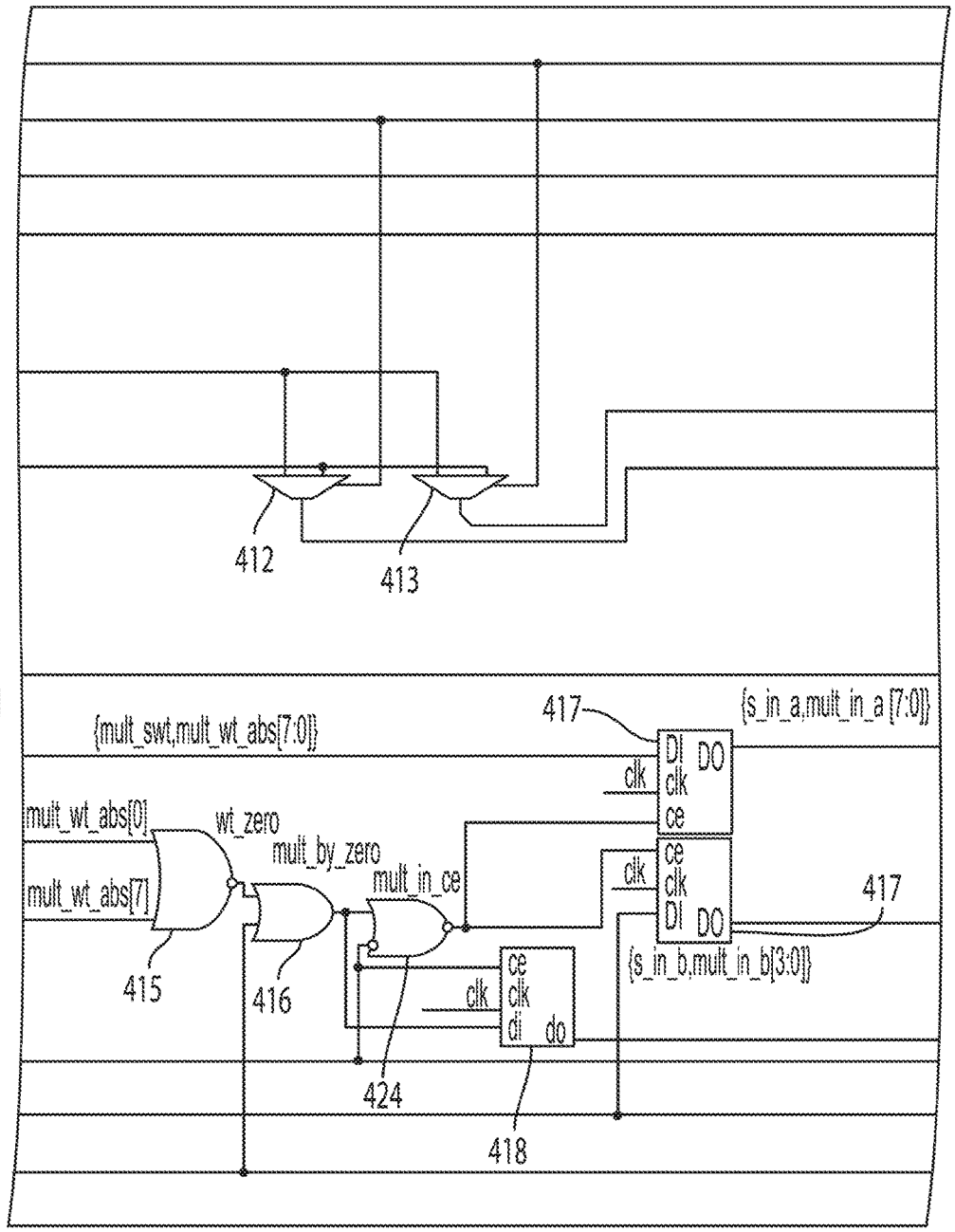
Figures 3, 4D:
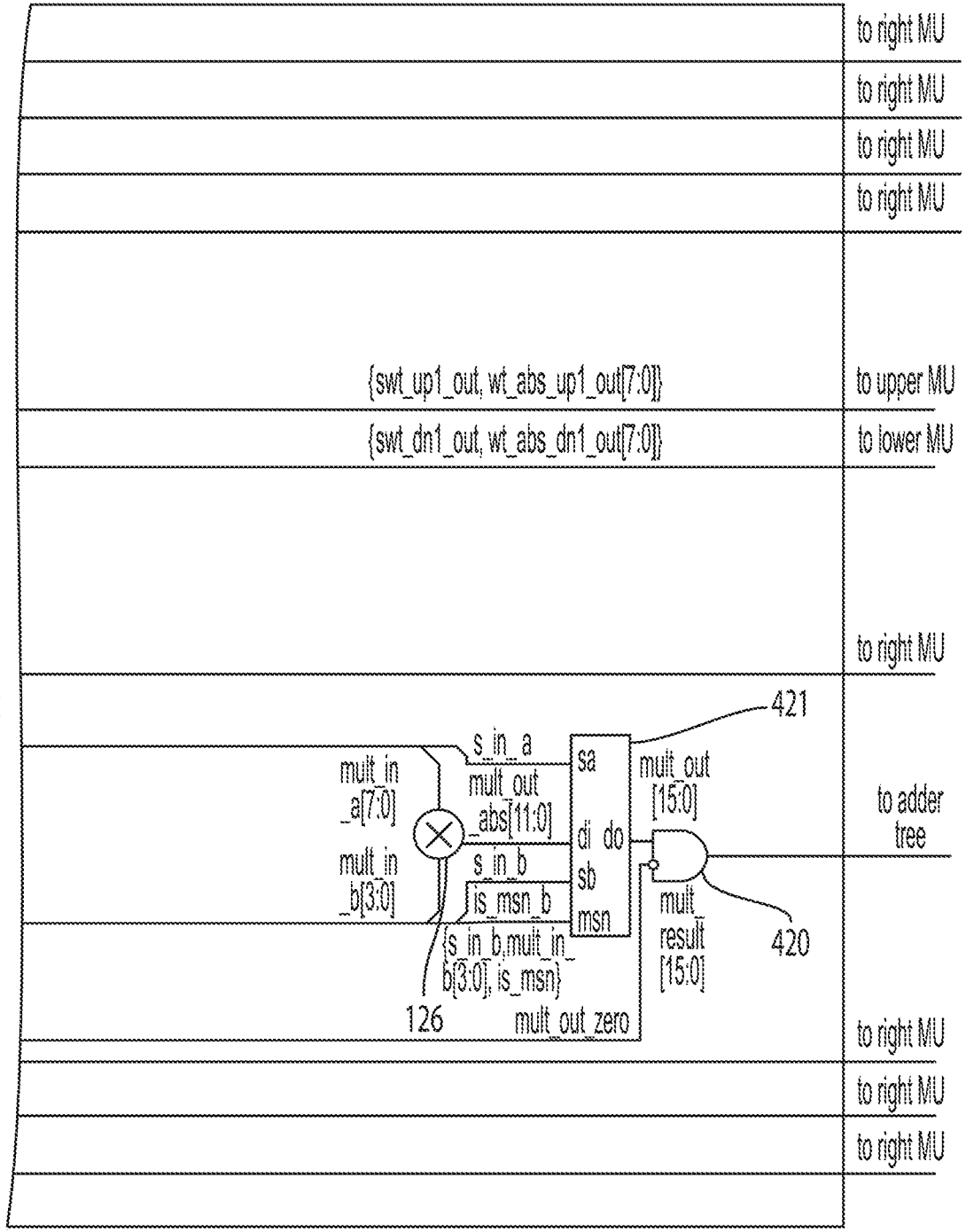

FIG. 4D shows an embodiment of multiplier unit 103 having 8-bit weights and 4-bit activations. Note that FIG. 4D is similar to FIG. 4B, however the activation magnitude act_abs bit width in lane broadcast bus {sact, act_abs[3:0], is_msn} is 4 bit wide, i.e. uint4, not 8-bit wide, and the multiplier 126 activation input mult_in_b[3:0] is also 4 bit wide. In case when activation magnitude is 8 bit wide, i.e. uint8, MU 103 in FIG. 4D can complete the computation using two clock cycles. More specifically, during the first clock cycle ABU 141 can send the activation's least-significant nibble (LSN), which MU 103 will multiply by an 8-bit weight, convert to a signed value, e.g. int16, and send the product to the adder tree that will, in turn, store (or add) its result to an ARU accumulator. During the second clock cycle ABU 141 can send the activation's most-significant nibble (MSB), which MU 103 in FIG. 4D will multiply by the same 8-bit weight as in the previous clock cycle, shift the unsigned result up by 4 bits, to account for the activation nibble being most-significant, convert the unsigned product to a signed value, e.g. int16, and send the product to the adder tree that will, in turn, add its result to the ARU accumulator. Now the ARU accumulator contains the correct result corresponding to a dot product of 8-bit activation values with 8-bit weight values.

Figure 4E:
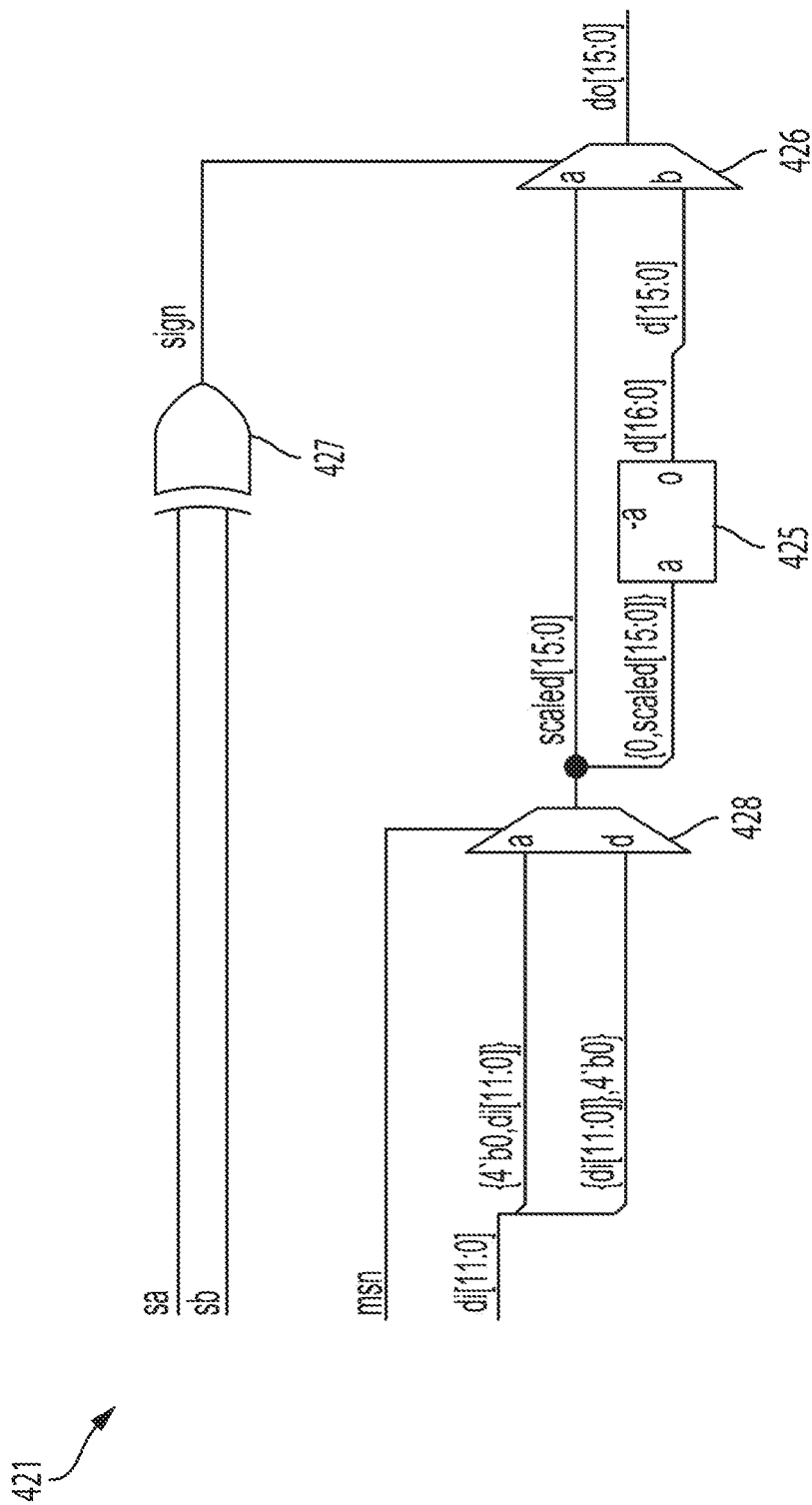
FIG. 4E illustrates a micro-architecture of a multiplier unit module to compute the sign of the output result and convert the unsigned product into the signed two's complement format, where the multiplier has the bit width of 8-by-4.

ABU 141 broadcasts an additional signal is_msn to indicate whether the 4-bit activation magnitude act_abs[3:0] being broadcast is the most-significant or the least significant nibble of the 8-bit activation's magnitude. Note that is_msn gets registered along with the activation sign s_in_b and magnitude mult_in_b[4:0] by registers 417 and reaches unsigned-to-signed result conversion unit 421 to enable the 4-bit up-shift when ABU is broadcasting the activation's MSN. More specifically, referring to FIG. 4E, signal msn causes multiplexer 428 to up-shift the uint12 product by 4 bits.

Figures 1, 4F:
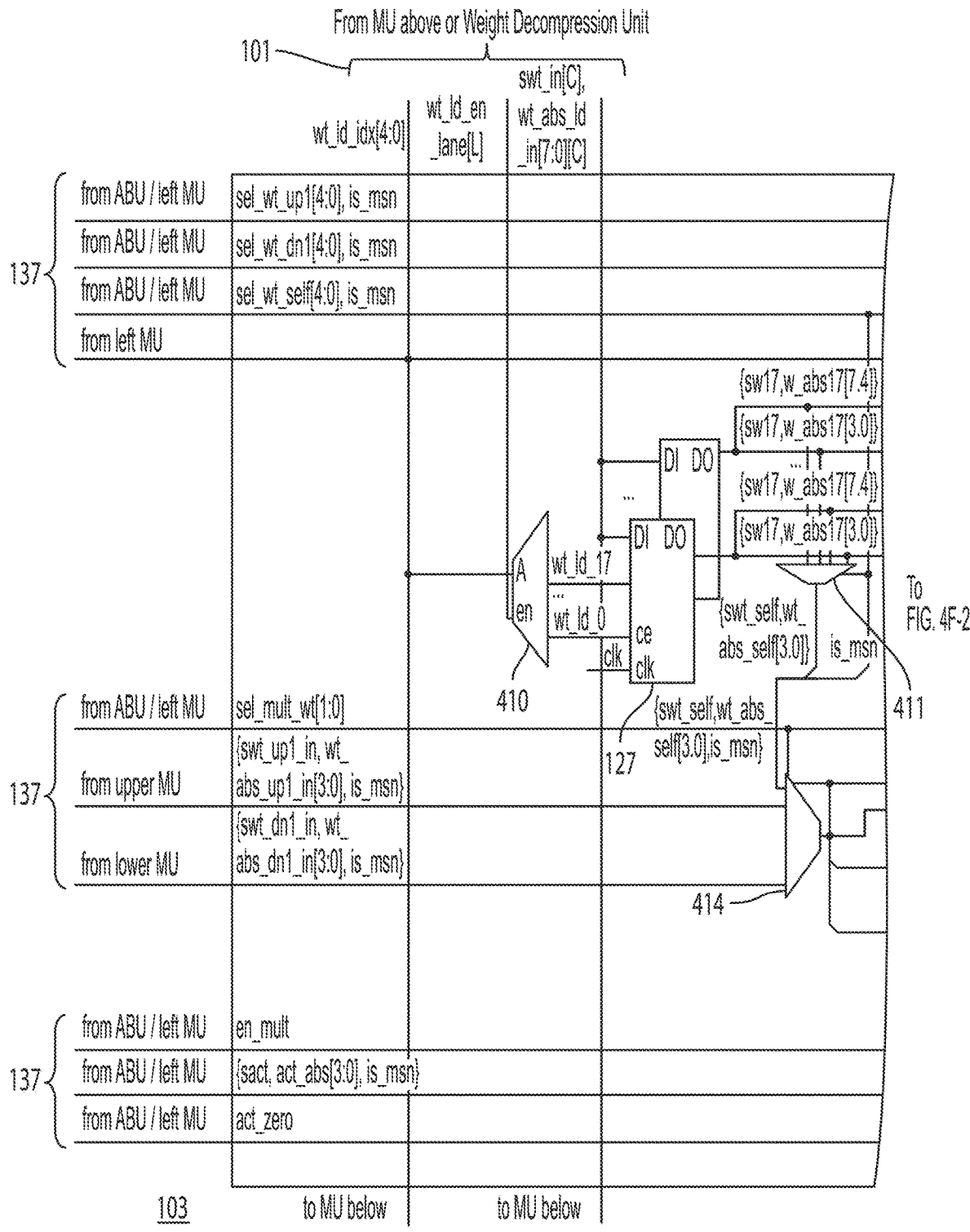
Figures 2, 4F:
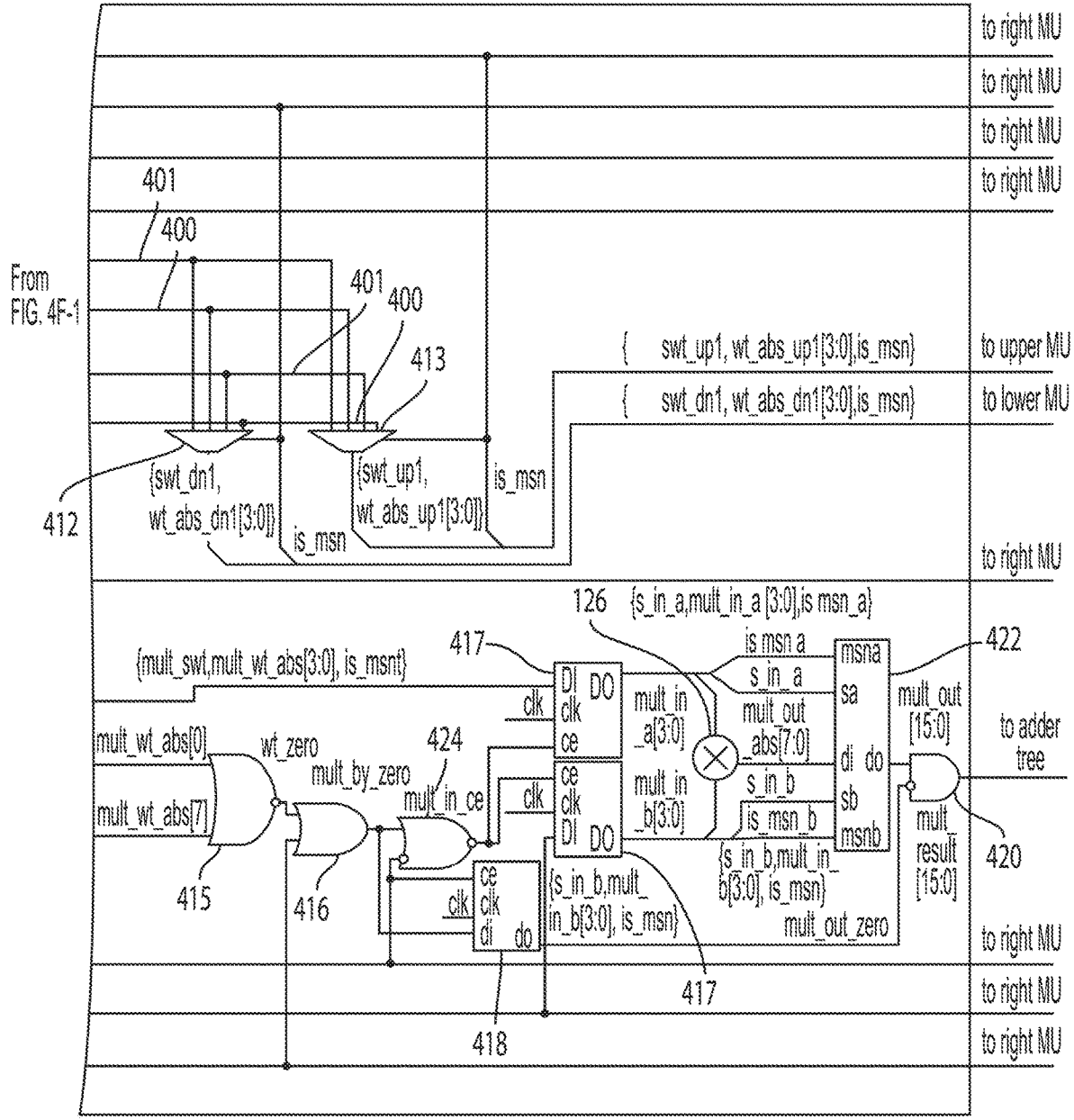

Lastly, FIG. 4F illustrates an embodiment of MU 103 operating on 4-bit activations as well as 4-bit weights. Note that the weight register file 127 still stores 18 8-bit weights, along with the weight's 1-bit sign. However, each stored weight is now logically split into MSN and LSN nibbles, e.g. {sw0, w_abs0[7:4]} and {sw0, w_abs0[3:0]}. Multiplexers 411, 412 and 413 each receive an additional address select bit is_msn, generated by ABU 141, indicating which weight nibble to fetch, and output 5-bit buses containing an uint4 weight nibble magnitude and the weight's sign: {swt_self, wt_abs_self[3:0]}, {swt_dn1, wt_abs_dn1[3:0]} and {swt_up1, wt_abs_up1[3:0]} respectively. Each is_msn signal gets associated with the corresponding bus to form buses {swt_self, wt_abs_self[3:0], is_msn}, {swt_dn1, wt_abs_dn1 [3:0], is_msn} and {swt_up1, wt_abs_up1 [3:0], is_msn} respectively. Via multiplexers 414 and input registers 417 these buses reach multipliers 126, which computes 4-bit-by-4-bit multiplications on mult_in_a[3:0] and mult_in_b[3:0] to obtain 8-bit unsigned, i.e. uint8, products mult_out_abs[7:0]. Unit 422 up-shifts the 8-bit unsigned product by 0, 4 or 8 bits and converts the up-shifted value into a signed result mult_out[15:0], e.g. int16. Unit 420 zeroes out the signed result and outputs mult_result[15:0] to adder trees.

It takes one clock cycle for MU 103 to multiply a 4-bit activation by a 4-bit weight. Multiplying an 8-bit activation by a 4-bit weight takes two clock cycles, where ABU 141 broadcasts, for example, the activation's LSN in the first clock cycle, then broadcasts the activation's MSN in the second clock cycle. Multiplier 126 multiplies both activation nibbles by same weight, while unit 422 up-shifts the product in the second clock by 4 bits. An ARU accumulator—via an adder tree—adds up products from these two clock cycles to obtain the correct multiplication result. Multiplying a 4-bit activation by an 8-bit weight also takes two clock cycles. In this case, ABU 141 keeps the activation unchanged during the two clock cycles, while multiplexers 411, 412 or 413 fetch, for example, the weight's LSN for multiplication during the first clock cycle and fetch that weight's MSN for multiplication during the second clock cycle. As multiplier 126 computes a product of 4-bit values in each of the two clock cycles, unit 422 up-shifts the second product by 4 bits and converts the up-shifted product to int16 signed format. Unit 422 converted the product computed in the first clock cycle to int16 signed format without up-shifting.

Multiplying an 8-bit activation by an 8-bit weight takes four clock cycles. ABU 141 broadcasts activation LSN during the first and second clock cycles and broadcasts activation MSN during the third and fourth clock cycles. Accordingly, multiplexers 411, 412 or 413 fetch the weight's LSN during the first and third clock cycle and fetch the weight's MSN during the second and the fourth clock cycles. As the multiplier 126 computes 8-bit an unsigned product in each of the four clock cycles, unit 422 up-shifts the 8-bit product in the first, second, third and fourth clock cycles by 0, 4, 4 and 8 bits respectively and converts each up-shifted result to a signed int16 two's complement value. Unit 420 zeros out the signed result mult_out[15:0] if the weight nibble or the activation nibble—or both—that were supposed to be multiplied in this clock cycle equal to zero. Unit 420 outputs its result mult_result[15:0] to an adder tree that works together with an accumulator to sum up mult_result[15:0] over these four clocks—as part of the dot product computation involving other MUs 103 in the MR column.

Figure 4G:
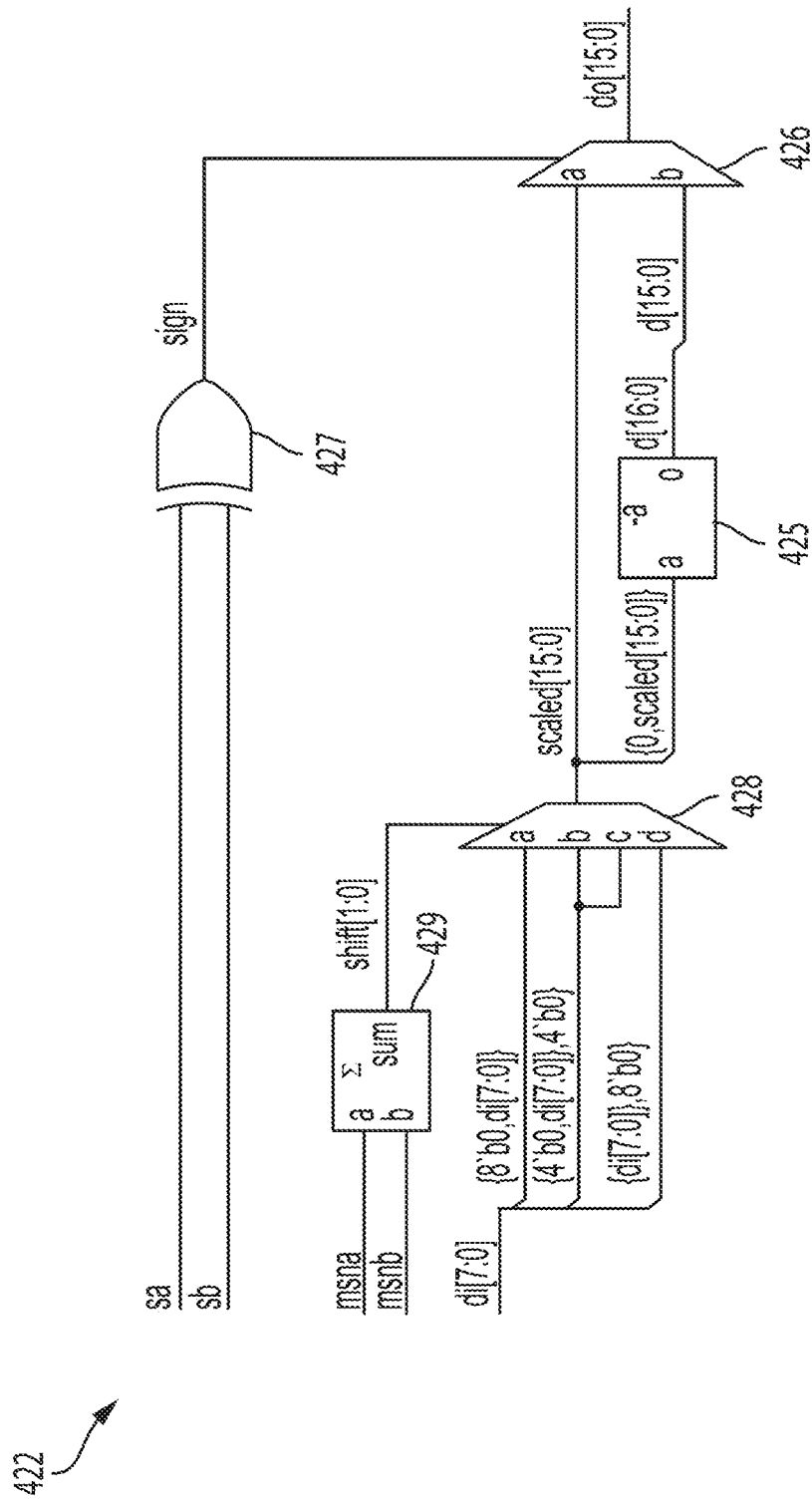
FIG. 4G illustrated micro-architecture of a multiplier unit module to compute the sign of the output result and convert the unsigned product into the signed two's complement format, where the multiplier has the bit width of 4-by-4.
Figure 4H:
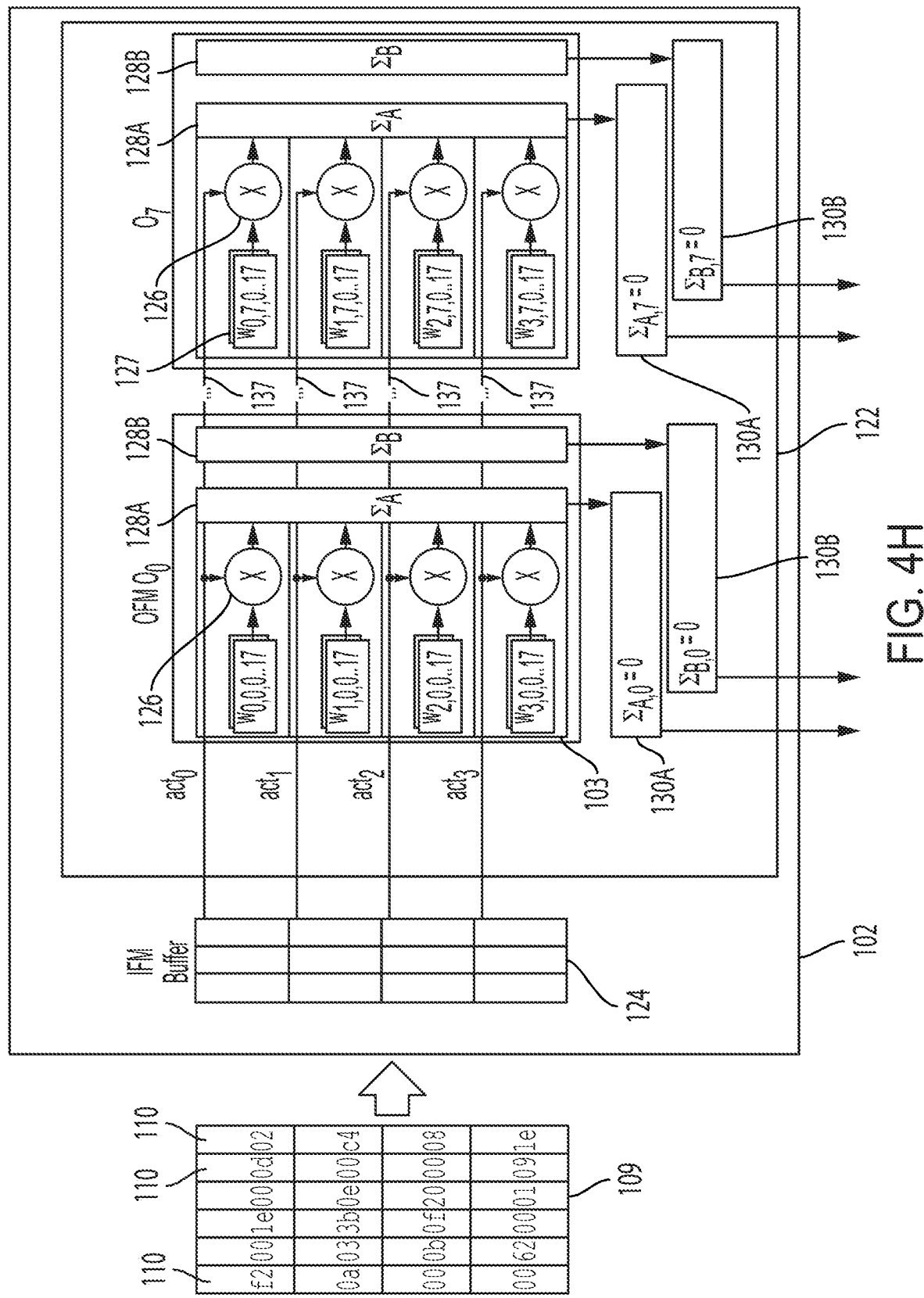
FIG. 4H illustrates an example of multiply-reduce tile operation using 8-bit activations and 8-bit weights, while using 8-by-4-bit multipliers.

FIG. 4G illustrates the micro-architecture of unit 420. Note that logic module 429 adds the two one-bit msn signals, one from weight and the other from the activation, to determine the amount of bits for up-shifting the unsigned result. When both msna and msnb are zero, i.e. a weight LSN is being multiplied by an activation LSN, the amount of up-shift is zero. When both msna and msnb are active, i.e. a weight MSB is being multiplied by an activation MSB, the amount of up-shift is 8 bits. In other cases, i.e. a weight MSB is being multiplied by an activation LSB or a weight LSB is being multiplied by an activation MSB, the amount of up-shift is 4 bits.

Figure 4I:
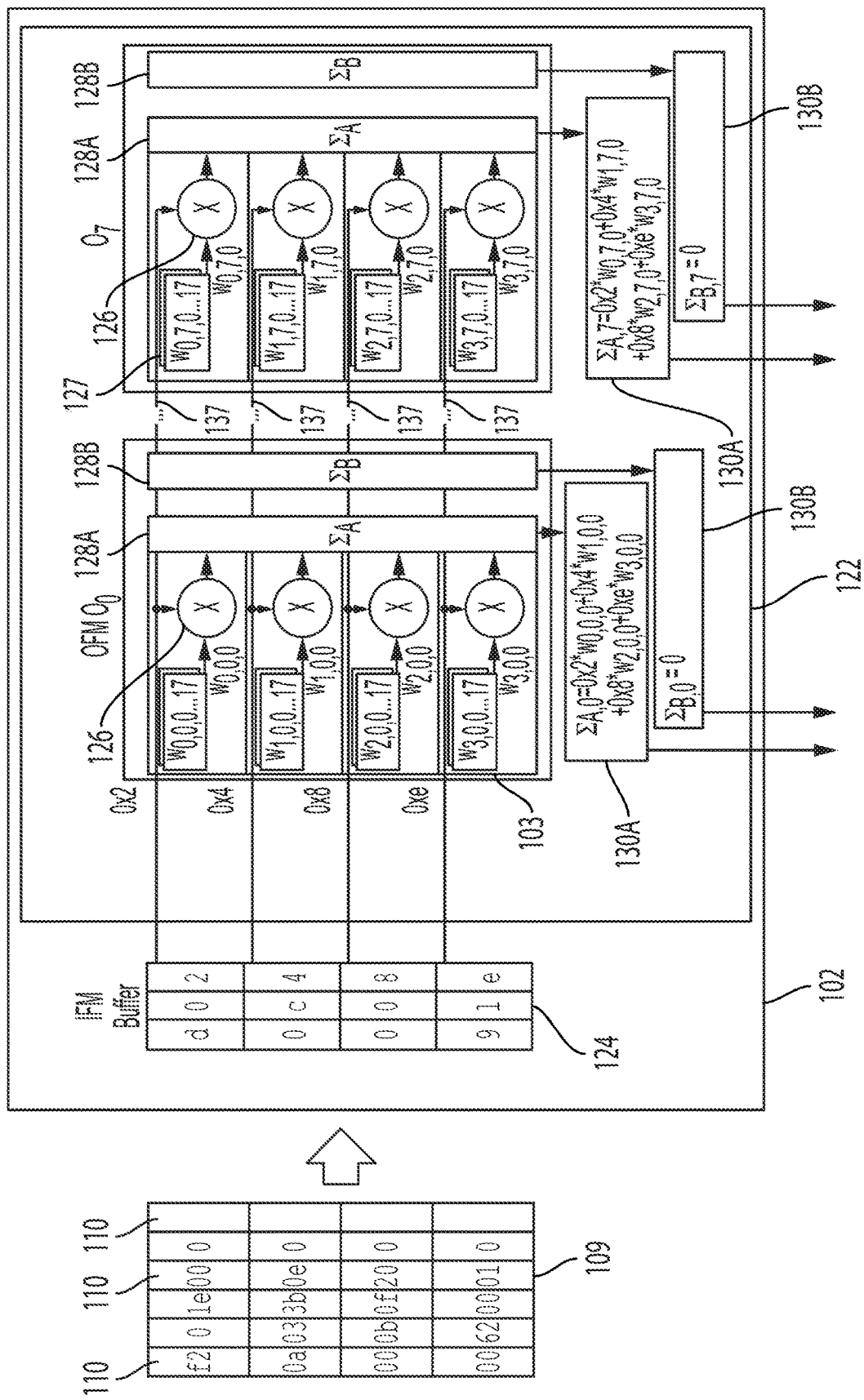
FIG. 4I illustrates an example of multiply-reduce tile operation using 8-bit activations and 8-bit weights, while using 8-by-4-bit multipliers.

FIGS. 4H through 4K illustrate MR tile 102 operation using 8-bit activations and 8-bit weights, while using 8-by-4-bit multipliers 126, not 8-by-8-bit multipliers. Similar to the baseline implementation of the '610 application, illustrated in FIGS. 1C through 1F, 8-bit IFM slices 110 arrive from SRAM 109 into an activations buffer, or "IFM buffer" 124 (which operates as a plurality of parallel queues). However, referring to FIG. 4I, IFM buffer 124 has nibble granularity. For example, the first (rightmost) IFM slice in FIG. 4H contains data {0x02, 0xc4, 0x08, 0x1e}. Referring to FIG. 4I, this IFM slice gets splits into its LSN and MSN parts as {0x2, 0x4, 0x8, 0xe} and {0x0, 0xc, 0x0, 0x1} correspondingly. The LSN IFM slice is fetched to the front (rightmost) slot of the IFM buffer 124, while the MSN IFM slice is fetched in to the second (middle) slot of IFM buffer 124. Also, the MSN portion {0xd, 0x0, 0x0, 0x9} of the second IFM slice {0x0d, 0x00, 0x00, 0x09} moves into the third (leftmost) slot of IFM buffer 124. Correspondingly, all activation lanes 137 have bit width of 4, as opposed to bit width of 8 in the baseline '610 application.

FIG. 4I illustrates MSN IFM slice {0x02, 0xc4, 0x08, 0x1e} from the front slot of IFM buffer 124 being broadcast to MR array 122. As 4-by-8-bit multipliers 126 compute activation-and-weight products, adder trees 128 sum up these products, into dot products $\Sigma_{A,c}=0x2*w_{0,c,0}+0x4*w_{1,c,0}+0x8*w_{2,c,0}+0xe*w_{3,c,0}$ column-wise, for OFM column index c ranging from 0 to 7.

Figure 4J:
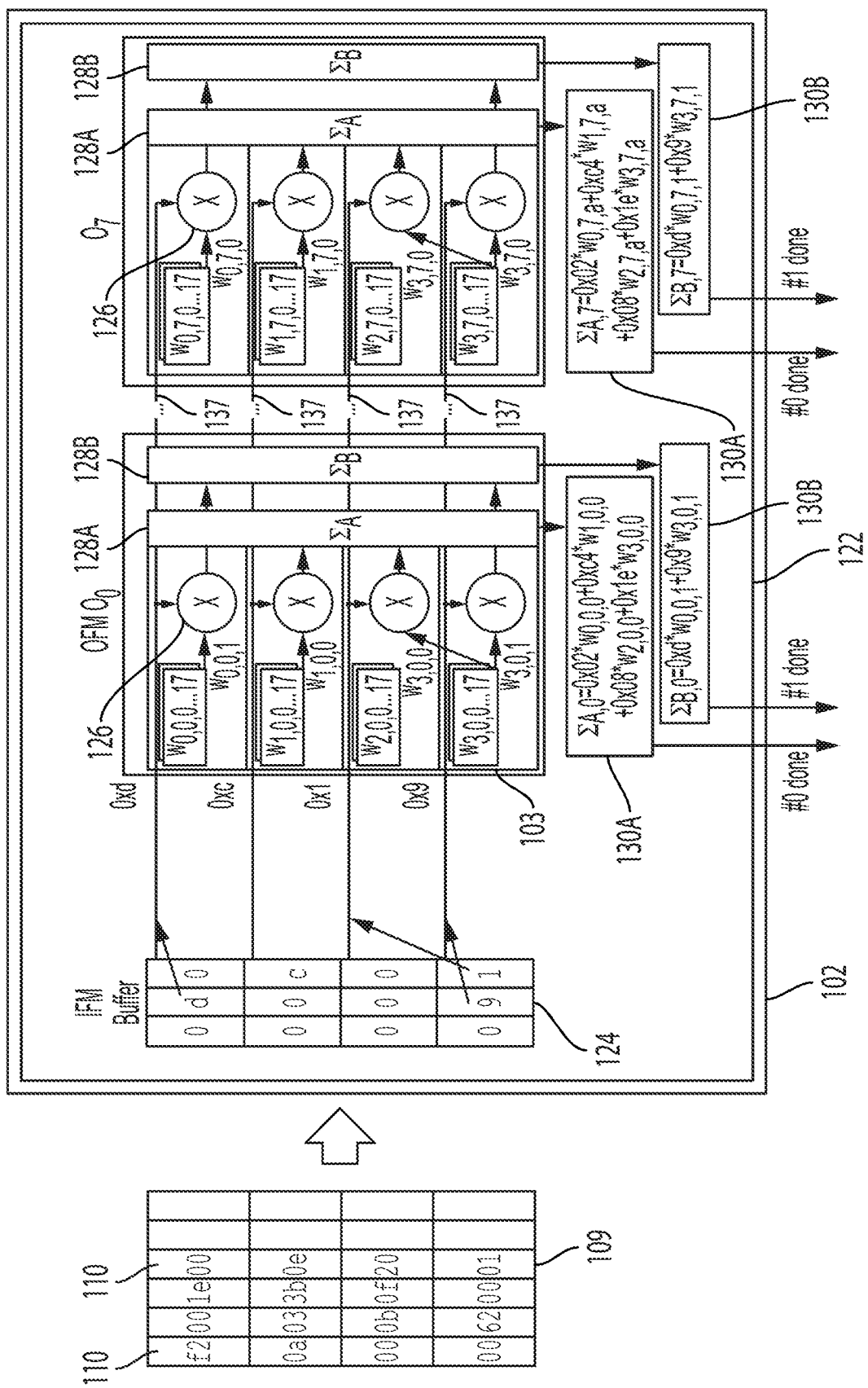
FIG. 4J illustrates an example of multiply-reduce tile operation using 8-bit activations and 8-bit weights, while using 8-by-4-bit multipliers.

Referring to FIG. 4J, with the MSN IFM slice {0x02, 0xc4, 0x08, 0x1e} removed from IFM buffer 124, the nibble IFM slices {0x0, 0xc, 0x0, 0x1} and {0xd, 0x0, 0x0, 0x9} each advance one slot right in the IFM buffer 124. Now LSN IFM slice {0x0, 0xc, 0x0, 0x1} occupies the front slot, MSN IFM slice {0xd, 0x0, 0x0, 0x9} occupies the second slot and IFM LSN slice {0x0, 0x0, 0x0, 0x0} moves into IFM buffer's 124 last slot. At this point ABU uses look-ahead and look-aside to advance non-zero activation nibbles out of order. More specifically, nibble 0xd from the second slot in the upper activation lane gets broadcast over activation lane 0. Also, nibble 0x1 from the front slot in activation lane 3 gets broadcast over activation lane 2. Lastly, nibble 0x9 from the second slot in the IFM buffer 124, in activation lane 3, gets broadcast over activation lane 3. As a result, the MR array 122 is now computing dot products for two IFM nibble slices simultaneously, i.e. for IFM nibble slice {0x0, 0xc, 0x0, 0x1} and IFM nibble slice {0xd, 0x0, 0x0, 0x9}. Adder trees 128A and accumulators 130A combine dot products associated with LSN and MSN IFM slices {0x02, 0xc4, 0x08, 0x1e} {0x0, 0xc, 0x0, 0x1} into the final dot product $\Sigma_{A,c}=0x02*w_{0,c,0}+0xc4*w_{1,c,0}+0x08*w_{2,c,0}+0x1e*w_{3,c,0}$. Simultaneously, adder trees 128B and accumulators 130B compute dot product for MSN IFM slice {0xd, 0x0, 0x0, 0x9}. Note that since the corresponding LSN IFM slice—stored in the third slot of IFM buffer 124—has all zero values, this all-zero MSN IFM slice can be discarded. Therefore, dot product results in accumulators 130B are now also final, equal to $\Sigma_{B,c}=0xd*w_{0,c,1}+0x9*w_{3,c,1}$, and MR tile 102 has computed two OFM slices in one clock cycle.

Figure 4K:
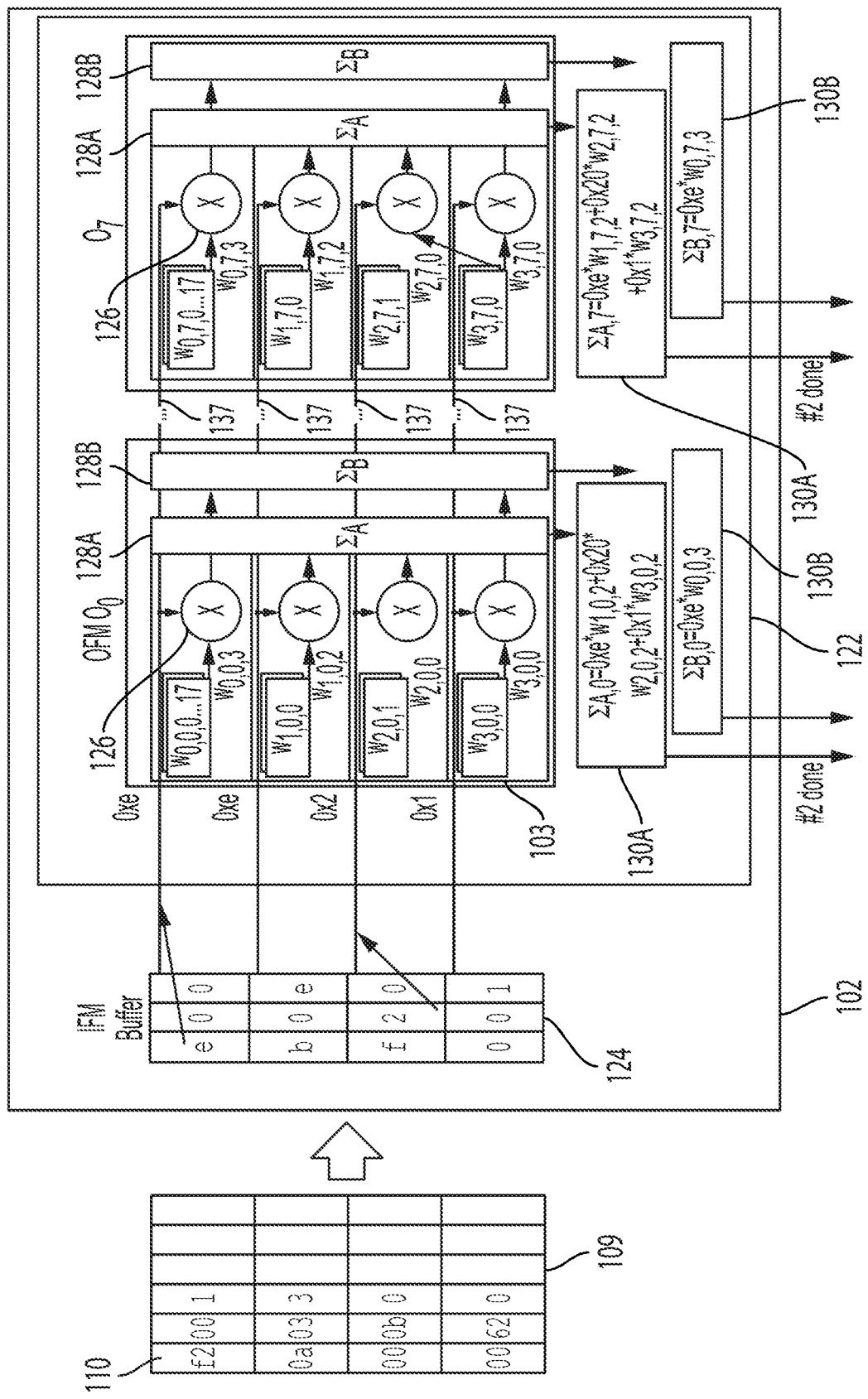
FIG. 4K illustrates an example of multiply-reduce tile operation using 8-bit activations and 8-bit weights, while using 8-by-4-bit multipliers.

FIG. 4K illustrates the next step in convolution computation, where IFM buffer 124 is filled with three next IFM nibble slices, nibbles in lane 0 slot 2 and lane 2 slot 1 get broadcast to MR array 122 out-of-order, adder trees 128A and accumulators 130A finish computing the dot product associated with the 8-bit IFM slice {0x00, 0x0e, 0x20, 0x01} and adder trees 128B and accumulators 130B have calculated the dot product for the MSN part of the 8-bit IFM slice {0x1e, 0x3b, 0x0f, 0x00}. This process continues, as described in the '610 application, until convolution at each location is finished.

Note that instead of using 8-bit IFM slices and splitting those 8-bit IFM slices into pairs of 4-bit, i.e. nibble-width, IFM slices, SRAM 109 (and IFM cache 139) can contain 4-bit activation, e.g. in uint4 or int4 formats. Therefore, NPU 100 as shown in FIGS. 4H through 4K can operate on 4-bit activations.

NPU operation as illustrated in FIGS. 4H through 4K can also utilize 4-by-4-bit multipliers 126 to multiply 8-bit weights by 8-bit or 4-bit activations by splitting 8-bit weight registers into pairs of nibble-width weights, and taking two clock cycles to multiply each nibble-width activation by the associated 8-bit weight. NPU operation as illustrated in FIGS. 4H through 4K also can also utilize 4-by-4-bit multipliers 126 to multiply 4-bit weights by 4-bit (or 8-bit) activations by splitting 8-bit weight registers into pairs of nibble-width weights, and taking one clock cycle to multiply each nibble-width activation by the associated nibble-width weight.

Besides skipping zero-value nibble activations, NPU can also skip zero-value weights, including zero-valued nibble weights. For example, when nibble weights in all 16 lanes— or all 4 lanes in each quad when quads operate independently from each other—associated with the activations being broadcast happen to be zero, the multiplication by zero-valued nibble in all lanes can be skipped. Since weights in trained deep learning models tend to have small values, there may be considerable chances of all current weight most-significant nibbles in all lanes—especially in independent quads—to be zero.

The increase in MR tile computation throughput due to zero activation skipping depends on how many activations have zero values—and also depends on how those zero values are distributed in IFM slices. For example, let's imagine IFM slices having all values in depth channels 0 through 7 equal to zero, while values in depth channels 8 through 15 contain only non-zero values. A 2-slot-deep IFM buffer 124 with look-ahead distance of two and look-aside distance of one, such as one shown in FIG. 1I, will not be able to spread out non-zero values over to zero-valued depth channels. Therefore, computation throughput will not increase despite IFM tensor 200 being 50% sparse. Increasing the look-ahead and look-aside distances may help increase throughput, however, this may require IFM buffer 124 to have more slots and cells 161 in each slot use multiplexers 163 having more inputs. Also, increasing the look-aside distance would require weight register files 127 have additional read ports, i.e. additional multiplexers analogous to units 411, 412 and 413 and connections to multiplier units 103 several rows up and/or down from each MU 103. This considerable increase in the amount of logic and connectivity may translate in a considerable increase in silicon area and power, not commensurate with the resulting increase in computation throughput.

Figures 1, 5A:
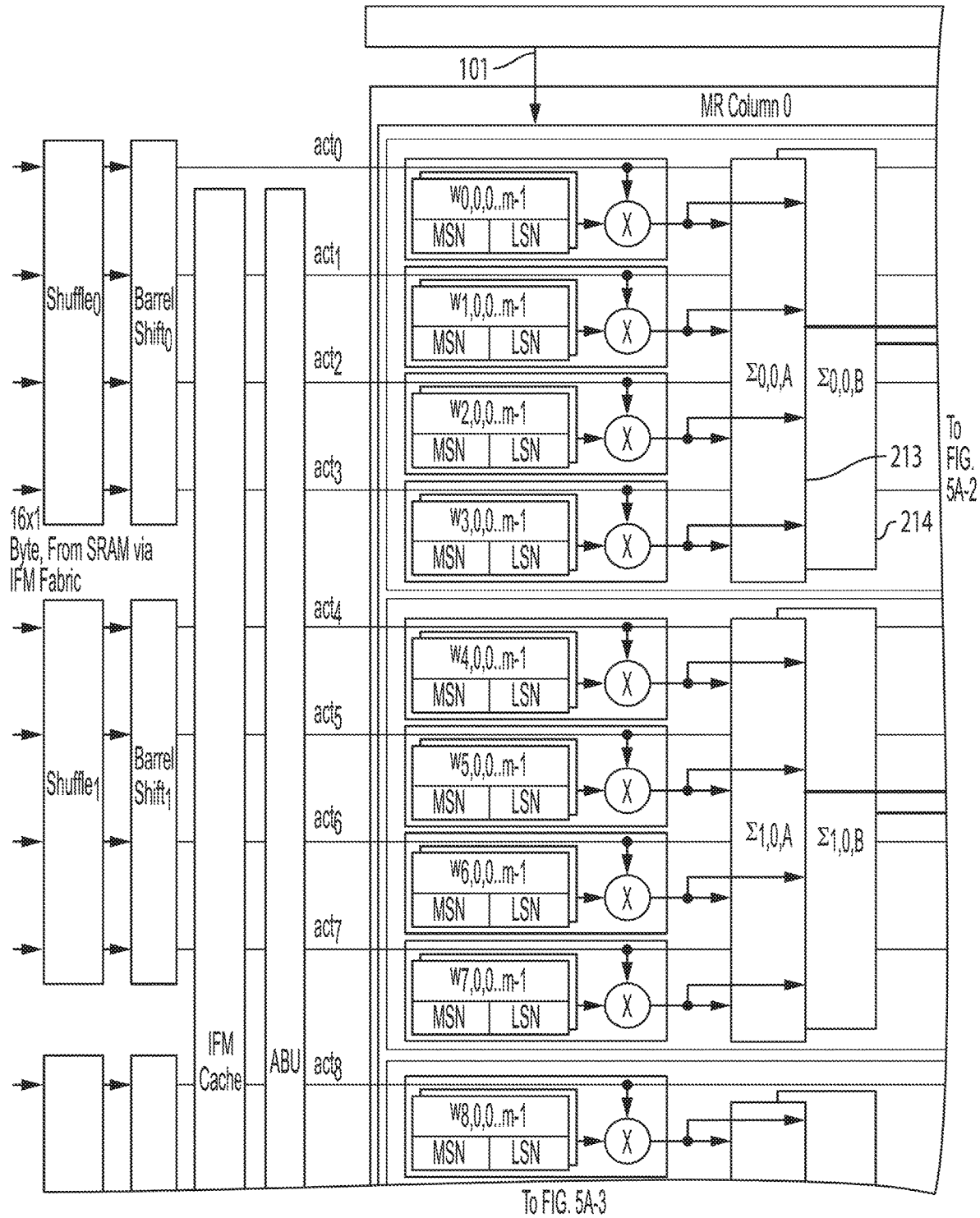
Figures 2, 5A:
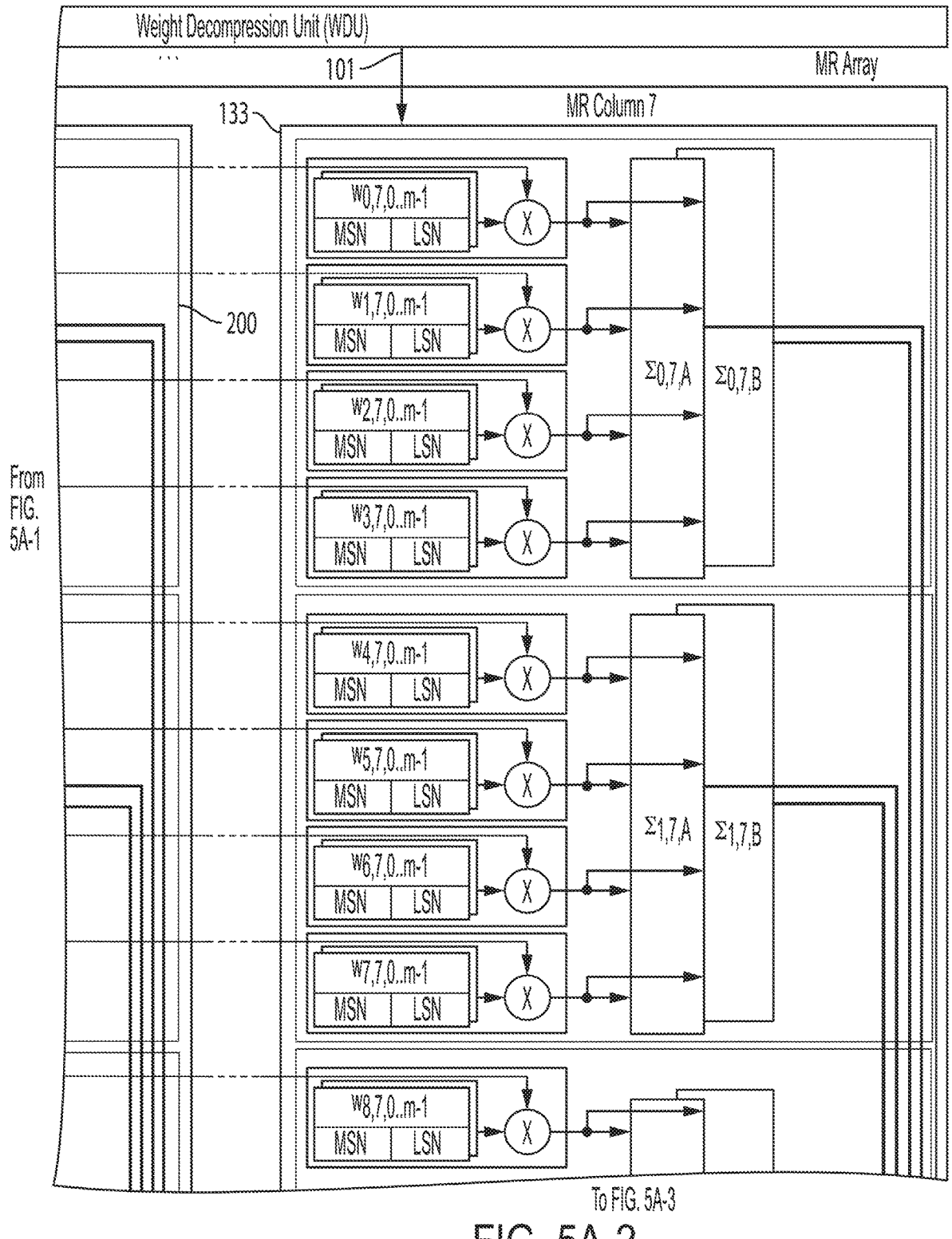
Figures 3, 5A:
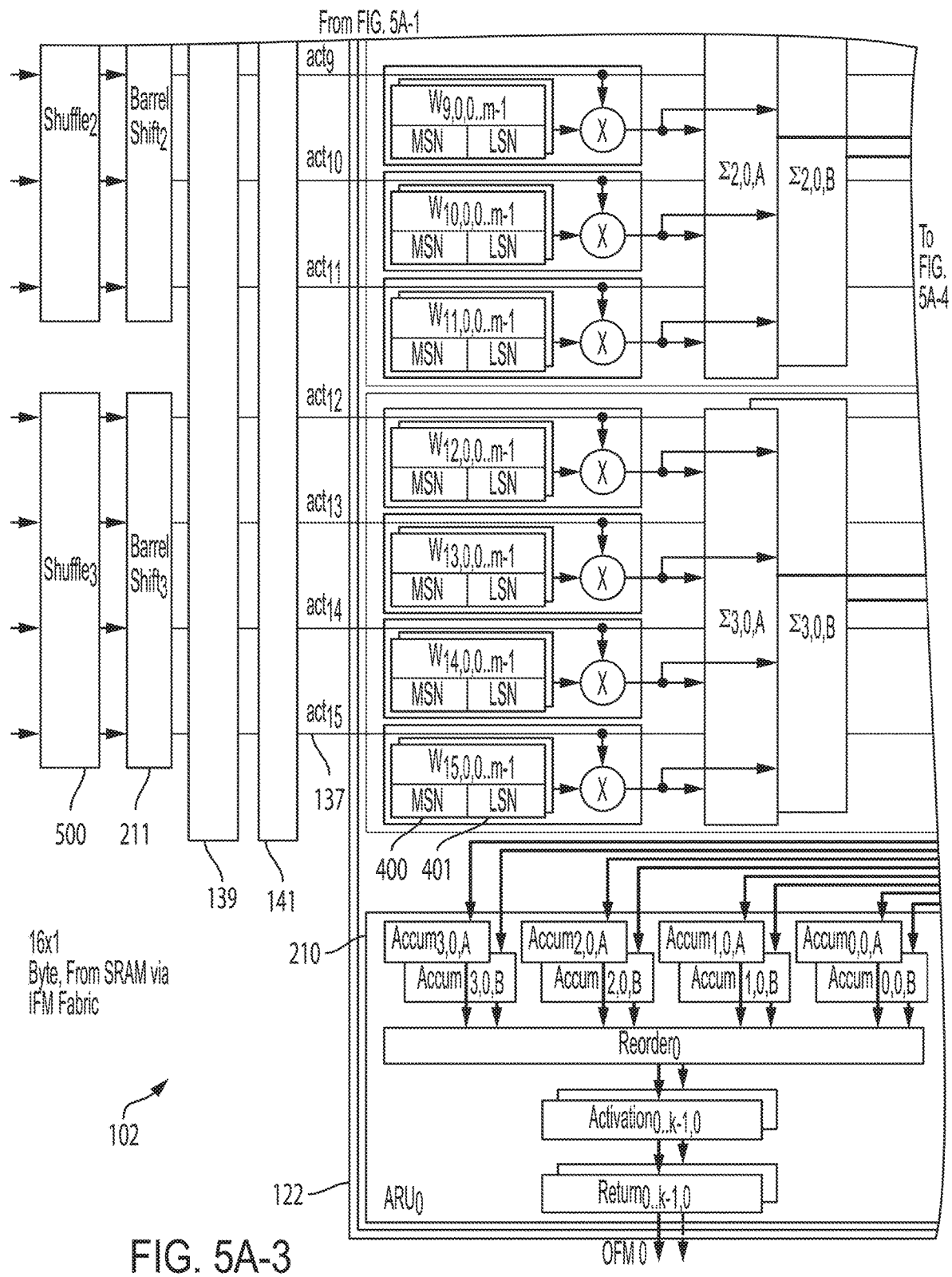
Figures 4, 5A:
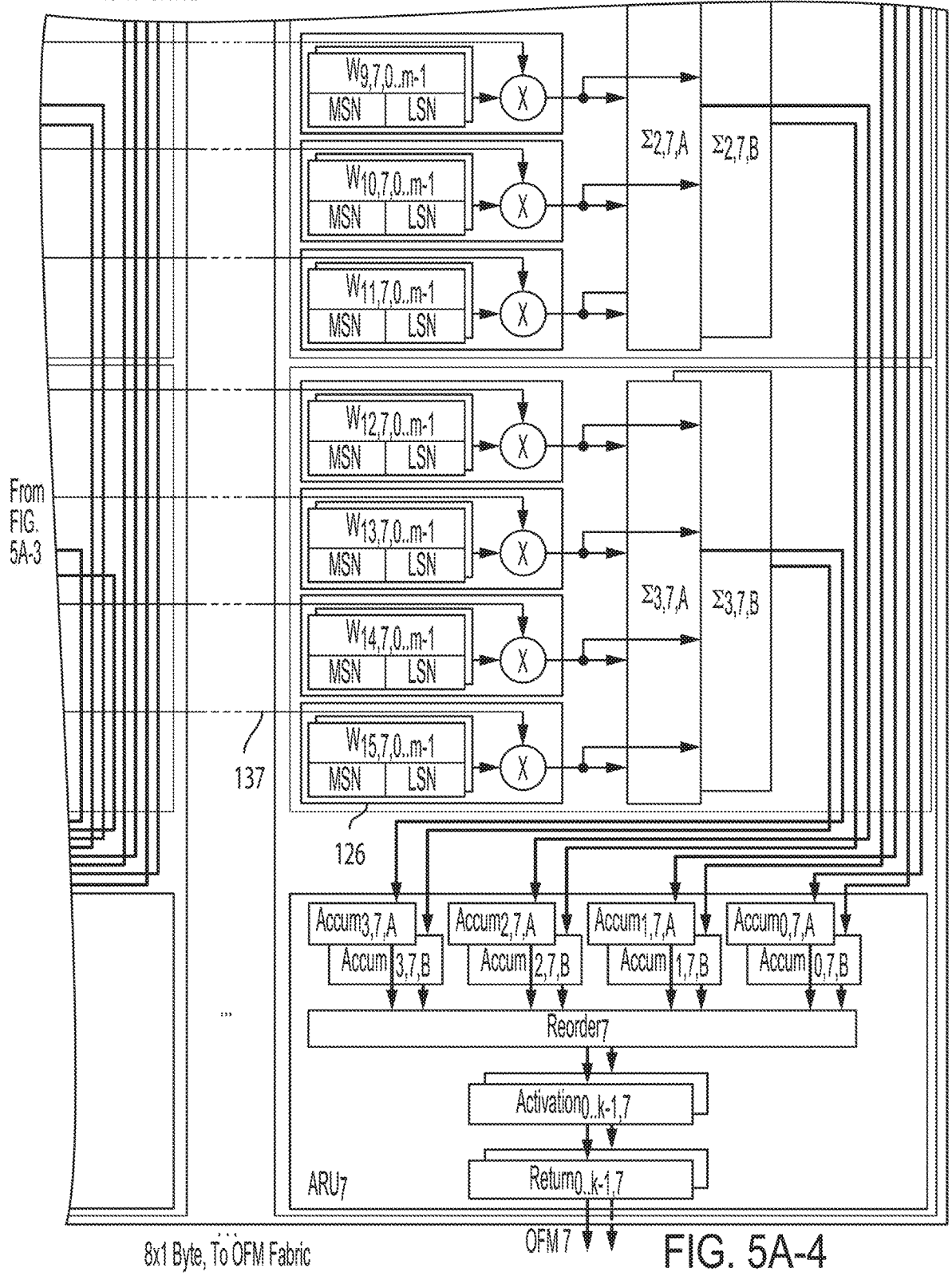
Figure 5B:
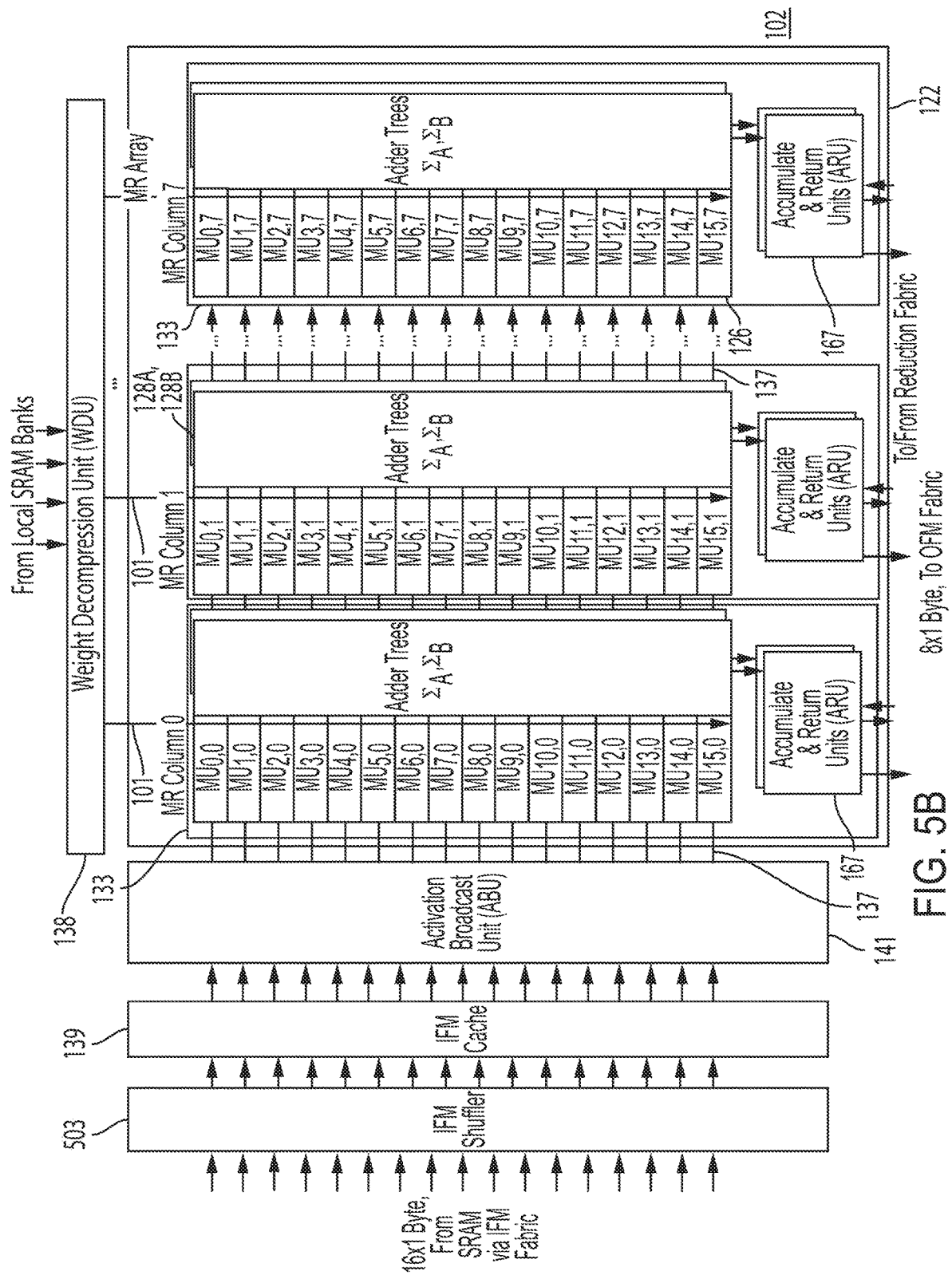
FIG. 5B illustrates a 16-lane IFM shuffler unit added to the baseline embodiment of multiply-reduce tile.

FIG. 5A shows a better way to increase computation throughput. Compared to FIG. 4A, FIG. 5A adds one 4-lane shuffle unit 500 per each lane quad between IFM delivery fabric 104 and barrel shift units 211. Similarly, in the case of general direct convolution, as described in the '610 application and shown in FIG. 1B, FIG. 5B adds a 16-lane IFM shuffler unit 503 positioned between IFM delivery fabric 104 and IFM cache 139.

The purpose of the shuffling units 500 and 503 is to permute the order of values within each incoming IFM slice in a pseudo-random fashion. For example, values in IFM slice {0, 1, 2, 3, 4, 5, 6, 7, 8, 9, 10, 11, 12, 13, 14, 15} can be pseudo-randomly shuffled (permuted) to become {9, 7, 3, 15, 0, 6, 7, 10, 1, 2, 5, 12, 4, 13, 14, 8}. This reordering acts to spread out non-zero values across all IFM activation lanes more evenly, i.e. equally probable to be present in each of the 16 activation lanes. Once zero and non-zero values are spread out evenly within IFM slices—as well as from one IFM slice to the next—zero activation skipping logic can increase computation throughput with the look-aside distance kept at one—or even set to zero to reduce the silicon area.

Note that weights in weight register files must be permuted—offline, before loading into weight register files—in same order as the activations. In other words, if shuffler 500 or 503 moves activation A within IFM slice 110 from lane X to lane Y, weights associated (to be multiplied) with activation A—that would be pre-loaded in multiplier units in lane X in the absence of shuffling—must now be pre-loaded into multiplier units in lane Y.

Figure 5C:
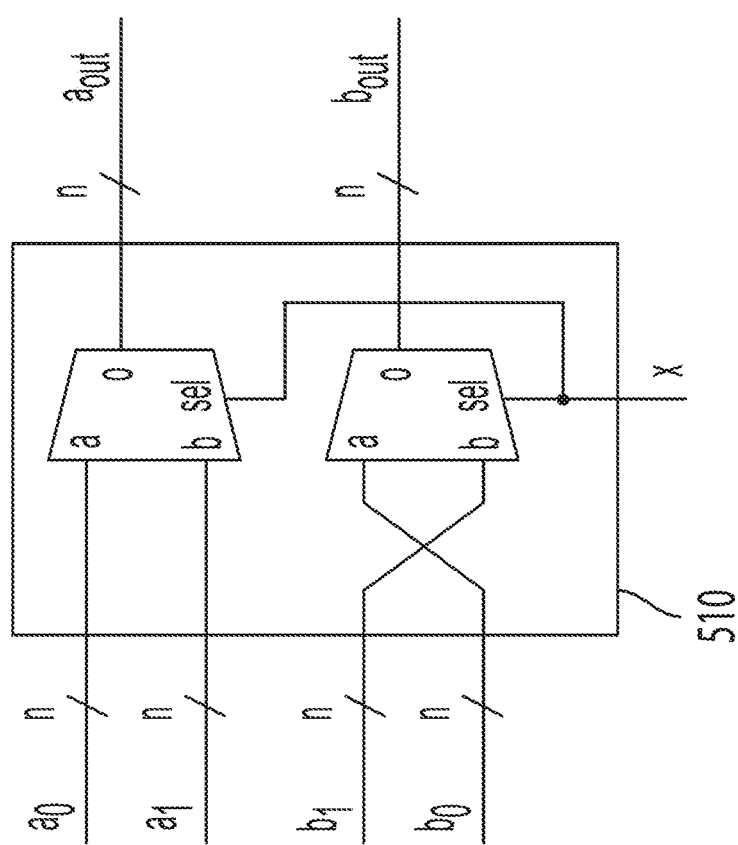
FIG. 5C shows a block diagram of a basic building block that makes up a butterfly shuffler.
Figure 5D:
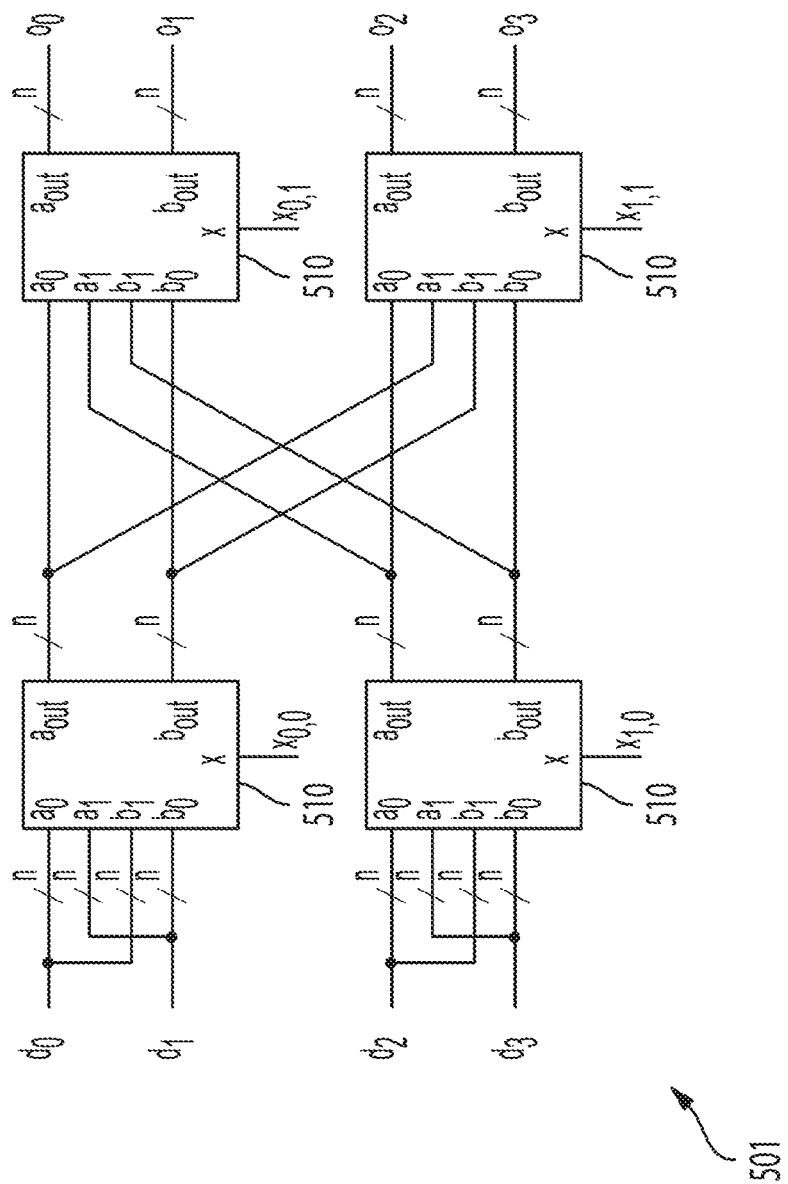
FIG. 5D shows a block diagram of a 4-channel butterfly shuffler.
Figure 5E:
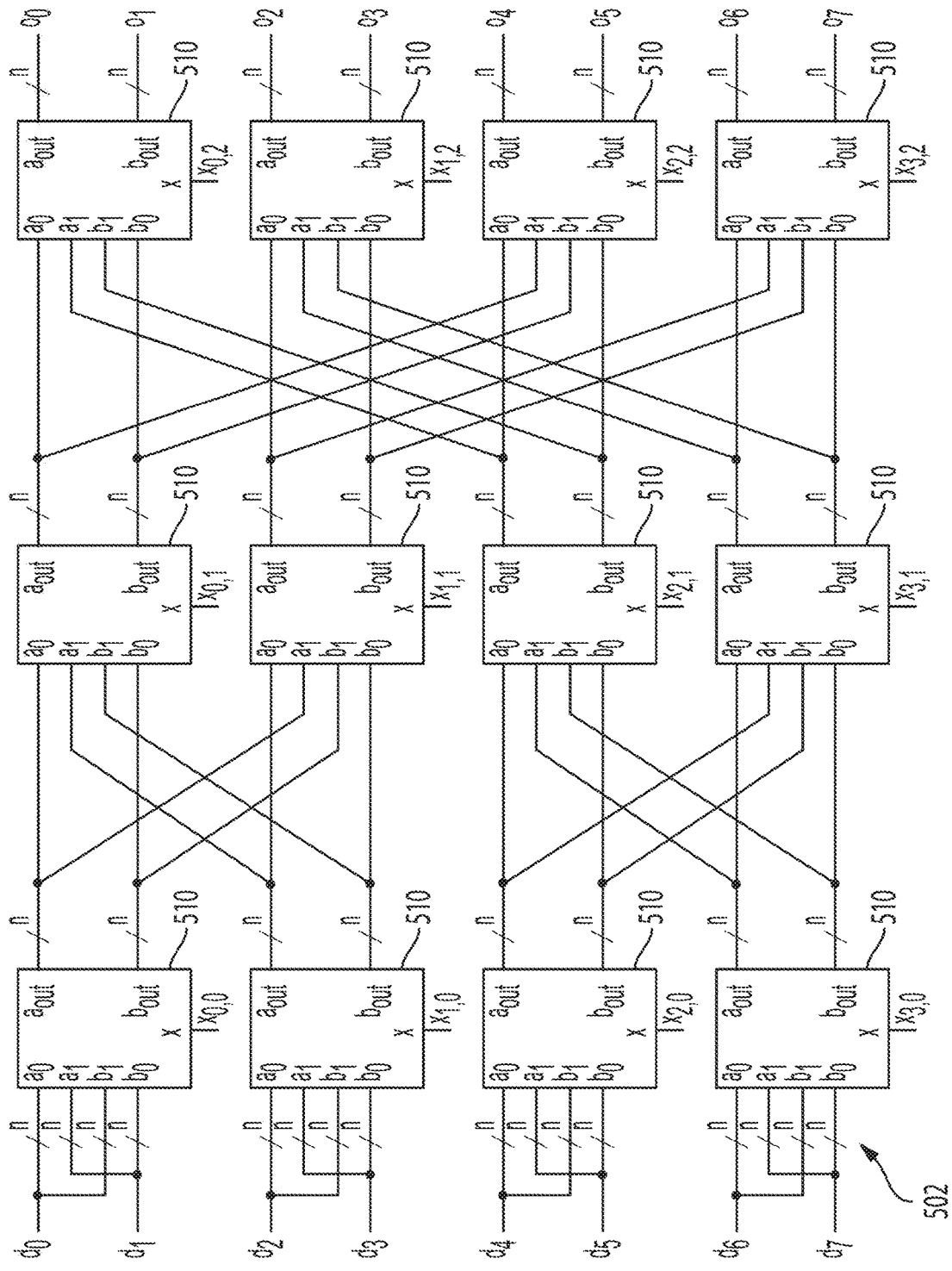
FIG. 5E shows a block diagram of an 8-channel butterfly shuffler.
Figures 1, 5F:
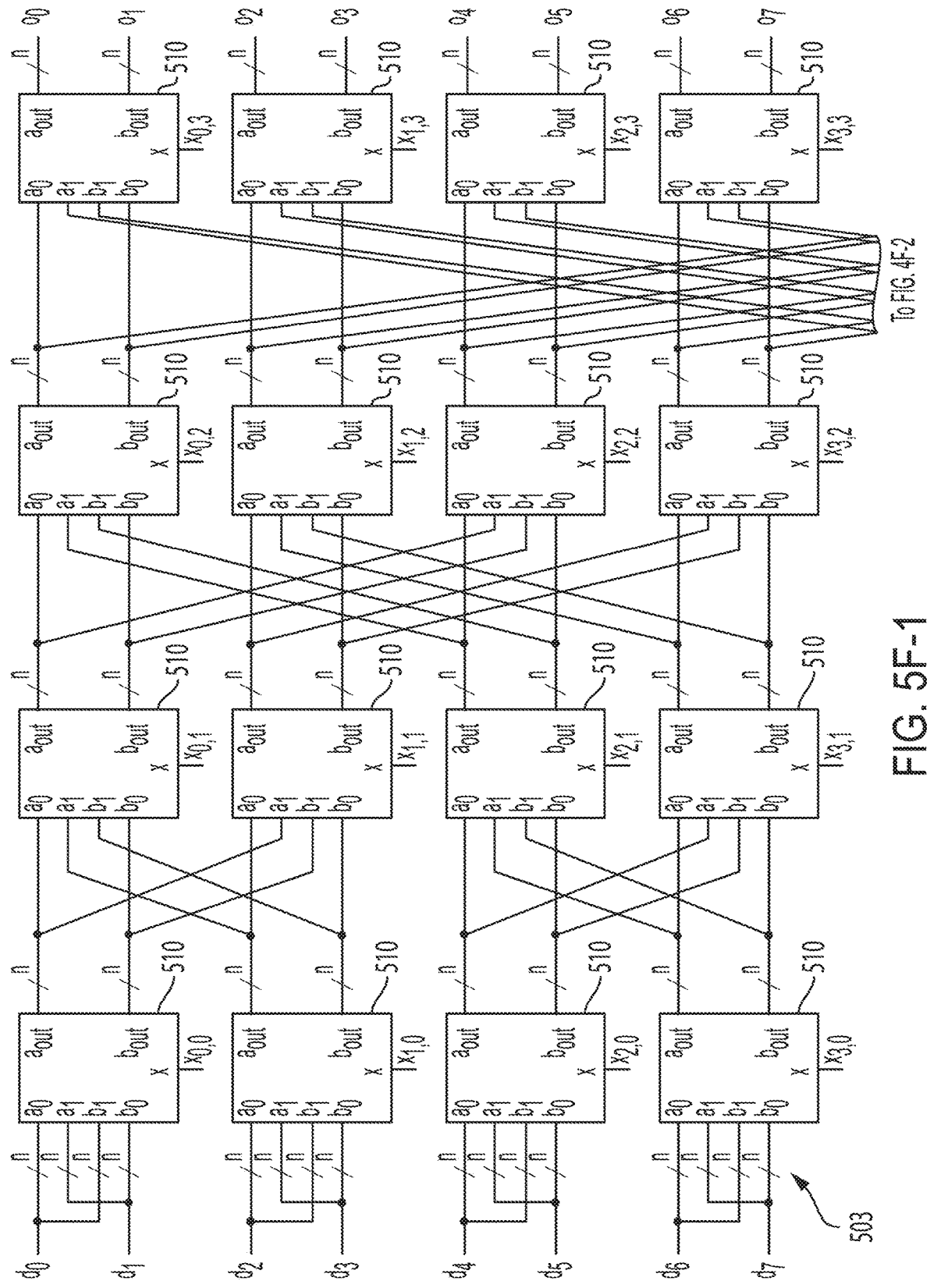
Figures 2, 5F:
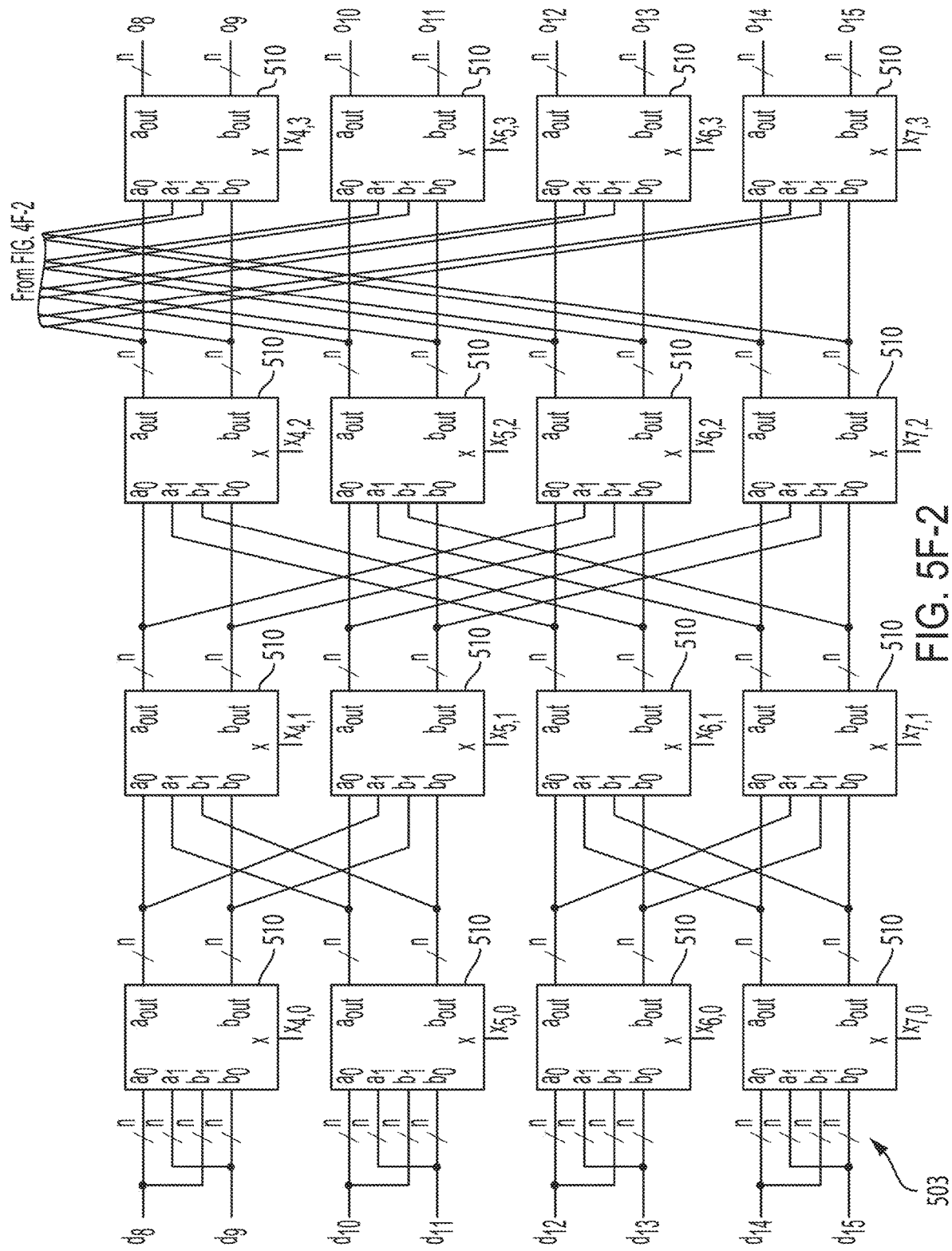
Figure 5G:
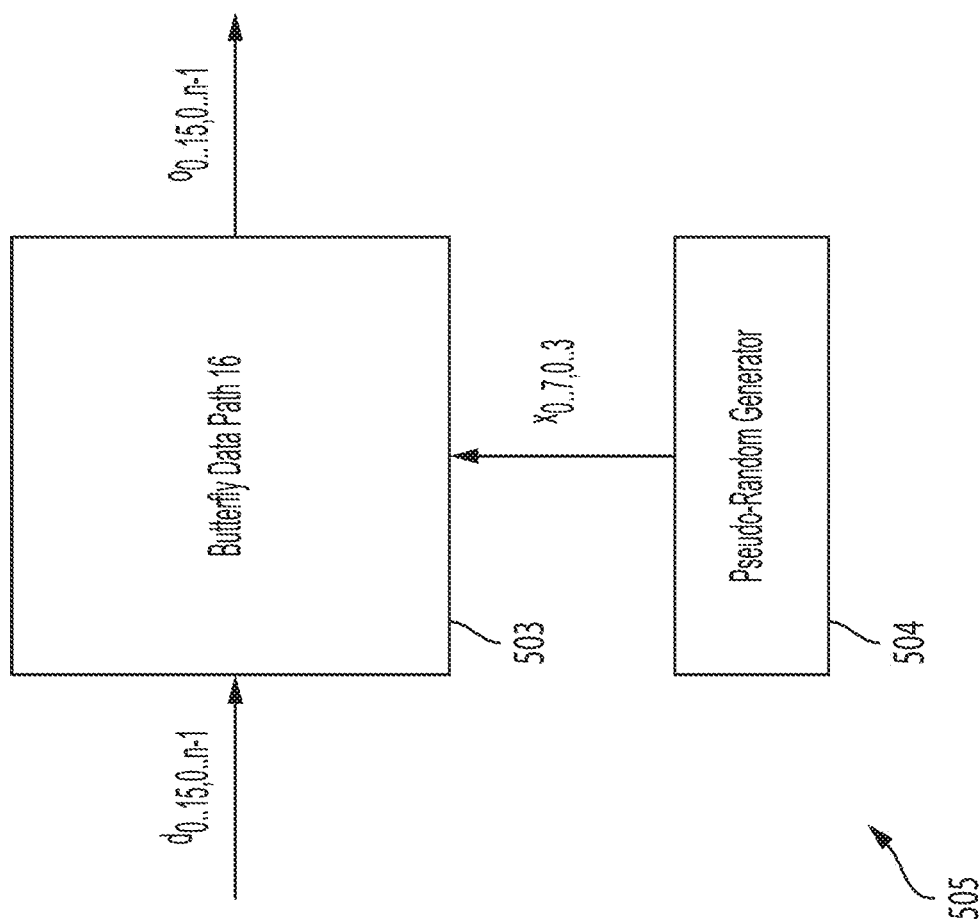
FIG. 5G shows a block diagram of a pseudo-random generator driving control signals of a butterfly shuffler.

A shuffling unit with a large number of inputs, such as module 503, can have a prohibitively large area if implemented as an all-to-all switch. FIGS. 5C through 5G illustrate a more economical embodiment of modules 500 and 503 that makes use of butterfly shuffler. FIG. 5C shows a basic building block 510 that makes up a butterfly shuffler. FIG. 5D shows a 4-channel butterfly shuffler that permutes input values $\{d_0, d_1, d_2, d_3\}$ to output $\{o_0, o_1, o_2, o_3\}$. Note that signals $X_{0 \ldots 1, 0 \ldots 1}$ select the permutation to apply. FIGS. 5E and 5F additionally show butterfly shufflers having 8 and 16 channels respectively. The number of permutations available for a butterfly shuffler having $2^N$ channels is $2^{\wedge}(N*2^{N-1})$. Lastly, FIG. 5G illustrates a pseudo-random generator 504 driving control signals X to permute values of the input vector d and output the resulting vector o.

Figures 1, 6:
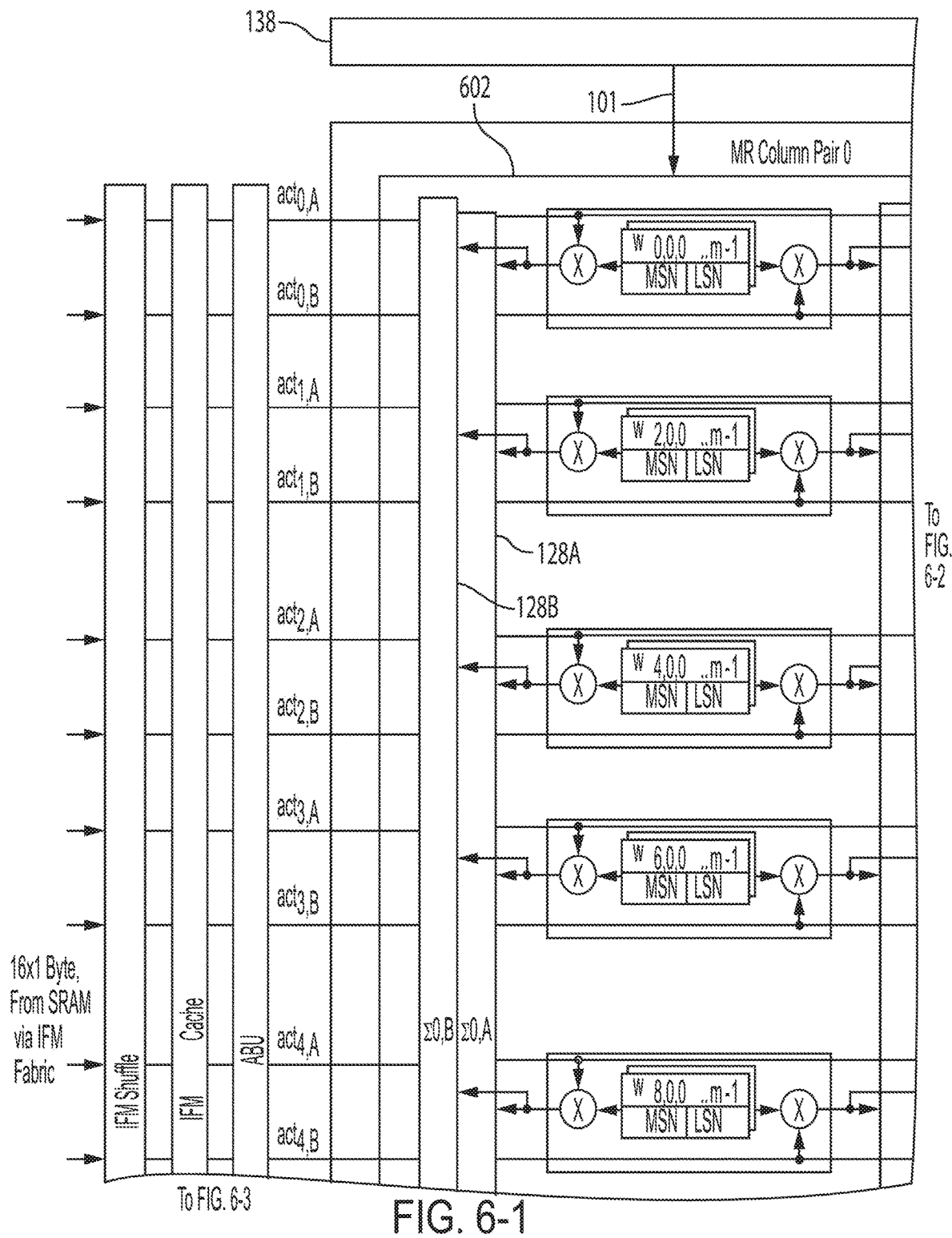
Figures 2, 6:
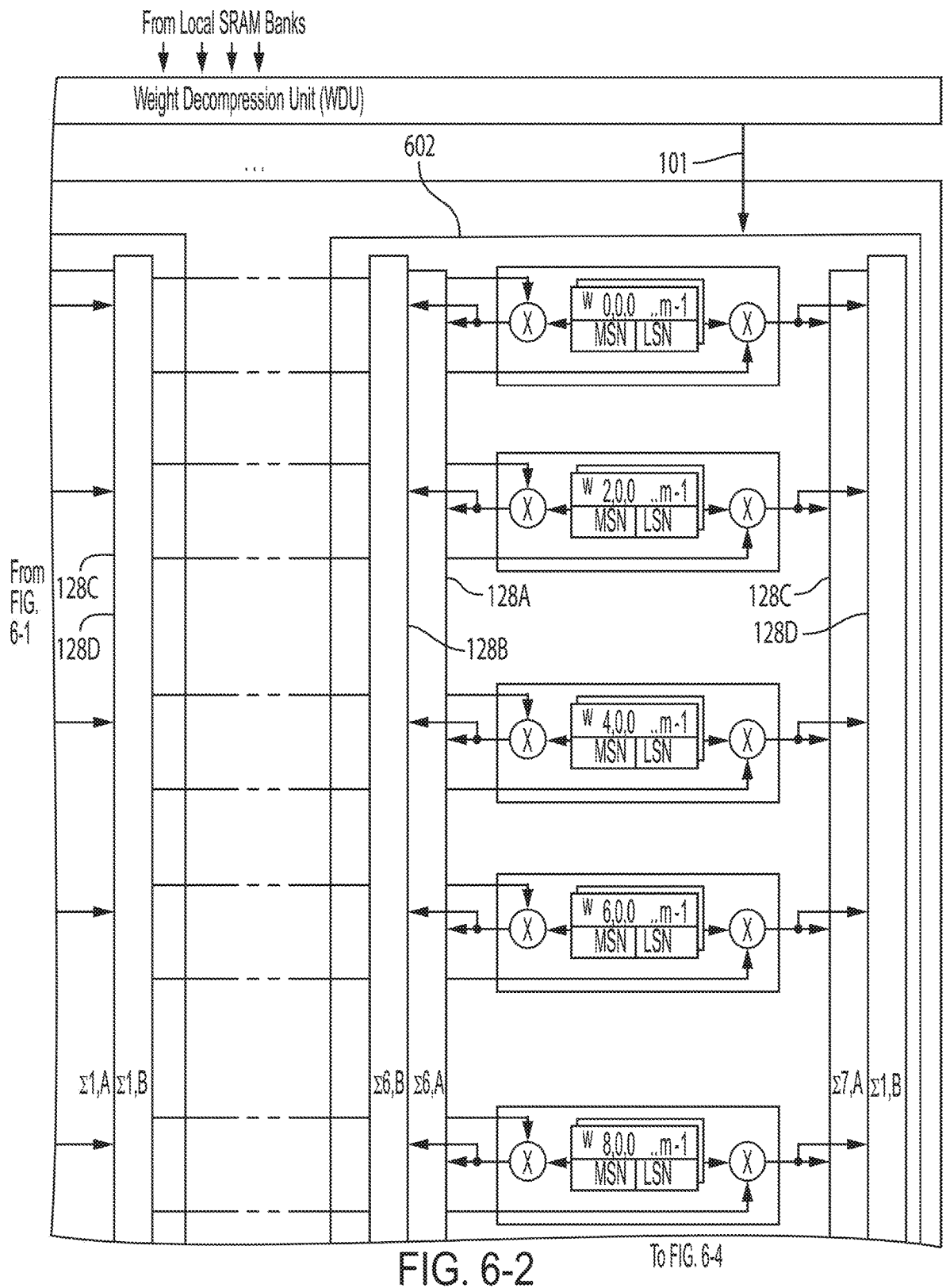
Figures 3, 6:
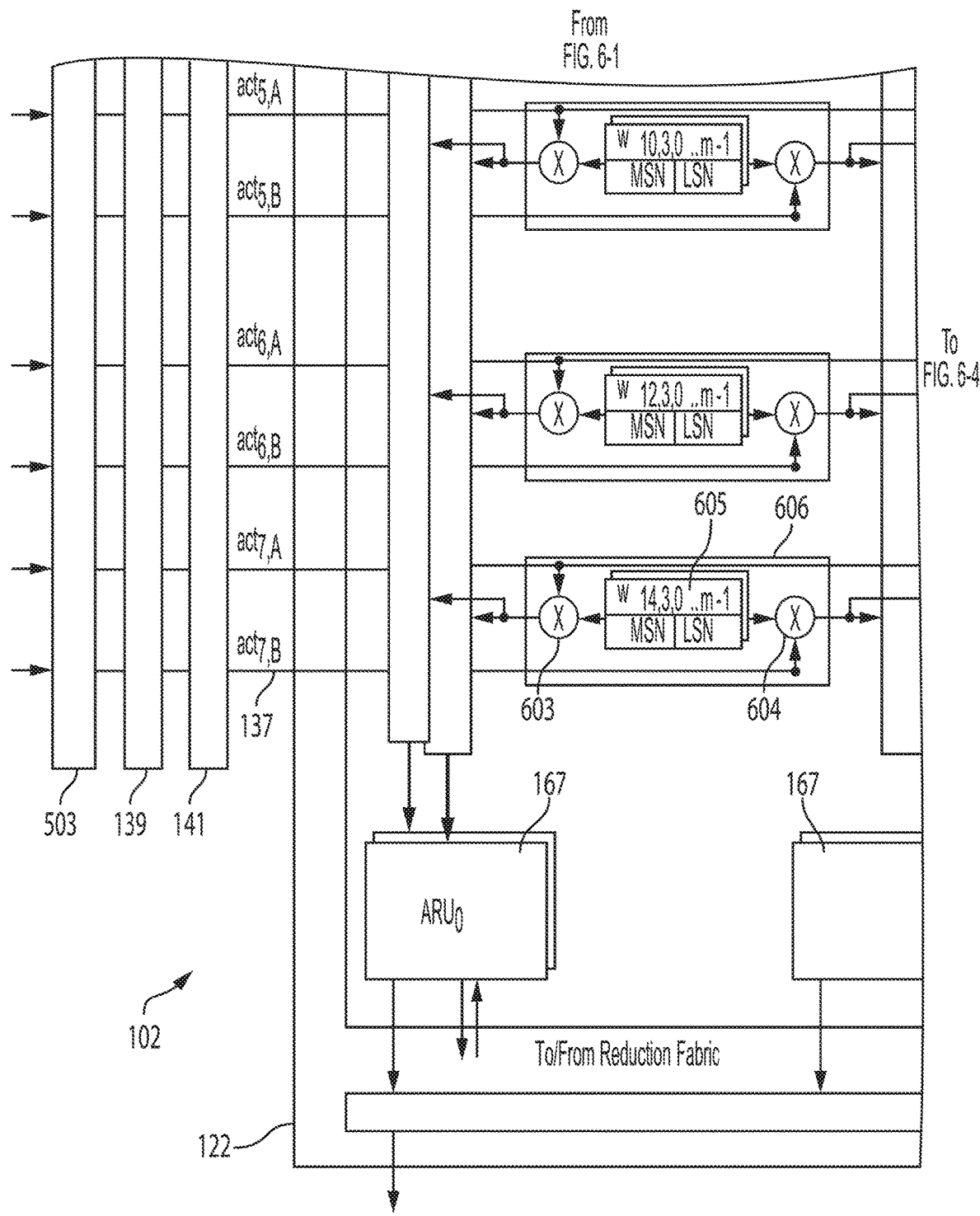
Figures 4, 6:
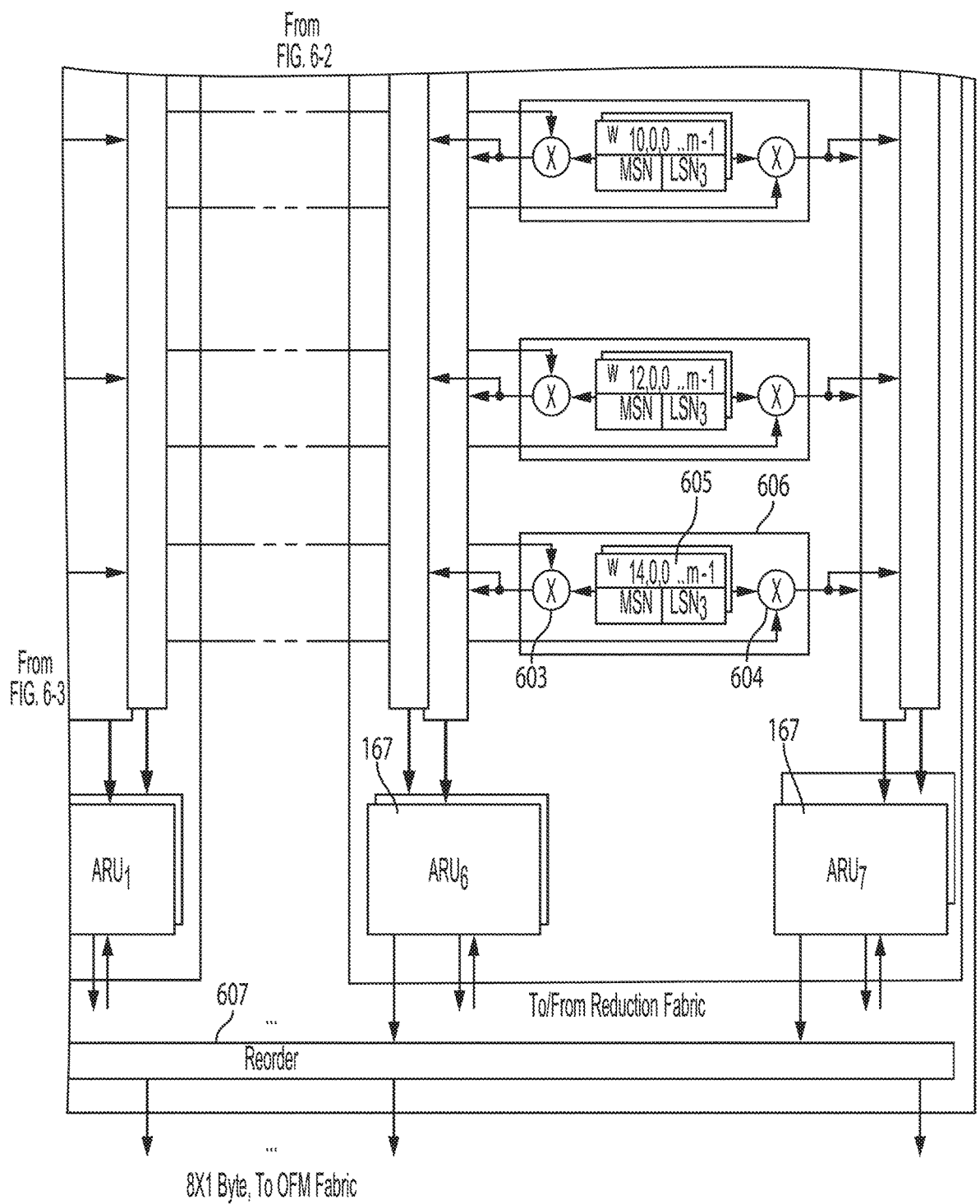

Let us continue considering several embodiments that might be of interest when it is desirable to reduce NPU 100 silicon area, while maintaining throughput as much as possible. As described above, one way to reduce NPU silicon area—more specifically the area occupied by MR tiles 102—is to reduce multiplier 126 bit width from 8-bit-by-8-bit to 8-bit-by-4-bit or 4-bit-by-4-bit. Another way to reduce the area of MR tiles 102 may be by sharing weight register files 127. More specifically, FIG. 6 illustrates an MR tile 102 embodiment where each weight register file 605 is shared by two multipliers 603 and 604 within multiplier unit 606. Note that ABU 141 now broadcasts to MR array 122—from cache 129—data from two planar locations simultaneously. In other words, IFM slice that brings 16 data channels from a planar location has been replaced by two IFM half-length slices, each bringing 8 data channels from a planar location. The two planar locations may be adjacent to each other in order to reduce IFM cache size. Note that the 8 MR columns 133 have been regrouped into 4 MR column pairs 602, with each column pair having two sets of adder trees 128A, 128B and 128C, 128D as well as two ARUs. MR column pairs 602 operate by taking same depth channel from both pixels—i.e. both planar locations—and multiplying those two activations by same weight—fetched from the shared weight register file 605. In other words, MR columns 602 act to compute convolution at two planar locations in parallel, simultaneously. Correspondingly, adder tree pairs and the associated ARU on the left side of each MR column 602, e.g. $\Sigma_{0,A}$, $\Sigma_{0,B}$ and $ARU_0$, compute OFM at the first planar location, while adder tree pairs and the associated ARU on the right side of each MR column 602, e.g. $\Sigma_{1,A}$, $\Sigma_{1,B}$ and $ARU_1$, compute OFM at the second planar location. With ARUs computing two half-length OFMs—one at each planar location—the reorder module 607 merges half-length OFMs from each planar location back to full-length OFMs at each planar location and sends the resulting full-length OFM slices over IFM delivery fabric 106 to SRAM for storage. Note that ABU 141 has to be modified and reconfigured correspondingly to fetch full-length IFM slices from IFM cache 139 at two planar location, split these full-length IFM slices into half-length IFM slices, interleave the resulting half-length IFM slices activation-lane-wise and cycle over half-length IFM slices to broadcast data from all depth channels as necessary.

FIGS. 7A through 7H illustrate a convolution window 700 of planar size 2×2 traversing an IFM tensor 200 in a zig-zag fashion. More specifically, the convolution window starts from the left, as shown FIG. 7A, and traverses the IFM tensor 200 in a repeating pattern of sliding one row up, one column right, one row down, and one column right again as illustrated in FIGS. 7B, 7C, 7D and 7E respectively, with another repetition shown in FIGS. 7F, 7G and 7H. Such zig-zag traversal may be used for baseline direct convolution as described in the '610 application. More specifically, zig-zag traversal allows computing several rows of OFM data per each horizontal pass while keeping the required IFM cache 139 size to a minimum. Similarly, zig-zag traversal can allow computing several columns of OFM data per each vertical pass while keeping the required IFM cache 139 size to a minimum.

FIGS. 8A through 8H show the order and planar locations of computed convolution results in OFM tensor 209 as the convolution window 700 in FIGS. 7A through 7H traverses IFM tensor 200 in zig-zag fashion. The convolution result is first computed and stored at location 703 in FIG. 8A, with subsequent results stored in a repeating pattern at locations one row up, one column right, one row down and one column right as shown in FIGS. 8B, 8C, 8D and 8E respectively, with another repetition shown in FIGS. 8F, 8G and 8H.

FIGS. 9A through 9D illustrate planar locations of convolution window pair that may be computed by MR tiles 102 utilizing the embodiment shown in FIG. 6. The embodiment shown in FIG. 6 computes convolutions at two planar locations simultaneously, with the planar locations being, in some embodiments, adjacent to each other to reduce IFM cache size. More specifically, the two planar locations may have a planar size of 2 rows by 1 column, as illustrated in FIGS. 9A through 9D. The 2×1 convolution window pair 700 and 705 may traverse the IFM tensor 200 in a left-toright fashion, thus computing two rows of OFM data per each horizontal pass, similar to zig-zag traversal when using a single convolution window 700 in FIGS. 7A through 7H. This kind of planar traversal pattern may be used in order to reduce the size of IFM cache 139.

Figure 10D:
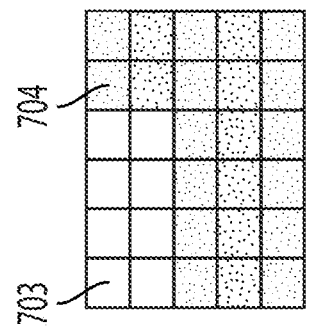
FIG. 10D shows computed convolution results.
Figure 10C:
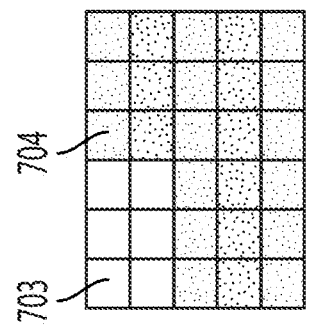
FIG. 10C shows computed convolution results.
Figure 10B:
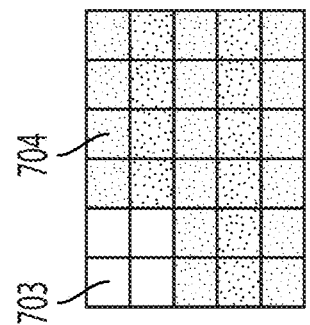
FIG. 10B shows computed convolution results.
Figure 10A:
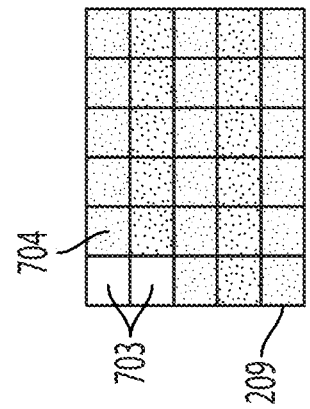
FIG. 10A shows computed convolution results.

FIGS. 10A through 10D show the order and planar locations of computed convolution results in OFM tensor 209 as the 2×1 convolution window pair 700 and 705 in FIGS. 9A through 9D traverses IFM tensor 200 in left-to-right fashion. The first 2×1 pair of convolution results is computed and stored at locations 703 in FIG. 10A, with subsequent results stored at locations one column right as shown in FIGS. 10B, 10C and 10D.

FIGS. 11A through 11H illustrate another way for convolution window pairs to traverse the IFM tensor 700. In this example, the 2×1 convolution window pair 700 and 705 may traverse the IFM tensor 200 in a zig-zag fashion, thus computing four rows of OFM data per each horizontal pass. More specifically, the convolution window starts from the left, as shown FIG. 11A, and traverses the IFM tensor 200 in a repeating pattern of sliding two rows up, one column right, two rows down, and one column right again as illustrated in FIGS. 11B, 11C, 11D and 11E respectively, with another repetition shown in FIGS. 11F, 11G and 11H.

FIGS. 12A through 12H show the order and planar locations of computed convolution results in OFM tensor 209 as the 2×1 convolution window pair 700 and 705 in FIGS. 11A through 9H traverses IFM tensor 200 in a zig-zag fashion. The first 2×1 pair of convolution results is computed and stored at locations 703 in FIG. 12A, with subsequent results stored in a repeating pattern at locations two rows up, one column right, two rows down and one column right as shown in FIGS. 12B, 12C, 12D and 12E respectively, with another repetition shown in FIGS. 12F, 12G and 12H.

Figure 13A:
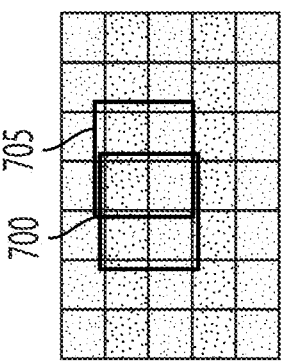
FIG. 13A illustrates a 1×2 convolution window pair.
Figure 13B:
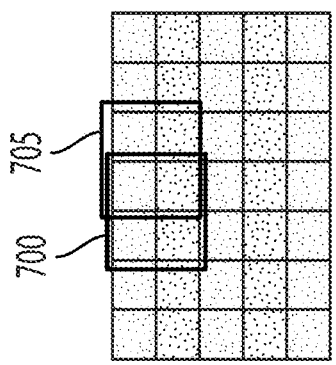
FIG. 13B illustrates a 1×2 convolution window pair.
Figure 13C:
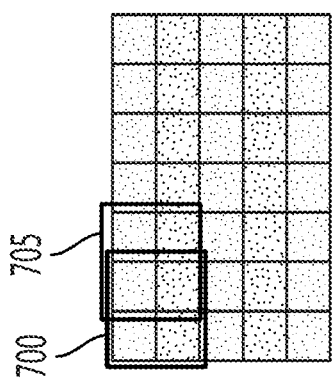
FIG. 13C illustrates a 1×2 convolution window pair.
Figure 13D:
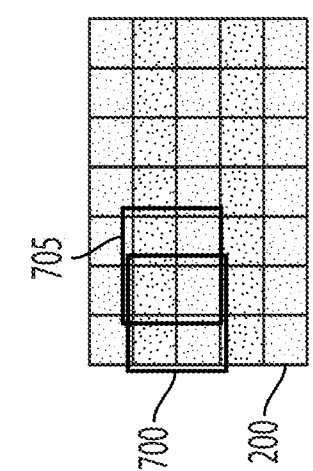
FIG. 13D illustrates a 1×2 convolution window pair.
Figure 13E:
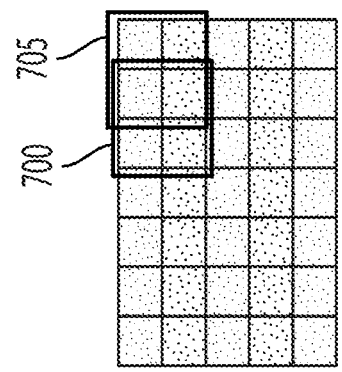
FIG. 13E illustrates a 1×2 convolution window pair.
Figure 13F:
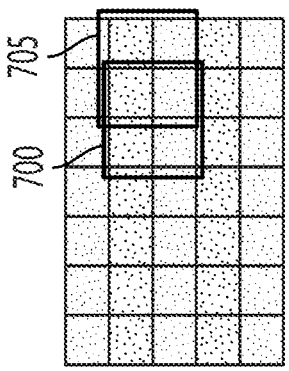
FIG. 13F illustrates a 1×2 convolution window pair.

FIGS. 13A through 13F illustrate yet another way for convolution window pairs to traverse the IFM tensor 700. In this example, a 1×2 convolution window pair 700 and 705 may traverse the IFM tensor 200 in a zig-zag fashion, thus computing two rows of OFM data per each horizontal pass. More specifically, the convolution window starts from the left, as shown FIG. 13A, and traverses the IFM tensor 200 in a repeating pattern of sliding one row up, two columns right, one row down, and two columns right again as illustrated in FIGS. 13B, 13C, 13D and 13E respectively, with another repetition starting as shown in FIG. 13F.

Figure 14A:
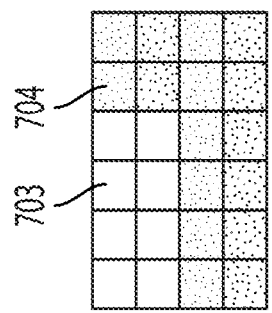
FIG. 14A shows computed convolution results.
Figure 14B:
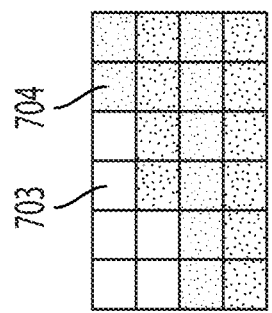
FIG. 14B shows computed convolution results.
Figure 14C:
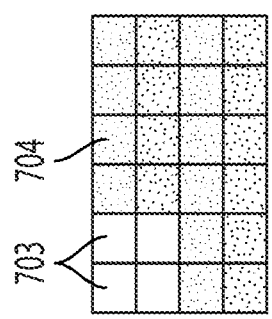
FIG. 14C shows computed convolution results.
Figure 14D:
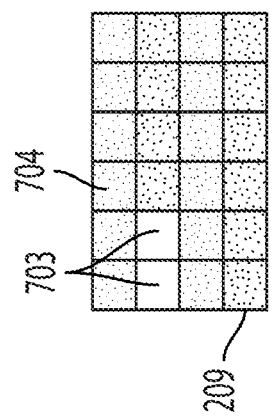
FIG. 14D shows computed convolution results.
Figure 14E:
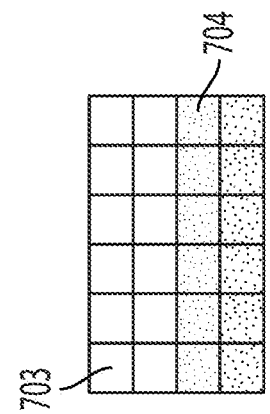
FIG. 14E shows computed convolution results.
Figure 14F:
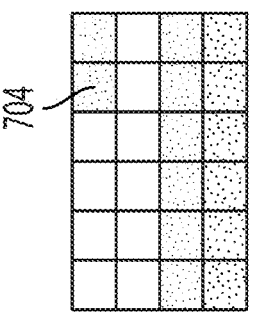
FIG. 14F shows computed convolution results.

FIGS. 14A through 14F show the order and planar locations of computed convolution results in OFM tensor 209 as the 1×2 convolution window pair 700 and 705 in FIGS. 13A through 13F traverses IFM tensor 200 in a zig-zag fashion. The first 1×2 pair of convolution results is computed and stored at locations 703 in FIG. 14A, with subsequent results stored in a repeating pattern at locations two rows up, one column right, two rows down and one column right as shown in FIGS. 14B, 14C, 14D and 14E respectively, with another repetition starting as shown in FIG. 14F.

Note that instead of reducing silicon area, since weight register files 127 are located not far from each other in physical layout, MR tile 102 could be reconfigured as shown in FIG. 6 to double the size of weight kernel storage. This might be particularly useful when working large weight kernels too large to fit into weight register file 127.

One way to describe layer convolution computation logically may be via representing layer convolution as a set of nested for-loops, each for-loop cycling over an index, including planar coordinates and weight kernel indices. Performing convolutions at two planar locations simultaneously may be equivalent to "unrolling" the convolution for-loop in planar fashion, in hardware. Note that unrolling convolution in planar fashion may result in an increase of SRAM access an increase in IFM cache 139 size. Therefore, one should consider the resulting SRAM access frequency and IFM cache 139 size as factors when choosing particular NPU embodiment. Also note that unrolling convolution for-loop in planar fashion may reduce the efficiency of skipping zero-valued activations. More specifically, activations $act_{j,A}$ and $act_{j,B}$ must both be zero in order for ABU to skip broadcasting $act_{j,A}$ and $act_{j,B}$ to MR array 122.

Figures 1, 15A:
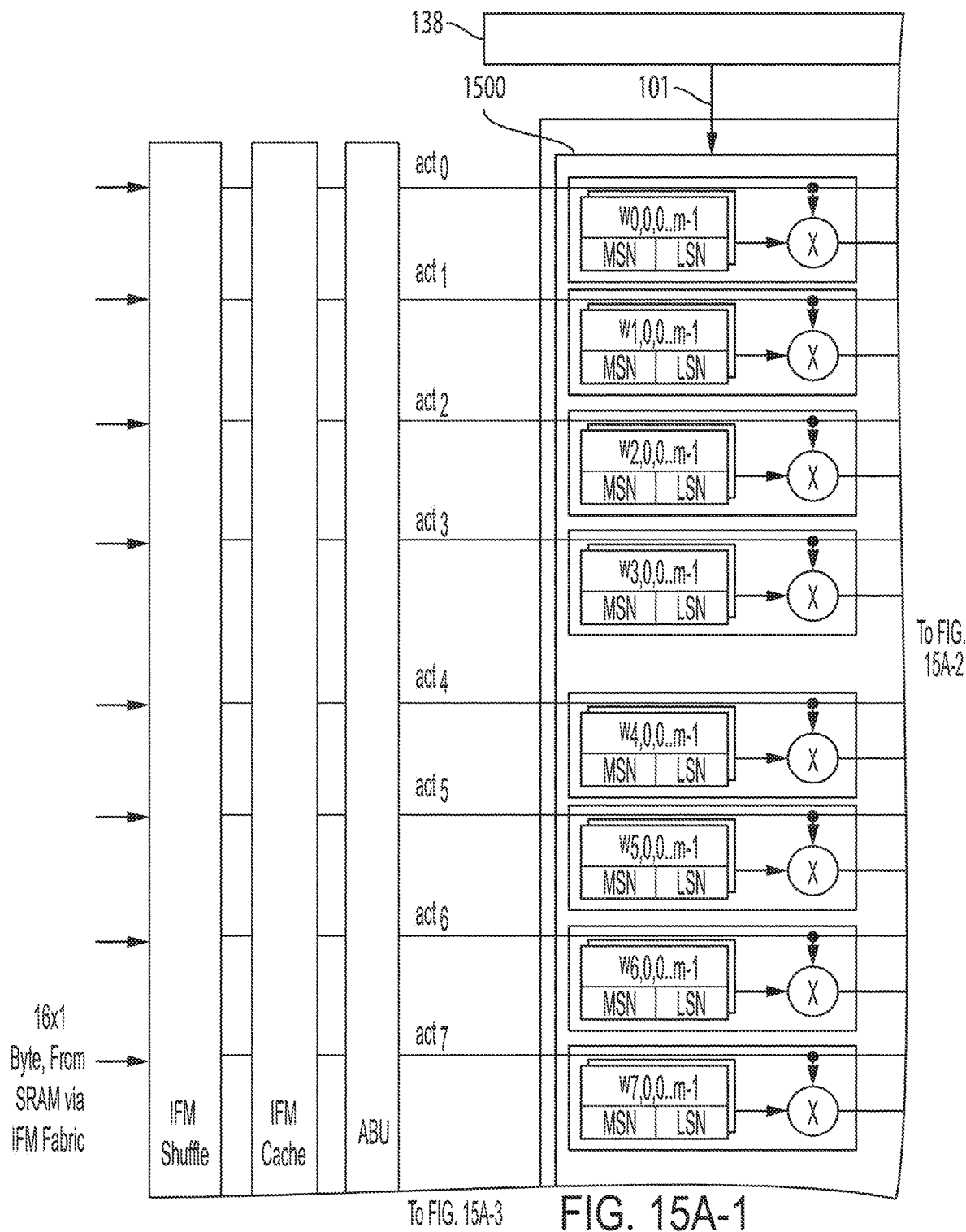
Figures 2, 15A:
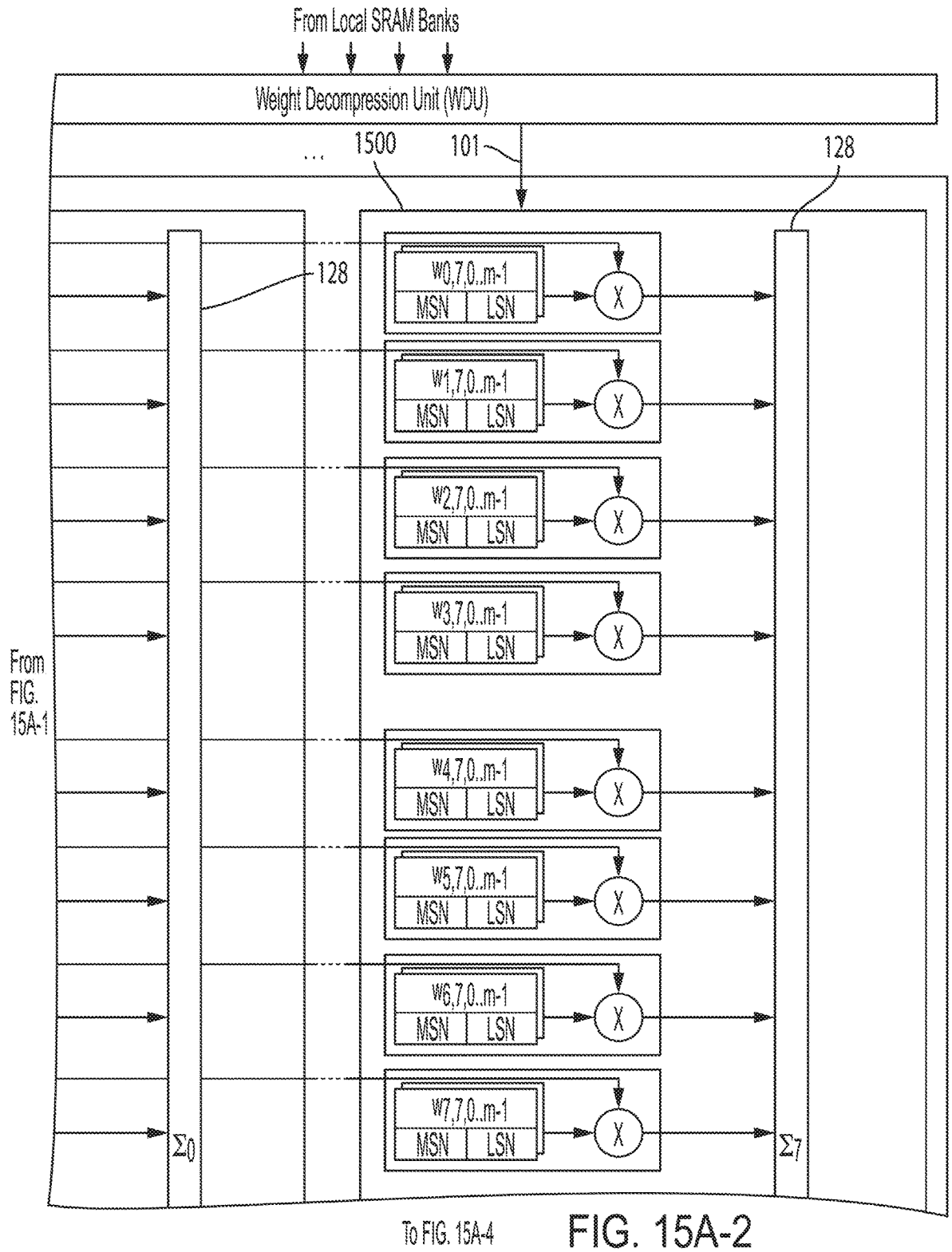
Figures 3, 15A:
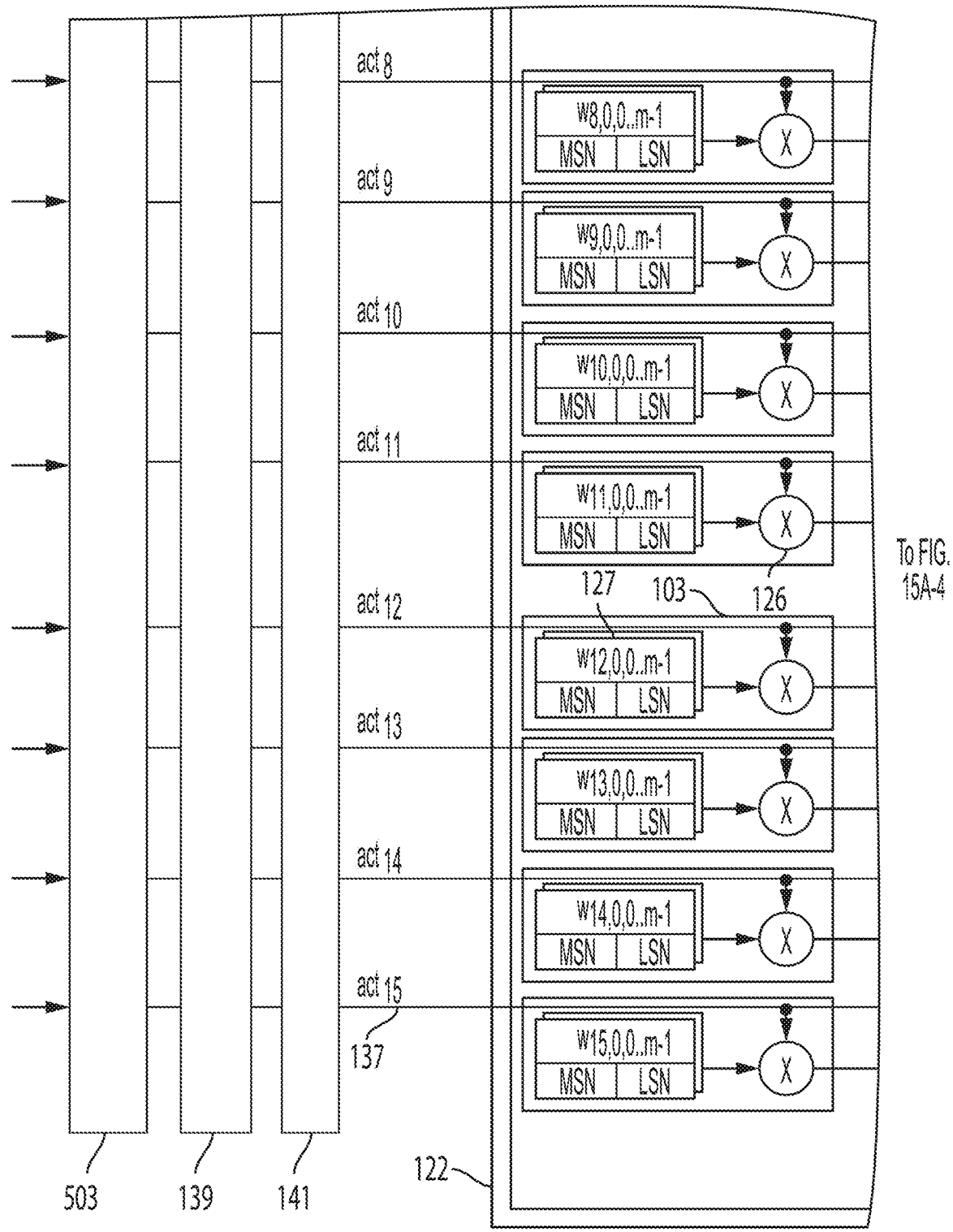

Another way to reduce NPU silicon area, in particular MR tile 102 area, may involve replacing pairs of adder trees 128A and 128B with single adder trees 128 and replacing of ARUs 167 with single ARUs, as illustrated in FIG. 15A.

Removing adder trees 128B interferes with the mechanism of zero activation skipping that was illustrated in FIGS. 1C through 1F, thus obviating look-aside multiplexer 161 connections in FIG. 1I. In this situation the mechanism of zero activation skipping can be replaced with one illustrated in FIG. 15B, where activation lanes are grouped in sets 215 of four, i.e. quads, similar to FIG. 2F. Multiplier units 103 in each quad 215 of each MR column 1610 output products to a "quad adder tree" 1600 $\Sigma_{q,c}$, where q is the quad number 0, 1, 2 or 3 and c is the MR column number ranging from 0 to 7. In other words, each quad adder tree 1600 computes "quad dot products", with each quad dot product having four terms corresponding to outputs of multiplier units 103 in the adder tree's quad. Another adder tree $\Sigma_c$ in each MR column 1610 sums up the four quad dot products once each of those quad dot products passes through a "quad FIFO" $FIFO_{q,c}$. The zero activation skipping mechanism in FIG. 15B may operate in a per-quad fashion, where an activation lane quad may skip a multiplication when activations in IFM buffer 124 in all four lanes associated with the quad have zero values. For example, FIG. 4J shows the third (left-most) slot in IFM buffer 124 slot having all having zero (nibble) values. An activation lane quad in FIG. 15B may skip the clock cycle that would otherwise be used to multiply such all-zero IFM value quad with kernel weights, thus increasing the activation quad's computation throughput.

An activation lane quad 215 skipping a multiplication cycle may cause that quad to run ahead, i.e. out of order, of other activation lane quads. Therefore, FIFOs $FIFO_{q,c}$ may be needed to temporarily store activation quad lane dot products such as to restore the order of resulting quad dot products before feeding these resulting dot products to column adder trees 128. Column adder trees 128 can skip an addition when all of adder trees 128 receive all zeros as inputs.

The probability of all activation lanes in a set 215 having zero values drops exponentially as a function of the number of lanes in each set 215. Therefore, reducing the number of activation lanes 137 per set 215, e.g. from four to two, may increase the probability of a lane set 215 skipping a multiplication, thus potentially increasing the computation throughput.

Figures 1, 15B:
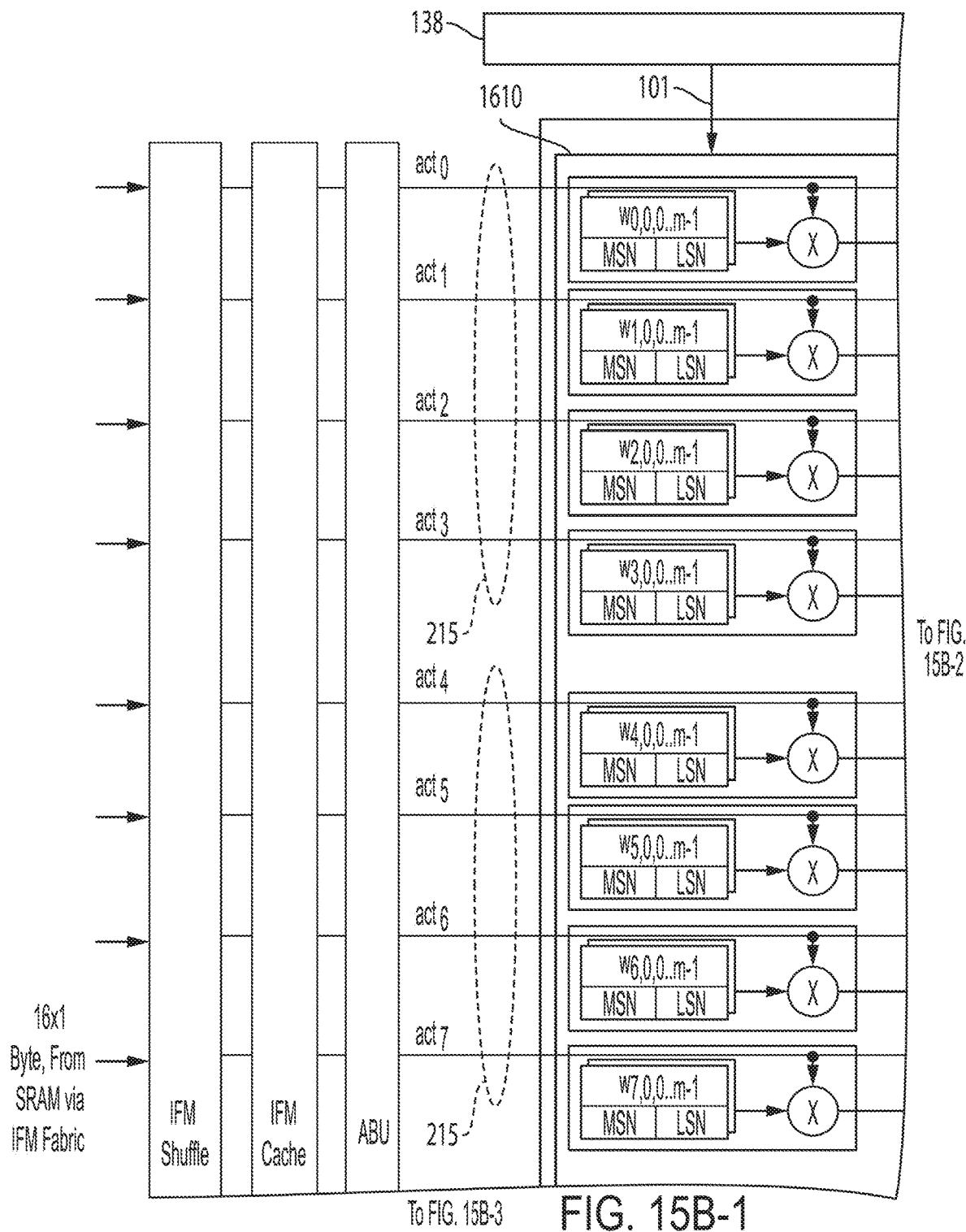
Figures 2, 15B:
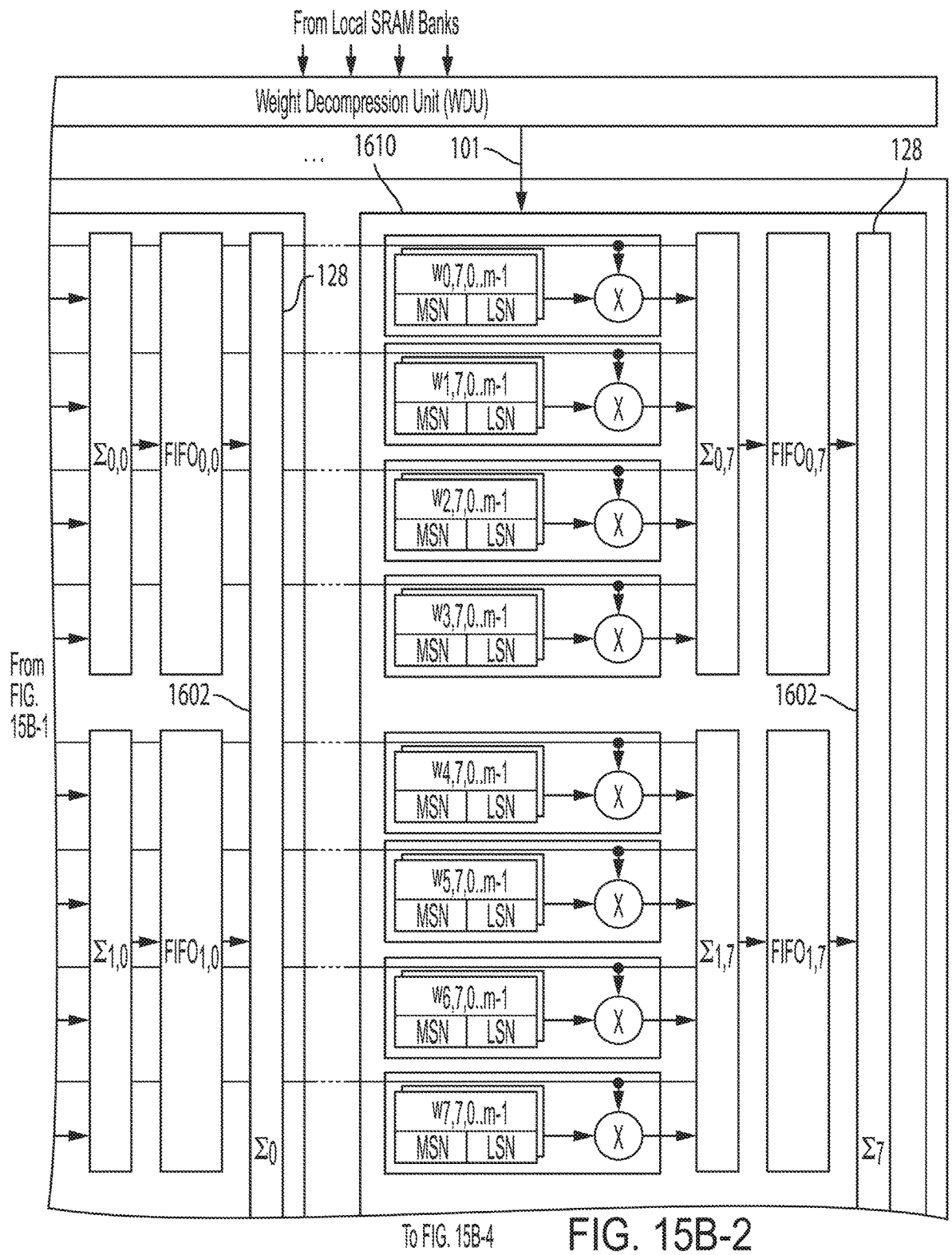
Figures 3, 15B:
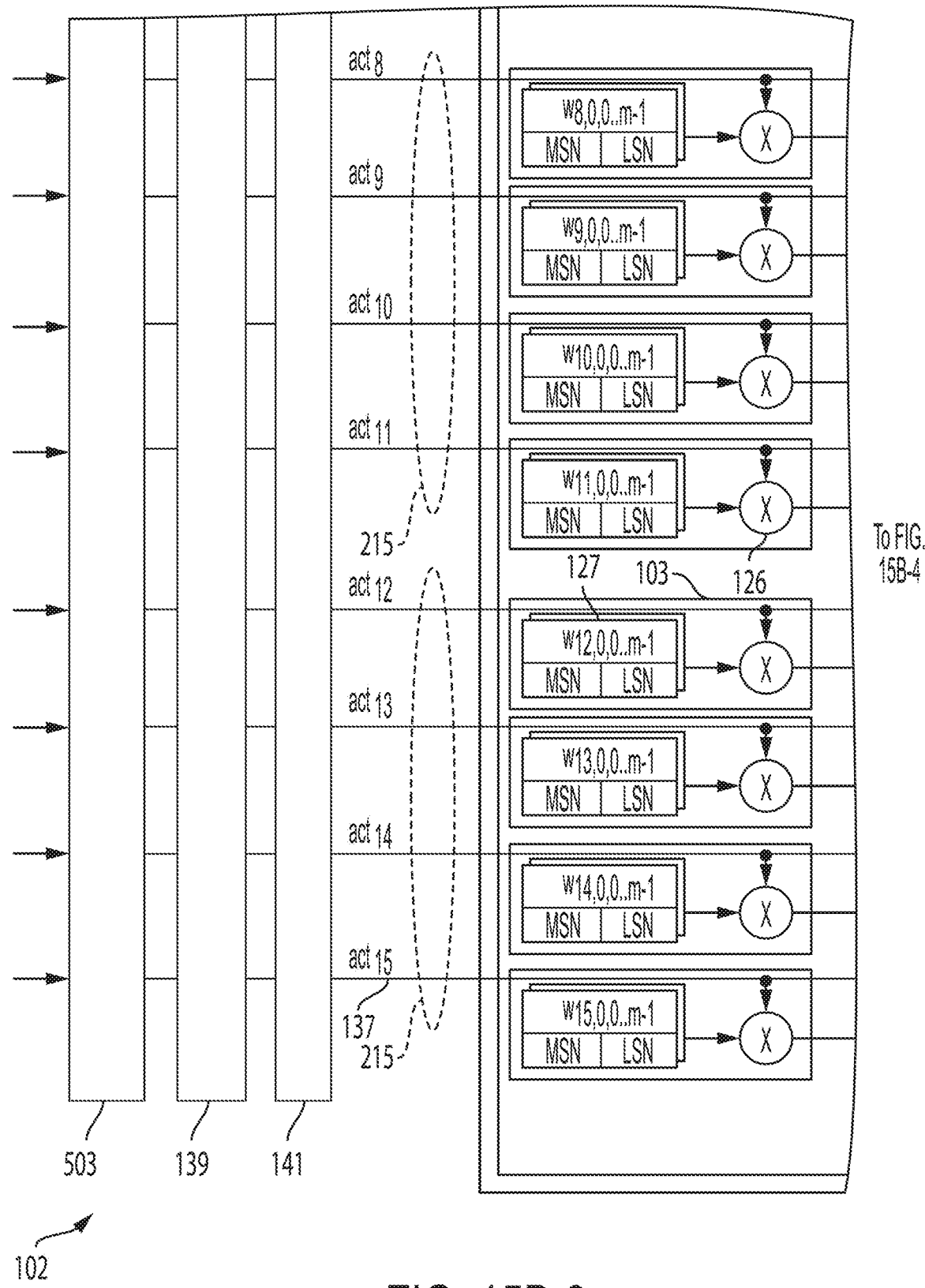
Figures 4, 15B:
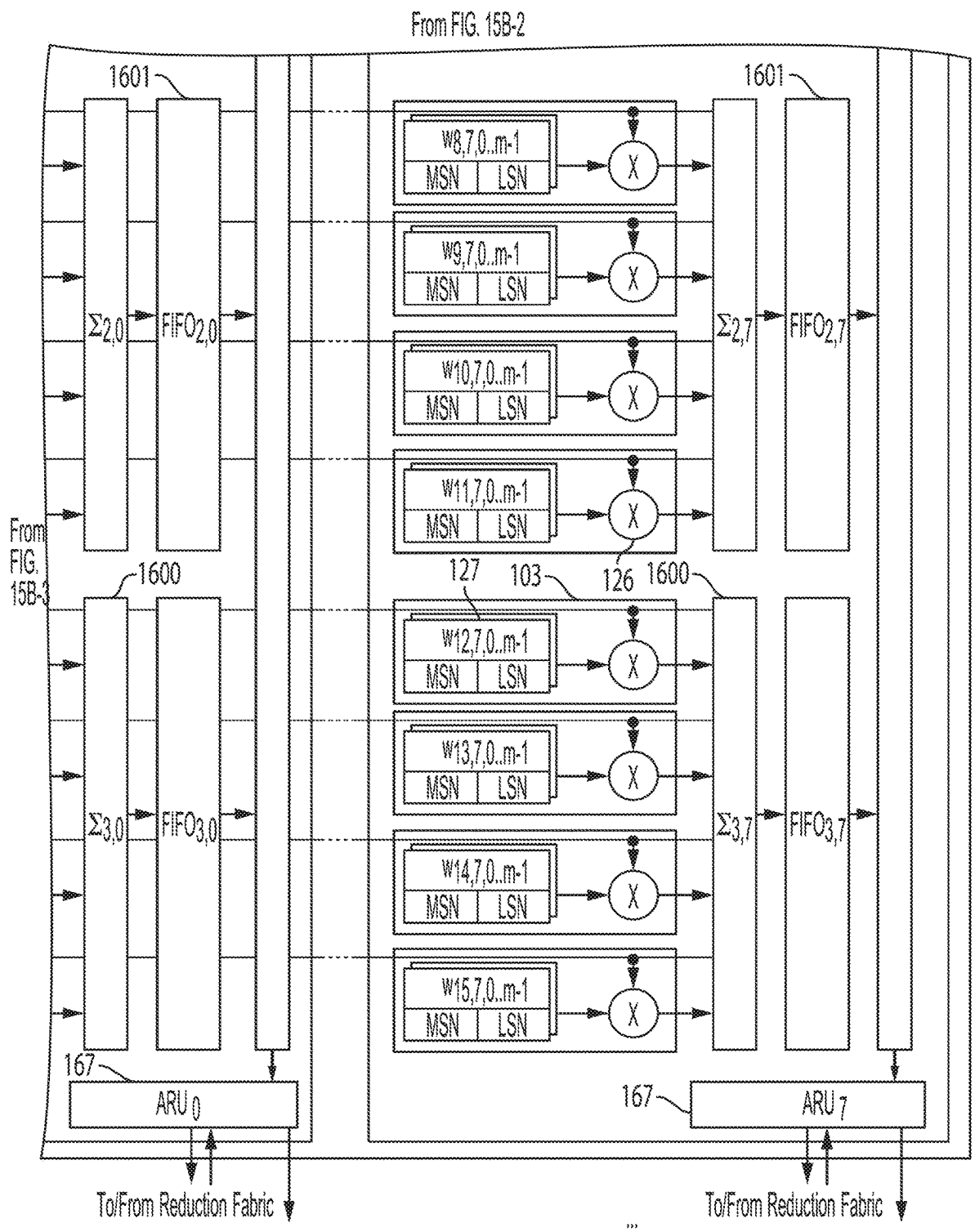
Figures 1, 15C:
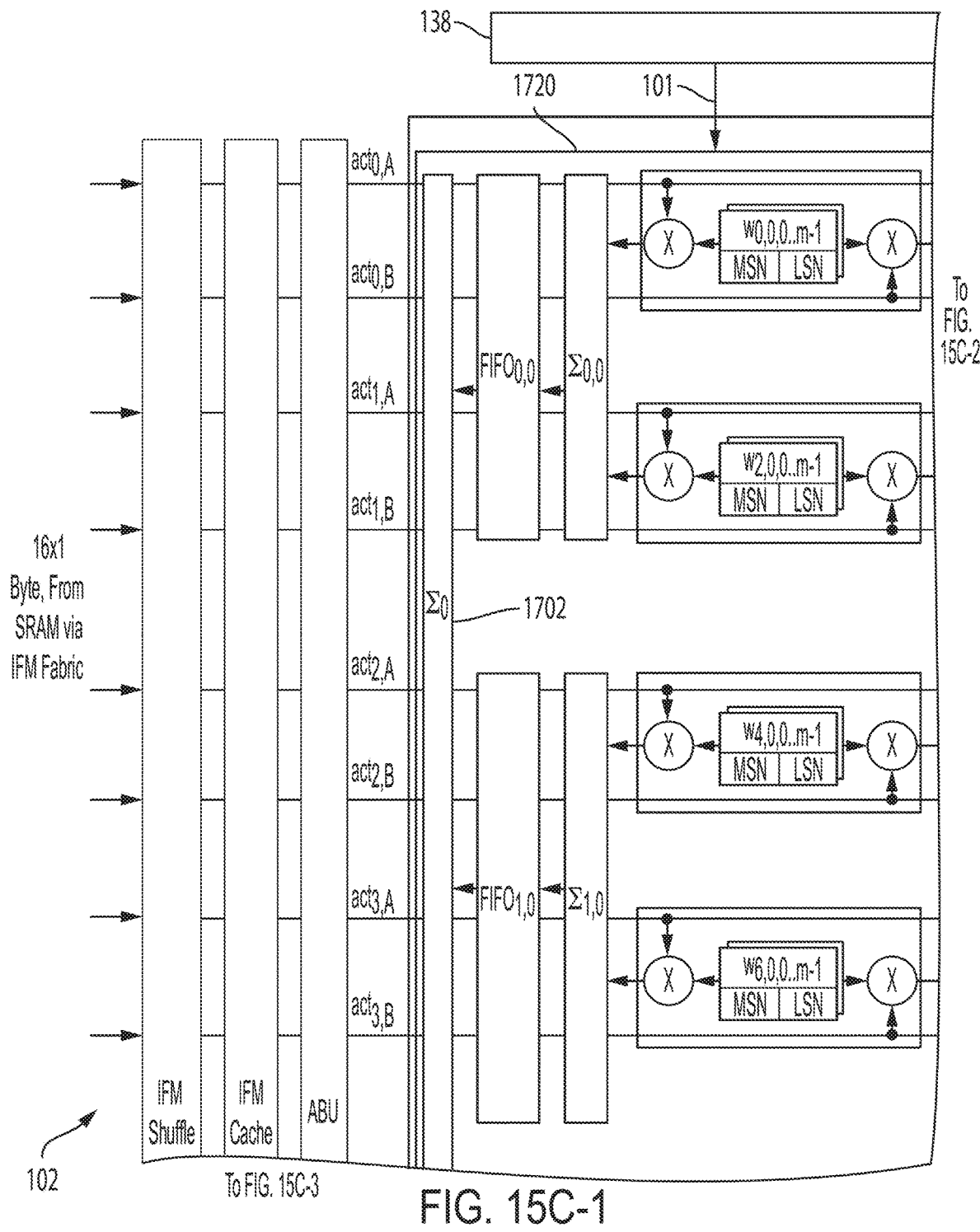
Figures 2, 15C:
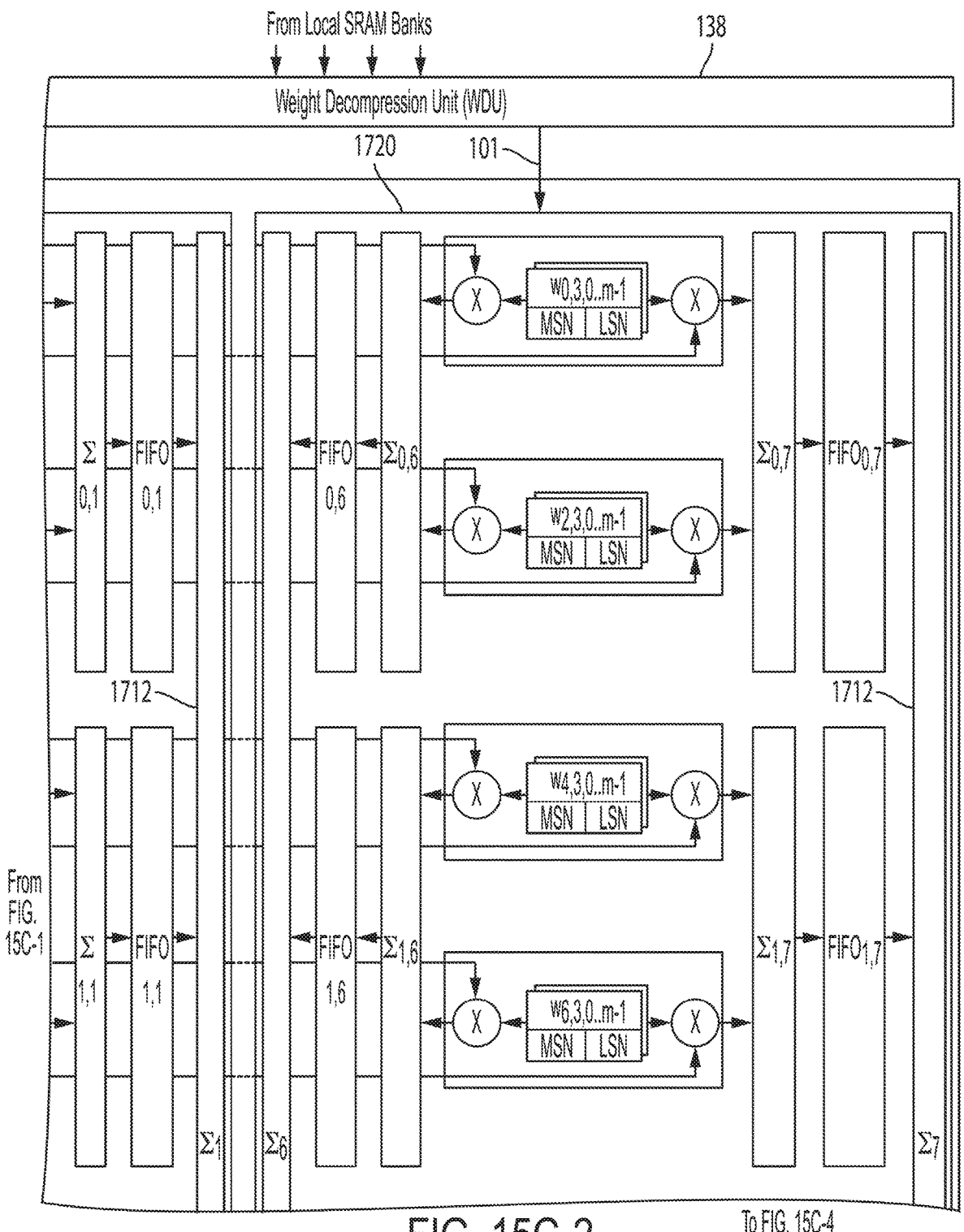
Figures 3, 15C:
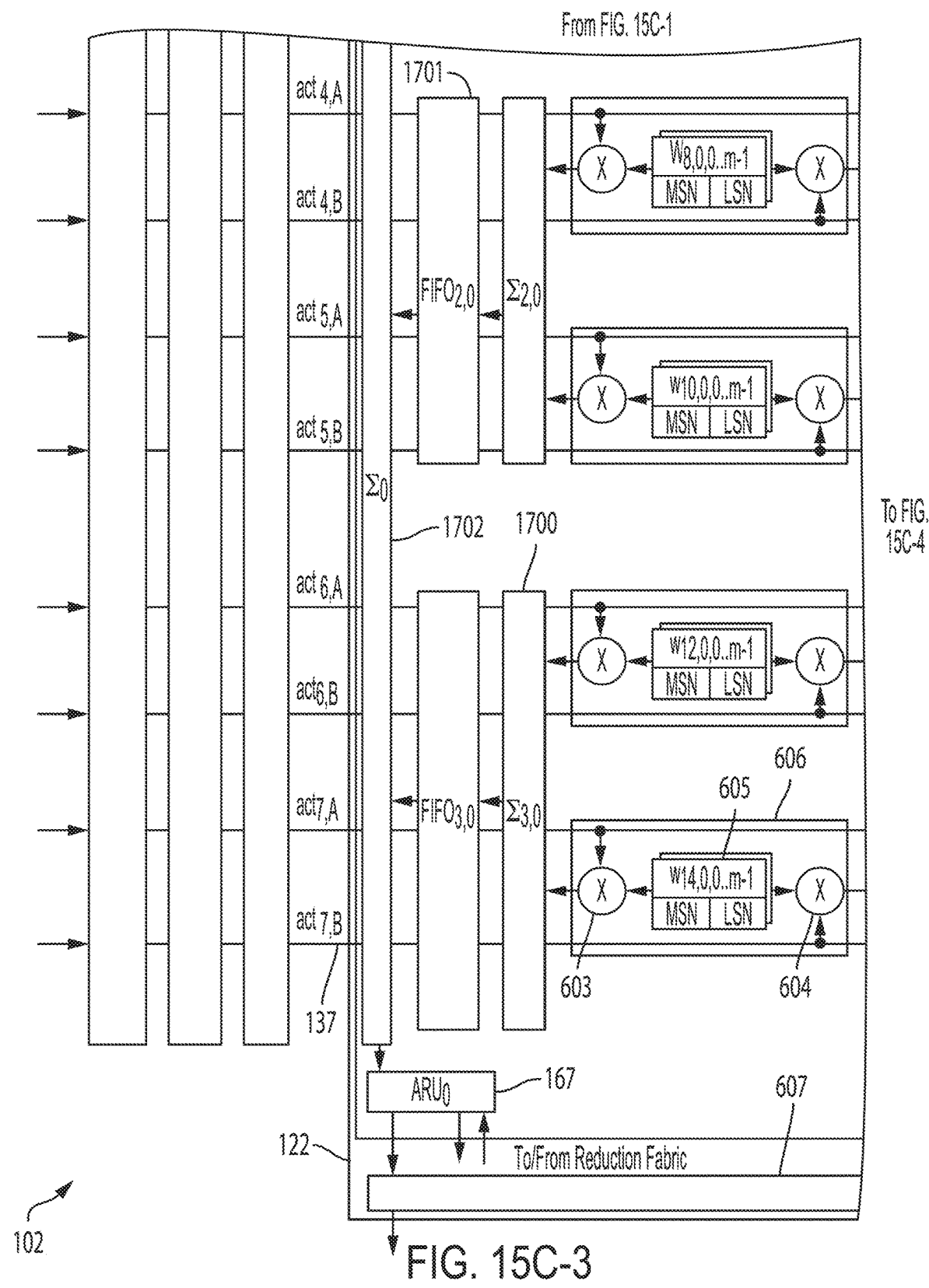
Figures 4, 15C:
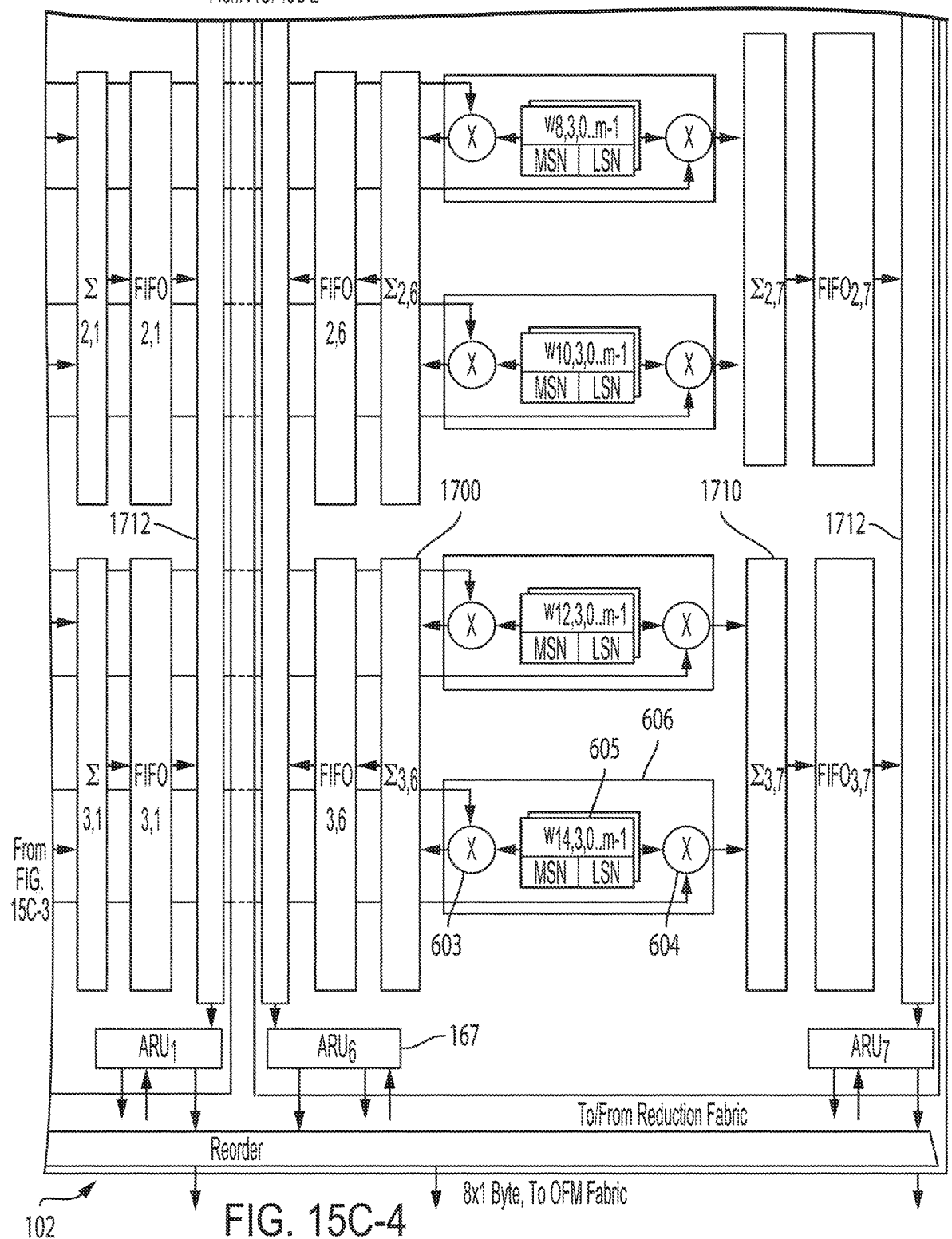

Lastly, the zero activation skipping mechanism in FIG. 15B can be combined with the planar patch unroll microarchitecture of FIG. 5A resulting in an embodiment shown in FIG. 15C where MR column pairs 1720 each have two adder trees 1702 and 1712, not two pairs of adder trees, two sets of quad adder trees 1700 and 1710, optionally, two sets of quad adder tree FIFOs 1701 and 1711 and two ARUs 167, as opposed to having two pairs of ARUs.

As used herein, "a portion of" something means all, or less than all, of the thing. As such, for example "a portion of an array" means all or less than all of the array. As used herein, the term "or" should be interpreted as "and/or", such that, for example, "A or B" means any one of "A" or "B" or "A and B". It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a mixed-precision NPU tile with depth-wise convolution have been specifically described and illustrated herein, many modifications and variations will be apparent to those skilled in the art. Accordingly, it is to be understood that a mixed-precision NPU tile with depth-wise convolution constructed according to principles of this disclosure may be embodied other than as specifically described herein. The invention is also defined in the following claims, and equivalents thereof.

What is claimed is:

1. A processor, comprising: a first tile, a second tile, a memory, and a bus, the bus being connected to: the memory, the first tile, and the second tile, the first tile comprising: a first weight register, a second weight register, an activations cache, a shuffler, an activations buffer, and a plurality of multipliers, the plurality of multipliers comprising: a first multiplier, a second multiplier, a plurality of bit shifters, for shifting products involving at least one most significant nibble to be offset from products involving two least significant nibbles, and a plurality of accumulators, for accumulating outputs of the plurality of bit shifters, the multipliers of the plurality of multipliers being arranged in a plurality of columns and a group of lanes, the group of lanes including an adder tree for summing outputs of the multipliers, the activations buffer being configured to include: a first queue connected to the first multiplier, and a second queue connected to the second multiplier, the first queue comprising a first register and a second register, the first register of the first queue being an output register for the first queue, the second queue comprising a first register and a second register, the first register of the second queue being an output register for the second queue, the activations cache including a plurality of independent lanes, each of the independent lanes being randomly accessible, the first tile being configured: to receive a tensor of activations representing an image comprising a plurality of pixels each having a plurality of color components, the tensor comprising a plurality of two-dimensional arrays, each representing one color component of the image; and to perform a convolution of a kernel with one of the two-dimensional arrays.

2. The processor of claim 1, wherein the shuffler is connected to an output of the activations cache.

3. The processor of claim 2, wherein the first tile comprises a plurality of multipliers including the first multiplier and the second multiplier, arranged in a plurality of columns and a plurality of lanes, the lanes being arranged in groups of four, each group of lanes including an adder tree for summing outputs of the multipliers.

4. The processor of claim 3, wherein the first tile further comprises an accumulator for each group of lanes, for accumulating outputs of the adder tree.

5. The processor of claim 2, wherein the shuffler has a granularity of four lanes.

6. The processor of claim 2, wherein the shuffler has a granularity of one lane.

7. The processor of claim 1, wherein the shuffler is connected to an input of the activations cache.

8. The processor of claim 7, wherein the first tile comprises a plurality of multipliers including the first multiplier and the second multiplier, arranged in a columns and a plurality of lanes, the lanes being arranged in groups of four, each group of lanes including an adder tree for summing outputs of the multipliers.

9. The processor of claim 8, wherein the first tile further comprises an accumulator for each group of lanes, for accumulating outputs of the adder tree.

10. The processor of claim 8, wherein the first tile further comprises, for a set of four groups of lanes:

a plurality of bit shifters, for shifting products involving at least one most significant nibble to be offset from products involving two least significant nibbles, and a plurality of accumulators, for accumulating the outputs of the bit shifters.

11. The processor of claim 8, wherein the shuffler has a granularity of four lanes.

12. The processor of claim 8, wherein the shuffler has a granularity of one lane.

13. A method for calculating with a processing circuit, the processing circuit comprising: a first tile, a second tile, a memory, and a bus, the bus being connected to: the memory, the first tile, and the second tile, the first tile comprising: a first weight register, a second weight register, an activations cache, a shuffler, an activations buffer, and a plurality of multipliers, the plurality of multipliers comprising: a first multiplier, a second multiplier, a plurality of bit shifters, for shifting products involving at least one most significant nibble to be offset from products involving two least significant nibbles, and a plurality of accumulators, for accumulating outputs of the plurality of bit shifters, the multipliers of the plurality of multipliers being arranged in a plurality of columns and a group of lanes, the group of lanes including an adder tree for summing outputs of the multipliers, the activations buffer being configured to include: a first queue connected to the first multiplier, and a second queue connected to the second multiplier, the first queue comprising a first register and a second register, the first register of the first queue being an output register for the first queue, the second queue comprising a first register and a second register, the first register of the second queue being an output register for the second queue, the activations cache including a plurality of independent lanes, each of the independent lanes being randomly accessible, the method comprising: receiving a tensor of activations representing an image comprising a plurality of pixels each having a plurality of color components, the tensor comprising a plurality of two-dimensional arrays, each representing one color component of the image; and performing a convolution of a kernel with one of the two-dimensional arrays.

14. The method of claim 13, wherein the shuffler is connected to an output of the activations cache.

15. The method of claim 14, wherein the first tile comprises a plurality of multipliers including the first multiplier and the second multiplier, arranged in a plurality of columns and a plurality of lanes, the lanes being arranged in groups of four, each group of lanes including an adder tree for summing outputs of the multipliers.

16. The method of claim 15, wherein the first tile further comprises an accumulator for each group of lanes, for accumulating outputs of the adder tree.

17. The method of claim 14, wherein the shuffler has a granularity of four lanes.

18. A method for calculating with a means for processing, the means for processing comprising: a first tile, a second tile, a memory, and a bus, the bus being connected to: the memory, the first tile, and the second tile, the first tile comprising: a first weight register, a second weight register, an activations cache, a shuffler, an activations buffer, and a plurality of multipliers, the plurality of multipliers comprising: a first multiplier, a second multiplier, a plurality of bit shifters, for shifting products involving at least one most significant nibble to be offset from products involving two least significant nibbles, and a plurality of accumulators, for accumulating outputs of the plurality of bit shifters, the multipliers of the plurality of multipliers being arranged in a plurality of columns and a group of lanes, the group of lanes including an adder tree for summing outputs of the multipliers, the activations buffer being configured to include: a first queue connected to the first multiplier, and a second queue connected to the second multiplier, the first queue comprising a first register and a second register, the first register of the first queue being an output register for the first queue, the second queue comprising a first register and a second register, the first register of the second queue being an output register for the second queue, the activations cache including a plurality of independent lanes, each of the independent lanes being randomly accessible, the method comprising: receiving a tensor of activations representing an image comprising a plurality of pixels each having a plurality of color components, the tensor comprising a plurality of two-dimensional arrays, each representing one color component of the image; and performing a convolution of a kernel with one of the two-dimensional arrays.

* * * * *